United States Patent [19]
Frank et al.

[11] Patent Number: 5,822,578
[45] Date of Patent: Oct. 13, 1998

[54] SYSTEM FOR INSERTING INSTRUCTIONS INTO PROCESSOR INSTRUCTION STREAM IN ORDER TO PERFORM INTERRUPT PROCESSING

[75] Inventors: Steven Frank, Hopkinton; Henry Burkhardt, III, Manchester; Frederick D. Weber, Concord; Linda Q. Lee, Cambridge; John A. Roskosz, Somerville; Brett D. Byers, Cambridge; Peter C. Schnorr, Sudbury; David I. Epstein, Boxborough, all of Mass.

[73] Assignee: Sun Microsystems, Inc., Mountain View, Calif.

[21] Appl. No.: 461,166

[22] Filed: Jun. 5, 1995

Related U.S. Application Data

[63] Continuation of Ser. No. 66,334, May 21, 1993, abandoned, which is a continuation of Ser. No. 370,325, Jun. 22, 1989, abandoned, which is a continuation-in-part of Ser. No. 136,930, Dec. 22, 1987, Pat. No. 5,055,999.

[51] Int. Cl.$^6$ .................................................. G06F 9/00
[52] U.S. Cl. ............................................................. 395/591
[58] Field of Search ................................... 395/375, 800, 395/741, 742, 591

[56] References Cited

U.S. PATENT DOCUMENTS

| Re. 28,811 | 5/1976 | Pierce ........................................ 179/15 |
|---|---|---|
| 3,713,096 | 1/1973 | Comfort et al. ......................... 340/172 |
| 3,723,976 | 3/1973 | Alvarez et al. ....................... 340/172.5 |
| 3,731,002 | 5/1973 | Pierce ........................................ 370/85 |
| 3,735,362 | 5/1973 | Ashany et al. ........................... 340/172 |
| 3,748,647 | 7/1973 | Ashany et al. ........................... 340/172 |
| 3,749,897 | 7/1973 | Hirvela ..................................... 371/62 |
| 3,800,291 | 3/1974 | Cocke et al. ......................... 340/172.5 |
| 3,896,418 | 7/1975 | Brown ..................................... 364/200 |
| 4,011,545 | 3/1977 | Nadir ....................................... 340/172 |
| 4,031,512 | 6/1977 | Faber ....................................... 340/147 |

(List continued on next page.)

FOREIGN PATENT DOCUMENTS

| 0014926 | 2/1980 | European Pat. Off. . |
|---|---|---|
| 0233993 | 4/1982 | European Pat. Off. . |
| 0 264 235 | 10/1986 | European Pat. Off. . |
| 0233993 | 2/1987 | European Pat. Off. . |
| 0214718 | 3/1987 | European Pat. Off. . |

(List continued on next page.)

OTHER PUBLICATIONS

Uffenbeck, John, "Microcomputers and Microprocessors," 1985, Prentice–Hall, pp. 257–264 and 320–332.

Ciepielewsik et al., "A Formal Model for Or–Parallel . . . ", Proc. of the IFIP 9th World Computer Congress (1983) pp. 299–305.

Censier et al., "A New Solution to Coherence . . . ", IEEE Transaction on Computers, vol. c–27, No. 12 (Dec. 1978) pp. 1112–1118.

(List continued on next page.)

*Primary Examiner*—Richard L. Ellis

[57] ABSTRACT

Digital multiprocessor methods and apparatus comprise a plurality of processors, including a first processor for normally processing an instruction stream including instructions from a first instruction source. At least one of the processors can transmit inserted-instructions to the first processor. Inserted-instructions are executed by the first processor in the same manner as, and without affecting the sequence of, instructions from the first instruction source. The first instruction source can be a memory element, including an instruction cache element for storing digital values representative of instructions and program steps, or an execution unit (CEU) which asserts signals to the instruction cache element to cause instructions to be transmitted to the CEU. The processors include input/output (I/O) processors having direct memory access (DMA) insert elements, which respond to a peripheral device to generate DMA inserted-instructions. These DMA inserted-instructions are executable by the first processing element in the same manner as, and without affecting processing sequence of, the instructions from the first instruction source.

21 Claims, 77 Drawing Sheets

U.S. PATENT DOCUMENTS

| | | | |
|---|---|---|---|
| 4,077,059 | 2/1978 | Cordi et al. | 364/200 |
| 4,141,067 | 2/1979 | McLagan | 364/200 |
| 4,240,136 | 12/1980 | Kjoller | 364/200 |
| 4,240,143 | 12/1980 | Besemer et al. | 364/200 |
| 4,275,458 | 6/1981 | Khera | 395/735 |
| 4,293,910 | 10/1981 | Flusche et al. | 364/200 |
| 4,322,795 | 3/1982 | Lange et al. | 364/200 |
| 4,334,305 | 6/1982 | Girardi | 370/86 |
| 4,358,823 | 11/1982 | McDonald et al. | 395/575 |
| 4,399,507 | 8/1983 | Cosgrove et al. | 395/375 |
| 4,409,651 | 10/1983 | Kjoller | 364/200 |
| 4,410,944 | 10/1983 | Kronies | 364/200 |
| 4,468,733 | 8/1984 | Oka et al. | 364/200 |
| 4,476,524 | 10/1984 | Brown et al. | 364/200 |
| 4,484,262 | 11/1984 | Sullivan et al. | 364/200 |
| 4,488,256 | 12/1984 | Zolnowsky et al. | 364/900 |
| 4,497,023 | 1/1985 | Moorer | 364/200 |
| 4,498,136 | 2/1985 | Sproul, III | 395/375 |
| 4,510,492 | 4/1985 | Mori et al. | 370/85 |
| 4,553,203 | 11/1985 | Rau et al. | 364/200 |
| 4,598,400 | 7/1986 | Hillis | 370/60 |
| 4,604,694 | 8/1986 | Hough | 364/200 |
| 4,622,631 | 11/1986 | Frank et al. | |
| 4,625,081 | 11/1986 | Lotito et al. | 379/88 |
| 4,646,271 | 2/1987 | Uchiyama et al. | 365/49 |
| 4,700,347 | 10/1987 | Rettberg et al. | 371/1 |
| 4,701,756 | 10/1987 | Burr | 370/60 |
| 4,706,080 | 11/1987 | Sincoskie | 370/94 |
| 4,709,324 | 11/1987 | Kloker | 395/375 |
| 4,714,990 | 12/1987 | Desyllas et al. | 364/200 |
| 4,730,249 | 3/1988 | O'Quin, II et al. | 364/200 |
| 4,734,907 | 3/1988 | Turner | 370/60 |
| 4,758,946 | 7/1988 | Shar et al. | 395/425 |
| 4,768,144 | 8/1988 | Winter et al. | 364/200 |
| 4,780,873 | 10/1988 | Mattheyses | |
| 4,792,895 | 12/1988 | Tallman | 395/375 |
| 4,797,880 | 1/1989 | Bussey, Jr. et al. | 370/60 |
| 4,811,009 | 3/1989 | Orimo et al. | 370/85 |
| 4,829,227 | 5/1989 | Turner | 370/60 |
| 4,845,702 | 7/1989 | Melindo | 370/1 |
| 4,864,495 | 9/1989 | Inaba | 395/250 |
| 4,885,742 | 12/1989 | Yano | 370/94 |
| 4,888,726 | 12/1989 | Struger et al. | 395/200 |
| 4,903,196 | 2/1990 | Pomerane et al. | 395/375 |
| 4,928,224 | 5/1990 | Zulian | 364/200 |
| 4,930,106 | 5/1990 | Danilenko et al. | 364/200 |
| 4,951,193 | 8/1990 | Muramatsu et al. | 364/200 |
| 4,972,338 | 11/1990 | Crawford | 395/400 |
| 4,980,816 | 12/1990 | Fukuzawa et al. | 395/400 |
| 4,984,235 | 1/1991 | Hillis et al. | 370/60 |
| 5,025,365 | 6/1991 | Mathur et al. | 364/200 |
| 5,025,366 | 6/1991 | Baror | 364/200 |
| 5,055,999 | 10/1991 | Frank et al. | 395/425 |
| 5,060,186 | 10/1991 | Barbagelata et al. | 395/425 |
| 5,063,497 | 11/1991 | Culter et al. | 395/800 |
| 5,067,071 | 11/1991 | Schanin et al. | 395/275 |
| 5,101,402 | 3/1992 | Chiu et al. | 70/17 |
| 5,101,485 | 3/1992 | Perazzoli, Jr. | 395/400 |
| 5,119,481 | 6/1992 | Frank et al. | 395/325 |
| 5,136,717 | 8/1992 | Morley et al. | 395/800 |
| 5,212,773 | 5/1993 | Hillis | 395/200 |
| 5,226,039 | 7/1993 | Frank et al. | 370/60 |
| 5,226,109 | 7/1993 | Dawson et al. | 395/120 |
| 5,226,175 | 7/1993 | Deutsch et al. | 395/119 |

FOREIGN PATENT DOCUMENTS

| | | |
|---|---|---|
| 0 262 750 | 4/1988 | European Pat. Off. . |
| 0322818 | 1/1989 | European Pat. Off. . |
| 0322117 | 6/1989 | European Pat. Off. . |
| 103166 | 6/1984 | Japan . |
| 2065941 | 7/1981 | United Kingdom . |
| 0 176 918 | 1/1987 | United Kingdom . |
| WO 84/01635 | 4/1984 | WIPO . |
| WO 87/03394 | 6/1987 | WIPO . |
| 8808652 | 11/1988 | WIPO . |
| 8909446 | 10/1989 | WIPO . |
| 9000283 | 1/1990 | WIPO . |

OTHER PUBLICATIONS

Eggers et al., "Evaluating the Performance of Four . . . ", Proc. of the 16th Annual Int'l Symposium on Computer Archit. (1989) pp. 2–15.

Gehringer et al., "The Cm* Hardware Architecture", Parallel Proc. the Cm* Experience, Digital Press, pp. 11–28, 432, 438.

Goodman et al., "The Wisconsin Multicube: A New . . . ", Proc. of the 15th Annual Int'l Symposium on Archit. (1988) pp. 422–431.

Hagersten et al., "The Cache Coherence Protocol of the . . . ", Cache & Interconnect Archit. in Multiproc., Klewer Acad. Pub. (1990) pp. 165–188.

Mizrahi et al., "Introducing Memory into the Switch . . . ", Proc. of the 16th Annual Int'l Symposium on Computer Archit. (1989) pp. 158–166.

Pfister et al., "The IBM Research Parallel Processor . . . ", IEEE Proc. of the 1985 Int'l Conf. on Parallel Proc. (1985) pp. 764–771.

Tabak, "Chapter 8 Bus–Oriented Ssytems", Multiprocessors, Prentice Hall (1990) pp. 92–102.

Wilson, Sr. Editor, "Increased CPU Speed Drives Changes in Multiprocessor Cache and Bus Designs", Computer Design (Jun. 1987) p. 20.

Ali et al., "Global Garbage Collection for Distributed . . . ", Int'l Jo. oF Parallel Programming, vol. 15, No. 5 (1986) pp. 339–387.

"High Performance/High Availability Interprocessor Communication Method," IBM Technical Disclosure Bulletin, vol. 31. No. 2, Jul. 1980 pp. 41–42.

Schwartz, Telecommunications Network, "Introduction & Overview" pp. 1–20, Layered Arhitecture in Data Networks pp. 71–117.

Haridi et al, "The Cache Coherence Protocol of the Data Diffusion Machine" Parallel Architecture Proceedings, vol. I, pp. 1–18 (1989).

Warren et al, "Data Diffusion Machine–A Scalable . . . ", Proceedings of The International Conference on Fifth . . . , 1988, pp. 943–952.

Hagersten, "Some Issues on Cache–Only Memory Architecture,"Scalable Shared–Memory Multiprocessors, May 1990, p. 12.

Hagersten et al, "The Data Diffusion Machine and Its Data Coherency Protocols," Proceedings of the IFIP, pp. 127–148 (1990).

Lovett et al., Proceedings '88 Int'l. Conf. on Parrell Proc., v.1, Penn State Univ.Press(Conf. Aug. 15–19 '88) p.303 et seg.

Kai Li et al., Proceedings '89 Int'l. Conf. on Parallel Processing, Penn State Univ. Press (Conf. Aug. 12, '89) pp. I–125 et seg.

Papamarcos et al.,Proc. of 11th Annual Symposium on Computer Architecture(Conf. Jun. 5–7 '84) p. 348 et seg (IEEE).

Intel, "MCS–80/85™ Family User's Manual," Oct. 1979, pp. 1–10 to 1–11, 2–1 to 2–23, 5–13, and 6–132 to 6–149.

Titus et al., "8080/8085 Software Design," 1979, pp. 59–63.

Proc. of the 6th Annual Phoenix Conf. on Computer and Communications, 25–27 Feb. 1987, pp. 14–17.

European Search Report for EP 91 30 4493.

```
              HEX PC
LAUNCH ──────
              000  FDIV.TR   %F0,%F1,%F2   ;CXNOP / RESULT DELAY 16 /
              008  FMOVI8    0.5,%F1        ;CXNOP / VIOLATION /
PRODUCE ──────  . . . . . . . . . . . . .
RESULTS       088  FADD8.TR  %F2,%F3,%F4    ;CXNOP
```

FIG. 5

```
              HEX PC
LAUNCH ──────
              000  FADD8   %F0,%F1,%F2   ;CXNOP
              008  FINOP                  ;LD8 120(%C10),%F20
              010  FNEG8   %F2,%F3        ;CXNOP
PRODUCE ──────
RESULTS       018  FSUB8   %F2,%F4,%F5    ;CXNOP
```

FIG. 6

```
HEX PC
000  FINOP;   LD8 15(%C10),%C20
008  FINOP;   CXNOP
010  FINOP;   CXNOP
018  FINOP;   AND8 %C20,%C21,%C22

▨ LOAD/STORE        ▨ RESULT DELAY
  IN USE
```

FIG. 7

```
HEX PC        ST64
000   FINOP;  ST64  %I0,64(%C10)
008   FINOP;  CXNOP
010   FINOP;  CXNOP
018   FINOP;  CXNOP
020   FINOP;  CXNOP
028   FINOP;  CXNOP
030   FINOP;  CXNOP
038   FINOP;  CXNOP
040   FINOP;  CXNOP
048   FINOP;  CXNOP

%I0 %I1 %I2 %I3 %I4 %I5 %I6 %I7

▨ LOAD/STORE    ▨ SOURCE %I      ▥ SOURCE
  IN USE          REGISTER USED    RESTRICTION (%C10)
```

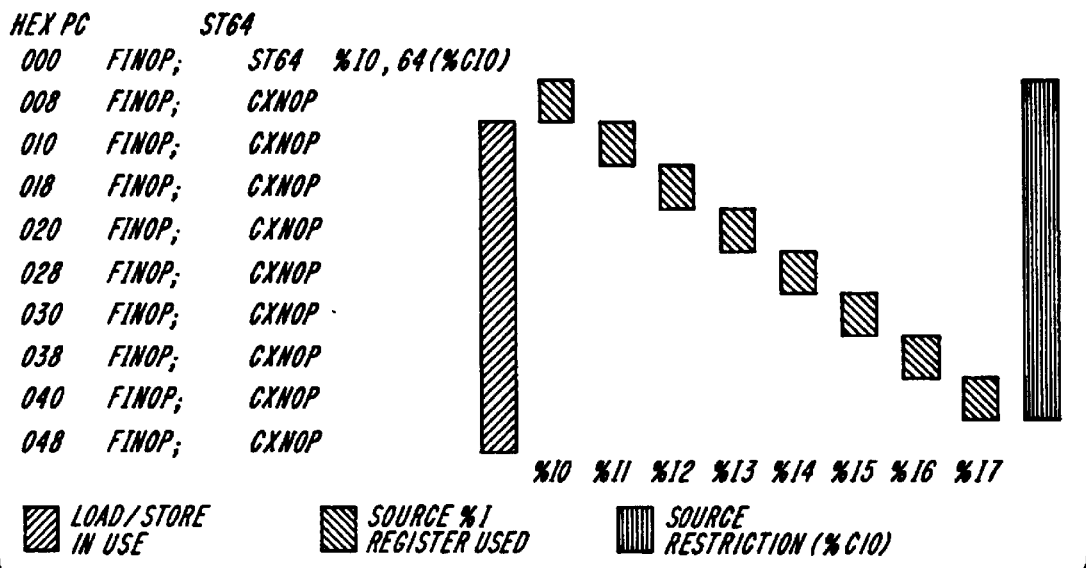

FIG. 10

```
HEX PC
000   FADD8,NTR %F0,%F1,%F2  ; LD8    128(%C20),%I0
008   FMUL4,NTR %F0,%F3,%F4  ; AND8   %C4,%C5,%C4
010   ADD8 ,NTR %I5,%I6,%I1  ; ST8    %C4,40(%C20)
018   MUL4 ,NTR %I0,%I1,%I2  ; BEQ.QT @CITST,WAS_EVEN
```

FIG. 11

```
HEX PC
000   FIPARTNER           ; JMP TARGET      RESULT DELAY
008   FIDELAY1            ; CXDELAY1            ▨
010   FIDELAY2            ; CXDELAY3
018   FINOTEXECUTED       ; CXNOTEXECUTED
      . . . . .
128 TARGET;
      FINOTEXECUTED       ; CXEXECUTED
```

FIG. 12

```
            FI_INSA0;        CX_INSA0
            FI_INSA1;        CX_INSA1
            FI_INSA2;        CX_INSA2
            FI_INSA3;        JMP    ADDRB4
            FI_NOP;          CXNOP
            FI_NOP;          CXNOP
            . . . . . . .
ADDRB4;     FI_INSB4;        CX_INSB4
            FI_INSB5;        CX_INSB5
```

FIG. 13

```
            FI_INSA0;        CX_INSA0
            FI_INSA3;        JMP    ADDRB4
            FI_INSA1;        CX_INSA1
            FI_INSA2;        CX_INSA2
            . . . . . . .
ADDRB4;     FI_INSB4;        CX_INSB4
            FI_INSB5;        CX_INSB5
```

FIG. 14

```
            FI_INSA0;        CX_INSA0
            FI_INSA1;        JMP    ADDRB4
            FI_INSA2;        CX_INSA1
            FI_INSA3;        CX_INSA2
            . . . . . . . .
ADDRB4;     FI_INSB4;        CX_INSB4
            FI_INSB5;        CX_INSB5
```

FIG. 15

```
ADDRA0;   FI_INSA0;   CX_INSA0          # LOOP FIRST INSTRUCTION
          FI_INSA1;   CX_INSA1          # LOOP SECOND INSTRUCTION
          FI_INSA2;   CX_INSA2          # LOOP THIRD INSTRUCTION
          . . .
          FI_INSA7    CBR,ON  ADDRA0    # NORMALLY TAKEN
          FINOP;      CXNOP
          FINOP;      CXNOP

FI_INSC0;   CX_INSC0          # AFTER LOOP TERMINATES
```

FIG. 16

```
          FI_INSA0;   CX_INSA0
          FI_INSA1;   CX_INSA1
ADDRA2;   FI_INSA2;   CX_INSA2
          . . .
          FI_INSA7;   CBR, QF  ADDRA2   # NORMALLY TAKEN
          FI_INSA0.1; CX_INSA0.1        # EXECUTED DURING LOOP ONLY
          FI_INSA1.1  CX_INSA1.1        # EXECUTED DURING LOOP ONLY

FI_INSC0;   CX_INSC0          # AFTER LOOP TERMINATES
```

FIG. 17

```
          FI_INSA0;   CX_INSA0
          FI_INSA1;   CBR,ON  ADDRC0    # NOT NORMALLY TAKEN
          FI_NOP;     CXNOP
          FI_NOP;     CXNOP
          FI_INSB0;   CX_INSB0
          FI_INSB1;   CX_INSB1
          FI_INSB2;   CX_INSB2
          . . . . . . .
ADDRC0;   FI_INSC0;   CX_INSC0          # USUALLY NOT EXECUTED
          FI_INSC1;   CX_INSC1          # USUALLY NOT EXECUTED
          FI_INSC2;   CX_INSC2          # USUALLY NOT EXECUTED
```

FIG. 18

```
           FI_INSA0;      CX_INSA0
           FI_INSA1;      CBR, QT  ADDRC0    # BRANCH NORMALLY NOT TAKEN
           FI_INSB0;      CX_INSB0           # USUALLY EXECUTED
           FI_INSB1;      CX_INSB1           # USUALLY EXECUTED
           FI_INSB2;      CX_INSB2           # USUALLY EXECUTED
           .......
 ADDRC0;   FI_INSC0;      CX_INSC0           # USUALLY NOT EXECUTED
           FI_INSC1;      CX_INSC1           # USUALLY NOT EXECUTED
           FI_INSC2;      CX_INSC2           # USUALLY NOT EXECUTED
```

FIG. 19

```
ADDRESS         INSTRUCTION
(HEX)
000             FI_INS0;       JMP    0 X 100
008             FI_INS1;       JMP    0 X 18
010             FI_INS2;       INS2
018             FI_INS3;       INS3
020             FI_INS4;       INS4
028             FI_INS5;       INS5
                .....
100             FI_INS32       INS32
100             FI_INS33       INS33
```

FIG. 20

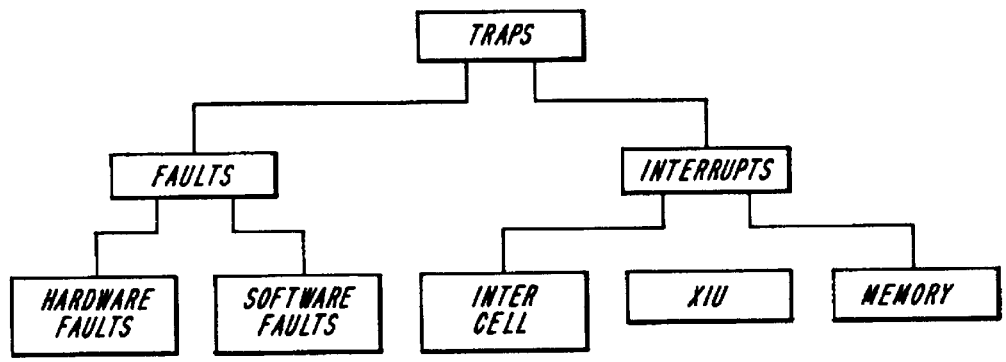

FIG. 21

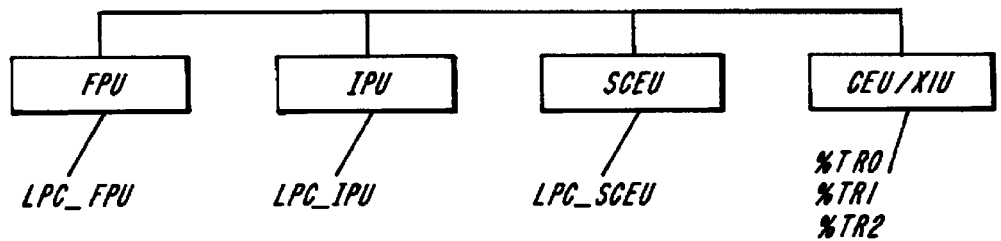
FIG. 22
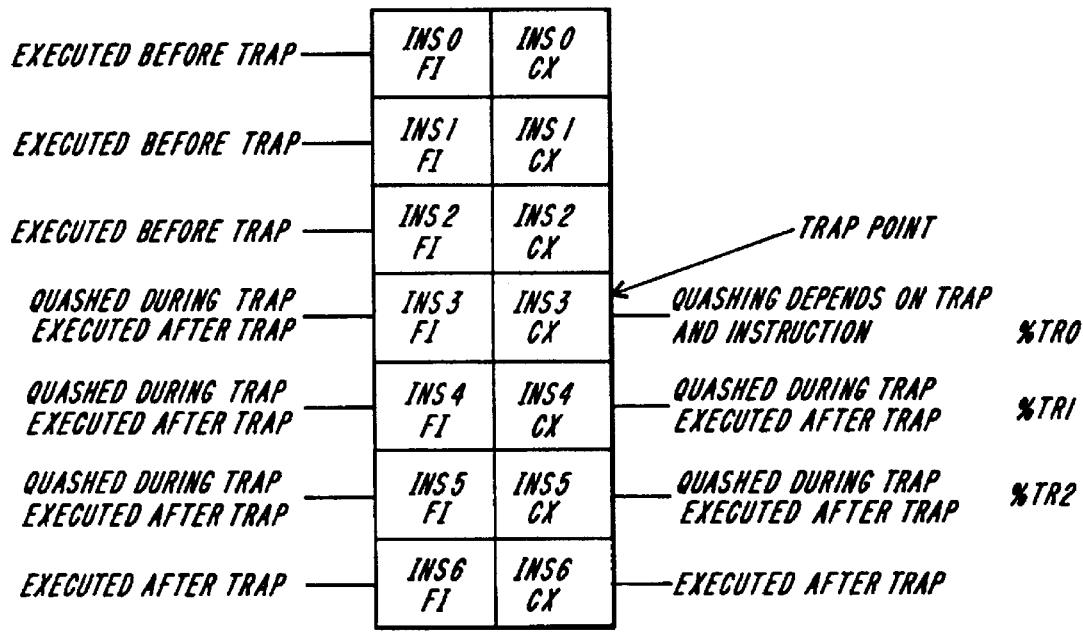
FIG. 23
| ADDRESS (HEX) | INSTRUCTION | |
|---|---|---|
| 000 | ADD8,TR  %18,%19,%110; | CX_INSA1 |
| 008 | FI_INSA1; | CX_INSA1 |
| 010 | FI_INSA2; | CX_INSA2 |
FIG. 24

| ADDRESS (HEX) | INSTRUCTION | | |
|---|---|---|---|
| 000 | FMUL8,TR %F0,%F1,%F2; | CX_INSA1 | /*MAY TRAP HERE */ |
| 008 | FI_INSA1; | CX_INSA1 | |
| 010 | FI_INSA2; | CX_INSA2 | /*OR HERE */ |
| 018 | FADD8,TR %F2,%F3,%F3 | CX_INSA3 | /*FMUL RESULT AVAILABLE*/ |

FIG. 25

| ADDRESS (HEX) | INSTRUCTION | | |
|---|---|---|---|
| 000 | FMUL8,TR %F0,%F1,%F2; | CX_INSA1 | |
| 008 | FI_INSA1; | CX_INSA1 | |
| 010 | FI_INSA2; | CX_INSA2 | /*FMUL TRAP OCCURS HERE*/ |
| 018 | FADD8,TR %F2,%F3,%F3 | CX_INSA3 | /*FMUL RESULT AVAILABLE*/ |
| 020 | FINOP | CX_INSA3 | |

FIG. 26

| ADDRESS (HEX) | INSTRUCTION | | |
|---|---|---|---|
| 000 | FMUL8,TR %F0,%F1,%F2; | CX_INSA1 | |
| 008 | FI_INSA1; | CX_INSA1 | |
| 010 | FADD8,TR %F10,%F11,%F12; | CX_INSA2 | /*TRAP OCCURS HERE*/ |
| 018 | FINOP; | CX_INSA3 | /*RESULT AVAILABLE*/ |

FIG. 27

| ADDRESS (HEX) | INSTRUCTION | |
|---|---|---|
| 000 | FMUL8, TR %F0,%F1,%F2; | CX_INSA1 |
| 008 | FADD8,TR %F10,%F11,%F12; | CX_INSA2 |
| 010 | FI_INSA3; | CX_INSA3 |
| 018 | FI_INSA4; | CX_INSA4 |
| 020 | FI_INSA5; | CX_INSA5 |

FIG. 28

| ADDRESS (HEX) | INSTRUCTION | |
|---|---|---|
| 000 | FMUL8,TR %F0,%F1,%F2; | CX_INSA1 |
| 008 | FADD8,TR %F10,%F11,%F12; | CX_INSA2 |
| 010 | NON_FPU_OPA3; | CX_INSA3 |
| 018 | FI_INSA4; | CX_INSA4 |
| 020 | FI_INSA5; | CX_INSA5 |

FIG. 29

| ADDRESS (HEX) | INSTRUCTION | |
|---|---|---|
| 000 | FMUL8,TR %F0,%F1,%F2; | CX_INSA1 |
| 008 | FI_INSA1; | LD8    8(%C9),%C10 /* TRAP HERE */ |
| 010 | FI_INSA2; | CX_INSA2 |
| 018 | FADD8,TR %F2,%F3,%F3 | CX_INSA3 /* FMUL RESULT AVAILABLE */ |
| 020 | FINOP | ST8    %C10,0(%C20) /* LD RESULT */ |

FIG. 30

| ADDRESS (HEX) | INSTRUCTION | |
|---|---|---|
| 000 | ADD8,NTR %I0,%I1,%I2; | ST8    %I2,128(%C8) |
| 008 | FI_INSA1; | CX_INSA1 /* STORE READS SOURCE */ |
| 010 | FI_INSA2; | CX_INSA2 |

FIG. 31

| ADDRESS (HEX) | INSTRUCTION | |
|---|---|---|
| 000 | FI_INSA0; | LD8    128(%C8),%I0 |
| 008 | FI_INSA1; | CX_INSA1 /* STORE READS SOURCE */ |
| 010 | FI_INSA2; | ST8    %I0,96(%C9) |

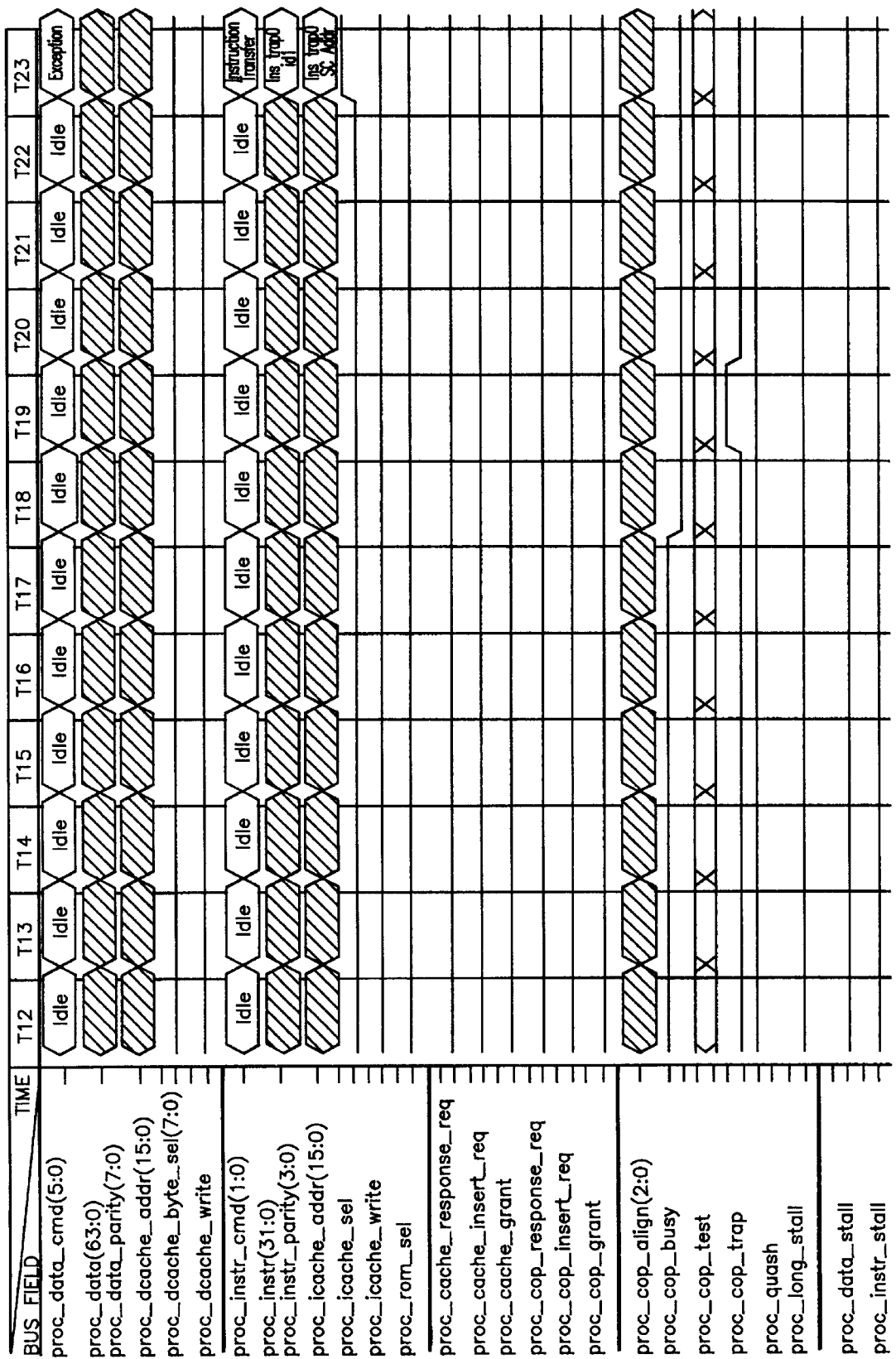

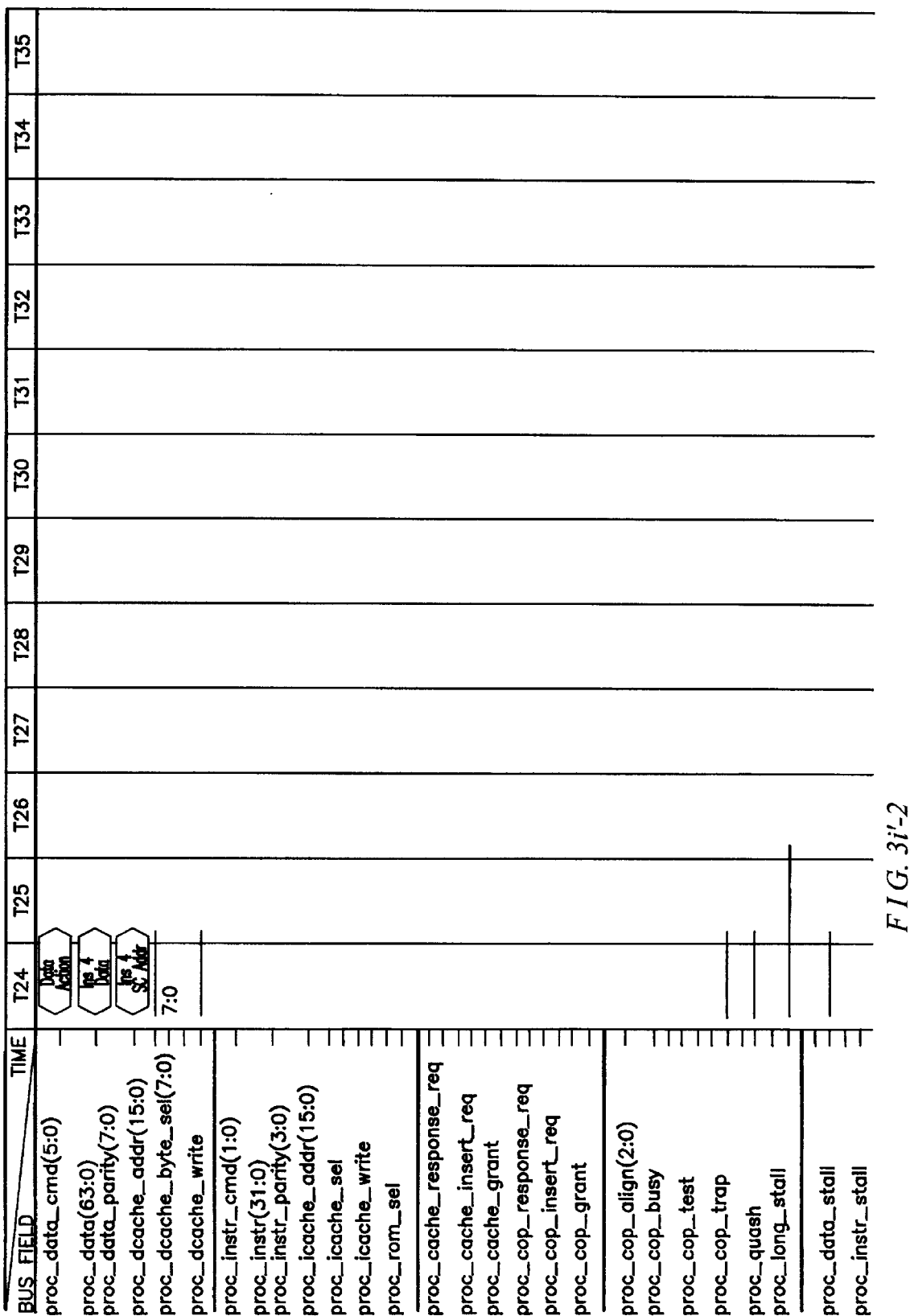

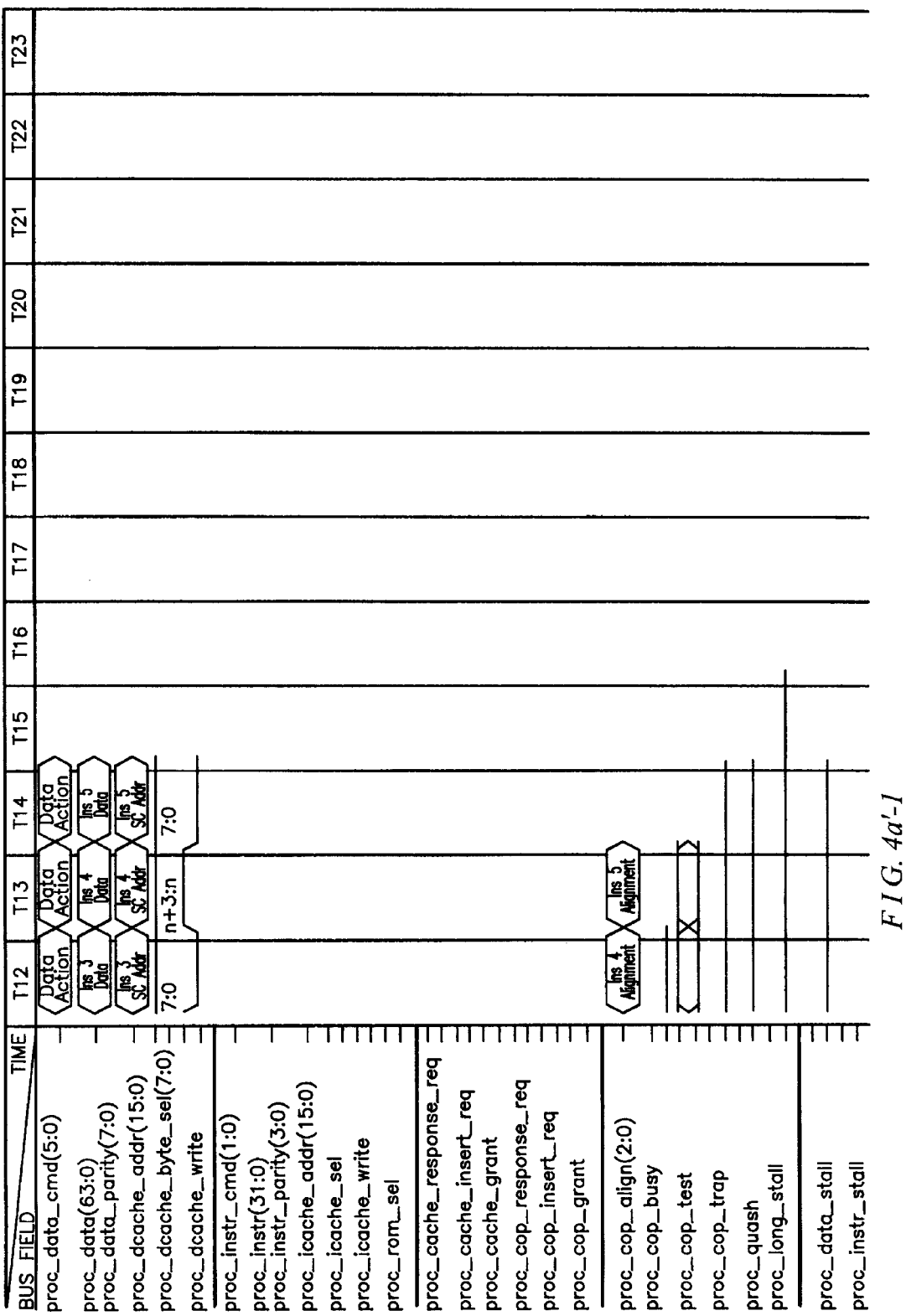

SYSTEM FOR INSERTING INSTRUCTIONS INTO PROCESSOR INSTRUCTION STREAM IN ORDER TO PERFORM INTERRUPT PROCESSING

REFERENCE TO RELATED APPLICATIONS

This application is a continuation of U.S. patent application Ser. No. 08/066,334, filed May 21, 1993, now abandoned, which is a continuation of U.S. patent application Ser. No. 07/370,325, filed Jun. 22, 1989, now abandoned, which is a continuation-in-part of U.S. patent application Ser. No. 07/136,930 filed 22 Dec. 1987, for "Multiprocessor Digital Data Processing System", now U.S. Pat. No. 5,055,999, assigned to the assignee hereof.

This application is related to U.S. patent application Ser. No. 08/136,701, filed 22 Dec. 1989, for "Interconnection System for Multiprocessor Structure", abandoned in favor of U.S. Ser. No. 07/509,480 filed Apr. 13, 1990, abandoned in favor of U.S. Ser. No. 07/696,291, filed Apr. 26, 1991, now U.S. Pat. No. 5,119,481, assigned to the assignee hereof.

This application is also related to U.S. Ser. No. 07/370,341 filed on Jun. 22, 1989 for "Multiprocessor Digital Data Processing System" now U.S. Pat. No. 5,297,265; and U.S. patent application Ser. No. 07/370,287 filed Jun. 22, 1989 for "Improved Multiprocessor System" now U.S. Pat. No. 5,251,308; both applications which are assigned to the assignee hereof and filed this same day herewith.

The teachings of the above-cited parent and related applications are incorporated herein by reference.

Grandparent U.S. patent application Ser. No. 07/370,325, filed Jun. 22, 1989, now abandoned was filed with an Appendix that includes detailed diagrammatic and textual descriptive information regarding various ones of the elements of one embodiment of the invention as described in the Description Of Illustrated Embodiments below. Reference may be made to the grandparent application for the Appendix

BACKGROUND OF THE INVENTION

This invention relates generally to digital data processing methods and apparatus, and, in particular, relates to digital multiprocessor computer systems having distributed memory systems.

Multiprocessor computer systems provide multiple independent central processing units (CPUs) which can be coherently interconnected. Recent efforts in the multiprocessor field have concentrated on multiprocessor systems wherein each of a plurality of processors is equipped with a dedicated random access or cache memory unit. These multiple processors typically communicate with one another via a common system bus structure, or by signaling within a shared memory address area. Multiprocessors utilizing a common bus are referred to as shared bus systems, while those utilizing a shared memory area are termed shared address space systems.

In order to minimize transmission bottlenecks, some distributed memory systems couple individual processing units with local memory elements to form semi-autonomous processing cells. To achieve the benefits of multiprocessing, some such systems provide cell communications through utilization of hierarchical architectures. For example, U.S. Pat. No. 4,622,631 to Frank et al. discloses a multiprocessing system in which a plurality of processors, each having it an associated private memory, or cache, share data contained in a main memory element. Data within that common memory is partitioned in to blocks, each of which can be owned by any one of the main memory and the plural processors. The current owner of a data block is said to have the correct data for that block.

Moreover, in recent years, a wide variety of methods and apparatus have been proposed or developed to interconnect the processors of a shared bus system multiprocessor.

One such shared bus multiprocessing computer system is disclosed in United Kingdom Patent Application No. 2,178,205, published 4 Feb. 1987, and incorporated herein by reference. The apparatus disclosed therein comprises multiple processors, each having its own dedicated cache memory. The cache memories of the system are connected to one another over a shared bus structure.

Certain conventional shared bus systems, however, lack adequate bandwidth to provide multiple processors with short effective access times during periods of high bus contention. Although a number of caching schemes have been proposed and developed for the purpose of reducing bus contention, the speed and size of many multiprocessor computers are still limited by bus saturation.

Moreover, the processing speed of a conventional bus structure is restricted by the bus length. In particular, as additional processors are interconnected in a typical shared bus system, bus length increases, as does the time required for signal transfer and processing.

Another class of interconnection systems, known as crossbar networks, avoid certain of the limitations of conventional shared bus systems. In a crossbar network, however, the path taken by a given signal cannot be uniquely specified. Additionally, system cost increases in proportion to lie square of the number of interconnected processors. These characteristics render crossbar networks generally unsuitable for multiprocessor systems.

It is therefore an object of the invention to provide multiprocessing methods and apparatus having flexible interconnection configurations which enable enhanced processing speed.

Another object of the invention is to provide digital multiprocessor methods and apparatus in which processors can selectively request additional processor resources to enable increased execution speed.

It is a further object of the invention to provide such multiprocessor methods and apparatus in which each processor can execute instructions from multiple sources, thereby enhancing parallelism of execution and efficiency of bus transactions.

Other general and specific objects of the invention will in part be obvious and will in part appear hereinafter.

SUMMARY OF THE INVENTION

The foregoing objects are attained by the invention, which provides digital processing methods and apparatus, including a set of interconnected processors comprising a first processor for normally processing an instruction stream including instructions from a first instruction source. At least one of the processors includes insert elements for inserting one or more inserted-instructions executable by the first processor in the, same manner as, and without affecting execution sequence of, the instructions from the first instruction source. The first instruction source can be a memory element, which can include an instruction cache element for storing digital values representative of instructions and program steps, or an execution unit (CEU) which includes elements for asserting signals to the instruction cache element to cause instructions to be transmitted from the instruction cache element to the CEU.

The invention can include an instruction pipeline for interconnecting the processors and for carrying the instructions. The insert elements can insert the inserted-instructions into the instruction pipeline.

The inserted-instructions can have the same format as the instructions from the first instruction source, including a first set of digital instruction bits for specifying selected address signals, and a second set of digital instruction bits for specifying selected command signals. Inserted-instructions having this format can include cache management instructions inserted by the instruction cache element.

The processors can include input/output (I/O) processors for handling signals received from, and transmitted to, a peripheral device. These I/O processors can incorporate direct memory access (DMA) insert elements, which respond to selected signals from a peripheral device, to insert DMA instructions which are processed by the first processor in the same manner as, and without affecting processing sequence of, the instructions from the first instruction source. The I/O processors can comprise a peripheral interface unit (XIU) for controlling signals received from, and transmitted by, a peripheral device; a graphics controller for controlling signals transmitted to a display device; and text search elements for searching data structures representative of text.

Selected processors can further include a register element for storing digital values representative of data. In this aspect of the invention, the insert elements can assert inserted-instructions to control movement of data into and out of register elements associated with the selected processors. 16. The inserted-instructions can be configured to cause execution of selected logical operations on digital values stored in the register elements.

Moreover, the processors can include trap elements which initiate a trap sequence in response to an applied trap signal. The insert elements include elements for generated inserted-instructions for generating the trap signal, and the resulting trap sequence can include any of a set of selected program steps. The processors can further comprise interrupt elements, responsive to an interrupt signal, for initiating an interrupt sequence. This interrupt sequence, analogous to the trap sequence, can include any of a set of selected program steps. In this aspect of the invention, the insert elements can incorporate elements for generating inserted-instructions adapted for initiating the interrupt sequence, or for generating a trap signal in response to an interrupt signal.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIG. 7 depicts resource usage and timing of an LD8 instruction;

FIG. 10 depicts resource usage and timing of an ST64 instruction;

FIG. 11 depicts an example of overlapped instructions associated with a trap sequence;

FIG. 12 illustrates a representative branch instruction in accordance with the invention;

FIG. 13 depicts an original code sequence with NOPS in the branch delay in a preferred system according to the invention;

FIG. 14 depicts an optimized code sequence with filled branch delay in a preferred system according to the invention;

FIG. 15 depicts a rearranged code sequence in a preferred system according to the invention;

FIG. 16 depicts a code sequence using NOPS in branch delay in a preferred system according to the invention;

FIG. 17 depicts an optimized code sequence with target in branch delay and branch-quashing in a preferred system according to the invention;

FIG. 18 shows a code sequence having NOPS in the branch delay in a preferred system according to the invention;

FIG. 19 depicts an optimized code sequence with post branch instructions in branch delay and branch-quashing in a preferred system according to the invention;

FIG. 20 depicts an example of program code for remote execution;

FIG. 21 depicts a taxonomy of traps in a preferred system according to the invention;

FIG. 22 depicts saving of co-execution PCs in !PC_IPU and !PC_FPU during a trap in a preferred system according to the invention;

FIG. 23 depicts the instruction execution model and the occurrence of a trap in a preferred system according to the invention;

FIG. 24 depicts a first example of program code associated with a trap sequence in a preferred system according to the invention;

FIG. 25 depicts a second example of program code associated with a trap sequence in a preferred system according to the invention;

FIG. 26 depicts a third example of program code associated with a trap sequence in a preferred system according to the invention;

FIG. 27 depicts a fourth example of program code associated with a trap sequence in a preferred system according to the invention;

FIG. 28 depicts a fifth example of program code associated with a trap sequence in a preferred system according to the invention;

FIG. 29 depicts a sixth example of program code associated with a trap sequence in a preferred system according to the invention;

FIG. 30 depicts a seventh example of program code associated with a trap sequence in a preferred system according to the invention;

FIG. 31 depicts a eighth example of program code associated with a trap sequence in a preferred system according to the invention; and FIG. 32 depicts a ninth example of program code associated with a trap sequence in a preferred system according to the invention;

DESCRIPTION OF ILLUSTRATED EMBODIMENTS

Figure 1:
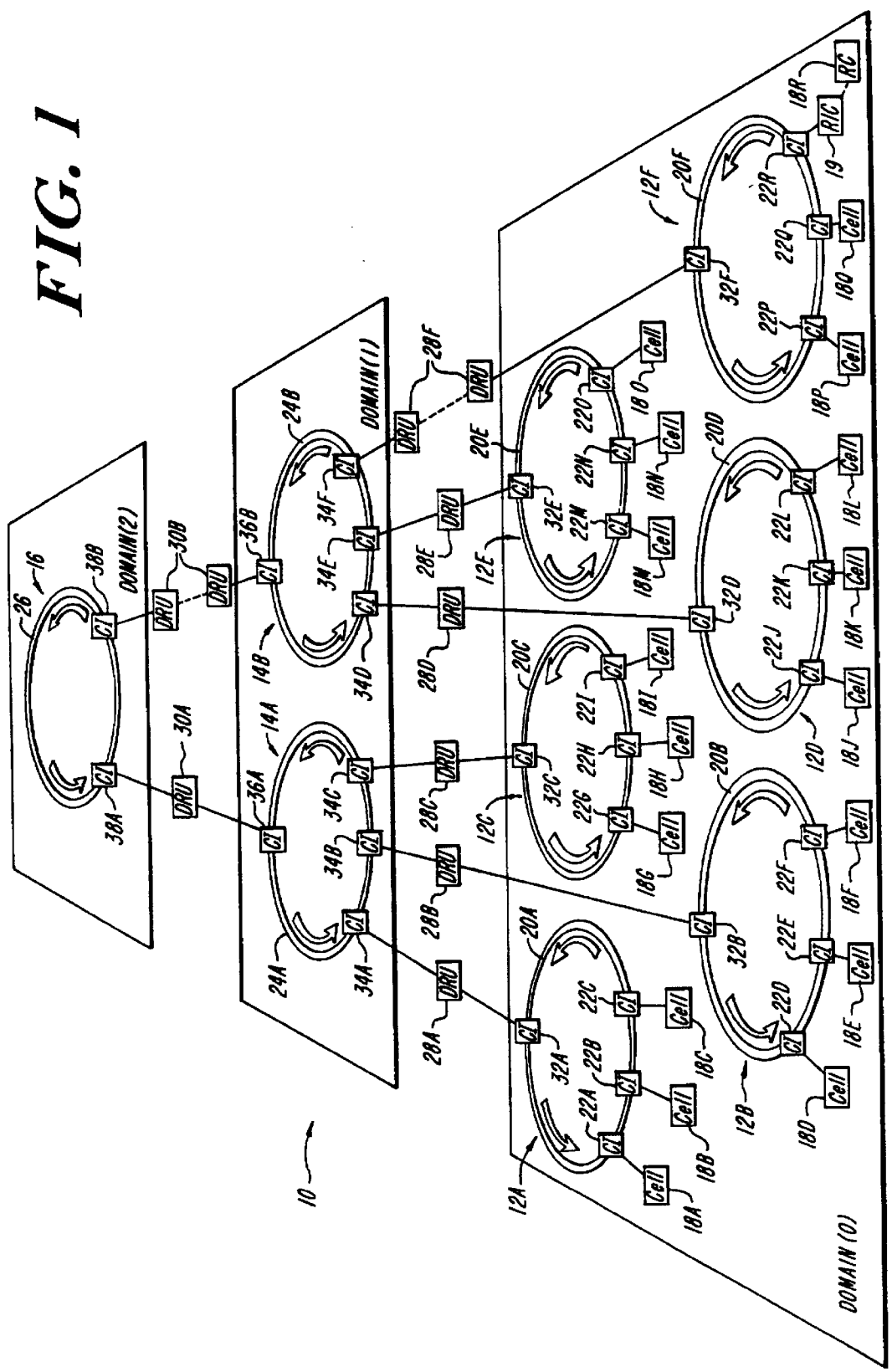
FIG. 1 is a schematic diagram depicting a multiprocessor structure incorporating the invention.

FIG. 1 depicts a multiprocessor structure 10, which can be utilized in connection with one practice of the invention. A structure of this type is further described in commonly-owned U.S. patent application Ser. No. 07/136,930 (now U.S. Pat. No. 5,055,999) filed 22 Dec. 1987, for Multiprocessor Digital Data Processing System, incorporated herein by reference. The illustrated multiprocessor structure is presented by way of example, and the invention described hereinafter can be advantageously practiced in connection with digital processing structures and systems other than that depicted in FIG. 1.

The illustrated multiprocessor structure 10 includes three information transfer domains: domain(0), domain(1), and domain(2). Each information transfer domain includes one or more domain segments, characterized by a bus element and a plurality of cell interface elements. Particularly, domain(0) of the illustrated system 10 includes six segments, designated 12A, 12B, 12C, 12D, 12E and 12F, respectively. Similarly, domain(l) includes segments 14A and 14B, while domain(2) includes segment 16.

Each segment of domain(0), i.e., segments 12A, 12B, . . . 12F, comprises a plurality of processing cells. For example, as shown in the illustration, segment 12A includes cells 18A, 18B and 18C; segment 12B includes cells 18D, 18E and 18F; and so forth. Each of those cells includes a central processing unit and a memory element, interconnected along an intracellular processor bus (not shown). In accord with the preferred practice of the invention, the memory element contained in each cell stores all control and data signals used by its associated central processing unit.

As further illustrated, each domain(0) segment may be characterized as having a bus element providing a communication pathway for transferring information-representative signals between the cells of the segment. Thus, illustrated segment 12A is characterized by bus 20A, segment 12B by 20B, segment 12C by 20C, and so on. As described in greater detail in commonly-owned U.S. patent application Ser. No. 07/136,930 (now U.S. Pat. No. 5,055,999), filed 22 Dec. 1987, incorporated herein by reference, information-representative signals are passed between the cells 18A, 18B and 18C of exemplary segment 12A by way of the memory elements associated with each of those cells. Specific interfaces between those memory elements and the bus 20A are provided by cell interface units 22A, 22B and 22C, as shown. Similar direct communication pathways are established in segments 12B, 12C and 12D between their respective cells 18D, 18E, . . . 18R by cell interface units 22D, 22E, . . . 22R, as illustrated.

As shown in the illustration and noted above, the remaining information transfer domains, i.e., domain(1) and domain(2), each include one or more corresponding domain segments. The number of segments in each successive segment being less than the number of segments in the prior one. Thus, domain(1)'s two segments 14A and 14B number fewer than domain(0)'s six 12A, 12B . . . 12F, while domain(2), having only segment 16, includes the fewest of all. Each of the segments in domain(1) and domain(2), the "higher" domains, include a bus element for transferring information-representative signals within the respective segments. In the illustration, domain(1) segments 14A and 14B include bus elements 24A and 24B, respectively, while domain(2) segment 16 includes bus element 26.

The segment buses serve to transfer information between the components elements of each segment, that is, between the segment's plural domain routing elements. The routing elements themselves provide a mechanism for transferring information between associated segments of successive domains. Routing elements 28A, 28B and 28C, for example, provide a means for transferring information to and from domain(1) segment 14A and each of domain(0) segments 12A, 12B and 12C, respectively. Similarly, routing elements 28D, 28E and 28F provide a means for transferring information to and from domain(1) segment 14B and each of domain(0) segments 12D, 12E and 12F, respectively. Further, domain routing elements 30A and 30B provide an information transfer pathway between domain(2) segment 16 and domain(1) segments 14A and 14B, as shown.

The domain routing elements interface their respective segments via interconnections at the bus elements. Thus, domain routing element 28A interfaces bus elements 20A and 24A at cell interface units 32A and 34A, respectively, while element 28B interfaces bus elements 20B and 243B at cell interface units 32B and 34B, respectively, and so forth. Similarly, routing elements 30A and 30B interface their respective buses, i.e., 24A, 24B and 26, at cell interface units 36A, 36B, 38A and 38B, as shown.

FIG. 1 illustrates further a preferred mechanism interconnecting remote domains and cells in a digital data processing system constructed in accord with the invention. Cell 18R, which resides at a point physically remote from bus segment 20F, can be coupled with that bus and its associated cells (18P and 18O) via a fiber optic transmission line, indicated by a dashed line. A remote interface unit 19 provides a physical interface between the cell interface 22R and the remote cell 18R. The remote cell 18R is constructed and operated similarly to the other illustrated cells and includes a remote interface unit for coupling the fiber optic link at its remote end.

In a similar manner, domain segments 12F and 14B can be interconnected via a fiber optic link from their parent segments. As indicated, the respective domain routing units 28F and 30B each comprise two remotely coupled parts. With respect to domain routing unit 28F, for example, a first part is linked directly via a standard bus interconnect with cell interface 34F of segment 14B, while a second part is linked directly with cell interface unit 32F of segment 12F. These two parts, which are identically constructed, are coupled via a fiber optic link, indicated by a dashed line. As above, a physical interface between the domain routing unit parts and the fiber optic media is provided by a remote interface unit (not shown).

Figure 2:
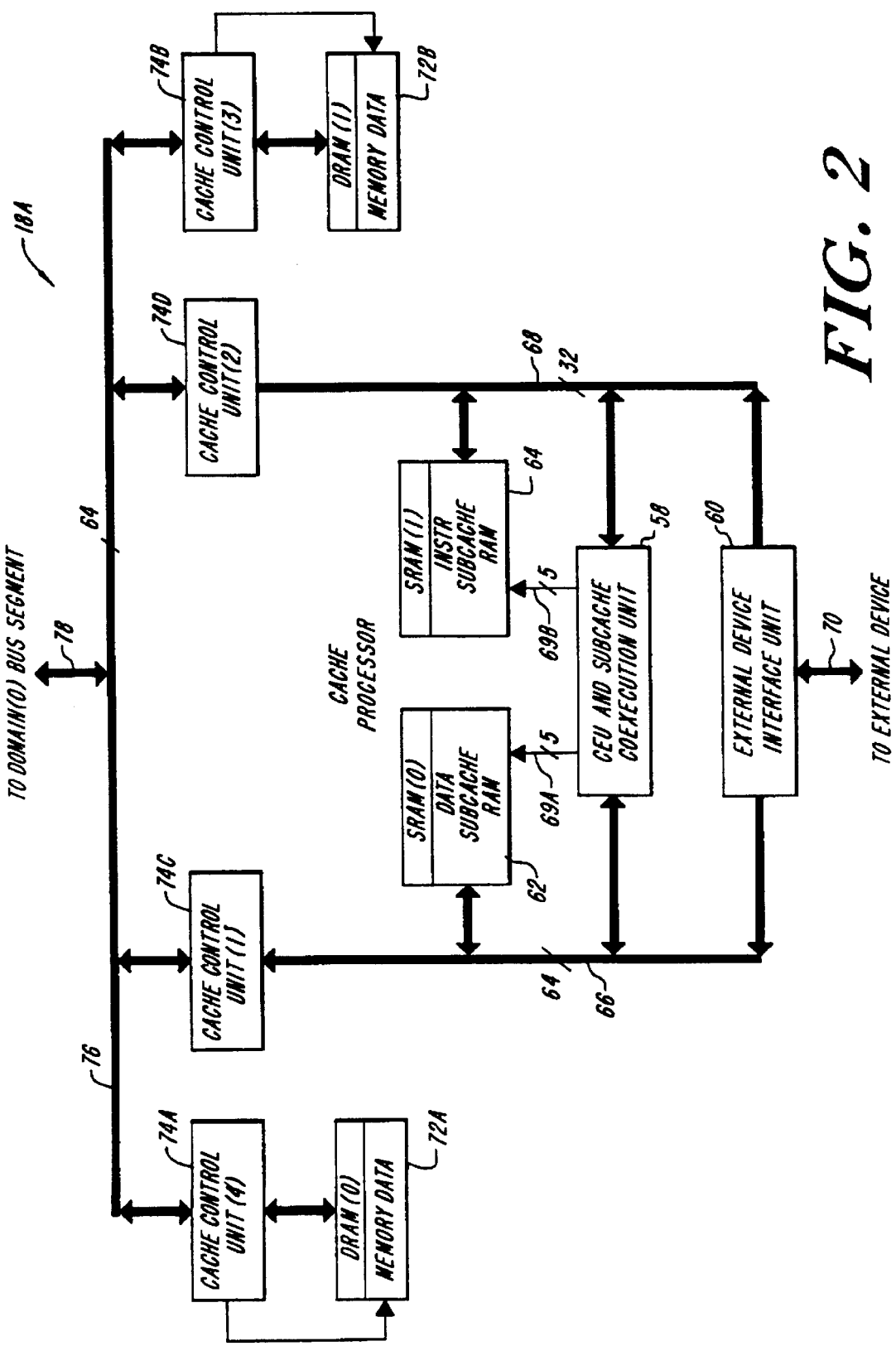
FIG. 2 is a block diagram of an exemplary processing cell depicted in FIG. 1.

FIG. 2 depicts an embodiment of the processing cells 18A, 18B, ..., 18R of FIG. 1. The illustrated processing cell 18A includes a central processing unit 58 coupled with external device interface 60, data subcache 62 and instruction subcache 64 over processor bus 66 and instruction bus 68, respectively. Interface 60, which provides communications with external devices, e.g., disk drives, over external device bus, is constructed in a manner conventional to the art.

Processor 58 can comprise any one of several commercially available processors, for example, the Motorola 68000 CPU, adapted to interface subcaches 62 and 64, under control of a subcache co-execution unit acting through data and address control lines 69A and 69B, in a manner conventional to the art, and farther adapted to execute memory instructions as described below. The processing cells are further described in commonly-owned U.S. patent application Ser. No. 07/136,930 (now U.S. Pat. No. 5,055,999), filed 22 Dec. 1987, for "Multiprocessor Digital Data Processing System," incorporated herein by reference.

Processing cell 18A further includes data memory units 72A and 72B coupled, via cache control units 74A and 74B, to cache bus 76. Cache control units 74C and 74D, in turn, provide coupling between cache bus 76 and processing and data buses 66 and 68. As indicated in FIG. 2 bus 78 provides an interconnection between cache bus 76 and the domain(0) bus segment 20A associated with the illustrated cell. Preferred designs for cache control units 74A, 74B, 74C and 74D are discussed in U.S. patent application Ser. No 07/136,930 (now U.S. Pat. No. 5,055,999) filed 22 Dec. 1987, for "Multiprocessor Digital Data Processing System," and U.S. patent application Ser. No. 07/370,287 now U.S. Pat. No. 5,251,308, filed this same date herewith, for "Improved Multiprocessor System." The teachings of both applications are incorporated herein by reference.

In a preferred embodiment, data caches 72A and 72B include dynamic random access memory (DRAM) devices, each capable of storing up to 16 Mbytes of data. The subcaches 62 and 64 are static random access memory (SRAM) devices, the former capable of storing up to 256k bytes of data, the latter of up to 256k bytes of instruction information. As illustrated, cache and processor buses 76 and 64 provide 64-bit transmission pathways, while instruction bus 68 provides a 64-bit transmission pathway. A preferred construction of cache bus 76 is provided in U.S. patent application Ser. No. 07/136,930 (now U.S. Pat. No. 5,055,999) filed 22 Dec. 1987, for "Multiprocessor Digital Data Processing System," incorporated herein by reference.

Those skilled in the art will understand that illustrated CPU 58 can represent a conventional central processing unit and, more generally, any device capable of issuing memory requests, e.g., an I/O controller or other special purpose processing element.

The instruction execution of a processing cell herein described differs from conventional digital processing systems in several significant ways. The processing cell—e.g., 18A—has multiple processing cells or functional units— e.g., 58, 60—that can execute instructions in parallel. Additionally, the functional units are "pipelined," to permit multiple instructions to be in progress at the same time by overlapping their execution. This pipelining is further described in U.S. patent application Ser. No. 07/136,930 (now U.S. Pat. No. 5,055,999), filed 22 Dec. 1987, for "Multiprocessor Digital Data Processing System," incorporated herein by reference. Further description of the instructions discussed herein—including LOADS, STORES, MOVOUT, MOVB, FDIV and others—can be found in U.S. patent application Ser. No. 07/370,287 now U.S. Pat. No. 5,251,308 filed this same date herewith, incorporated herein by reference.

A processing cell constructed in accordance with the invention executes a sequence of instructions fetched from memory. The context of execution can be partially defined by the architecture, and partially defined by software. The architectural portion of the execution context can consist of a context address space, a privilege level, general registers, and a set of program counters. The context address space and privilege level determine what data in the memory system the instruction stream may reference. General registers, constructed in accordance with known engineering practice, are used for computation. These features are further described in U.S. Ser. No. 07/136,930 (now U.S. Pat. No. 5,055,999), incorporated herein by reference. The program counters define what portion of the instruction stream has already executed and what will be executed next, as described in greater detail hereinafter.

Two time units can be employed in specifying the timing of instructions. These units are referred to herein as "clocks" and "cycles," respectively. A clock is a unit of real-time which has duration defined by the system hardware. The processor performs an instruction fetch every cycle. A cycle takes one clock unless a "stall" occurs, in which case a cycle takes some larger integral number of clocks. The execution of instructions is described in terms of cycles and is data-independent.

Pipeline stalls can result from subcache and cache management overhead. Most LOAD and STORE operations will complete without a stall; however, any LOAD, STORE, or memory control instruction may cause a stall in order to allow the system to retrieve data from the local cache or from a remote cells. These delays are referred to herein as stalls. During a stall, the execution of other instructions does not proceed, and no new instructions are fetched. Stalls are not related to the instruction itself, but to the proximity of the related data. Stalls are measured in clocks and each stall is an integral number of clocks. Even though a CEU might stall while obtaining data from the local cache, the programming model (expressed in cycles) remains constant.

Figures 3, 4:
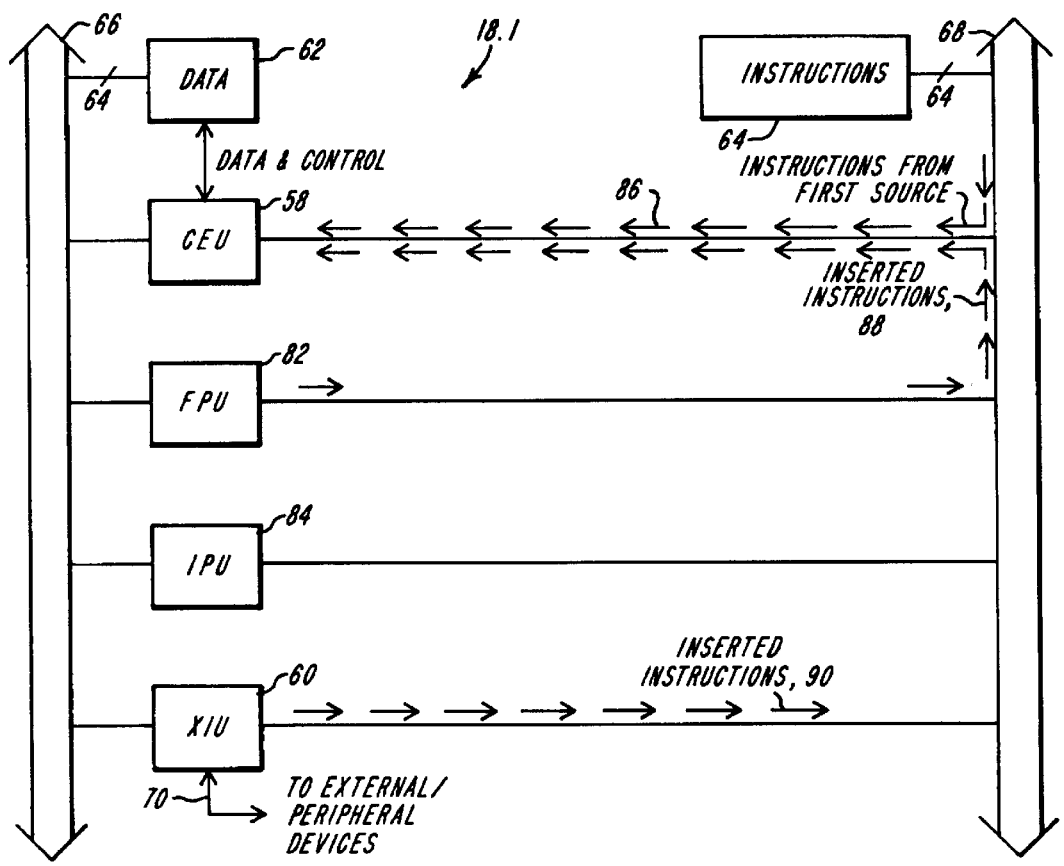
FIG. 3 depicts a further embodiment of a processing cell constructed in accordance with the invention.
FIG. 4 depicts single-cycle instructions in accordance with the invention.

As illustrated in FIG. 3, a processing cell 18.1 in accordance with the invention can include four processing elements, also referred to herein as "functional units": the CEU 58, IPU 84, FPU 82 and XIU 60. While FIG. 3 illustrates a processing cell 18.1 having four processing elements, those skilled in the art will appreciate that the invention can be practiced in connection with a processing cell having more or fewer processing elements.

In particular, the CEU (Central Execution Unit) fetches all instructions, controls data FETCH and STORE (referred to herein as LOADS and STORES), controls instruction flow (branches), and does arithmetic required for address calculations. The IPU (Integer Processing Unit) executes integer arithmetic and logical instructions. The FPU (Floating point Processing Unit) executes floating point instructions. The XIU (eXternal I/o Unit) is a co-execution unit which provides the interface to external devices. The XIU performs DMA (Direct Memory Access operations) and programmed I/O, and contains timer registers. It executes several instructions to control programmed I/O.

The processing cell 18.1 thus comprises a set of interconnected processors 58, 60, 82 and 84, including a CEU 58 for normally processing an instruction stream including instructions from the instruction cache 64. The flow of instructions from the instruction cache 64 is indicated in FIG. 3 by dashed lines 86.

As depicted in FIG. 3, at least one of the processors—in the illustrated example, FPU 82 and XIU 60—can assert instructions, referred to herein as "inserted-instructions", which can be executed by the CEU 58. The flow of inserted-instructions from FPU 82 to CEU 58 is indicated in FIG. 3 bar dashed lines 88. Analogously, the movement of inserted-instructions from XIU 60 to CEU 58 is denoted by dashed lines 90.

Moreover, as discussed in greater detail hereinafter, these inserted-instructions can be executed by CEU 58 in the same manner as, and without affecting execution sequence of, the instructions from the instruction cache 64. Moreover, as further explained below, the inserted-instructions can have the same format as the instructions from the first instruction source, including a first set of digital instruction bits for specifying selected address signals, and a second set of digital instruction bits for specifying selected command signals. Inserted-instructions having this format can include cache management instructions inserted by the instruction cache 64 or by the cache control unit 74D depicted in FIG. 2.

While FIG. 3 depicts an instruction cache 64 as the source of instructions, alternatively, the source of instructions can be a processor or execution unit—including, under certain circumstances, the CEU 58—adapted for asserting signals to the instruction cache element to cause instructions to be transmitted from the instruction cache element to the CEU 58.

As discussed above, the processing cell 18.1 can include an instruction pipeline, comprising instruction bus 68, for interconnecting the processors and for carrying the instructions. The processors, in turn, can incorporate hardware and software elements, e.g., 60D, for inserting the inserted-instructions into the instruction pipeline.

The XIU 60 depicted in FIG. 3 can incorporate input/output (I/O) modules for handling signals 70 received from, and transmitted to, peripheral devices, also referred to herein as external devices. These I/O modules can include direct memory access (DMA) elements, e.g., 60A, which respond to selected signals from a peripheral device, to insert DMA instructions which can be processed by the CEU 58 in the same manner as, and without affecting processing sequence of, the instructions from the first instruction source. These processing sequences are discussed in greater detail hereinafter. The XIU 60 can also include graphics controller circuits, e.g., 60B, constructed in accordance with known engineering practice, for controlling signals transmitted to a display device; or conventional text search elements, e.g., 60C, for searching data structures representative of text.

Each processor 58, 60, 82, 84 depicted in FIG. 3 can include registers, e.g., 58A, for storing digital values representative of data and processor states, in a manner discussed in greater detail hereinafter. The inserted-instructions control movement of data into and out of the registers, and cause execution of selected logical operations on values stored in the registers.

In a preferred embodiment of the invention, the processors depicted in FIG. 3 can initiate a trap sequence (see, e.g., element 58B) in response to an applied trap signal, as explained in greater detail hereinafter. The trap sequence can be initiated by selected inserted-instructions. Analogously, the processors of the cell 18.1 depicted in FIG. 3 can include elements, e.g., 58C, for initiating an interrupt sequence, and the inserted-instructions can cause entry into the interrupt sequence, or trigger a trap signal in response to an interrupt signal. These features of the invention, including specific instruction codes for triggering trap and interrupt sequences, are depicted as elements 60E, 60F and set forth below.

The four functional units depicted in FIG. 3 operate in parallel. The cell pipeline can launch two instructions every cycle. Some instructions, such as FMAD (floating-point multiply and add) perform more than one operation. Others, such as LD64 (load 64 bytes) generate more than one result. Each can be executing an instruction independently of the others.

In accordance with the invention, program instructions can be stored in memory in instruction pairs. Each pair consists of one instruction for the CEU or XIU and one instruction for the FPU or IPU. The former is called the CX-instruction and the latter is called the FI instruction.

The CEU can have three program counters (PCs), referred to as PC0, PC1, and PC2. PC2 is also referred to herein as the "fetch PC." From the programmer's perspective, the processing element is executing the instruction-pair pointed to by PC0, will next execute the instruction-pair designated by PC1, and is fetching the instruction-pair designated by PC2. As an instruction completes, PC0 acquires the previous value of PC1, PC1 acquires the previous value of PC2, and PC2 is updated according to the CX-instruction just executed. If that instruction was not a branch instruction, or was a conditional branch instruction whose condition was not met, PC2 is updated to the value of PC2 plus eight. If this value is not in the same segment as the previous value of PC2, the result is undefined. If that instruction was a taken branch, PC2 is updated to the target of the branch.

In each cycle, the processor logically fetches the instruction-pair designated by PC2 from memory and begins execution of both of the instructions in the pair designated by PC0, in parallel. Thus, a single instruction pair can initiate work in the CEU and IPU, the CEU and FPU, the XIU and IPU, or the XIU and FPU. Those skilled in the art will appreciate that because the functional units are pipelined, each unit can commence execution of a new instruction at each cycle, regardless of the number of cycles an instruction requires to complete. However, there are restrictions on the use of processor element or functional unit resources which affect the ordering of instructions by the compiler or programmer.

Certain instructions have effects in more than one unit. LOAD and STORE instructions, for example, involve the CEU and the unit containing the source or target registers. However, the processor can launch a LOAD or STORE for the FPU or IPU in the same cycle that it launches an execute instruction for the same unit.

The MOVB (move-between-units) instruction moves data between the registers of two units. Most inter-unit data movements require a single instruction; moving data between the FPU and IPU requires specification of MOVIN and MOVOUT instructions in a single instruction pair.

When the value of PC2 changes, the processor fetches that instruction pair. The instructions are entered in the processor pipeline, and occupy pipeline states in the order entered.

Although an instruction cannot be removed from the pipeline, it can be marked as "quashed." In accordance with the invention, there are two types of quashing, referred to herein as "result-quashing" and "launch-quashing."

Result-quashing occurs during "traps." A trap is an operational sequence initiated by the trap mechanism, which is used to transfer control to privileged software in the event of interrupts and "exceptions." An exception, described in greater detail hereinafter, is a state which occurs if an instruction executing in the FPU or IPU reports a trap and any operating instruction for the same unit was launched in the cycles between that launch and the current cycle. An exception is signaled when any error is detected as the direct result of fetching or executing an instruction in the instruction stream. Exceptions include overflow of a data type, access violations, parity errors, and page faults.

A trap can be initiated in two basic ways: a fault or an interrupt. A fault is explicitly connected with the executing instruction stream. An interrupt is an event in the system which is not directly related to the instruction stream. Traps, faults, and interrupts are described in greater hereinafter.

In accordance with the invention, instructions executing at the time of a trap may be result-quashed. An instruction which is result-quashed was launched and processed by the functional unit, but does not affect the register or memory state except by reporting status in one or more special trap-status registers described below.

An instruction which is launch-quashed is handled in a manner similar to that used for no-operation (NOP) instructions. A launch-quashed instruction can only generate traps relative to fetching that instruction. All other effects of a launch-quashed instruction are nullified. If an instruction is launch-quashed at the time it reaches PC0 stage, it is not launched and does not use any resource normally used by the instruction. Launch-quashing is associated with the three execution PCs. In accordance with the invention, it is possible to individually control launch-quashing for the PC0 CX and FI instructions and to control launch-quashing for the PC1 instruction pair. System software and the hardware can individually alter all three quashing controls. A trap will launch-quash certain instructions in the pipeline. Additionally, the conditional branch instructions allow the program to quash the two instruction pairs which follow it in the pipeline. This is called branch-quashing, and results in the processor launch-quashing the instructions in the branch delay. These features are described in greater detail hereinafter.

When an instruction fetch copies PC1 to PC0, it sets launch-quashing for both the CX and FI instructions depending upon the old launch-quashing state for PC1. If the just-completed CX instruction was a conditional branch which specified branch-quashing and no trap occurred, then launch-quashing is set for PC0 CX and FI and PC1 after the PCs are updated.

An instruction typically causes a processing element to read one or more source operands, operate on them in a specific fashion, and deliver a result operand. In accordance with the invention, "execute-class" instructions can be classified into three groups according to how they read their operands and deliver results. The first group causes a functional unit to read the source operands immediately, compute and deliver the result immediately. The result can be used by the next instruction pair. The second group causes a functional unit to read the source operands immediately, compute and deliver the result after some delay. The result can be used by the Nth instruction pair following the instruction, where N varies according to the instruction. The third group causes the functional unit to read some source operands immediately, compute part of the result, read other source operands after some delay, and deliver the result after some delay. The result can be used by the Nth instruction pair following the instruction, where N varies according to the instruction.

In accordance with the invention, LOAD and STORE instructions have several significant characteristics. All LOAD instructions use the source address immediately and deliver one or more results after some delay. Moreover, all LOAD instructions use their CEU index-register source immediately. If a CEU or XIU register is being stored, that value is also obtained immediately. If an FPU or IPU register is being stored, that value is obtained after some delay. The STORE-64 BYTE (ST64) instruction uses its CEU index-register source over the duration of the instruction, and obtains the various FPU and IPU source data after varying delays.

At each cycle the processor elements or functional units examine the appropriate instruction of the instruction pair addressed by the Program Counter (PC). An instruction within the instruction pair can be a directive to one of the two corresponding units (CEU/XIU or FPU/IPU), or indicates that there is no new work for either unit. The latter case is indicated by no-operation instruction encodings, CXNOP and FINOP. As referred to herein, an operating instruction is an instruction which is not a FINOP or CXNOP, and which is not launch-quashed. If an operating instruction is present, the appropriate unit launches that instruction. When the instruction execution is complete, the functional unit "retires" the instruction. In general, the result of an instruction is available to the instruction pair following retirement of the instruction, as shown in FIG. 4.

FIG. 4 illustrates single-cycle instructions, which are defined herein as an instruction which is retired before the next instruction-pair is considered for launching, and which has a "result delay" of zero. All other instructions are referred to as "multi-cycle instructions" and have a non-zero result delay. The result delay is the number of instruction pairs which must be present between a particular instruction and the instruction which uses the result. All other timings are expressed in terms of cycles form the launch time of the instruction; the first cycle is numbered zero.

Many instructions may take traps to indicate that the instruction did not complete successfully. The system disclosed herein provides users significant control over arithmetic traps.

Other traps can be used by system software to implement features such as virtual memory, as described in U.S. Ser. No. 07/136,930 (now U.S. Pat. No. 5,055,999) incorporated herein by reference. As described in greater detail hereinafter, instructions report traps at well-defined trap points, which are expressed in terms of cycles completed since the launch of the instruction.

In accordance with the invention, each instruction reads its source registers at a specified time. All single-cycle and many multi-cycle instructions read all of their sources in cycle zero of execution (i.e. with a delay of zero). Certain multi-cycle instructions read one or more sources at a later time.

If a trap occurs, system software can take corrective action (e.g. make the page available) and restart the user program instruction stream. The program generally must not change the source registers during the time that the instruction might be affected by a fault. This property is referred to as the source register restriction. FIG. 5 depicts an example of an instruction sequence which violates this restriction.

Each functional unit utilizes a selected set of source registers. The CEU {A,B} source register, for example, is used during all CEU instructions. It provides the index register used by a LOAD or STORE, the source operands used by execute-class instructions. The FPU {A,B} source register is used during FPU execute-class instructions. It provides the first or first and second source operands used by execute class instructions. The FPU {C} source is used during FPU execute-class triad instructions. It provides the third operand used by these instructions. It is also used when the CEU accesses an FPU register with a STORE-TYPE or MOVB instruction.

Additionally, the IPU {A,B} source is used during IPU execute-class instructions. It provides the first or first and second source operands used by execute class instructions. The IPU {C} source is used when the CEU accesses an IPU register with a STORE-TYPE or MOVB instruction. The XIU {A,B} Source is used during XIU execute-class instructions. It provides the first or first and second source operands used by execute-class instructions. It is also used when the CEU accesses an XIU register with a store-class or MOVB instruction.

As described above, each instruction that produces a result has a result delay that specifies how many cycles ensue before the result is available. During the result delay, the result registers are undefined. Programs may not depend on the old value of a result register of an instruction during the result delay of that instruction. This is called the result register restriction. When an exception occurs, all launched instructions are allowed to complete before the system software handler is invoked. Thus, it is possible that the result of a multi-cycle instruction will be delivered before the defined result delay has expired. Any instruction which uses the result register of a multi-cycle instruction during the result delay of that instruction will indeterminably obtain one of the (at least two) values of that register. FIG. 6 shows a sequence that violates this restriction. The FNEG instruction attempts to depend upon the value that %f2 had before the FADD instruction. The FADD instruction will write %f2 in time for the FSUB instruction to read it. If the LD8 instruction takes a page fault, or an interrupt is signalled before the FNEG is fetched, the FADD will complete before the FNEG is launched. This program will therefore produce unpredictable results.

Each of the functional units has a number of internal resources which are used to execute instructions. These resources may only operate on one instruction at a time. At any time, each resource must be idle or in use by at most one instruction. This is called the resource restriction. Various functional units may detect violations of the resource restriction and cause a trap.

Figure 8:
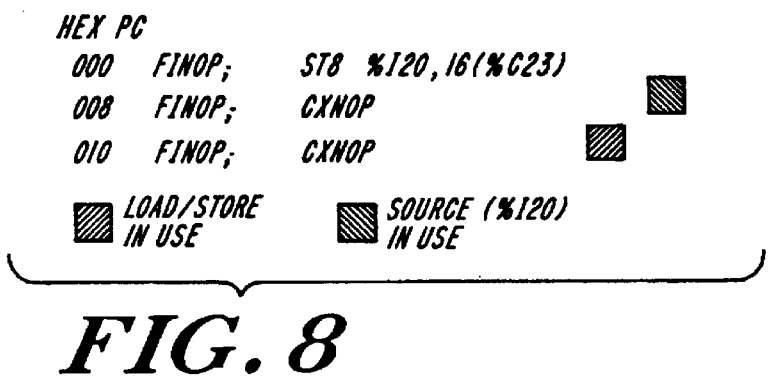
FIG. 8 depicts resource usage and timing of a ST8 instruction.
Figure 9:
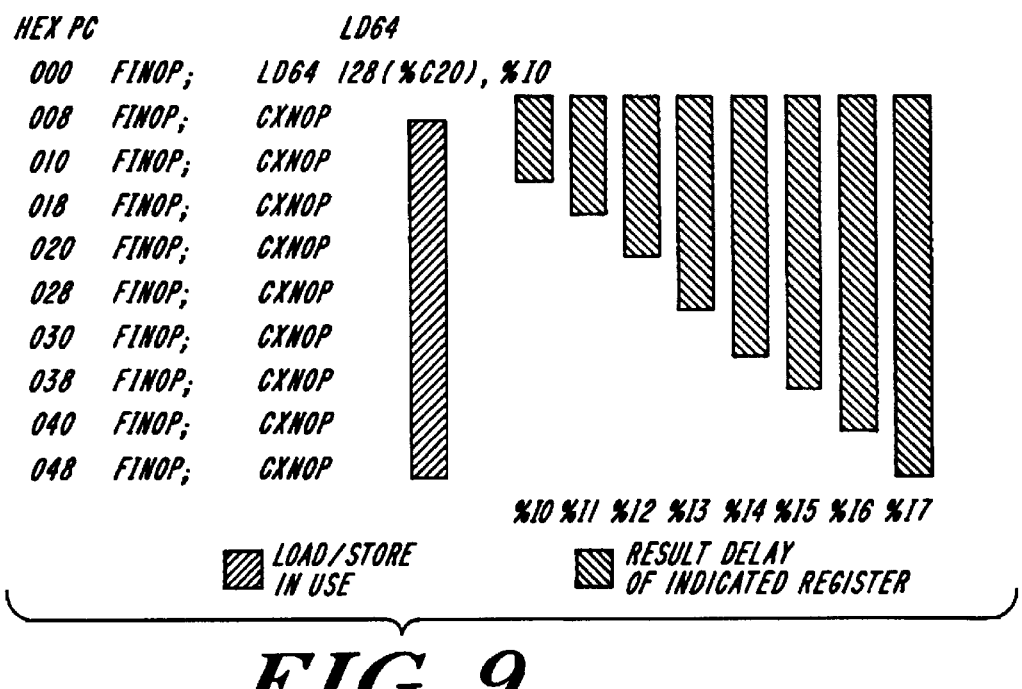
FIG. 9 depicts resource usage and timing of a LD64 instruction.
Figure 33:
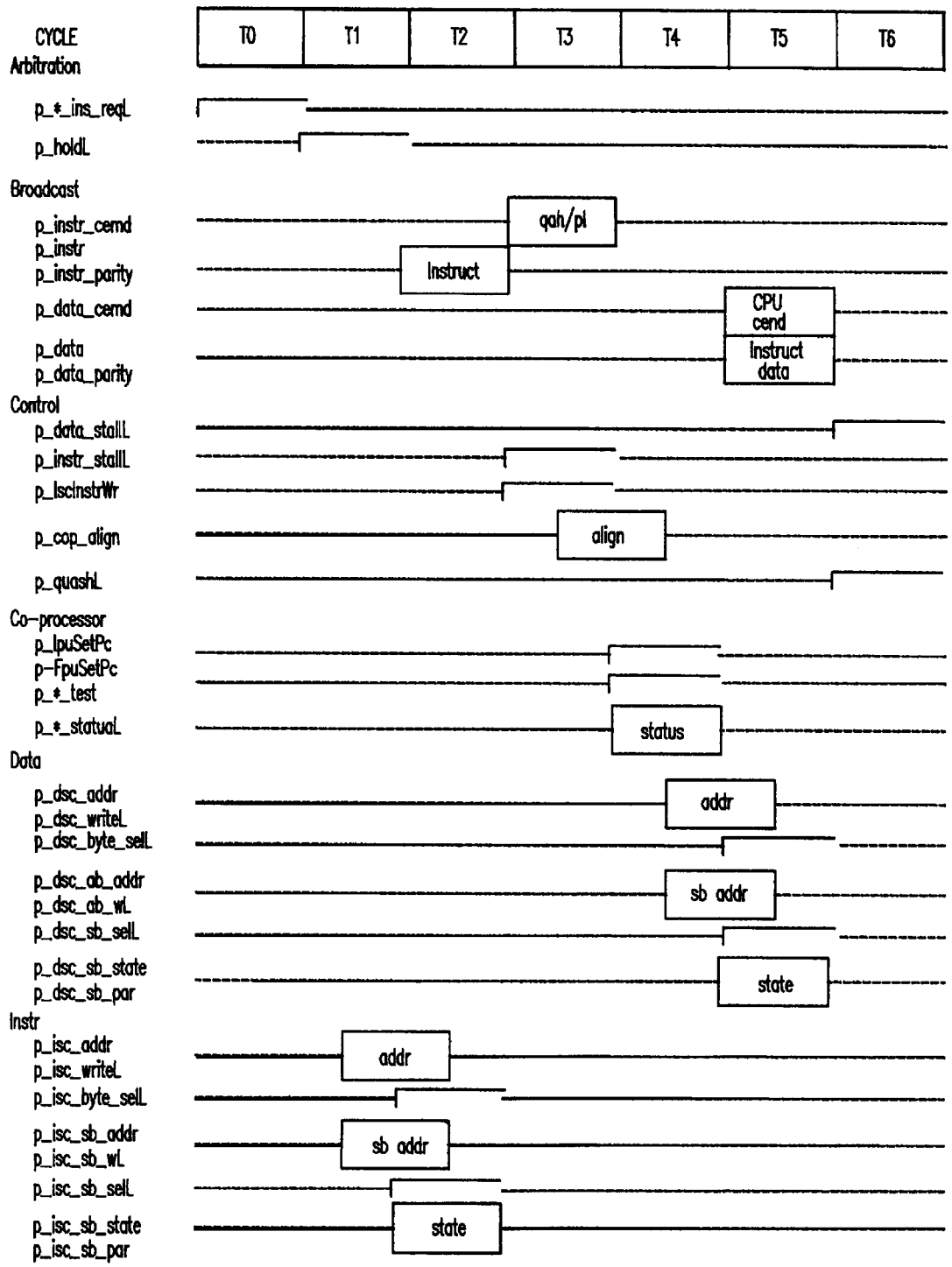
FIG. 33 shows pipeline stages when an instruction drives signal fields in a preferred system according to the invention.

The CEU has only one resource which is subject to conflicts. This is the load/store resource, which is used by all LOAD, STORE, MOVB, MOVOUT and memory system instructions. All instructions except LD64 and ST64 (LOAD and STORE 64 bytes) use this resource only during their third cycle (i.e. with a delay of two). The LD64 and ST64 instructions use the load/store resource during the third through ninth cycle (delay two through eight). The resource usage of LD and MOVB instructions is depicted in FIG. 7, while FIG. 8 shows resource usage. The timing of a LD64 instruction is depicted in FIG. 9, and that of a ST64 instruction is shown in FIG. 10.

The IPU resources include a multiplier resource, which is used by the MUL and MULH instructions. Resources associated with the FPU include result, divider, adder and multiplier resources. The result resource is used by all of the FX instructions to deliver results into registers. This resource is not used by certain CX instructions—LD, ST, LD64, ST64, MOVOUT, and MOVB—which operate on FPU registers. It is used by MOVIN to a %f register.

The IPU divider resource is used in FDIV instructions, the IPU adder resource is employed in many floating point computational instructions, and the IPU multiplier resource is used in many of the floating point computational instructions. No resource conflicts are possible in the XIU.

In the description of instructions provided herein and in co-pending U.S. Ser. No. 07/370,287 filed on Jun. 22, 1989, now U.S. Pat. No. 5,251,308 resource usage is specified by giving the name of the resource, the number of cycles of delay before the resource is used and then the number of cycles for which it is used in a tabular format. Thus, the timing of a LD instruction would be described as:

| INSTR CEU {A,B} | Load/Store | Result |
|---|---|---|
| Source | Resource | Delay |
| 1d [0, 1, 0] | [2, 1] | 2 |

The timing for sources is a triple, specifying [delay, cycles, source restriction]. "Delay" is the number of cycles until the resources is used; it is counted from zero, commencing with the launch of the instruction. "Cycles" is the number of cycles the source is used, after the delay has expired. "Source restriction" is the number of cycles that the source should not be altered, counting after the delay has expired. "Result Delay" is the number of instructions which must occur between the instruction-pair and the first instruction which references the result.

Because some instructions require multiple cycles to complete or report exception status, the CEU maintains a co-execution PC for the FPU and for the IPU. If an exception occurs, the trap handler may need to examine the co-execution PC to determine the actual address of the failing instruction, as described in greater detail hereinafter. The CEU performs a similar function wilt load/store-type instructions so that ST64 instruction exceptions can be resolved.

If an instruction may trap, there must not be any operating instructions for the same unit in the instruction slots between the containing instruction pair and the instruction pair where the trap will be reported. This is called the trap PC restriction. It is possible to place an operating instruction in the instruction pair where the trap will be reported or in any instruction pair thereafter. The application of this restriction depends upon the needs of the operating system and the user application.

These coding practices ensure that an instruction sequence generates deterministic results, and that any exception which occurs can be resolved by system software or passed to the user program for analysis. In all cases, it is possible to determine exactly what operations were in progress, to correct a temporary condition such as a missing page, alter data, and finally restart the computation. The program must not violate the result register restriction or any resource restriction, and must not violate the source register restriction or functional unit trap PC restriction in any instruction sequence which might take a fault. This restriction does not apply to instruction sequences which will not take faults, either because the no trap modifier is used or the data parameters are known.

To maximize the number of instructions which are scheduled and minimize the number of FINOP and CXNOP instructions executed, several options are available. The programs must net violate the result register restriction or any resource restriction. The program may ensure that data-dependent faults do not occur during FI-instructions, either by knowing the data or by using the no trap instruction modifier. In the latter case, the program may decide to examine various condition codes (such as @IOV) to determine whether or not an arithmetic error occurred. When no faults can occur, it is possible to violate the source register restriction and the functional unit trap PC restriction for FI instructions. It is also possible to violate these restrictions even when traps will occur if precise knowledge of the trapping instruction is not required. Whether or not the CEU source register restriction may be violated depends upon the system software, but typical implementations will not guarantee the results of such violations. FIG. 11 depicts an example of overlapped instructions which obey the rules for precise traps.

As discussed above, the CEU has three PCs which define the current instruction stream. A branch instruction will change the fetch PC (PC2) to the target value of the branch. A branch instruction may be a conditional branch (B** instruction), an unconditional JUMP (JMP or RTT instruction), or an unconditional subroutine jump (JSR instruction). Conditional branches allow the program to compare two CEU registers or a CEU register and a constant, or to examine a CEU condition code. The fetch PC is changed if the branch condition is satisfied, and simply incremented if the branch condition is not satisfied.

To trace the instruction-pairs executed by a program, it is necessary to trace the values of the three PCs as the program proceeds. A program may specify branch instructions in a branch delay. This technique is referred to herein as remote instruction execution, and is described in greater detail hereinafter. Any JMP, JSR or RTT instruction which changes the segment portion of PC2 may not have a "PC-relative" branch in its branch delay. A PC-relative branch is defined as any conditional branch or unconditional branch which specifies the program counter as its index register A branch is always followed by two instructions in the processor pipeline. These instructions are called branch DELAY instructions. The branch delay is actually a special case of result register delay, where the result register of a branch happens to be PC0. For unconditional branches, these instructions are always executed. For conditional branches, their execution is controlled by the branch-quashing option of the branch instruction. Because branch instructions may occur in the branch delay slots of another branch, control by the branch-quashing option does not necessarily mean that the two instruction pairs which sequentially follow a branch in program memory are fetched or executed. This property is further discussed below.

In accordance with the invention, there is no source register restriction, branch register restriction, or resource restriction for branch instructions. This is because the fetch PC is changed by the branch instruction, and any exception pertaining to the new fetch PC will be reported at the time that value has arrived at PC0, and the instruction-pair is being launched. For optimum performance, branch delays can be filled with instructions that logically belong before the branch but do not affect, and are not affected by, the branch itself. If no such instructions are available, the delay slots may be filled with NOPS.

A representative branch instruction is depicted in FIG. 12. The JMP instruction is fetched along with its partner. The partner begins execution. The two delay pairs are then fetched and begin execution. Then, the instruction pair at the target address is fetched and executed.

The programmer or compiler can fill the branch instruction with instruction preceding or after the branch itself. The branch delay of conditional branches can be harder to fill. In the best case, instructions preceding the branch can be put in the branch delay. These must be executed whether or not the branch is taken. However, instructions from before the branch are not always available to more into the branch delay. Filling the branch delay of conditional branches is simplified by branch-quashing. In particular, the conditional branch instructions allow the programmer to specify whether the branch delay instructions should be executed based on the result of the branch decision. The branch instruction can specify quash-on-true if the instructions are to be branch-quashed when the branch is taken, quash-on-false if they are to be branch-quashed when it is not taken, and quash-never if the instructions should always be executed. The assembler conditional branch mnemonics use the letters QT, QF, and QN, respectively, to indicate which branch-quashing semantics are required. Branch-quashing results in launch-quashing as the instructions in the branch delay arrive, at PC0 and PC1.

When instructions from before the branch are to be used in the branch delay, quash-never is specified. If no such instructions are available, the programmer can fill the delay with instructions from the target and choose quash-on-false, or from below the branch, selecting quash-on-true. The decision of which source to fill from depends on which instructions can easily be moved and upon prediction, at code generation time, of whether the branch is likely to be taken. Examples are shown in FIGS. 13–19.

FIGS. 13–15 depict an example of filled branch delay. In this example, code is moved from before a branch into the branch delay, thus removing two NOPS from the instruction stream. In particular, FIG. 13 depicts the original code sequence with NOPS in the branch delay. The instructions executed are FI_INSA0/CX_INSA0, FI_INSA1/CX_INSA1, FIINSA2/CXINSA2, FI INSA3/jmp, FI_NOP/CXNOP, FINOP/CXNOP, FI_INSB4/CX_INSB4, FI_INSB5/CX_INSB5. This sequence results in 2 wasted cycles.

Alternatively, the optimized code sequence with filled branch delay depicted in FIG. 14 can be employed. As depicted therein, to fill the branch delay, instructions FI_INSA1/CX_INSA1 and FIINSA2/CXINSA2 are moved into the branch delay, saving two instruction cycles. The instructions executed are FI_INSA0/CX_INSA0, FI_INSA3/jmp, FIINSA1/CX_INSA1, FI INSA2/CX_INSA2, FIINSB4/CXINSB4, FI_INSB5/CX_INSB5, resulting in no wasted cycles. It is also possible to rearrange the FI instructions independent of the rearrangement of the CX instructions, as depicted in FIG. 15.

Certain programming constructions, such as the loop make it likely that a branch will be taken. If the branch is most likely to be taken, the first two instructions from the branch target may be placed in the branch delay. Branch-quash on false is used to produce correct results should the branch not be taken. If the branch is indeed taken, two instruction cycles are saved. If not, the two cycles are branch-quashed and so program correctness preserved. FIG. 16 depicts a code sequence using NOPS in branch delay, while FIG. 17 depicts an optimized code sequence with target in branch delay and branch-quashing. Referring to FIG. 16, if the branch is not taken, the instructions executed are FIINSA0/CX_INSA0, FI_INSA1/CX_INSAI, FIINSA2/CXINSA2, . . ., FI INSA7/CBR.QN, FINOP/CXNOP, FINOP/CXNOP, FI_INSC0/CX_INSC0, resulting in two wasted cycles. If the branch is taken the instructions executed are FI_INSA0/CX_INSA0, FIINSA1/CX INSA1, FIINSA2/CX_INSA2, FIINSA7/CBR.QN, FINOP/CXNOP, FINOP/CXNOP, FIINSC0/CX INSC0, resulting in two wasted cycles.

FIG. 17 illustrates that to fill the branch delay the user can copy the two instructions FIINSA0/CXKINSA0 and FI_INSA1/CX_INSA1 into the branch delay, select branch-quash on false (branch taken), and adjust the branch target. If the branch is not taken, the instructions executed are FIINSA0/CX_INSA0, FI_INSA1/CX INSA1, FIINSA2/CXINSA2, . . . , FI_INSA7/CBR.QF, branch-quashed, branch-quashed, FI_INSC0/CX_INSC0, resulting in two wasted cycles. If the branch is taken, the instructions executed are FIINSA0/CXINSA0, FI_INSA1/CX_INSA1, FIINSA2/CXINSA2, . . . , FI_INSA7/CBR.QF, FIINSA0.1/CX INSA0.1, FLINSA1/CX_INSA1.1, FIINSA2/CX_INSA2, so that in the most likely case, no cycles are wasted.

In some programs, certain branches are most likely to be skipped. One such branch is a test of a rarely set condition, such as arithmetic overflow. If the branch is most likely to be skipped, the first two instructions after the branch may be placed in the branch delay. Branch-quash-on-true is used to produce correct results should the branch be taken. If the branch is indeed not taken, two instruction cycles are saved. If not, the two cycles are branch-quashed and the execution time is not improved. An example of this is depicted in FIGS. 18 and 19.

FIG. 18 shows a code sequence having NOPS in the branch delay. If the branch is not taken, the instructions executed are FI_INSA0/CX_INSA0, FIINSA1/CBR.QN, FINOP/CXNOP, FINOP/CXNOP, FIINSB0/CX_INSB0, FI_INSB1/CX_INSB1, FIINSB2/CXINSB2, resulting in two wasted cycles. If the branch is taken, the instructions executed are FIINSA0/CX_INSA0, FI INSA1/CBR.QN, FINOP/CXNOP, FINOP/CXNOP, FI_INSC0/CX_INSC0, F_INSC1/CX_INSC1, FIINSC2/CX_INSC2, resulting in two wasted cycles.

FIG. 19 depicts an optimized code sequence with post branch instructions in branch delay and branch-quashing. As illustrated in FIG. 19, to fill the branch delay, the user can move instructions INSA1 and INSA2 into the branch delay and choose branch-quash on true, saving two instruction cycles when the branch is indeed not taken. If the branch is taken, the instructions executed are FIINSA0/CXINSA0, FI_INSA1/CBR.QT, branch-quashed, branch-quashed, FI INSC0/CX_INSC0, FI_INSC1/CX_INSC1, F_INSC2/CX_INSC2, resulting in two wasted cycles. If the branch is not taken, the instructions executed are FI_INSA0/CX_INSA0, FI_INSA1/CBR.QT, FIINSB0/CXINSB0, FI_INSB1/CX_INSB1, FIINSB2/CXINSB2, so that in the most likely case, there are not wasted cycles.

Because of the three PCs used for determining the instruction stream, it is possible to "remotely execute" one or two instructions which is not associated with the linear flow of a program. These operations can be executed with the type of sequence depicted in FIG. 20. The program. sequence of FIG. 1 20 executes the instruction pair at addresses 000, 008, 010, 100, 018, 020, etc. By moving the JMP from address 008 to address 0x10, two remote instructions pairs (at 100 and 108) are executed. These particular sequences do not support remote instructions which contain branches as CX instructions.

In accordance with the invention, the transmission of interrupts and DMA inserts instructions into the processor pipeline between consecutive instructions of the instruction stream. These instructions are referred to herein as inserted-instructions. The CEU controls the "right" to insert instructions, and will occasionally ignore or quash an inserted instruction.

The architecture permits any instruction to be inserted, but the functional units can be designated so that only a limited part of the instruction set is used. These inserted instructions do not change the PCs. Inserted instructions use cycles, and allow the pipelines of all processing elements or functional units to advance, just as an ordinary instruction does.

The effect of inserted-instructions on the programming model is that an inserted-instruction may cause a result to appear earlier than expected. This is because the inserted-instruction occupies a physical pipeline stage, and a hidden cycle occurs. If the program obeys the result register restriction, there is no change to the logical execution of the program, only to the time required to execute it. Inserted-instructions cannot be quashed by branch-quashing or by launch-quashing state associated with the logical pipeline (PC0, PC1, PC2), but can be result-quashed or launch-quashed in the physical pipeline by an exception.

The following examples show how the CCU and XIU can employ inserted-instructions. The XADDR, XCACHE, XNOP, and XDATA instructions, and the subpage, subblock, and other memory operations set forth in the following examples are further described in U.S. patent application Ser. No. 07/370,287 filed this same date herewith, and in U.S. patent application Ser No. 07/136,930 (now U.S. Pat. No. 5,055,999) both incorporated herein by reference. The CCUs and XIU supply the CX portion of an instruction pair, and the CEU logically supplies an FINOP instruction. The CCUs and XIU manipulate processor busses at the same time that they insert an instruction to supply the operands of the instruction. The CCU and XIU insert two or more contiguous instructions.

Flushing a Subpage from the Subcache:
xaddr
xaddr
xnop
xcache
xcache

Loading or Storing Data, Unpipelined:
xaddr
xnop
xnop
xdata

Loading or Storing Two Items (Each 8 bytes or less), Pipelined:
xaddr
xaddr
xnop
xdata
xdata Loading or Storing a Subblock:
xaddr
xaddr
xnop
xdata
xnop xnop
xnop
xnop
xnop
xnop
xnop
Requesting an Interrupt:
xtrap
xnop The inserted-instructions can be coded as part of a program by diagnostic software. In a preferred embodiment of the invention, the CEU implements the FI instruction which accompanies the CX instruction. The program must take special action to supply or extract data as required. This can be accomplished, for example, by using MOVIN or MOVOUT instructions.

In a preferred embodiment of the invention, a trap mechanism is used to transfer control to privileged software in the event of interrupts and exceptions. The taxonomy of traps is shown in FIG. 21. As illustrated therein, a trap can be initiated in two basic ways: by a fault or by an interrupt. A fault is explicitly connected with the executing instruction stream, and occurs when certain combinations of data, states and instruction arise. An interrupt is an event in the system which is not directly related to the instruction stream.

Faults are further classified into software and hardware faults, respectively. Software faults are those faults which are part of the expected operation of the program, and may be caused by user or system software as part of implementing a computational model. Hardware faults can occur when unexpected errors are detected by the hardware as it operates. Preferably, the processor handles faults immediately, but can sometimes defer the handling of interrupts.

The most significant characteristic of the trap sequence is its ability to suspend execution and save the execution state of the processor so that software can restart execution in a manner which is transparent—i.e., "invisible"—to the original program. Such sequences are made possible by the configuration of processor registers and restrictions described in U.S. patent application Ser. No. 07/136,930 (now U.S. Pat. No. 5,055,999), incorporated herein by reference. A program which violates the applicable restrictions, however, may suffer indeterminate results or the inability to resume an instruction stream after trap handling. The highest priority trap is referred to herein as a RESET. A RESET cannot be masked.

Between three and six PC values are required to specify the instructions in execution at the time of a trap. As discussed in greater detail in U.S. Ser. No. 07/136,930 (now U.S. Pat. No. 5,055,999), incorporated herein by reference, the CEU pipeline is described by PC0, PC1, and PC2. During a trap, these PCs are saved in CEU registers %TR0, %TR1, and %TR2 (also referred to as %C0, %C1, and %C2). The CEU maintains the addresses of the most recent operating FPU and IPU instructions. These addresses are called the co-execution PCs.

The co-execution PC for a given functional unit indicates the PC value of the last operating instruction launched by that unit, as long as that instruction is not result-quashed because an earlier instruction in any functional unit reported an exception. This mechanism, in conjunction with the Trap PC restriction, permits software to determine the exact instruction PC responsible for an exception, regardless of the result time of the instruction.

The execution point of the XIU is always described by PC0 at the time of the trap, since the XIU has no overlapping execution. During a trap, the co-execution PCs are saved in !PC_IPU and !PC_FPU indicated in FIG. 22. The CEU also provides !PC_SCEU to assist system software in handling faults which result from an ST64 instruction. The CEU and co-execution PCs are referred to collectively as the execution PCs, and are depicted in FIG. 22.

If an instruction executing in the FPU or IPU reports a trap and any operating instruction for the same unit was launched in the cycles between that launch and the current cycle, that unit reports an "imprecise exception." Otherwise the exception is referred to as "precise." In accordance with the invention, the instruction pair designated by PC0 may contain an instruction for the same unit without affecting the precision of the exception reported by that earlier instruction.

An exception is marked "imprecise" when the processor does not have enough information to precisely specify the state of the computation. If an operating instruction is present in the pipeline after the instruction which reports exception, there is no PC information for the trapping instruction, because the CEU has already updated the co-execution PC. If multiple exceptions are reported as part of a single trap, it is impossible to determine which instruction signalled which exception. Such computations cannot be meaningfully restarted, and the imprecise-exception flag is set to 1 in !I TRAP and/or !F_TRAP, as appropriate.

The trap mechanism stores trap state values in various registers. These registers include thy following:

| | |
|---|---|
| %TR0 | stores the PC of the instruction at the trap point. |
| %TR1 | stores the PC of the first instruction after the trap point. |
| %TR2 | stores the PC of the instruction about to be fetched (second after the trap point). |
| !CONTEXT | stores the context register of the suspended instruction stream. |
| !TRAP | stores the trap register which records the causes of the trap. |
| !PC_SCEU | stores the PC of the last LD or ST instruction launched which reported a trap, or of the last LD64 or ST64 instruction which was not launch-quashed and was not result-quashed by some 6ther exception. IF an STT or memory system fault is indicated in !TRAP, this register contains the PC of the offending instruction. |
| !PC_FPU | stores the PC of the last operating FPU instruction launched which might have generated the current exception. This register is only valid if !TRAP indicates an FPU exception and ![00fa]TRAP indicates the exception was precise. |
| !F_TRAP | stores the FPU trap register which records any FPU exceptions. |

-continued

| | |
|---|---|
| !PC_IPU | stores the PC of the last operating IPU instructions launched which might have generated the current exception. This register is o#y valid if !TRAP indicates an IPU exception and !#RAP indicates the exception was precise. |
| !I_TRAP | stores details of the IPU exception, if an IPU exception is indicated in !TRAP. |
| !X_TRAP | stores details of the XIU exception, if an XIU exception is indicated in !TRAP. |

Upon entry into the trap handling software, the state of execution is specified by these registers. Additionally, the causes of the trap are indicated by the contents of these registers, which are more fully described in U.S. patent application Ser. No. 07/136,930 (now U.S. Pat. No. 5,055,999) and U.S. patent application Ser. No. 07/370,287, now U.S. Pat. No. 5,251,308 incorporated herein by reference.

Gaps in the instruction stream can occur when a multi-cycle instruction signals an exception after cycle zero of execution. An instruction is launched when its address is present in PC0. In the next cycle, the execution PCs are updated to describe the next three instructions to be executed. If that multi-cycle instruction reports a precise exception, its address is present in a co-execution PC (!PC_FPU, or !PC_IPU) or !PC_SCEU. The address of the instruction is lost if the program launches another operating instruction for the same unit in the result delay of that instruction.

After a trap occurs, system software may signal an error to the program or resolve the trap cause. To restart an instruction stream without gaps, the kernel executes a simple sequence which restores the execution PCs and register state. User or system software must complete any "dangling" instructions before the instruction stream can be restarted, as discussed in greater detail hereinafter.

A CEU gap can exist if a ST64 instruction reports an exception in its final cycle of execution. This is the only case where !PC_SCEU is valid (an STT or memory system exception occurred) but not equal to %TR0. The actual instruction was launched seven cycles before the instruction pair designated by PC0 when the trap occurs.

If multiple instruction are executing in the IPU or FPU when a trap occurs, the trap state of that unit is imprecise. Imprecise state cannot be meaningfully analyzed, so system software will typically signal an error to the user process and not allow the previous instruction stream to be restarted. If the trap state is precise, it is possible that the trap was caused by the instruction at the trap point (PC0/%TR0), or by an instruction launched before the trap point.

When the processor signals a trap, it establishes a trap point. The trap point is one of the PCs in the sequence of instruction pairs executed by the program. All instruction pairs before the trap point have completed or are allowed to complete. All instruction pairs after the trap point are not launched. The instruction pair at the trap point is treated specially, according to the sources of the trap and the instructions present.

For single cycle instructions which signal exceptions, the trap point is the PC of the trapping, instruction. Some multi-cycle instructions report exceptions in cycle zero of execution, or at a later time. In many cases, the later trap point is the cycle before the result is available. The CEU reaches steady state, saves the execution state, and enters the trap handler, as described below.

When a trap is signalled, the processor stops fetching instruction, refuses to allow inserted instructions, and waits for all of the co-execution units to retire any instructions in progress. If any of these instructions report exceptions, each exception is included as part of the trap information. Each co-execution instruction may be retired by successfully completing its actions or by reporting, an exception status and quashing its results. If an instructions does not report an exception status while completing, no further action will be required. If a retiring instruction launched before the instruction pair at PC0 reports an exception, that instruction represents a gap in the instruction stream before the trap point. Its status and address must be saved for the software to use in filling the gap.

The CEU handles the instruction pair at PC0 (the trap point) according to the launch-quashing state of the instruction stream, the trap source, and the CX instruction at PC0. Interrupts are generated, for example, when the XIU or a CCU inserts an XTRAP instruction into the instruction stream. An inserted instruction does not affect the program PCs; the XTRAP occurs before the instruction pair at PC0 is launched. Thus, if the trap was initiated by an interrupt (regardless of whether or not any functional unit reports a trap as part of reaching ready state), the instruction pair at PC0 is not launched. The instructions at PC0, PC1 and PC2 are result-quashed.

When the CEU updates the execution PCs (PC0, PC1, PC2), it attempts to fetch the instruction designated by PC2. It is possible that a fault will be signalled during address translation (STT violation) or while the CEU is obtaining the instruction subblock (e.g. pagefault). The error status is associated with the instruction pair, and follows it through the pipeline. If the instruction pair is result-quashed, the exception is not reported. Otherwise, the exception is reported, and the instructions at PC0, PC1 and PC2 are result-quashed.

If there is a trap reported by the CEU or XIU, the CX instruction at PC0 is result-quashed. A service request is treated as any other CEU instruction which reports a trap in cycle zero. If the FI instruction at PC0 was not already launch-quashed, it is result-quashed. The instructions at PC1 and PC2 are result-quashed.

The trap sequence result-quashes the FI instruction. If the CX instruction at PC0 is not a store-type instruction, it is result-quashed. If the CX instruction at PC0 CX is a store-type instruction, it is allowed to complete. The store-type instruction may complete normally, or report a trap. In the first case, PC0 CX is marked as launch-quashed. If the store-type instruction reports an exception, it becomes part of the trap state; the launch-quashing state is not changed. This behavior ensures that a store-type instruction only completes once.

The instructions at PC1 and PC2 are result-quashed. The cause or causes of the trap are saved in the trap registers. The CEU sets its trap register, !TRAP, to indicate the causes and sources of the trap. Each co-execution unit that reports an exception also sets its trap register—!F_TRAP,!i trap, or !x-trap—to further detail the exception it detected.

FIG. 23 shows the instruction execution model and the occurrence of a trap. If a program is using conditional branch quashing, it is important that this quashing state be preserved as part of trap state. Branch quashing state affects launch-quashing state. If an inserted XTRAP instruction causes a trap, the trap will occur before or after the conditional branch instruction. In the first case, the trap launch-quashes the conditional branch; if the instruction stream is restarted, the conditional branch is refetched and launched. In the second case, the branch-quashing state causes launch-quashing to be set for PC0 CX/FI and PC1 CX/FI, and then the inserted instruction (which is not logically associated with PC0) is executed and causes a trap. Thus, the saved launch-quashing state indicates that the two instruction pairs should be quashed if the instruction stream is restarted.

If an instruction before the conditional branch or the FI instruction paired with a conditional branch signals a trap, the conditional branch instruction will be result quashed, and launch-quashing is not affected. If the instruction stream is restarted, the conditional branch instruction pair will be re-launched, and branch-quashing will occur when the pipeline PCs are updated.

The trap sequence saves the state of the instruction stream in processor registers. The contents of these registers are described in U.S. patent application Ser. No. 07/136,930 (now U.S. Pat. No. 5,055,999) and U.S. patent application Ser. No. 07/370,287, now U.S. Pat. No. 5,251,308 incorporated herein by reference. In order to protect these register values from being destroyed by another trap, the trap sequence disables further traps. The trap handling software will re-enable traps when the registers are safely stored in memory. In particular, to save the state of execution the hardware trap sequence disables further traps by setting !CONTEXT.TE =0; stores PC0 (the trap point) in trap register 0 (%TR0); stores PC1 (the next PC) in trap register 1 (%TR1); stores PC2 (the instruction fetch PC) in trap register 2 (%TR2); modifies the context register, !CONTEXT, to save the privilege level, !CONTEXT.PL, in the old privilege level, !CONTEXT.OP; copies the launch-quashing state to !CONTEXT.QSH; and saves the current co-execution PCs and !PC_SCEU. The validity of !PCFPU, and !PC_SCEU depend upon exception status reported by the individual functional units or processor elements.

The PCs stored in %TR0, %TR1, and %TR2 and the launch-quashing information saved in !CONTEXT define the instruction stream to be resumed. The trap register !TRAP indicates whether or not the instruction pair at PC0 (%TR0) caused an exception. The PCs stored in %TR1 and %TR2 are unrelated to the cause of the trap.

The co-execution unit PCs (!PC_FPU, !PC_IPU, and !pc_iu) maintained in the CEU are only valid if the !TRAP control register indicates that the corresponding co-execution unit reported an exception. Finally, the processor must collect the information that describes the causes of the trap and store this in the trap registers, !TRAP, !F_TRAP, !XTRAP, and !I_TRAP.

In the third stage of the trap sequence, the processor begins executing the trap handler, changing processor privilege level to the greatest privilege by setting !CONTEXT.p1=0; clearing the launch-quashing state so that no instructions are quashed; and setting the PCs to cause sequential execution beginning at context address zero.

Except as noted above, the context of the previous instruction stream is inherited by the trap handler. System software must ensure that context address 0 is mapped by the ISTT of every executing context. The trap handler may choose to store the state and then change to some other context. Since the trap handler executes at privilege level 0, it has access to the kernel general registers, %C0–%C3.

Since the trap handler inherits the context address space of whatever was executing when the trap occurred, every context address space must map the code and data segments that trap handler requires to start. The data mappings may be hidden from the user instruction stream by restricting access to level 0 only. The trap sequence takes the number of clocks needed to retire any co-execution instructions in progress plus three instruction cycles. Interrupts are not accepted during these cycles.

Faults are traps which are directly related to the instruction stream being executed. The KSR instruction, for example, is used to request an operating system service or debugging break point. System software defines an interface by which a program will pass information detailing the specific nature of its request. A service request has the same trapping characteristics as any other CX instruction which faults in cycle zero of execution. It is shown separately because restarting the instruction stream requires distinctive system software activity.

The KSR instruction is defined as a single-cycle instruction and traps in cycle zero of execution. A KSR instruction never completes normally. The address of the KSR is recorded in %TR0. The trap status indicates the service request and also indicates whether or not the paired FI instruction faulted. If the instruction stream is to be restarted, system software must alter quashing state so that the CX instruction is quashed. Note that this operation results in the FI instruction being completed after the service call completes.

An exception is signaled when any error is detected as the direct result of fetching or executing an instruction in the instruction stream. Exceptions include overflow of a data type, access violations, parity errors, and page faults. Exception causes are described by the !TRAP, !F_TRAP, !I_TRAP, AND!X_TRAP registers.

Since multiple instructions are executed in parallel in the co-execution units, more than one exception can be signalled in the same cycle. When a trap is signalled, software must examine all the source flags in !TRAP to determine the sources of the trap. Individual units report additional status in their private trap registers.

When a CX instruction signals an exception in cycle zero of execution, it is quashed and the corresponding FI instruction is result-quashed. If the FI instruction or both of the instructions in a pair signals an exception in its first cycle of execution (cycle zero), the instruction pair is quashed and the trap point is that instruction pair, with the exception of a ST or ST64 instruction partner of an FPU or IPU instruction that signals an exception. Thus the saved state of execution is as it was before the exception occurred. The address of the instruction which caused the exception is stored in %TR0.

In the example set forth in FIG. 24, the add8 instruction has a result delay of zero, and will report an overflow in cycle zero of execution. The register value of %TR0 is 0, %TR1 is 8, %TR2 is 0x10. In addition, !PC_IPU is 0, and the exception is precise.

As described above, an exception signalled by an instruction after cycle zero of execution results in a gap in the instruction stream, indicated by the corresponding !pc register being unequal to %TR0. If the exception is imprecise, the PC register may or may not be different from %TR0, and will not indicate the instruction signalling the exception.

In the instruction sequence example set forth in FIG. 25, the FMUL instruction has a result delay of two, and may report a trap in cycle zero or cycle two of execution. If the exception is reported in cycle 0, then %TR0 is 0, %TR1 is 8, %TR2 is 0x10. The value of !PC_FPU is 0, and the exception is precise.

The example of overlapped execution depicted in FIG. 26 is similar to that of FIG. 25, but the previous example, but with data which causes the FMUL instruction to fault in cycle two. In this case, %TR0 is 0x10, %TR1 is 0x18, %TR2 is 0x20, !PC_FPU is 0. This exception is precise.

In the example set forth in FIG. 27, the FMUL again reports an exception in cycle two. Regardless of whether or not the instruction at 0x10 report an exception, %TR0 is 0x10, %TR1 is 0x18, %TR2 is 0x20, !P_FPU is 0. This exception is precise.

In the instruction sequence example of FIG. 28, the FMUL instruction again reports an exception in cycle two. If the FADD instruction reports an exception in cycle zero, %TR0 is 8, %TR1 is 0x10, %TR2 is 0x18, !PC_FPU is 8; the exception is imprecise. Otherwise, %TR0 is 0x10, %TR1 is 0x18, %TR2 is 0x20, and !PC_FPU is 8; and the exception is imprecise.

FIG. 29 depicts an instruction sequence in which data is such the FMUL instruction does not trap. If the FADD instruction reports an exception in cycle zero, %TR0 is 8, %TR1 is 0x10, %TR2 is 0x18, !PC_FPU is 8; the exception is precise. If the FADD instruction reports an exception in cycle two, %TR0 is 0x18, %TR1 is 0x20, %TR2 is 0x28. If the FI instruction at 0x10 is an operating FPU instruction, then the FADD exception is imprecise and !PC_PU is 0x10. Otherwise the FADD exception is precise, and !PC_FPU is 8.

In the example illustrated in FIG. 30, the FMUL instruction has data which will not cause any fault. The CX instruction at 008 takes a trap in cycle zero (page_fault). The FPU quashes its launched instructions and the result of the FMUL is delivered to %f2. %TR0 is 8, %TR1 is 0x10, %TR2 is 0x18, !PC_FPU is not valid. The CEU exception is precise and !PC_CEU is 8, indicating that a ST64 instruction was not the cause of the memory system fault.

The instruction sequence depicted in FIG. 31 takes advantage of the fact that store-type instructions have a one cycle delay before reading the source. This code sequence will only generate correct results if no trap can occur when the store instruction is addressed by PC0.

Although the result delay for a LOAD instruction is two cycles, it is similarly possible to compress the sequence if it is known that no fault can occur when the STORE instruction is addressed by PC0. The sequence shown in FIG. 32 is precise and restartable even if a CX faults occurs at address 0 or 0x10.

All LD, LD64 and ST instructions detect exceptions in cycle zero of execution. Thus, as STT or memory system fault (e.g. missing-segment, missingpage) is reported with %TR0 and !PC SCEU set to the address of that instruction. The ST64 instruction may report an error in cycle zero (STT-related) or cycle seven (detected by memory system). Non-programmatic errors (such as parity errors) can occur at any time, and the value of %TR0 is not predictable.

A significant feature of the invention is that the XIU and memory system can use inserted-instructions to request interrupts and perform direct memory access (DMA). In a preferred embodiment of the invention, these instructions do not cause a trap. Rather, each inserted instruction reports error status to its source. The source may then inform the CEU of the error with an interrupt. Inserted-instructions may be launch-quashed if some earlier instruction causes a trap.

Interrupts, as described above, are events which are not associated with the main instruction stream but require the attention of the processor. Interrupts may be generated by the memory system or the XIU while performing asynchronous activities. The generator delivers the interrupt to the CEU by inserting an XTRAP instruction. The CEU accepts only one interrupt at a time and may at times reject all interrupts. Interrupt sources are responsible for maintaining interrupts until CEU will accept them. The !TRAP control register will indicate the source of the interrupt.

Interrupts can include memory system interrupts, inter-cell interrupts, and XIU interrupts. A memory system interrupt is an interrupt generated by the memory system. A cache will generate interrupts whenever it detects errors in asynchronous operations it is executing, in the data it is maintaining, or in its view of the memory system. The priority of the memory interrupts is defined by the configuration location of the cell which detects it.

An inter-cell interrupt is a special case of the memory system interrupt, and occurs only as a result of a write to the CTL$CCU_CELL_INT control location of a cell. Because of the hierarchical layout of SPA space, processor's may direct interrupts to specific processors or to groups of processors at a level in the hierarchy.

An XIU interrupt is caused by time expiration of I/O completion.

If an XTRAP (interrupt request) instruction is inserted in the instruction stream before any instruction which causes an exception, the interrupt is accepted and the instructions following it are launched-quashed. Moreover, if the XTRAP instruction is inserted in the pipeline and some preceding instruction causes a trap before the XTRAP is launched, the XTRAP is ignored, effectively rejecting the interrupt. Thus interrupt requests do not cause a double trap reset. When this occurs, the response to the asynchronous instruction which requested the interrupt will indicate that it was rejected.

When an interrupt is received, the normal trap sequence is initiated. This will cause all co-execution unit instructions to complete and report their exception status, if any. If any co-execution instruction reports an exception, the interrupt and exception status is merged and reported in !TRAP.

Additionally, when the trap sequence completes, a new instruction stream is started at context address 0. This code, executed at privilege level 0, is the software trap handler which completes the trap mechanism. Its job is to save the trap status stored in registers, dispatch control to the appropriate software to handle the trap, and later resume or abort the suspended instruction stream, Traps are disabled by the trap sequence. A processor will take a double trap reset if another fault occurs before traps are enabled. However, XTRAP instructions inserted by the CCUs or XIU to signal an interrupt do not generate a trap while traps are disabled. If traps are re-enabled before the machine state is safely stored, that state may be overwritten by another trap, precluding restart analysis. Therefore, the system software trap handler preferably first saves trap state and then re-enable traps as quickly as possible. This minimizes the amount of system software which must be coded to avoid faults. The trap handler must examine !TRAP and determine which other register are valid.

Because the trap handler is executing in the context of the trapped previous instruction stream, it must also save any registers which it may disturb, such as !CONTEXT, !i_context, !f context, and certain CEU/IPU/FPU general registers.

Certain traps require the system to respond to a condition and later resume the suspended instruction stream as if the trap had not occurred. Others will result in the instruction stream being abandoned or restarted at location other than where the trap occurred. These responses are collectively referred to herein as "resuming the instruction stream."

The trap handler begins at privilege level 0, where it must establish re-entrancy and then act upon the specific trap.

System software can handle the trap at privilege level 0 and then resume the instruction stream. The trap status can also be passed to less privileged code by invoking a new instruction stream. That software handler can take corrective action and then make a service request to have the kernel restart the trapped instruction stream. System software or less privileged code can also decide to abandon the trapping instruction stream state and start a new instruction stream.

An important aspect of handling a trap involves filling the gaps in the instruction stream left by FPU, IPU, or ST64 instructions which reported exceptions. The need to fill gaps is the basis of the source register restriction described above. To handle these gaps, the software must "manually" execute the "dangling" instructions. In some cases, the instruction is effectively executed by changing its result register or memory. For example, a calculation which overflowed might be handled by setting the result register to the largest valid value.

It is also possible to change source values or machine state and re-execute the faulting instruction. An example of such modification and re-execution involves altering an arithmetic operation or making a page accessible. System software can establish a special context which launches the dangling instruction at its actual context address and immediately reinvokes the kernel.

An example of the special context has PC0 as the address of the dangling instruction, and PC1 and PC2 as the address of a KSR instruction (with a special operand code) in system software, text space. The instruction paired with the dangling instruction has launch-quashing specified, and PC1 has launch-quashing clear. This context will launch the desired instruction. If the dangling instruction reports an exception in cycle zero of execution, a trap will occur immediately. Otherwise the KSR instruction is launched and causes a trap; if the dangling instruction was single-cycle, it has completed successfully. If the dangling instruction is multi-cycle, it may still report an exception as the processor reaches steady state, or it may complete normally.

When the kernel is re-entered, it examines trap status. If the dangling instruction completed successfully, the original trapped instruction stream can be restarted. Otherwise, system software must handle the new fault or abandon the instruction stream. If multiple dangling instructions are present in the original trapped instruction stream, they can be sequentially resolved using the above technique. System software must take precautions to ensure that users do not attempt to execute the special KSR instruction at inappropriate times.

Most of the context of a trapped instruction stream can be restored while traps are still enabled. For example, all FPU and IPU general registers, !f_context register, and most CEU registers are not used by the trap handler while traps are disabled. Assuming that the trap handler software implements a proper recursive model, any trap which occurs during the restoration of this state would eventually restore any state it changed. System software normally executes with traps enabled, but it must disable traps as the final part of resuming a trapped instruction stream. As when the trap handler was initially invoked, this is necessary to prevent a recursive trap from destroying state. Next, register CONTEXT is restored. Finally, the trap PCs are reloaded into %TR0, %TR1, and %TR2 and the following code is executed:

```
RTT 0(%TR0)   /* enable traps, restore privilege level from
                 !CONTEXT.OPL. Restore quashing from
                 !CONTEXT.QSH (with two instruction delay). Branch to
                 instruction pair at the trap point, designated by %TR0. */
JMP 0(%TR1)   /* jump to the first instruction after trap point. */
JMP 0(%TR2)   /* jump to the second instruction after trap point. */
```

This sequence will restore the state of the suspended instruction stream and start execution at the trap point as if no trap had occurred. The use of three consecutive branch instructions is in fact an example of the remote instruction technique described above. The changes of privilege level and trap enable by the RTT instruction take effect as the instruction at %TR0 is executed. The two JMP instructions have already been fetched from the segment which contains this code. All subsequent instruction fetches use the restored value of !CONTEXT.PL to detect privilege violations. The processor state is therefore restored just as the suspended code resumes execution. The conditions stored by the trap are restored explicitly before the return sequence and not modified by the sequence. The launch-quashing information restored by the RTT instruction control individual quashing of the first CX and FI instruction, and the quashing of the second instruction pair. This capability is necessary to enable interrupts to occur between a conditional branch and the instructions which it quashes, and to permit system software control over the first instruction pair being re-launched.

System software need not include special precautions with regard to the ISTT or memory system to ensure that the addresses at %TR0, %TR1, or %TR2 are accessible. This is because any exception pertaining to fetching those instructions is reported during the trap phase of that instruction. For example, if the page containing the addresses specified by %TR0 is missing, the instruction page fault will occur at that address.

In accordance with the invention, when system software invokes a less-privileged fault handler, signal a user program, or start a new process, the software must start a new instruction stream. This can be accomplished by fabricating information equivalent to that saved by the trap handling software, and then resuming the execution of that "interrupted" instruction stream. This is the preferred technique for changing from kernel mode to user mode.

A more complete understanding of structure and operation of the illustrated embodiment may be attained by reference to the following text.

Figure 34:
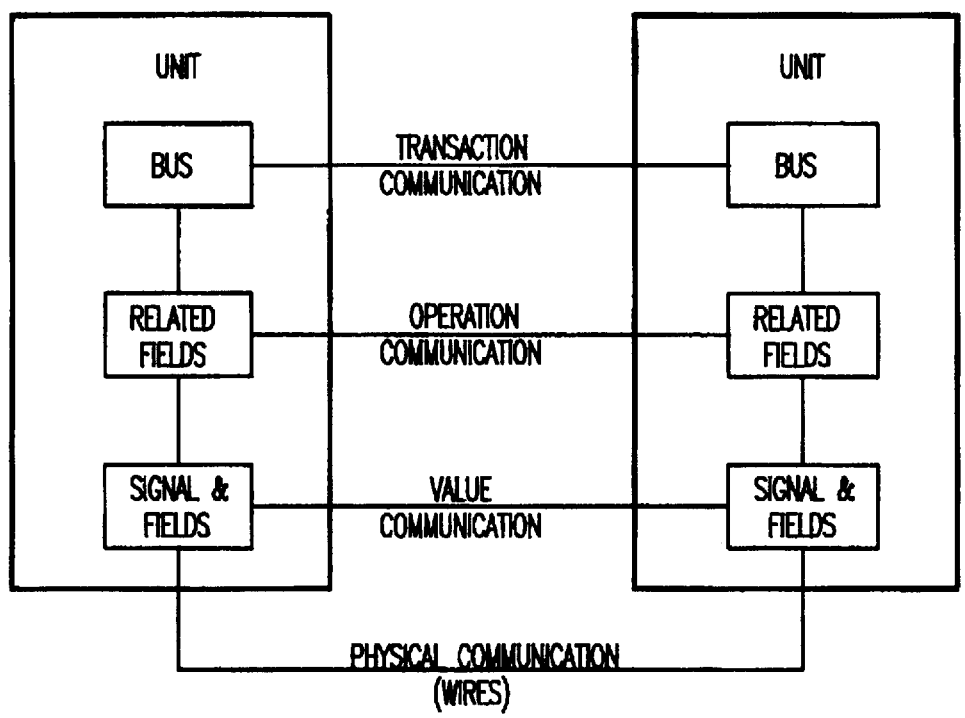
FIG. 34 is a functional block diagram depicting the interface hierarchy.
Figure 1A:
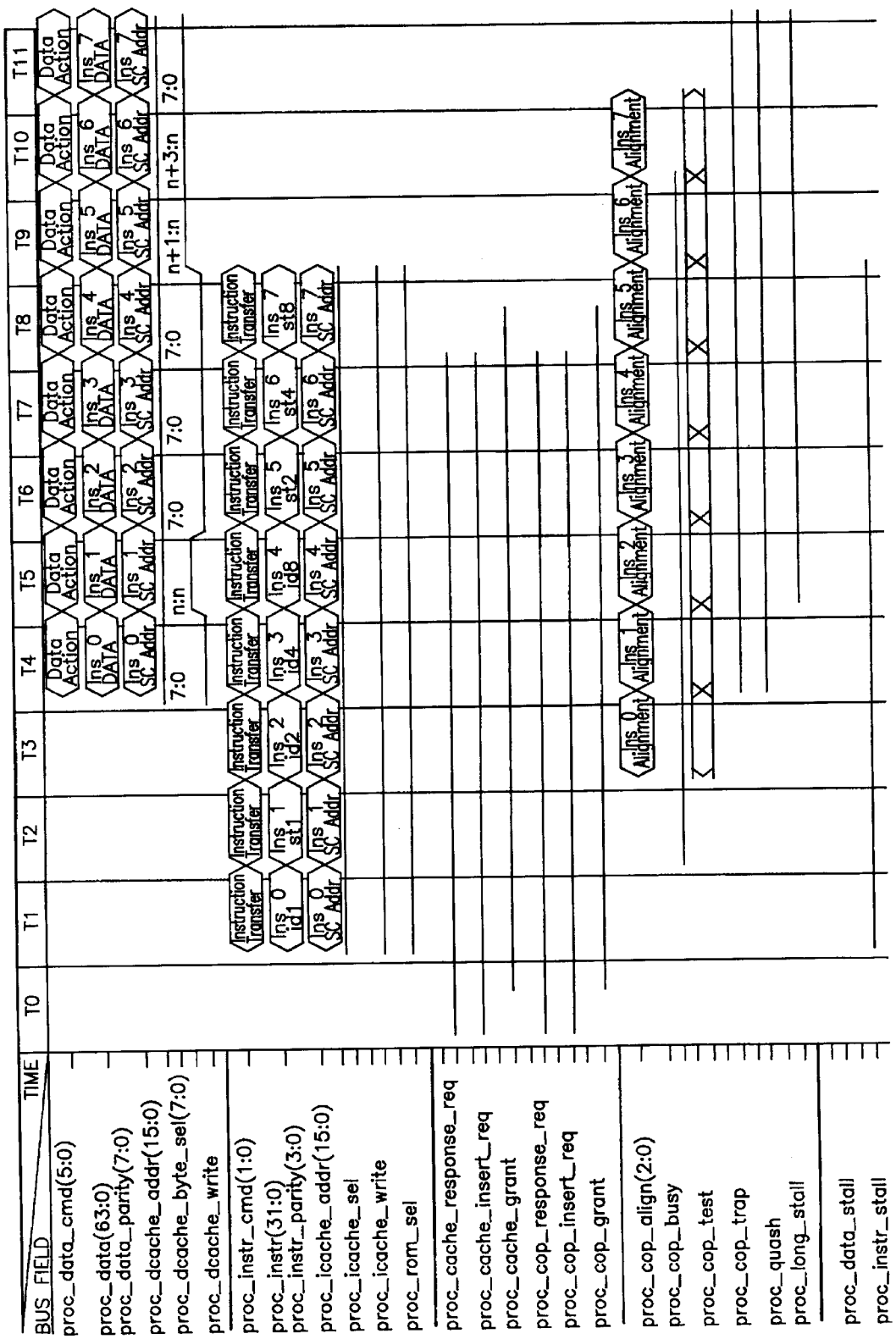
FIGS. 1a', 1b', 1c', 1d', 1e', 1f', 1g', 1h', 1i', 1j' and 1k' are timing diagrams depicting the timing of subcache hit and miss operations.
Figure 1B:
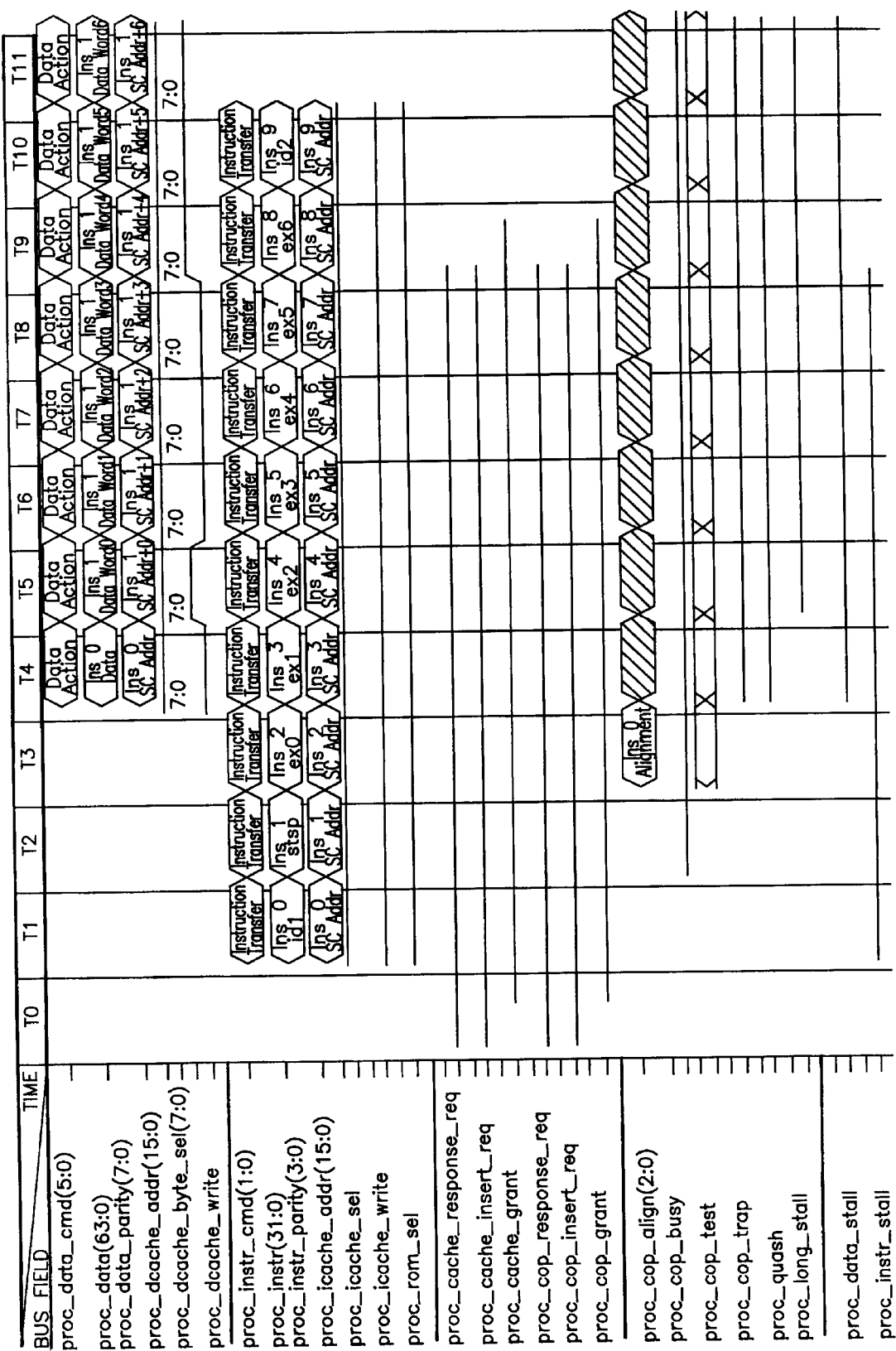
Figure 1B:
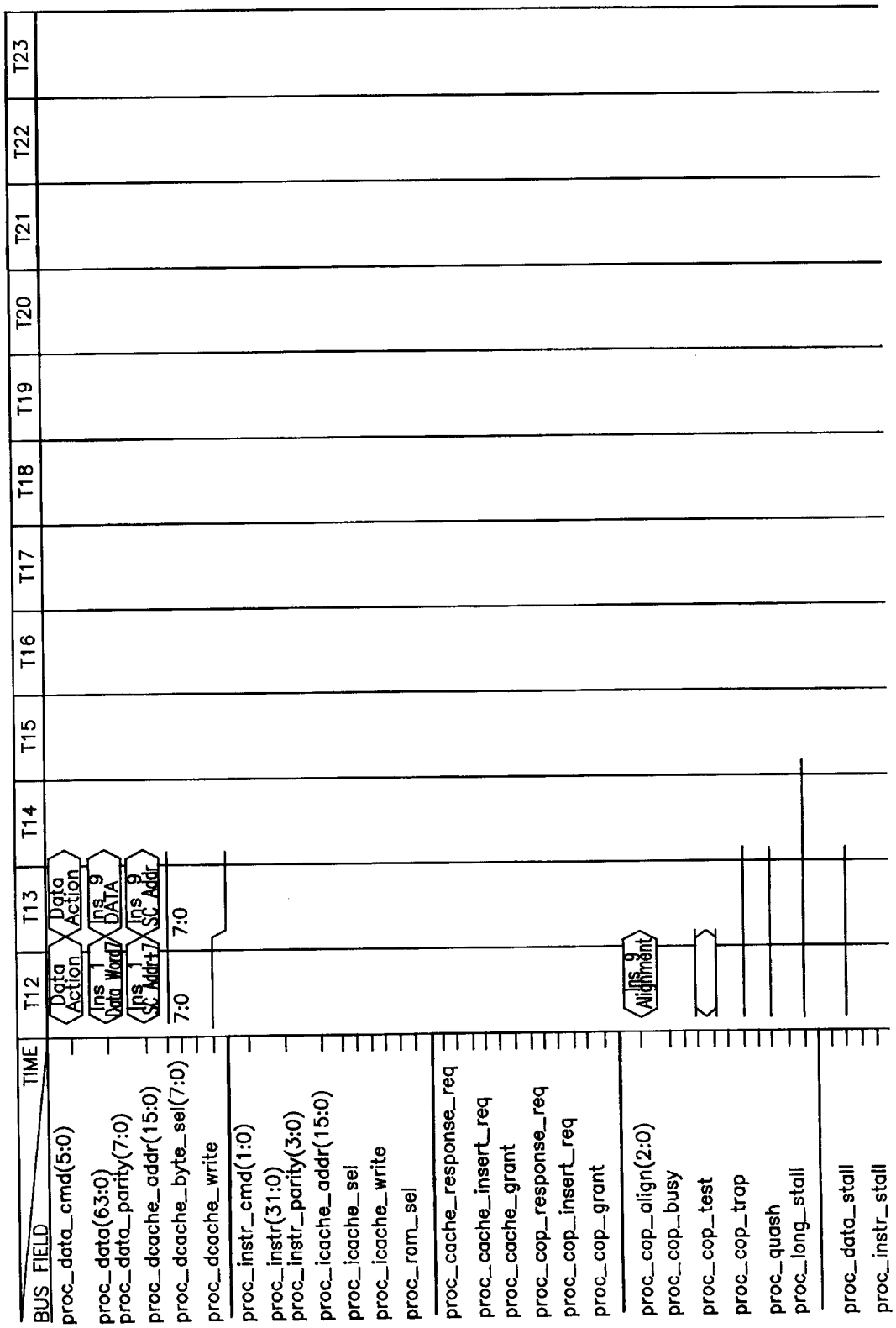
Figure 1C:
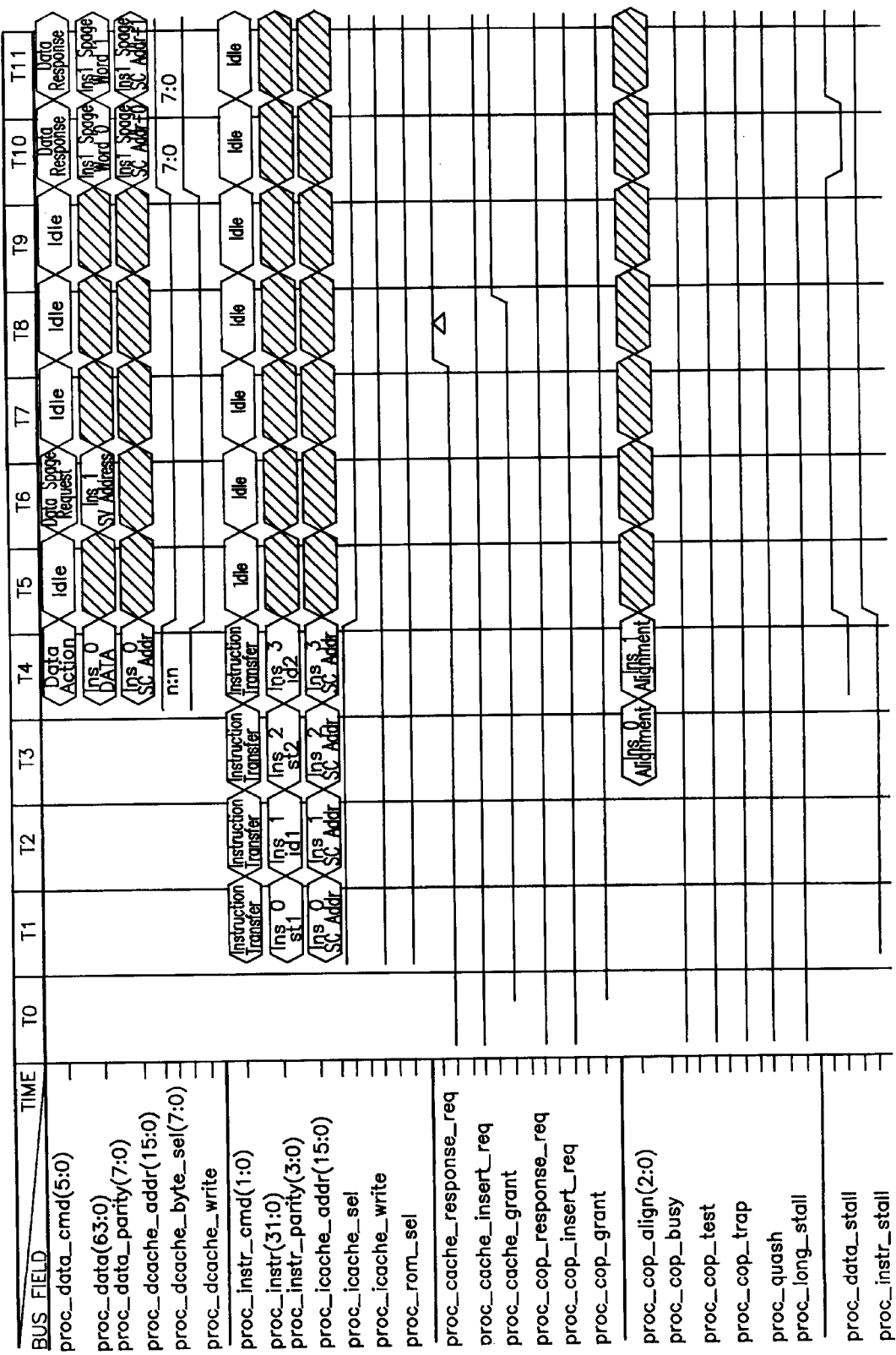
Figure 1C:
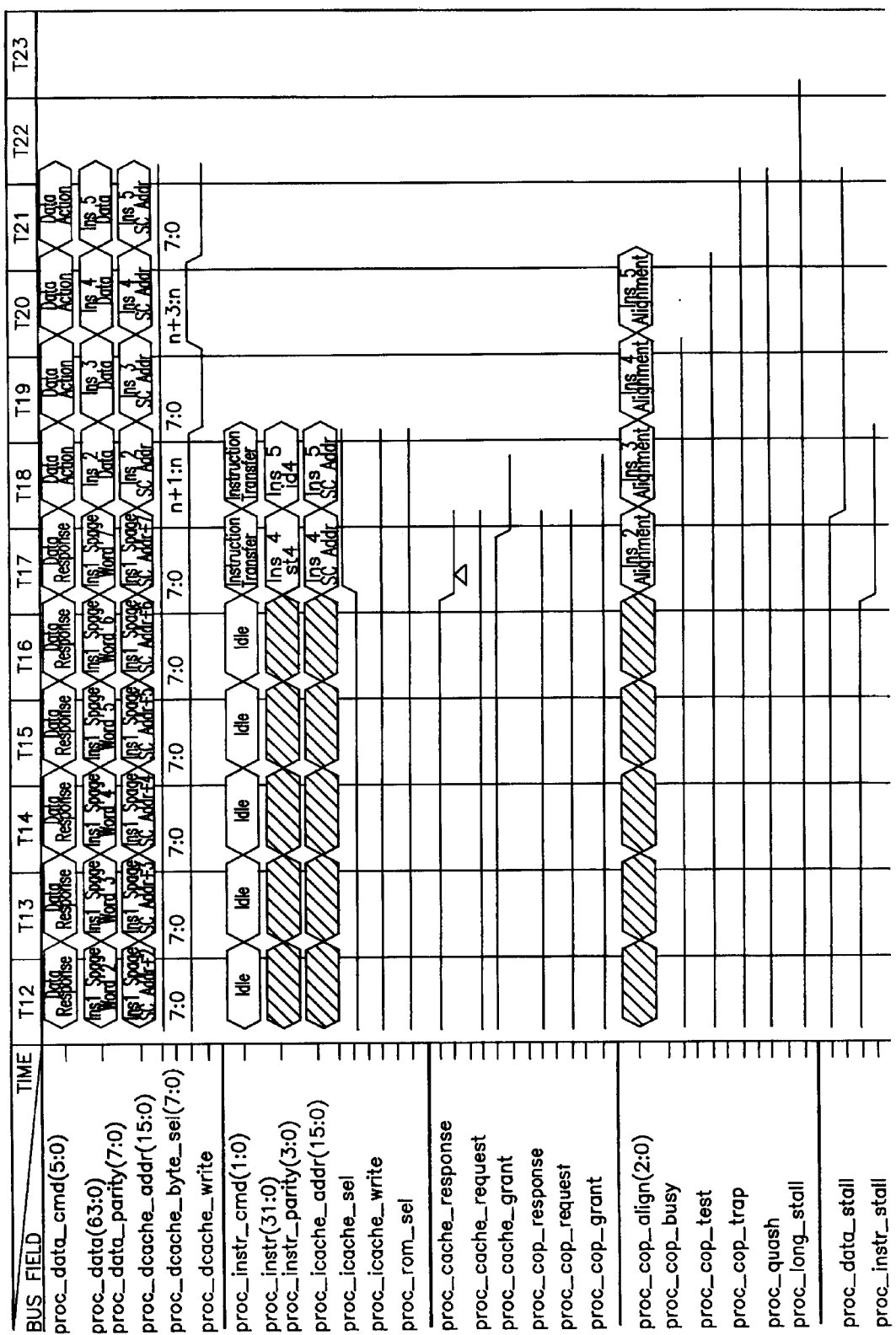
Figure 1D:
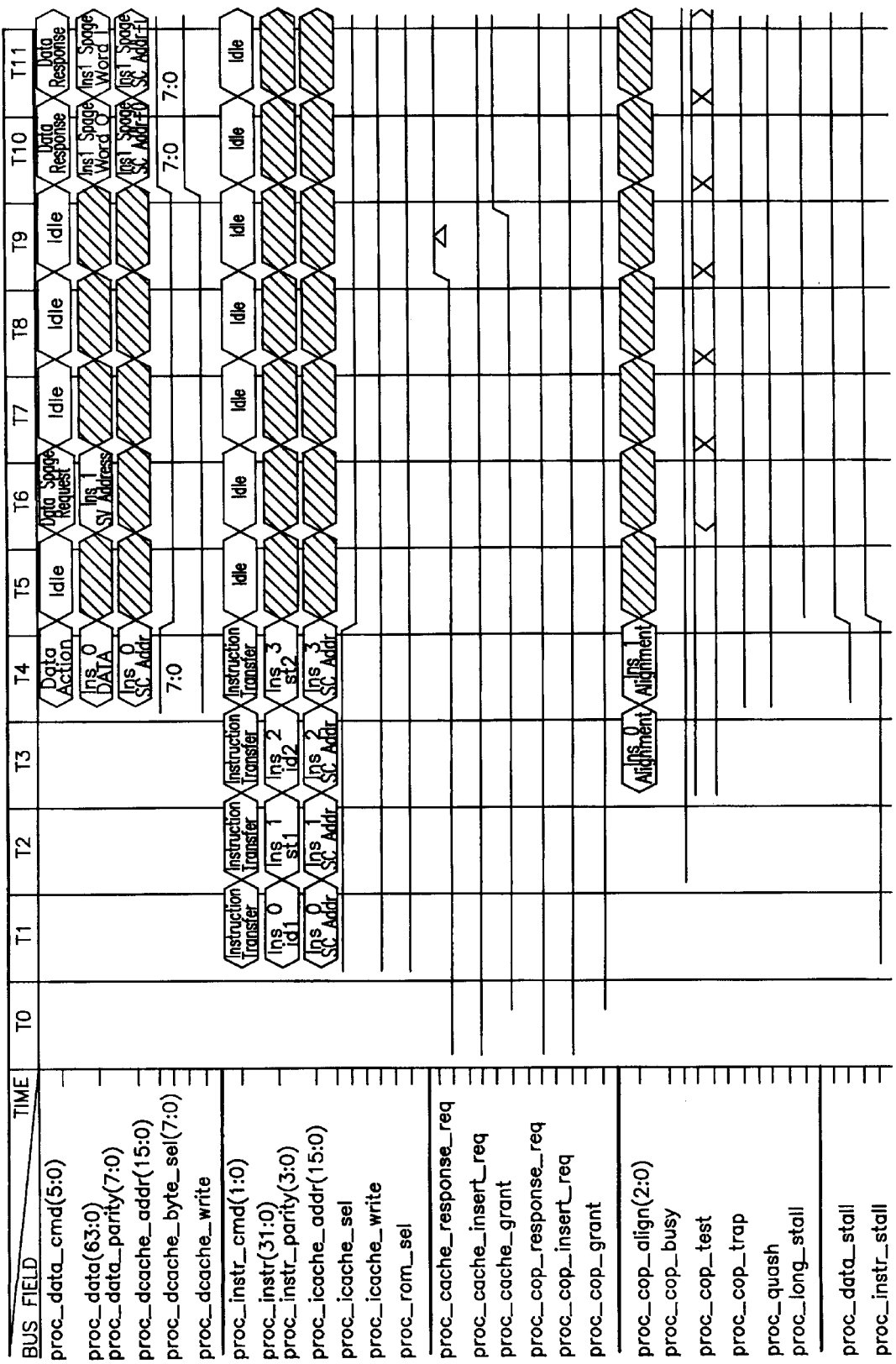
Figure 1D:
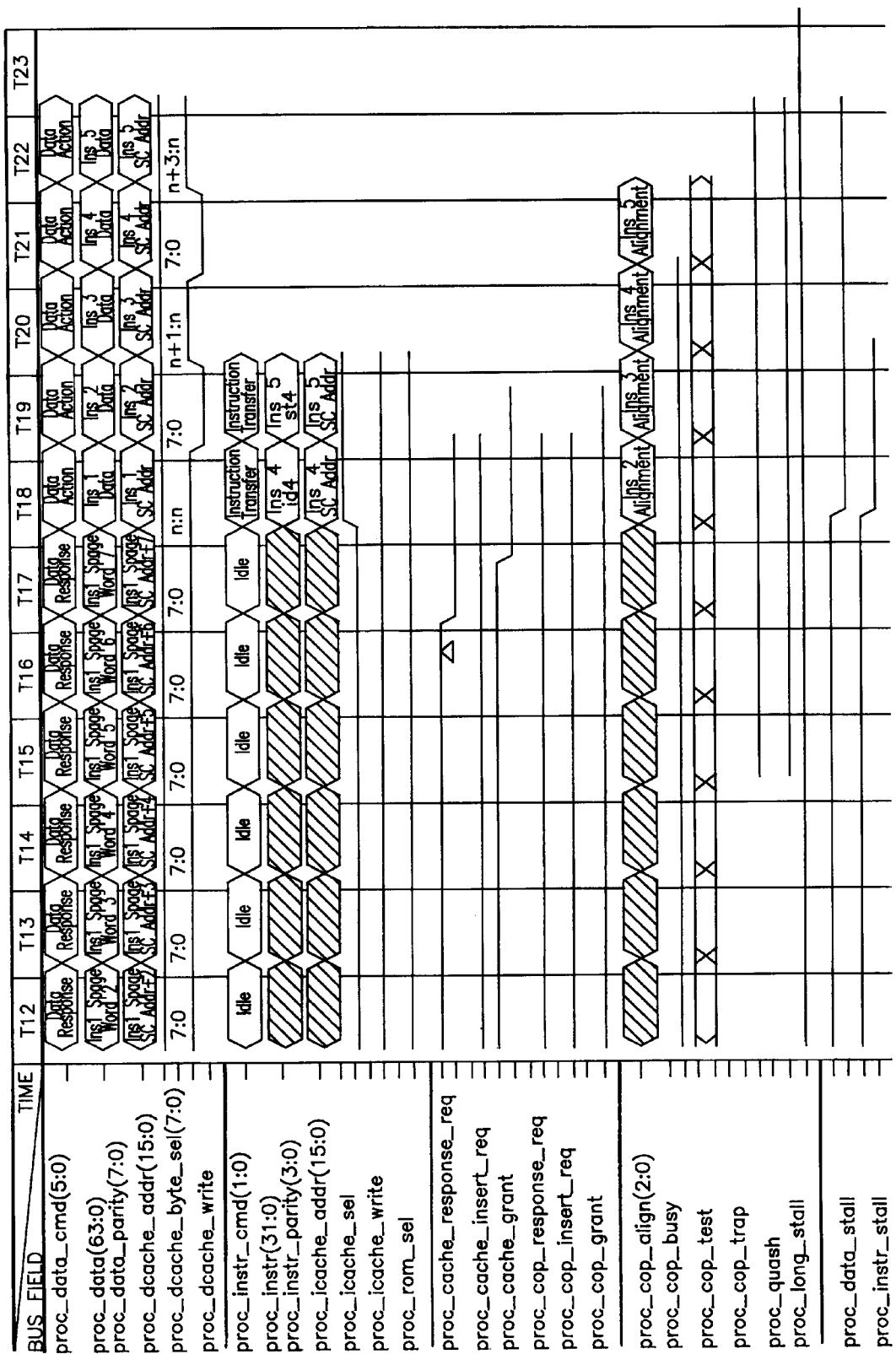
Figure 1E:
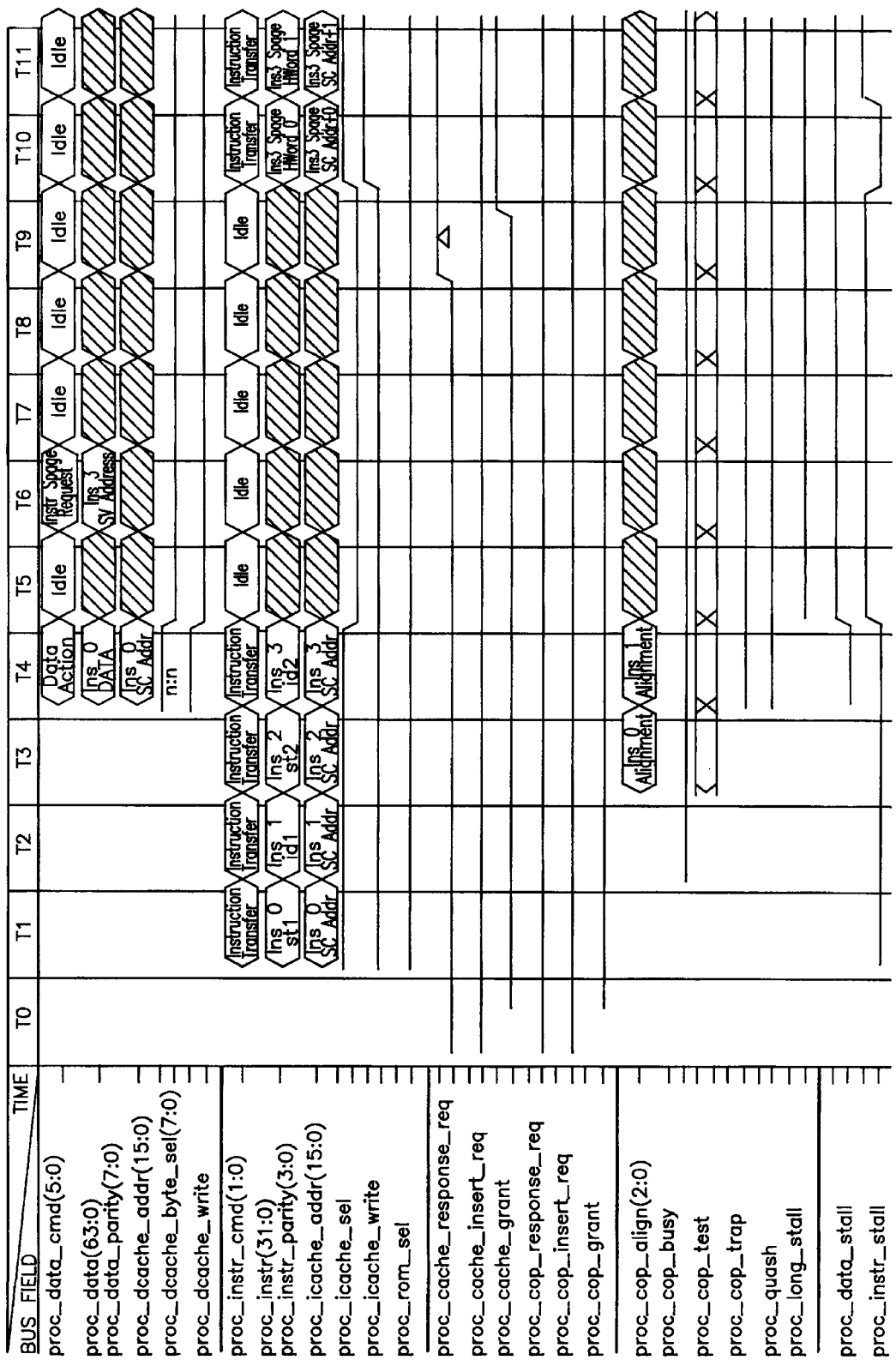
Figure 1F:
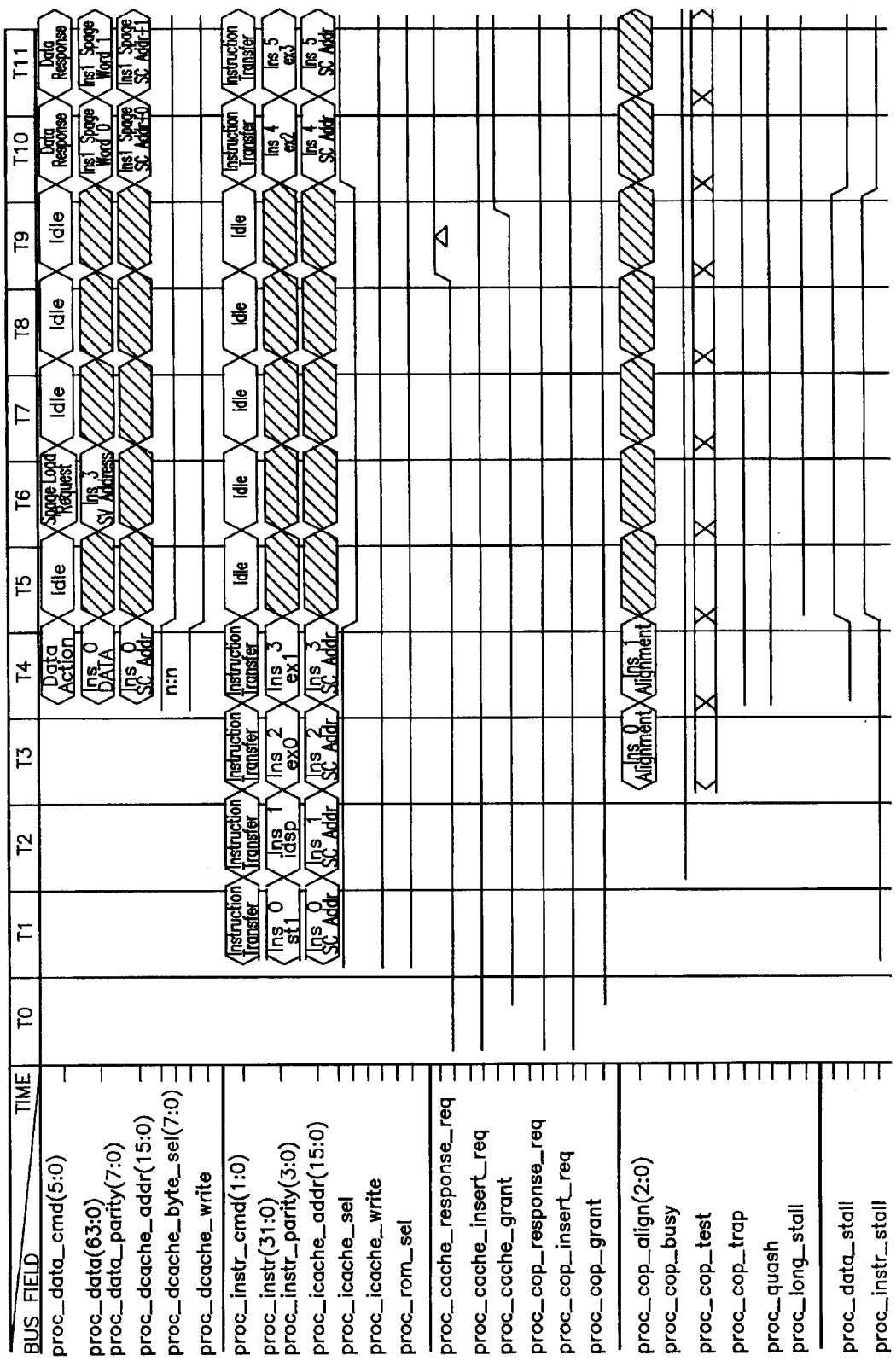
Figure 1G:
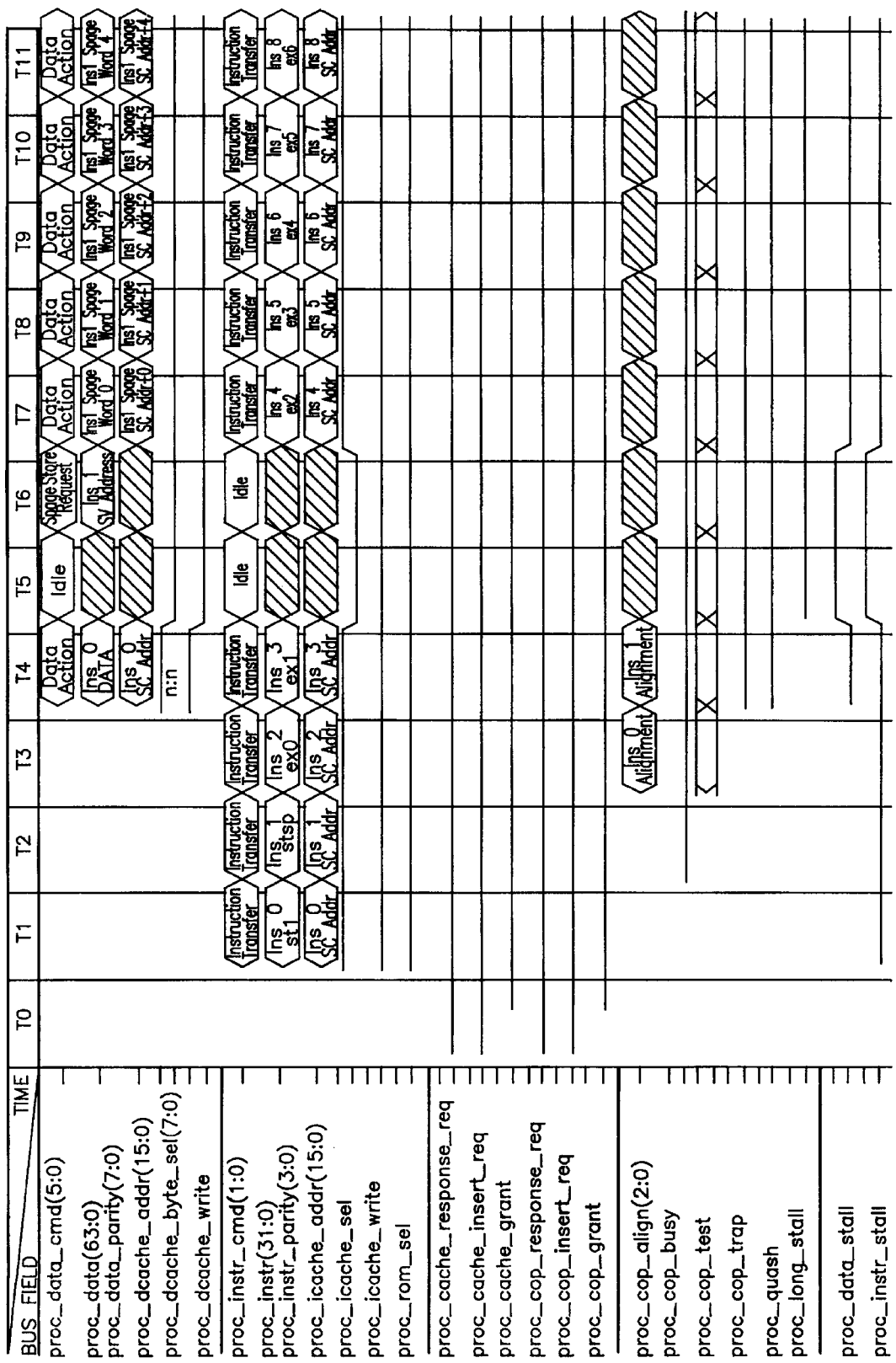
Figure 1G:
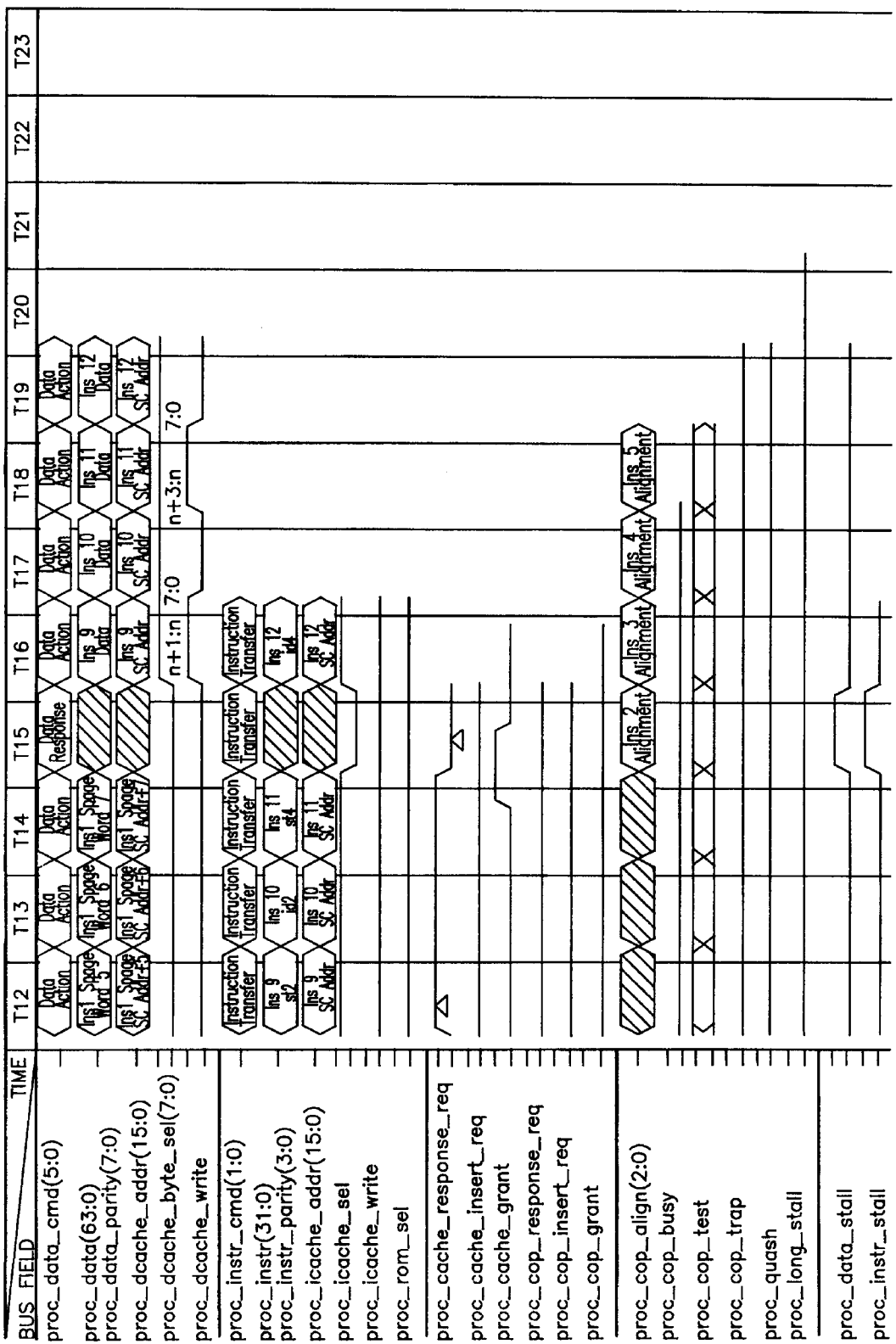
Figure 1H:
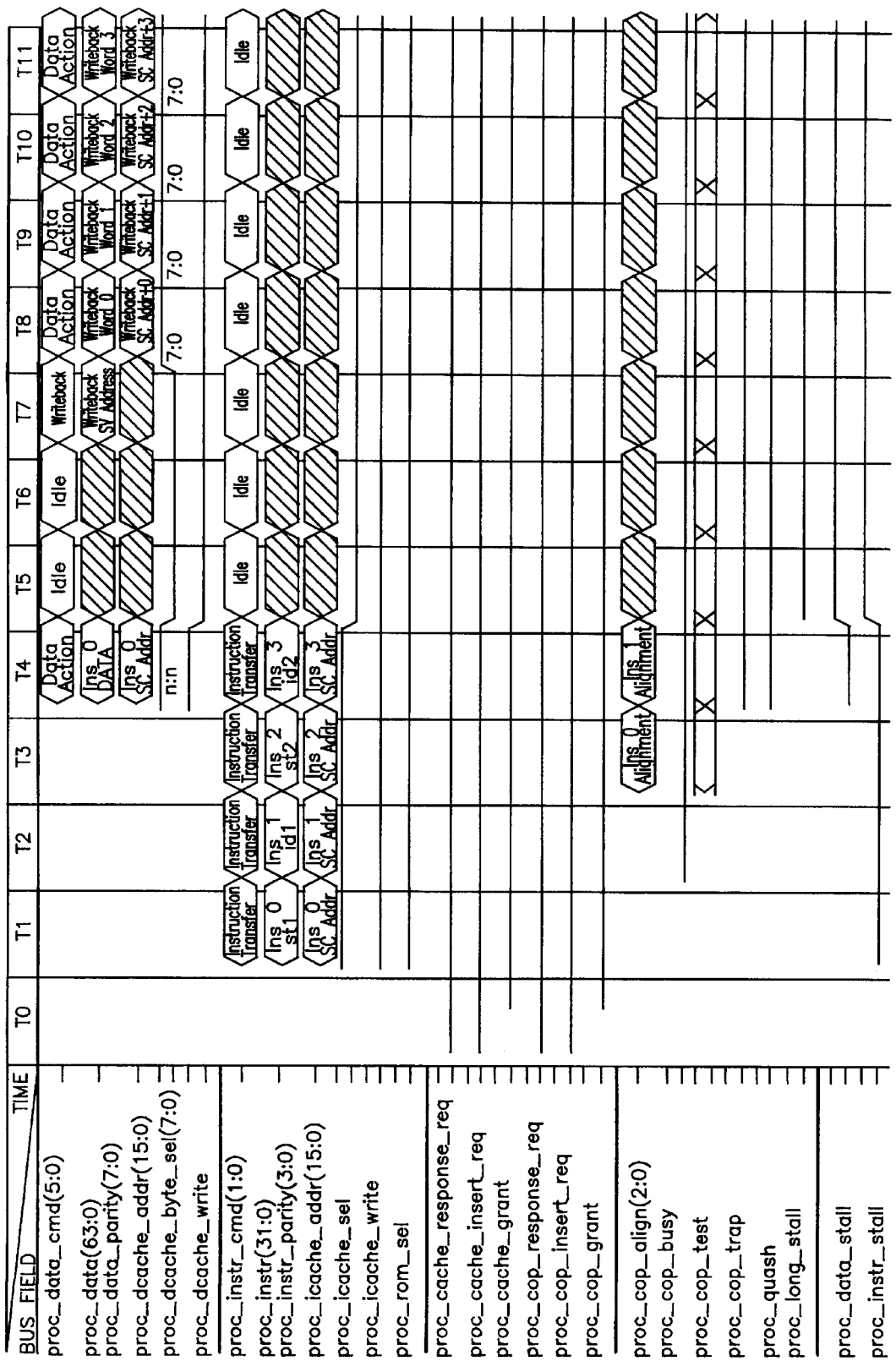
Figure 1H:
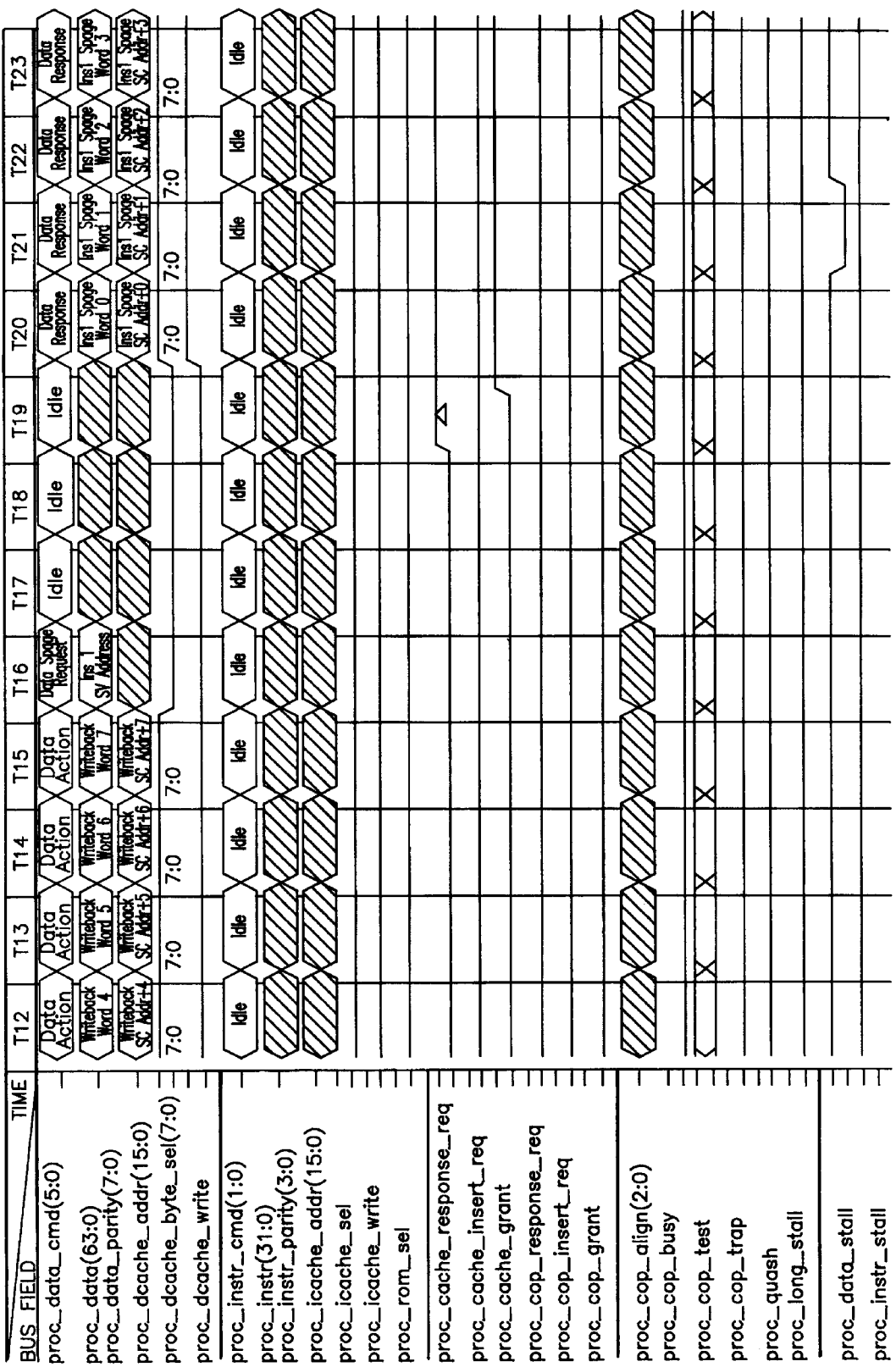
Figure 1H:
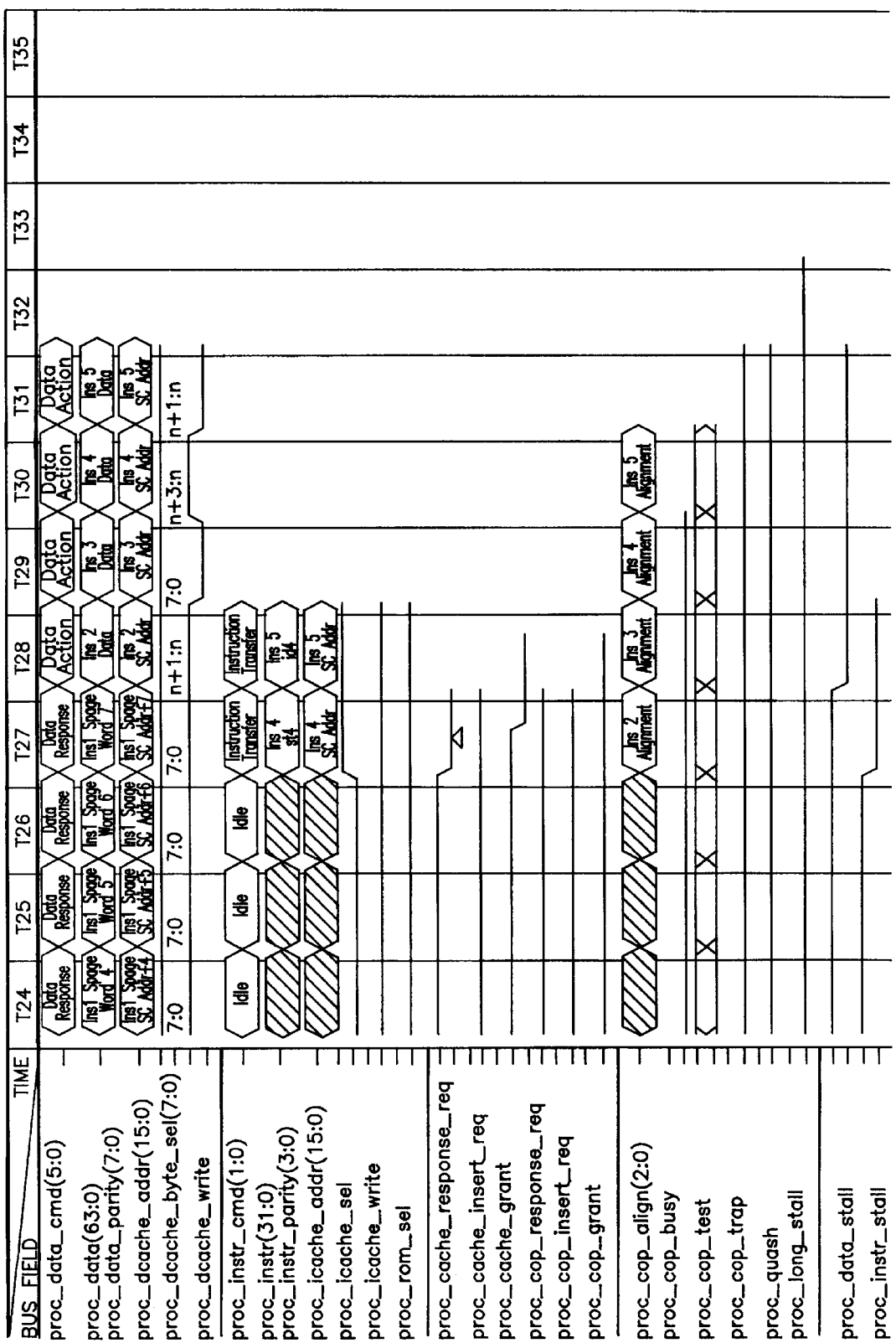
Figure 1I:
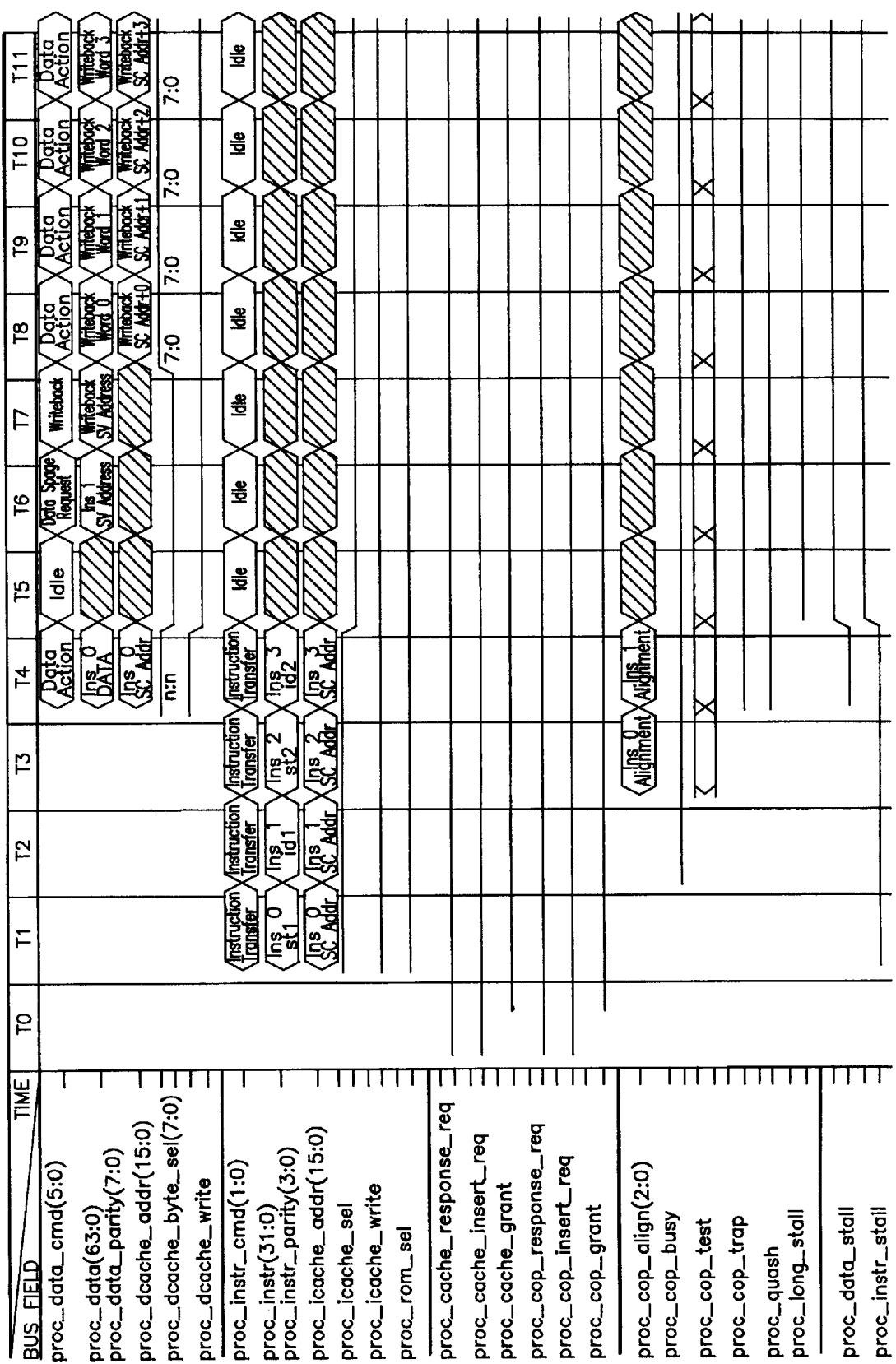
Figure 1I:
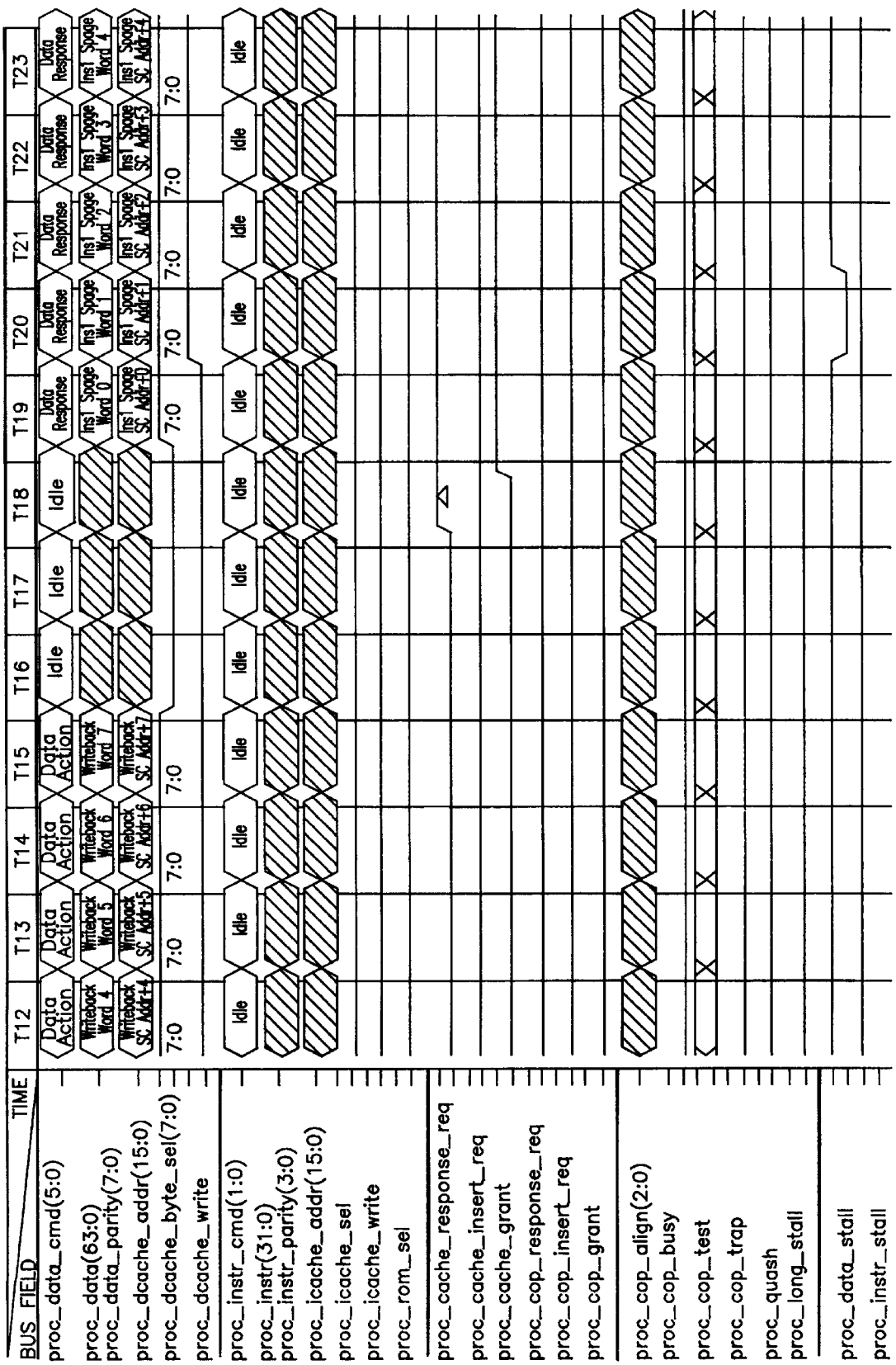
Figure 1I:
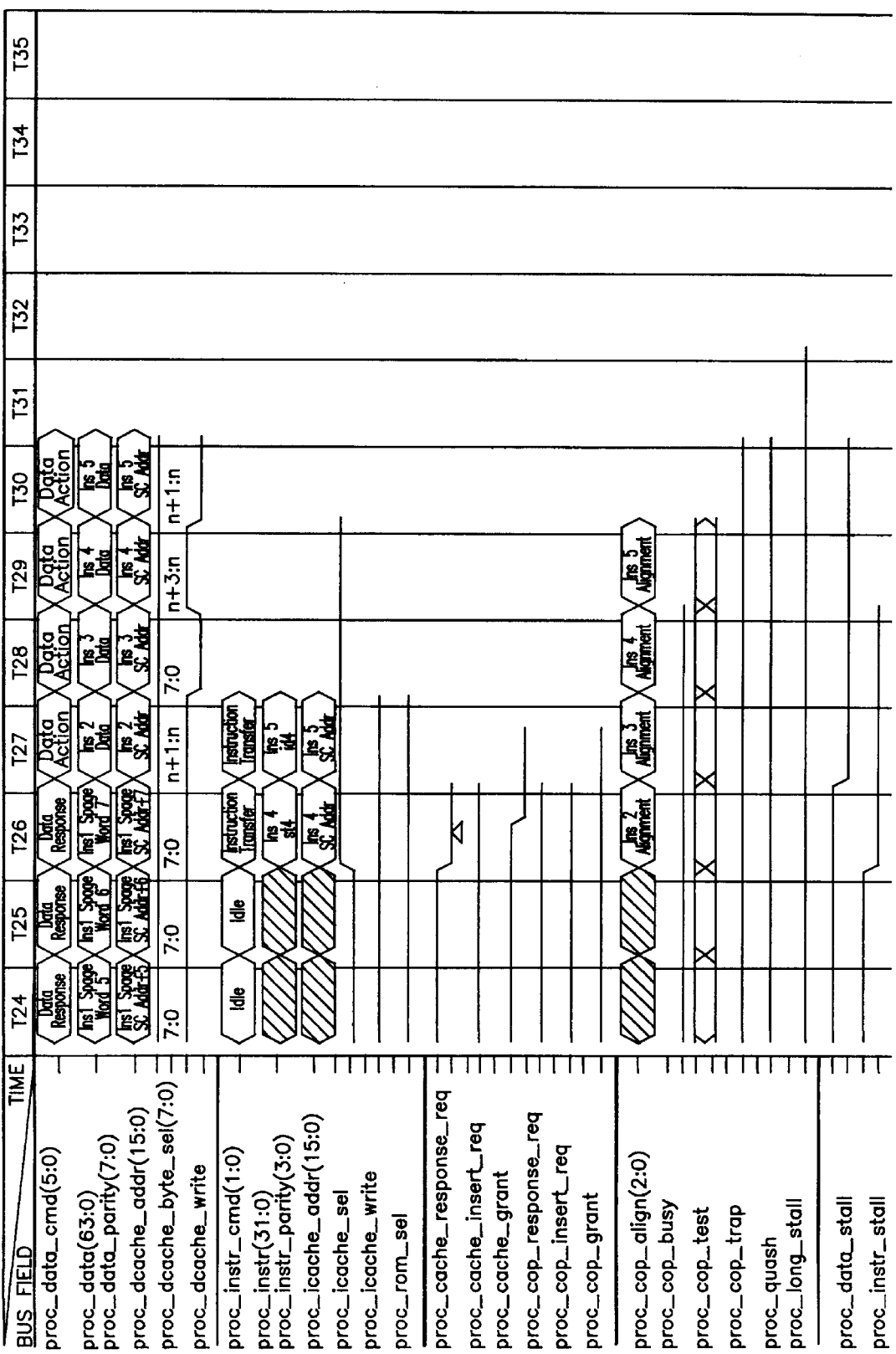
Figure 1J:
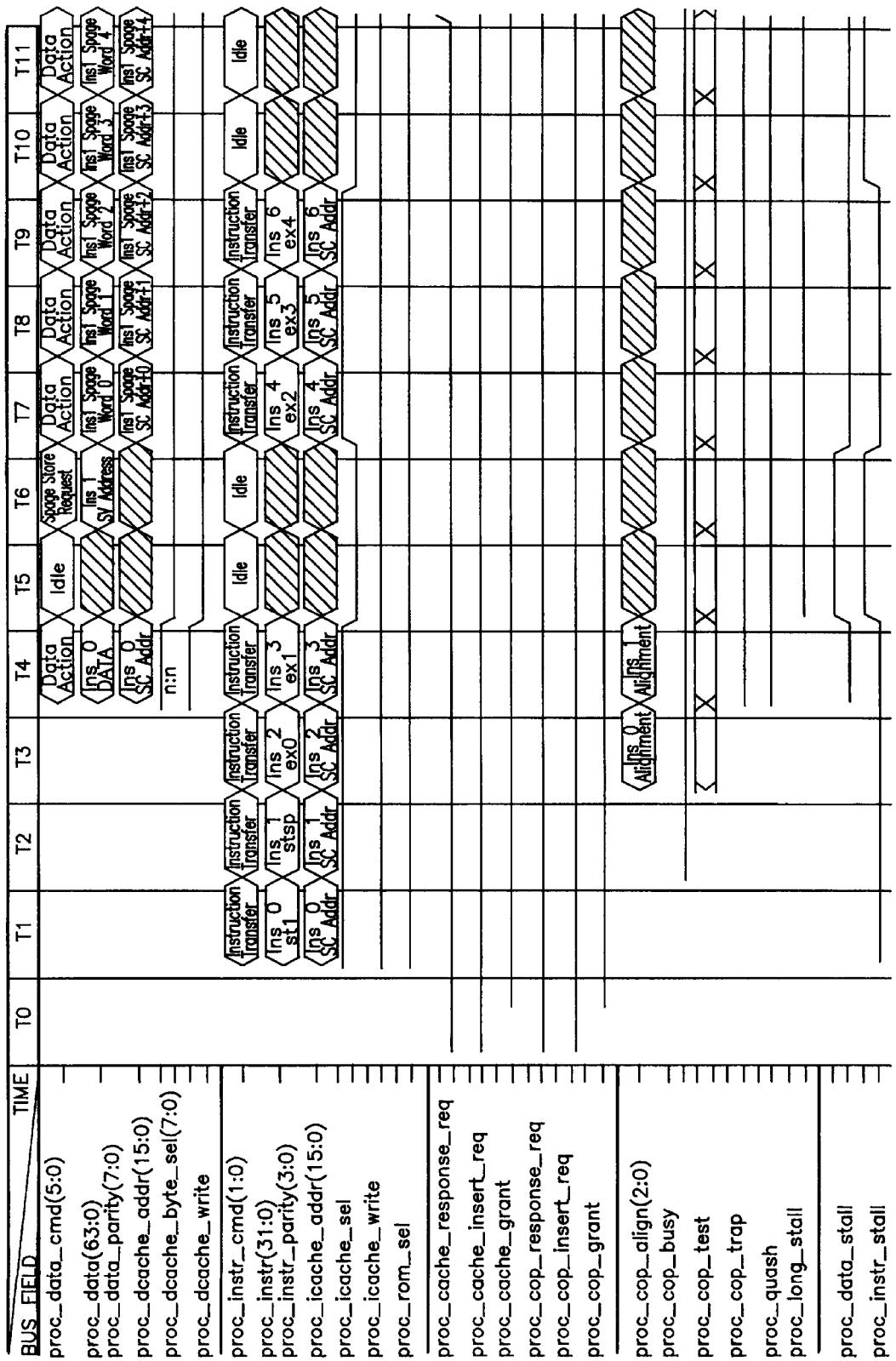
Figure 1J:
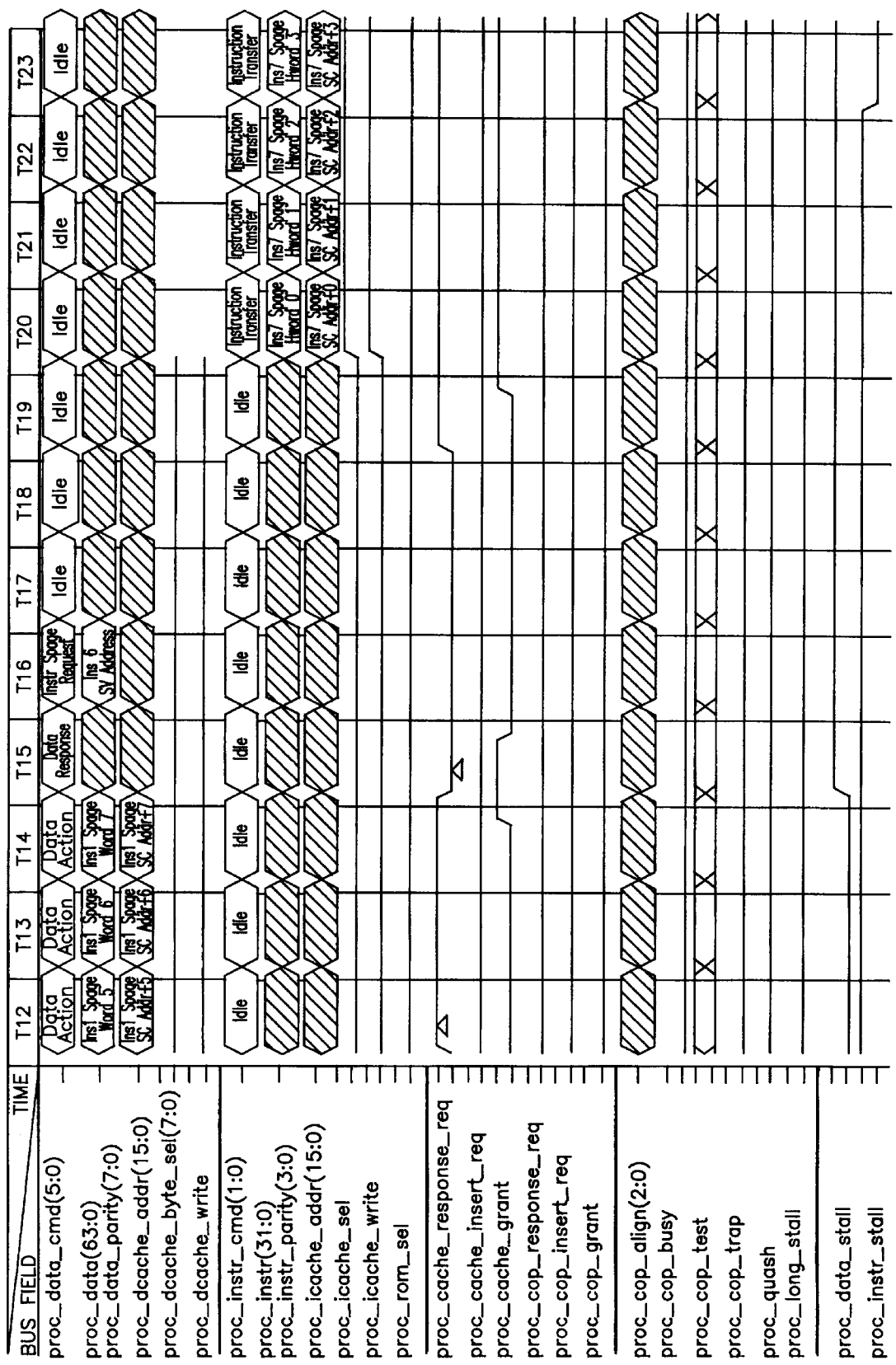
Figure 1J:
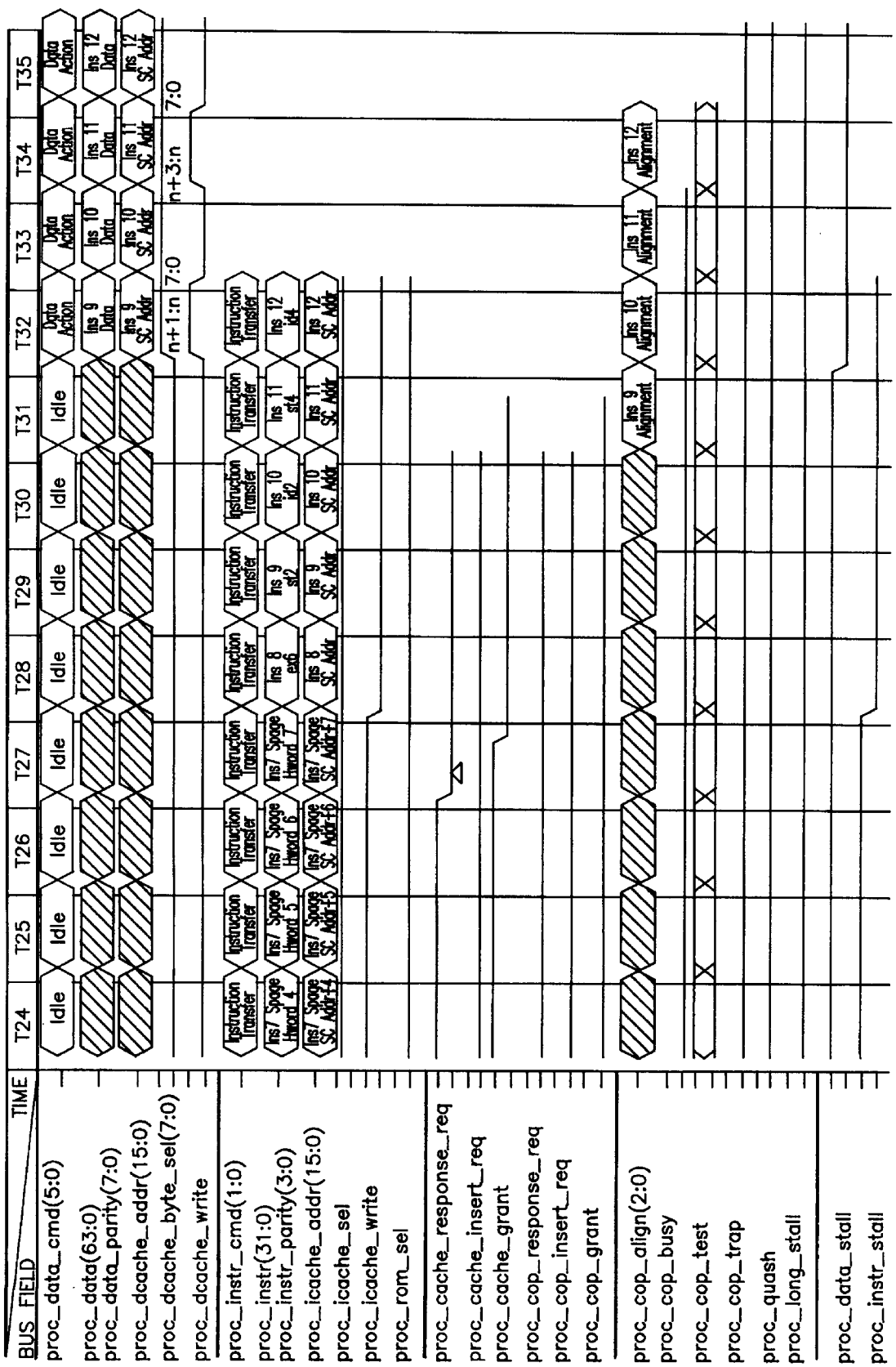
Figure 1K:
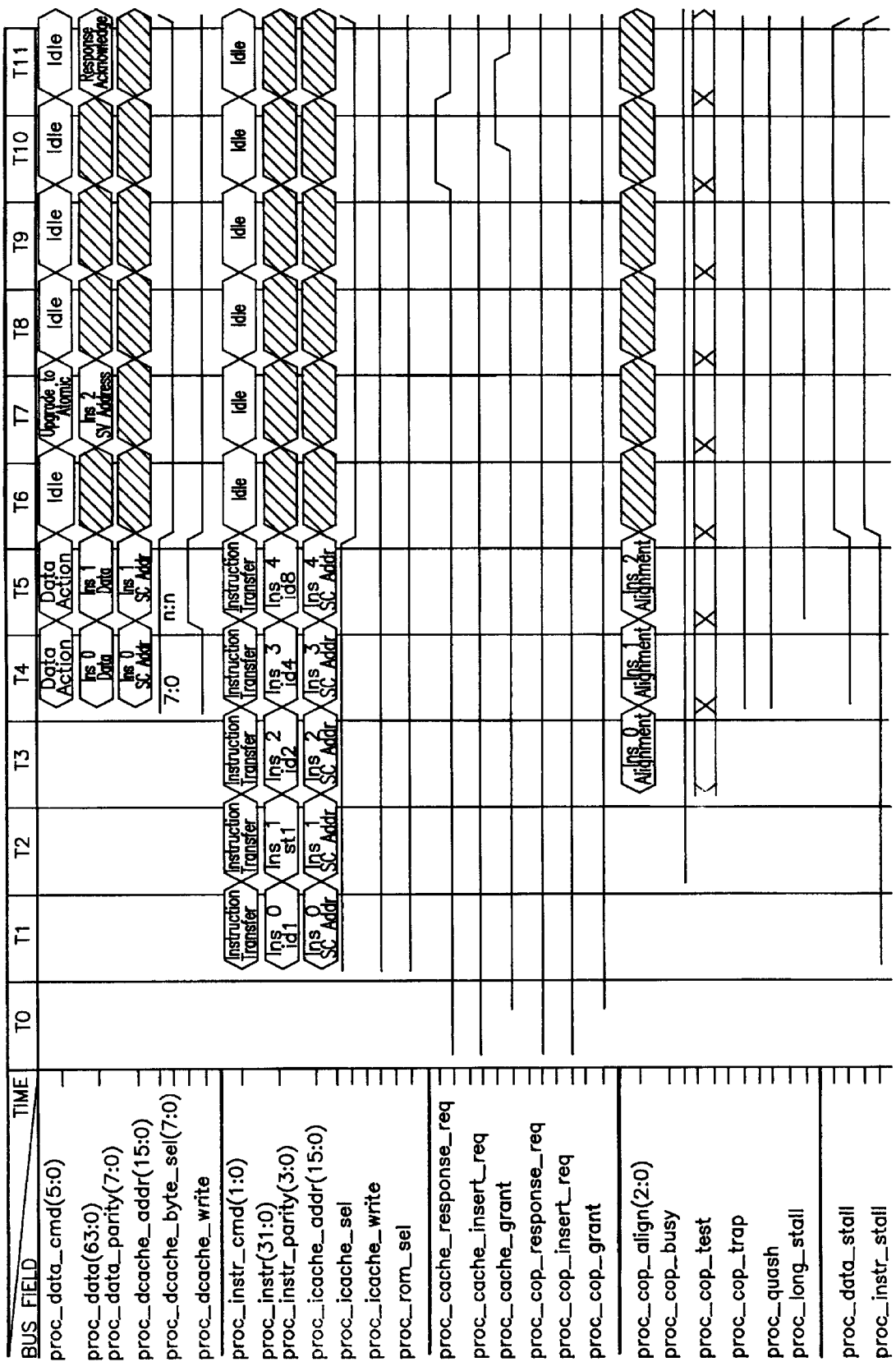
Figure 1K:
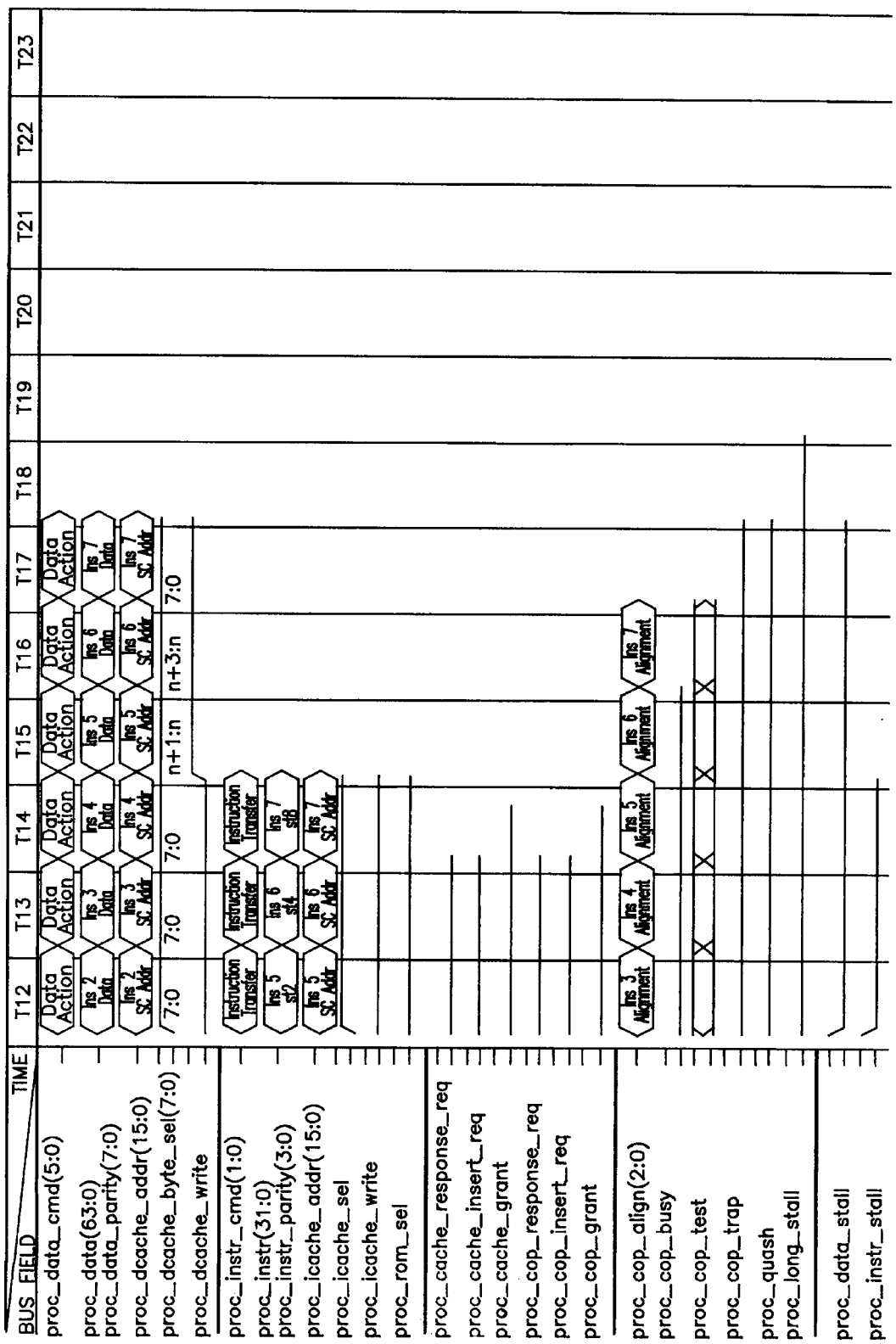
Figure 2A:
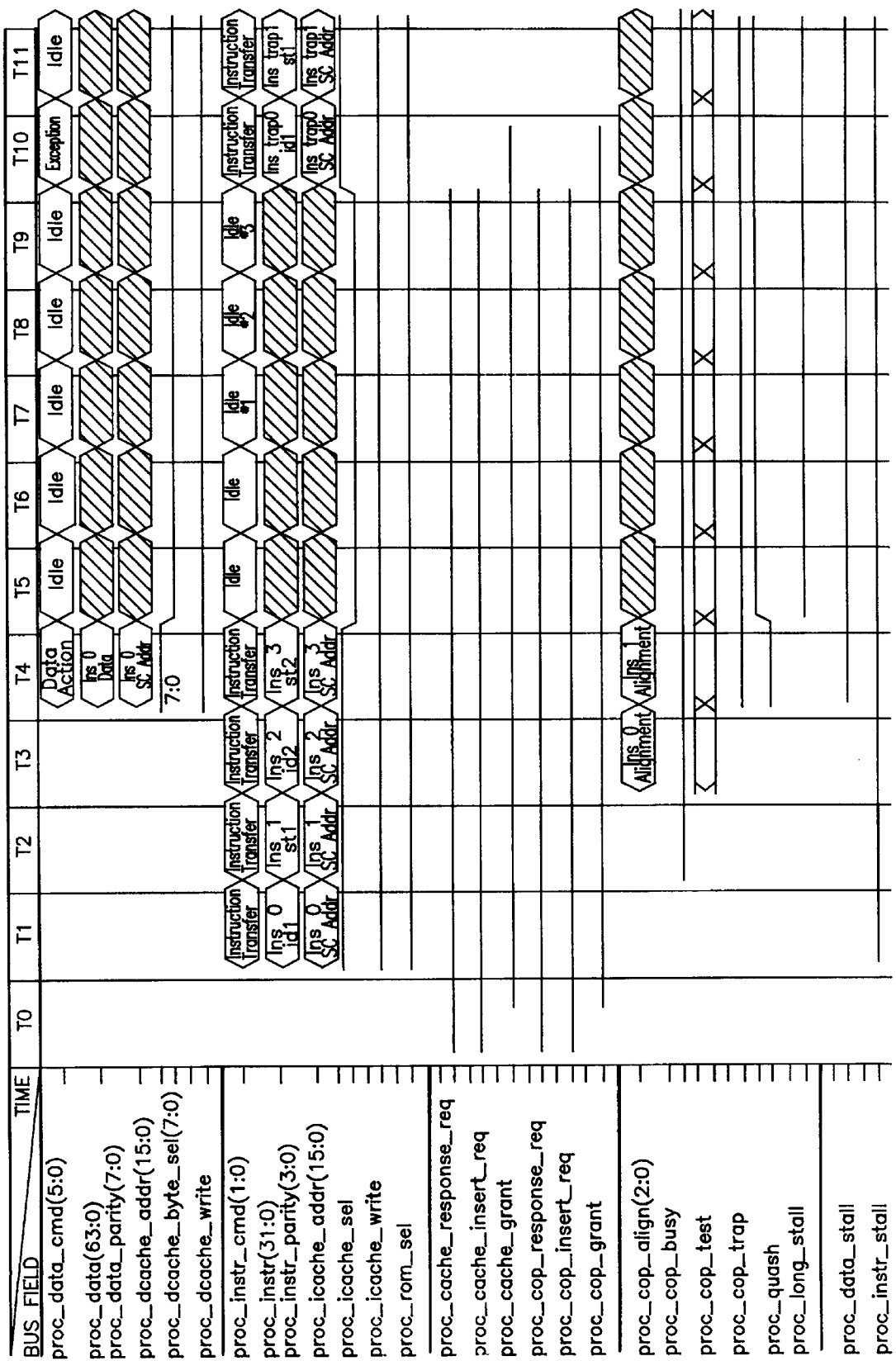
FIGS. 2a' and 2b' are timing diagrams depicting the timing of trap operations.
Figure 2A:
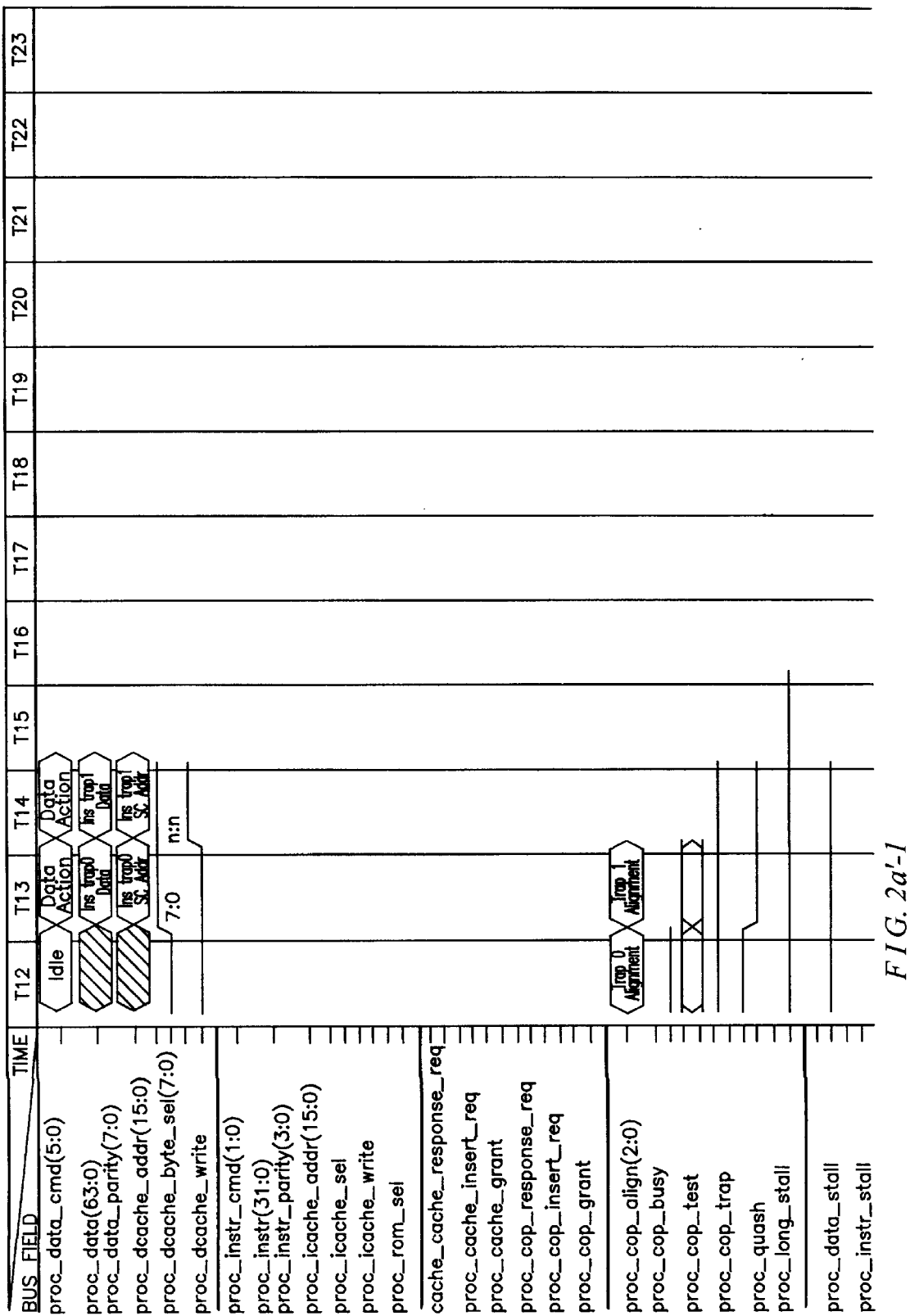
Figure 2B:
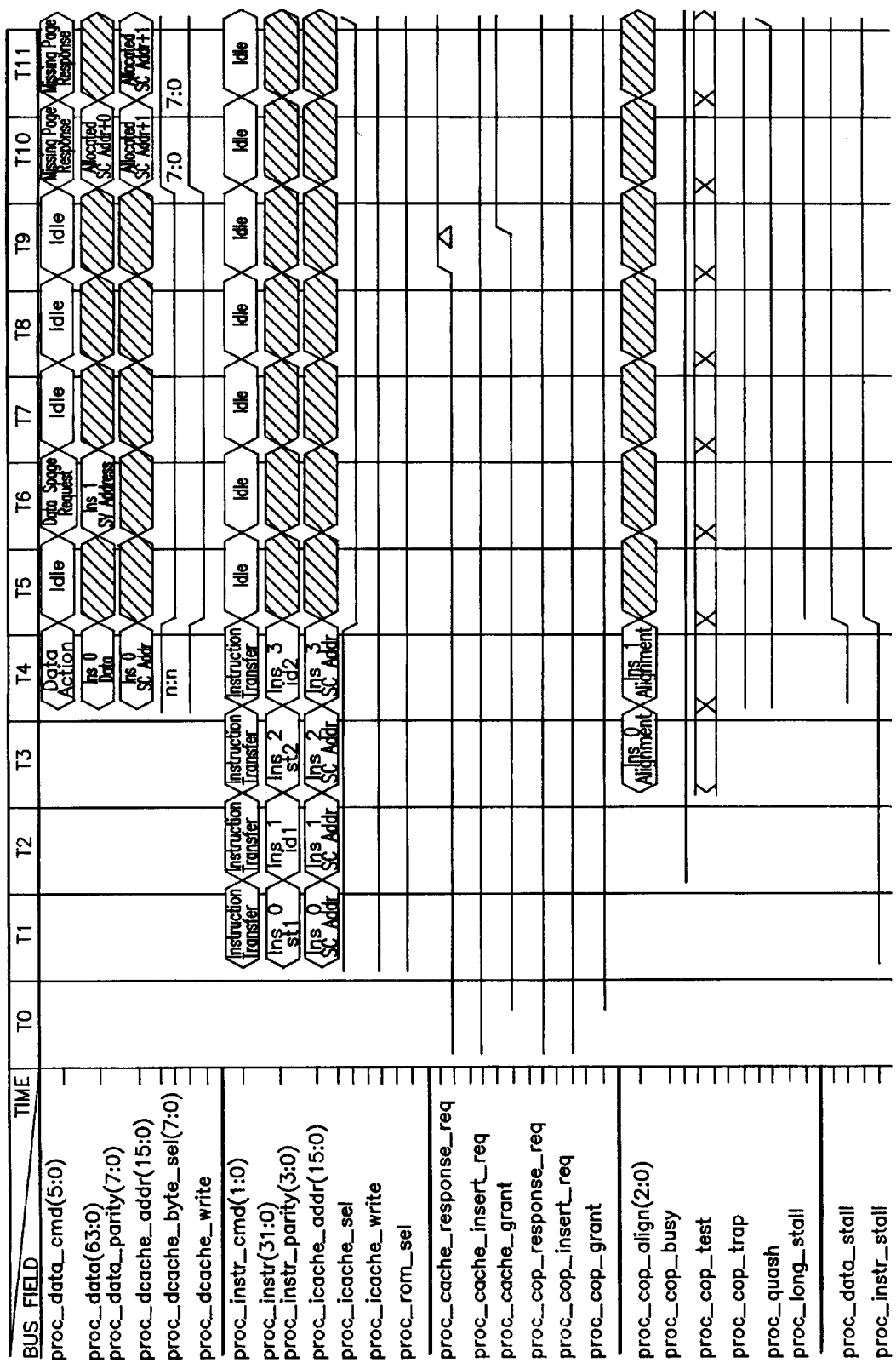
Figure 2B:
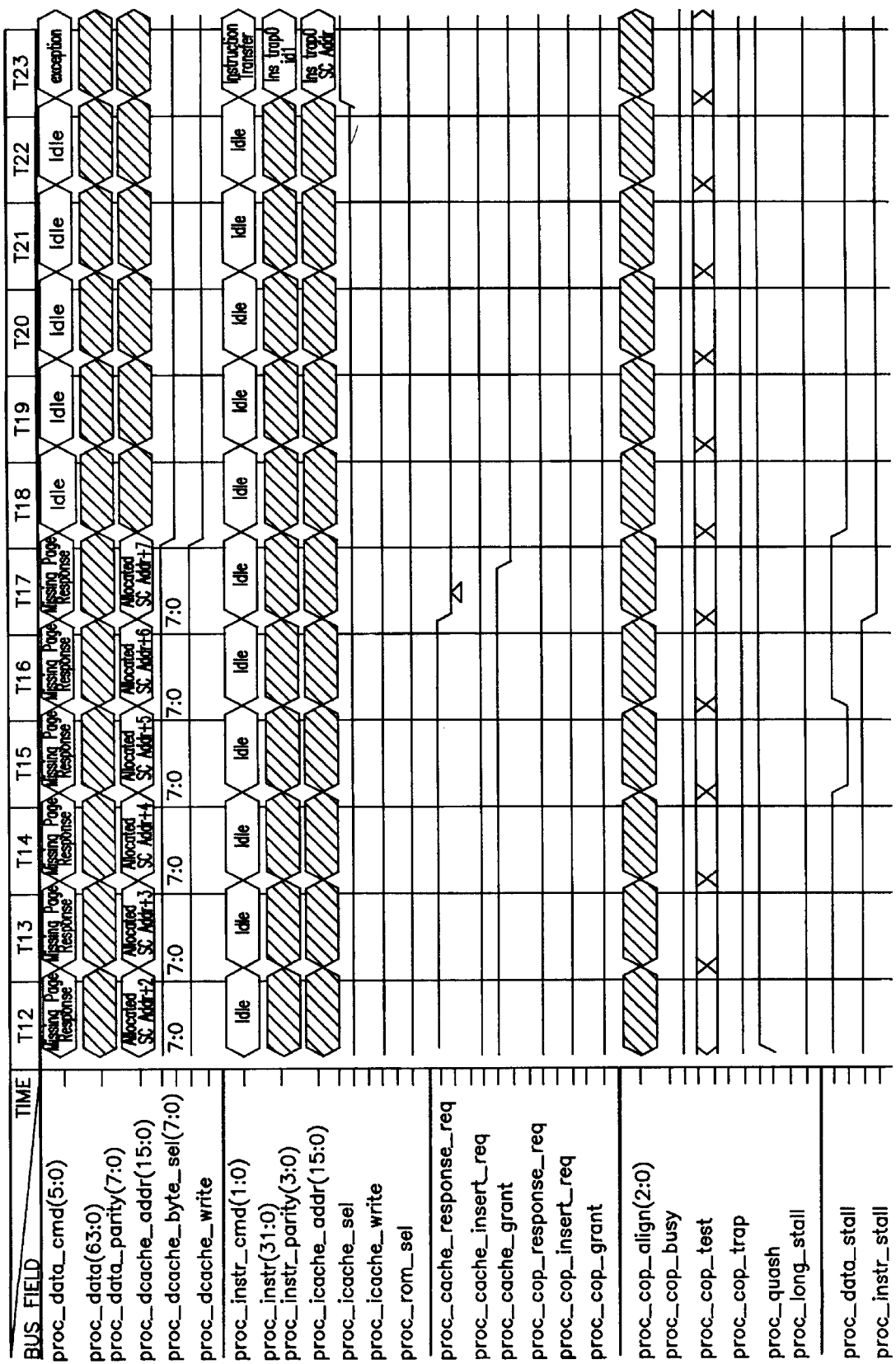
Figure 2B:
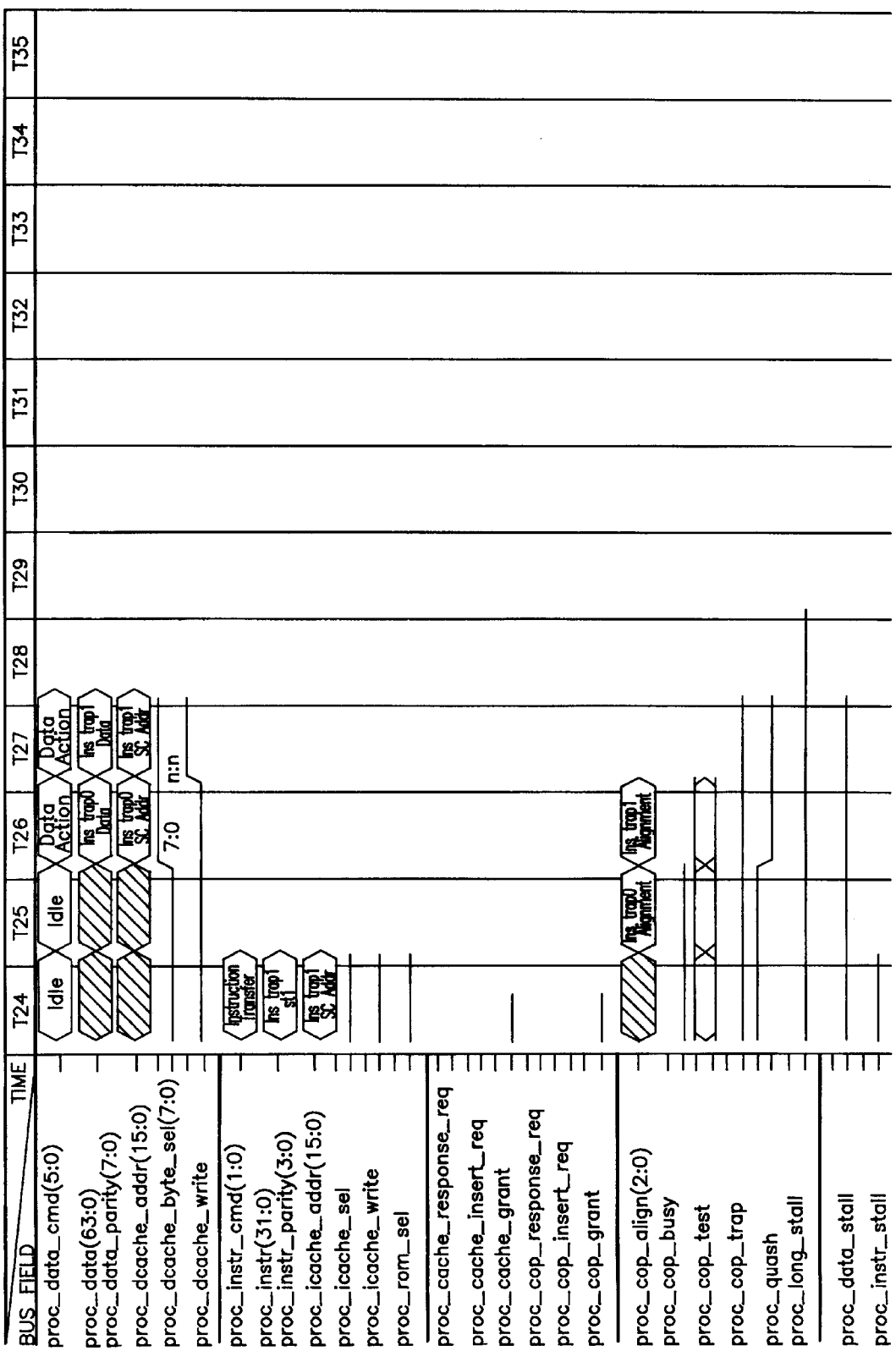
Figure 3A:
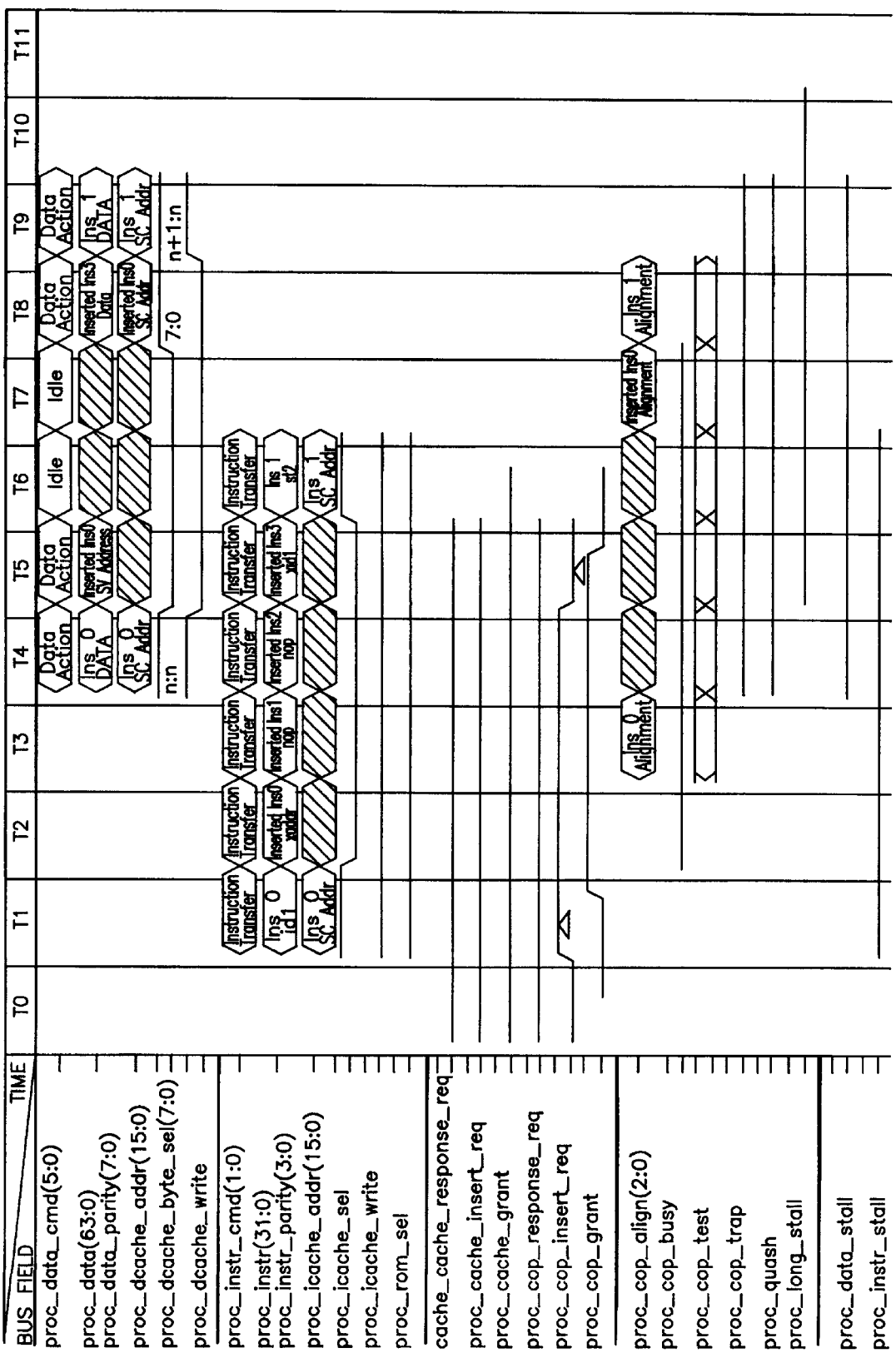
FIGS. 3a', 3b', 3c', 3d', 3e', 3f', 3g', 3h', and 3i' are timing diagrams depicting the timing of load and interrupt operations.
Figure 3B:
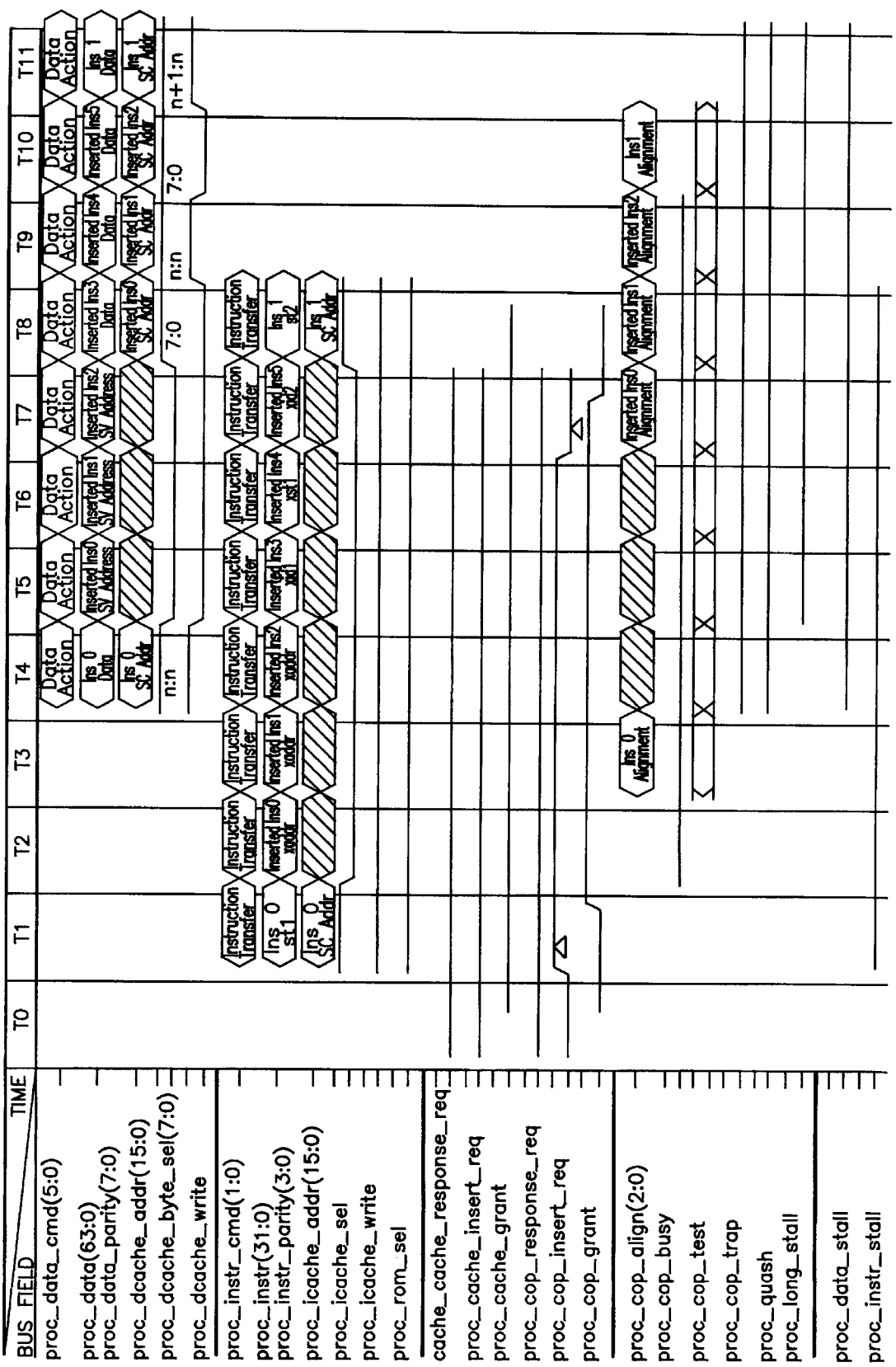
Figure 3C:
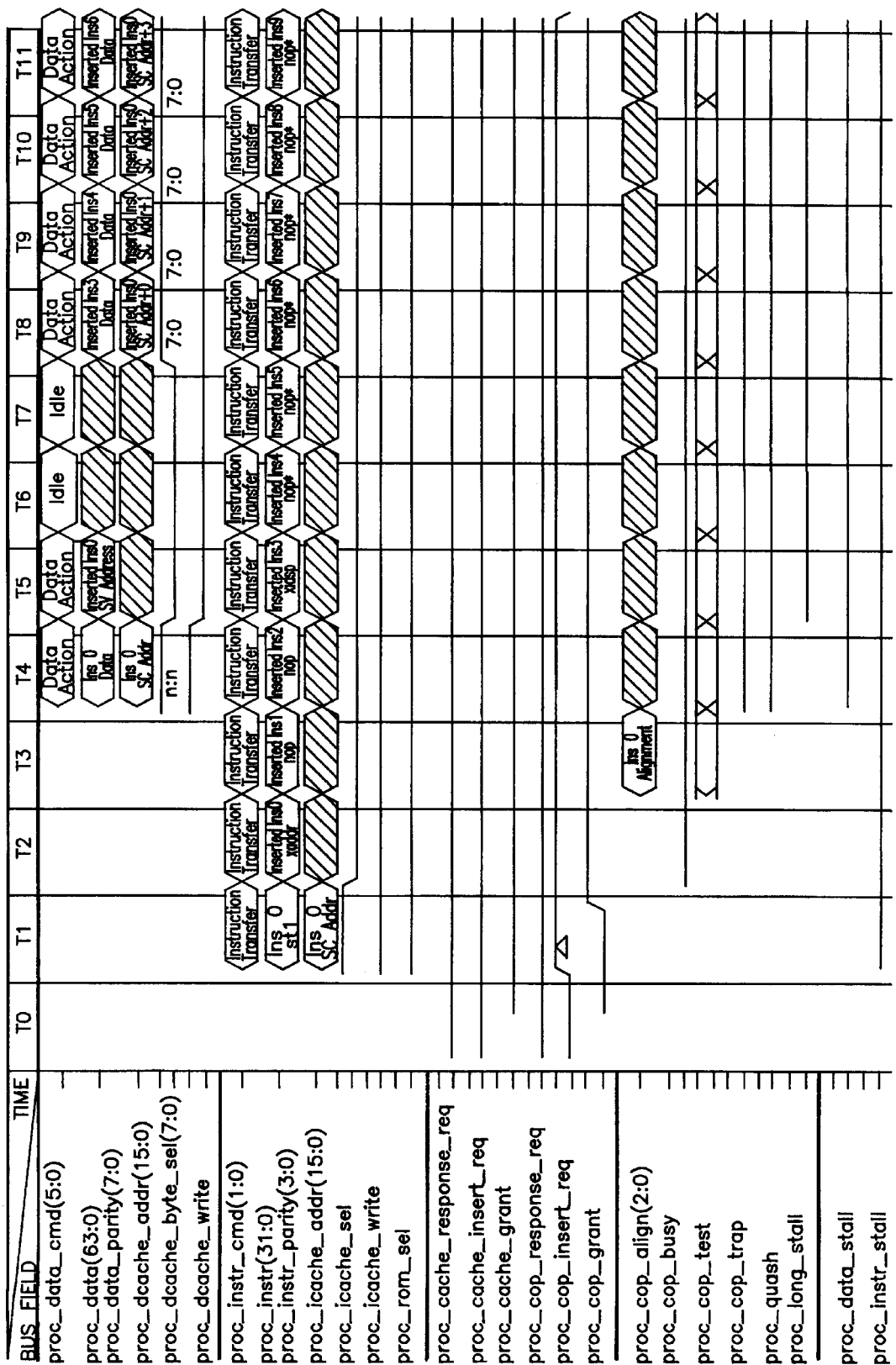
Figure 3C:
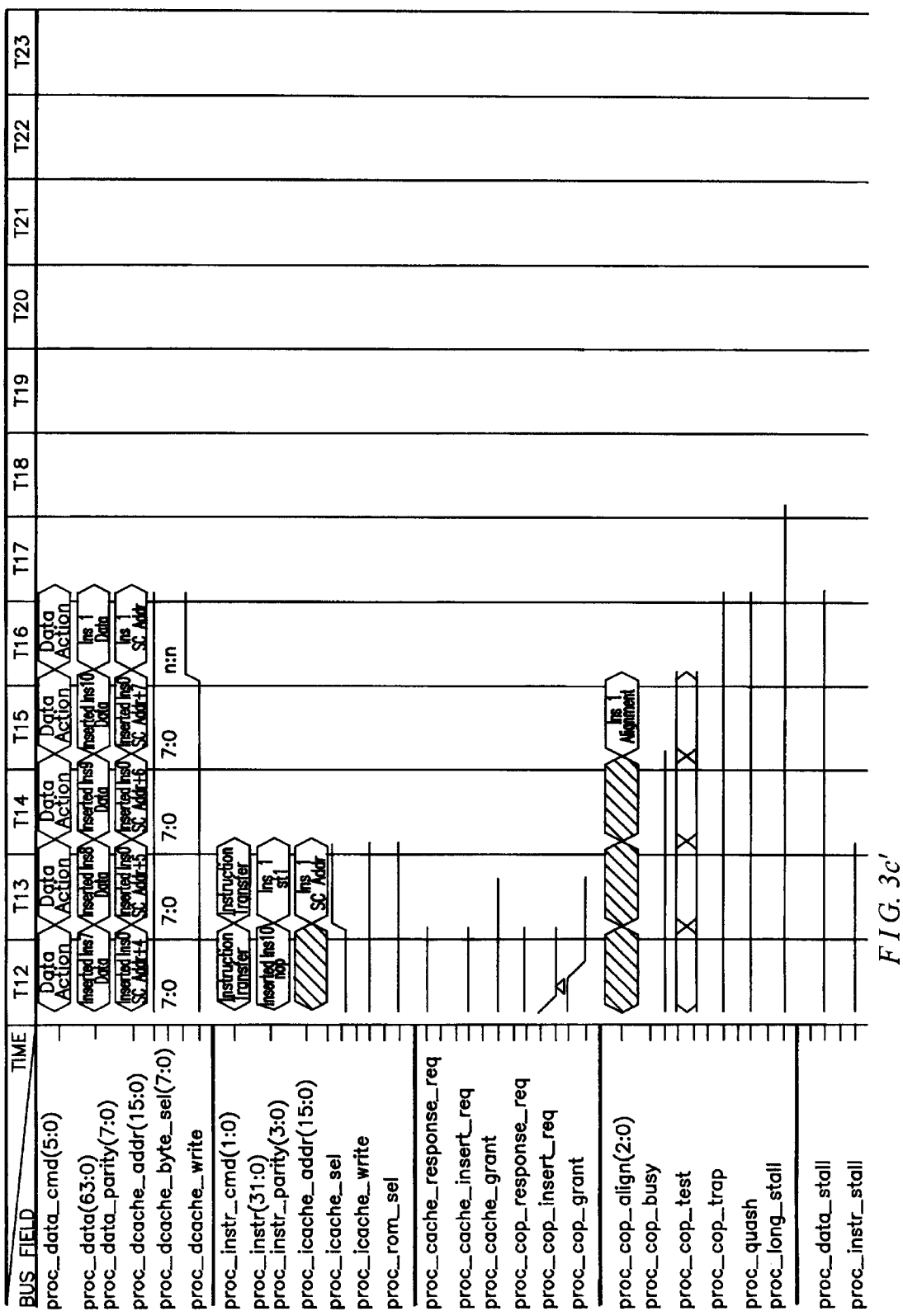
Figure 3D:
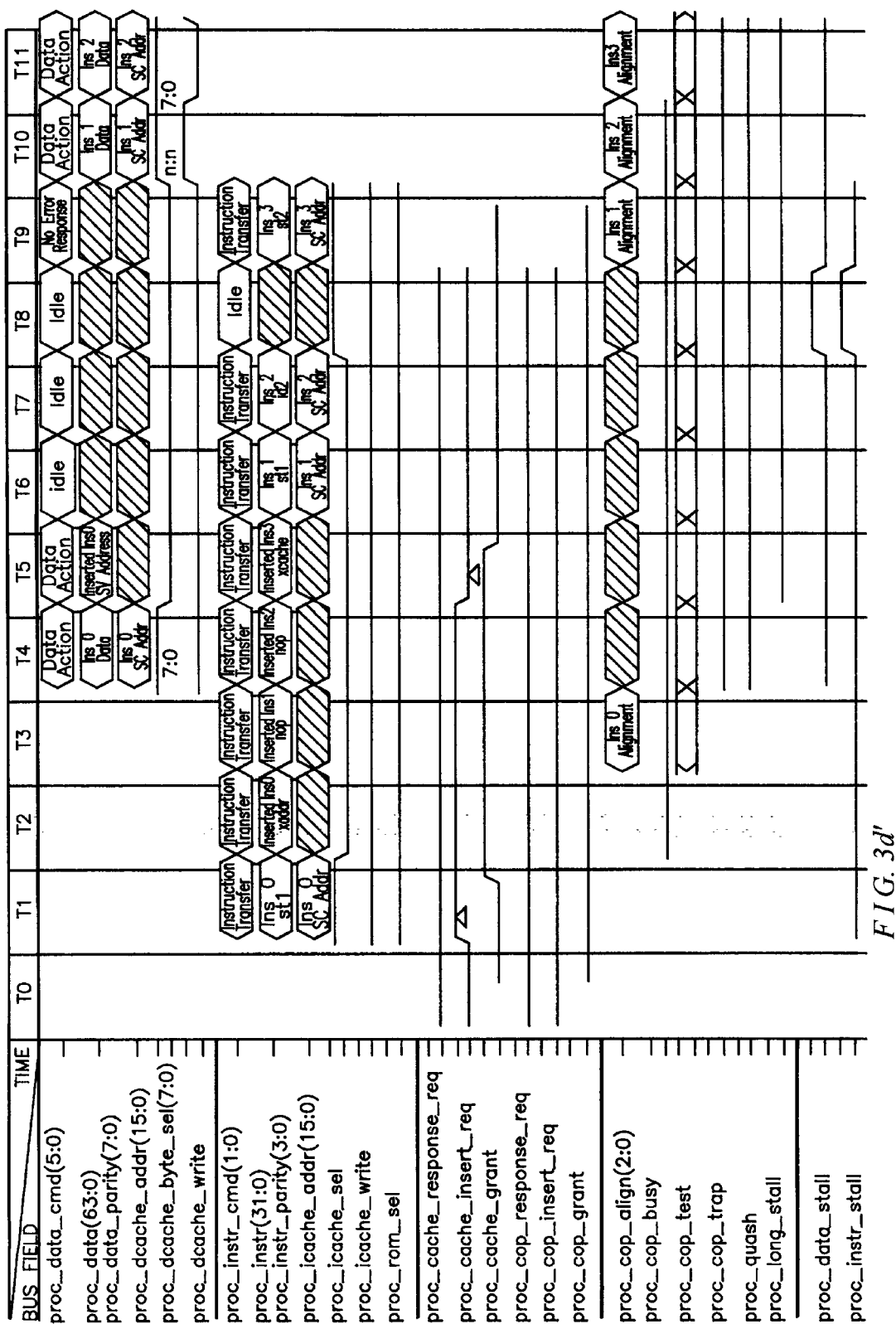
Figure 3D:
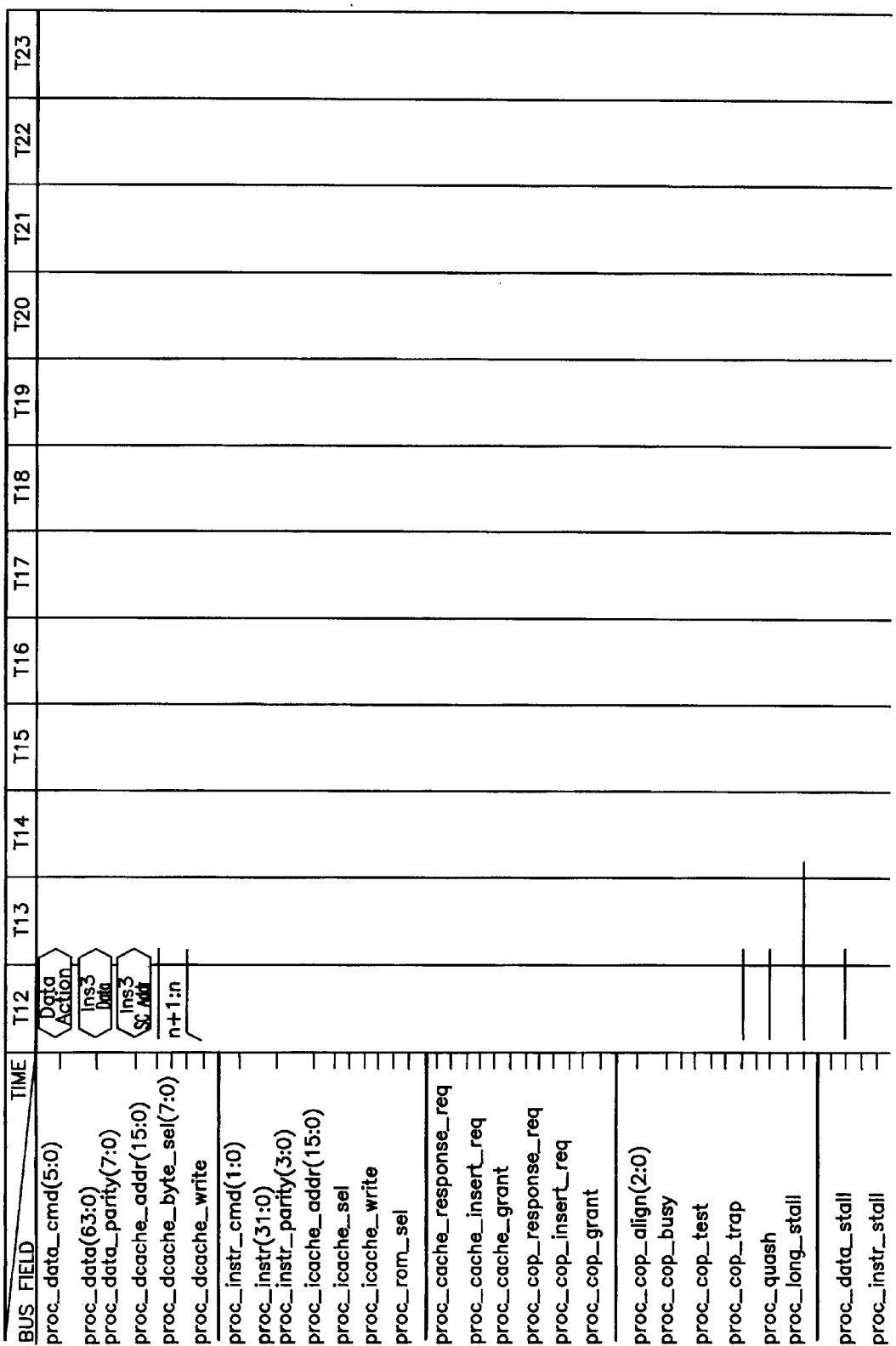
Figure 3E:
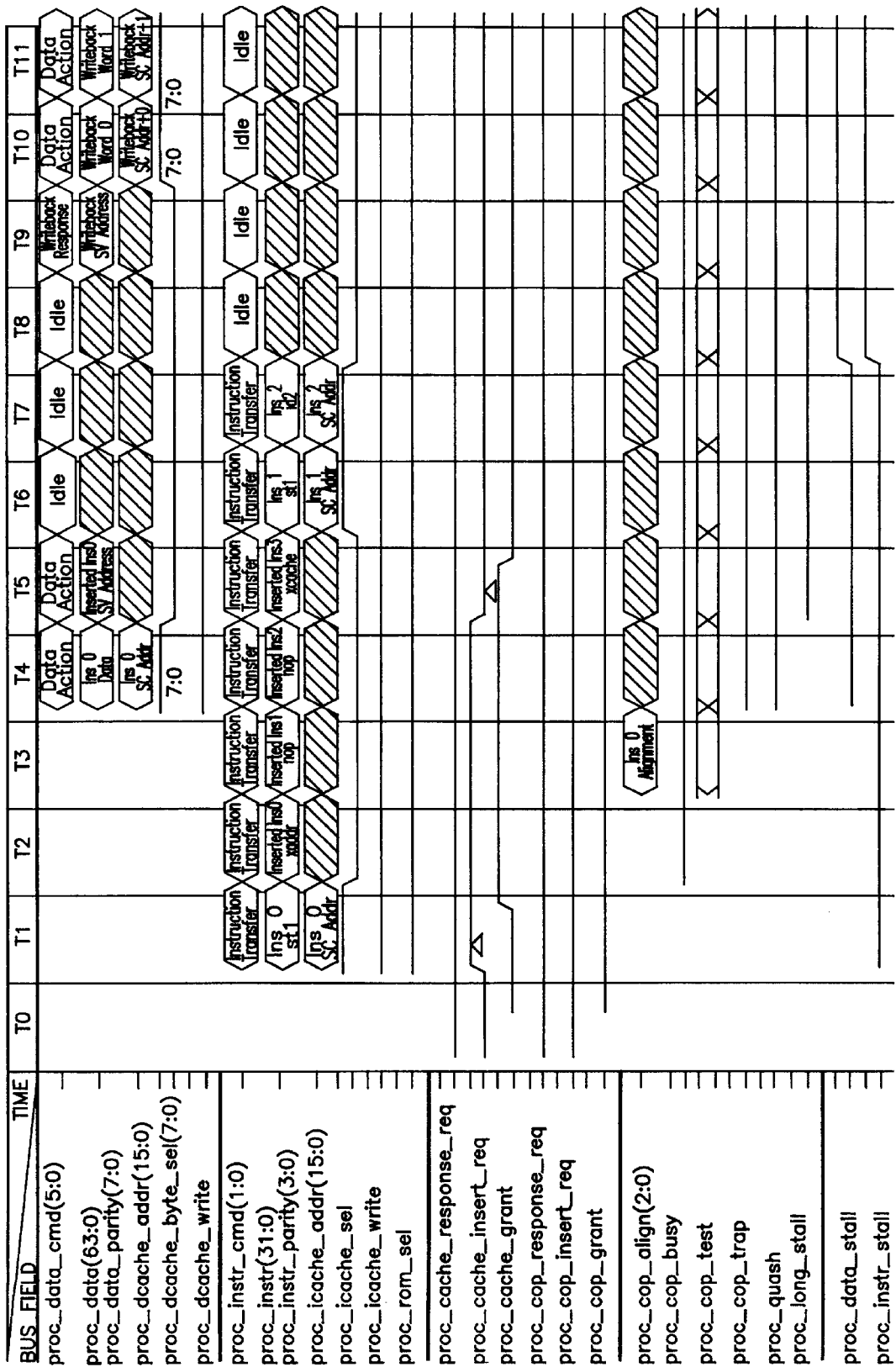
Figure 3E:
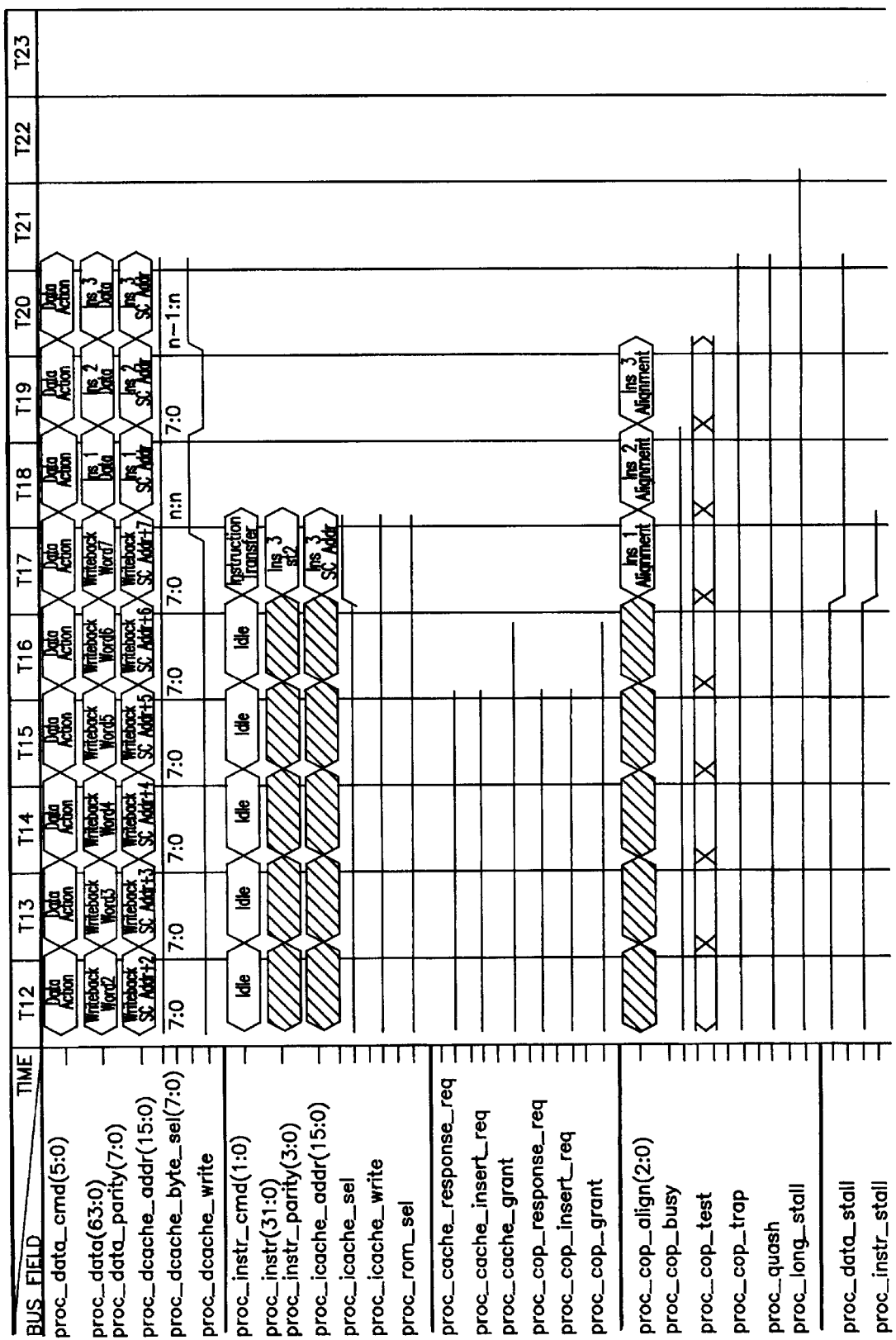
Figure 3F:
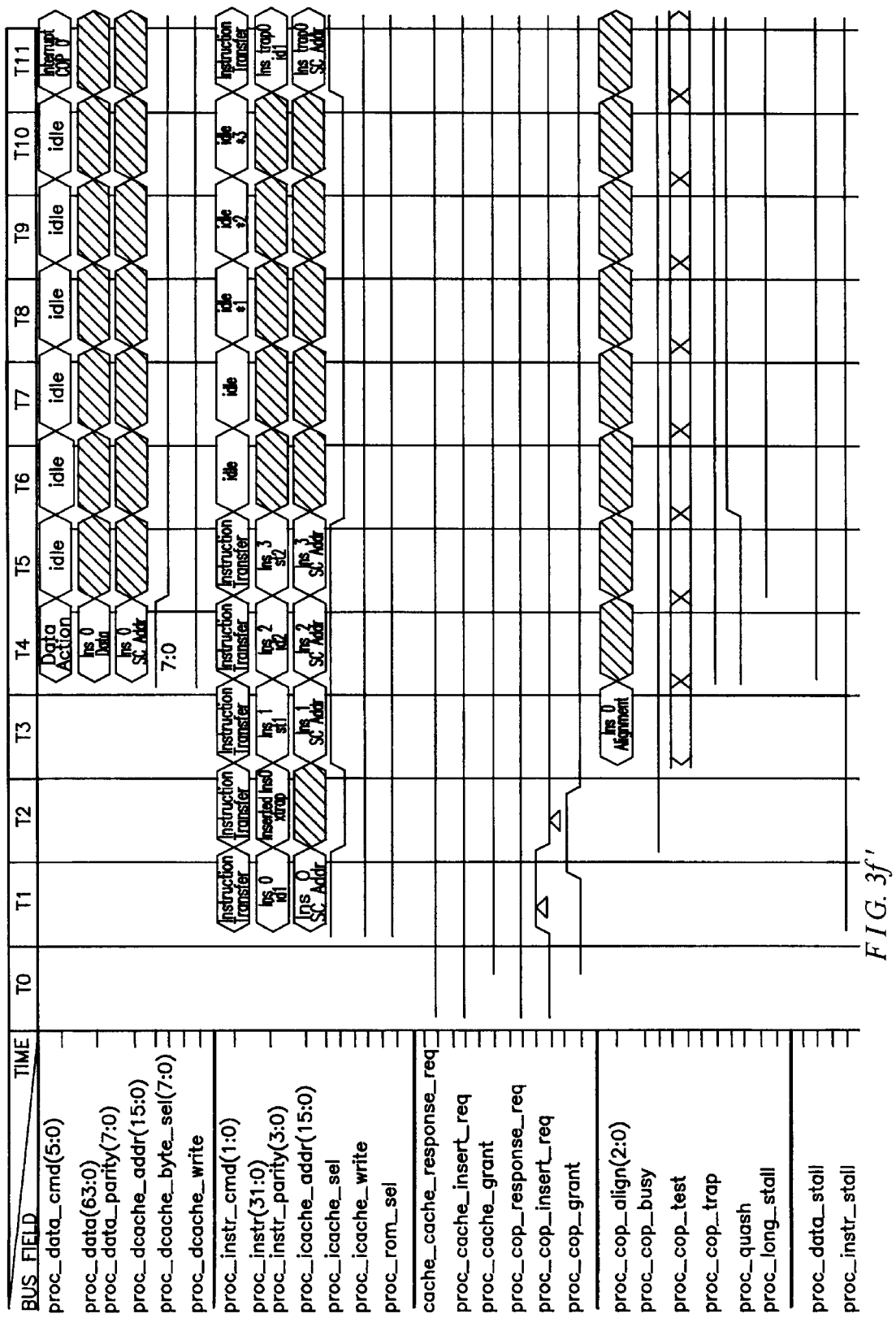
Figure 3F:
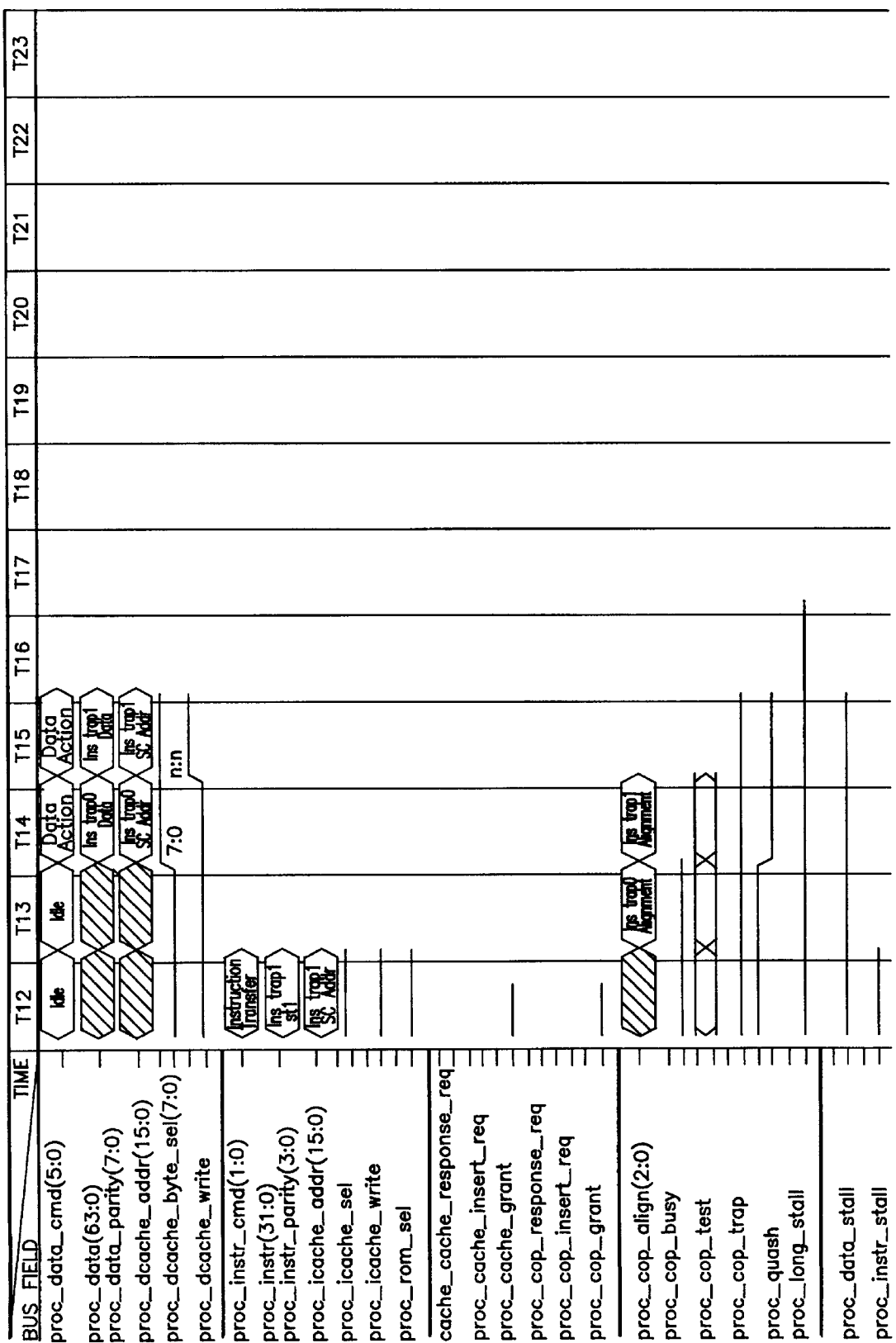
Figure 3G:
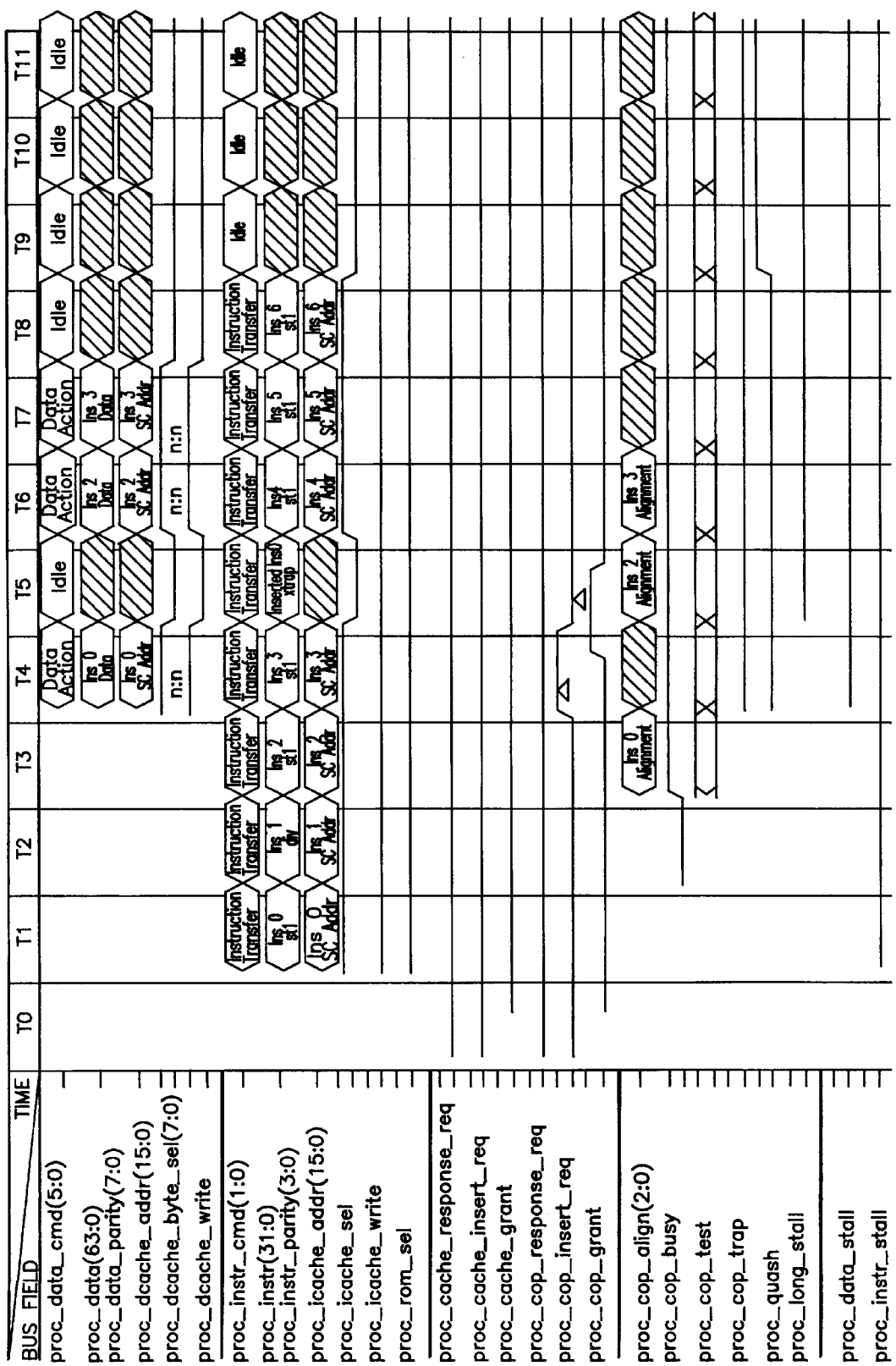
Figure 3G:
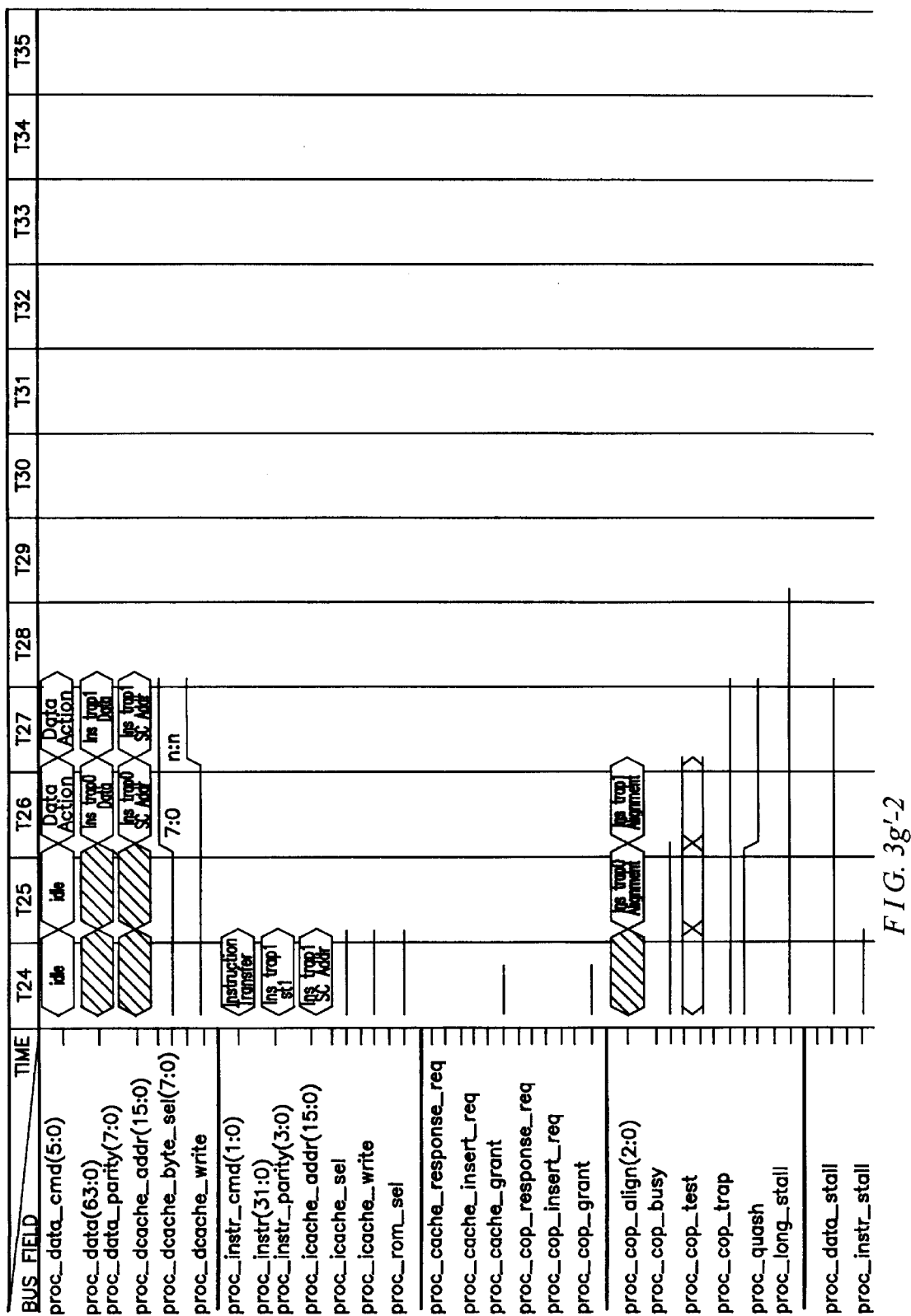
Figure 3H:
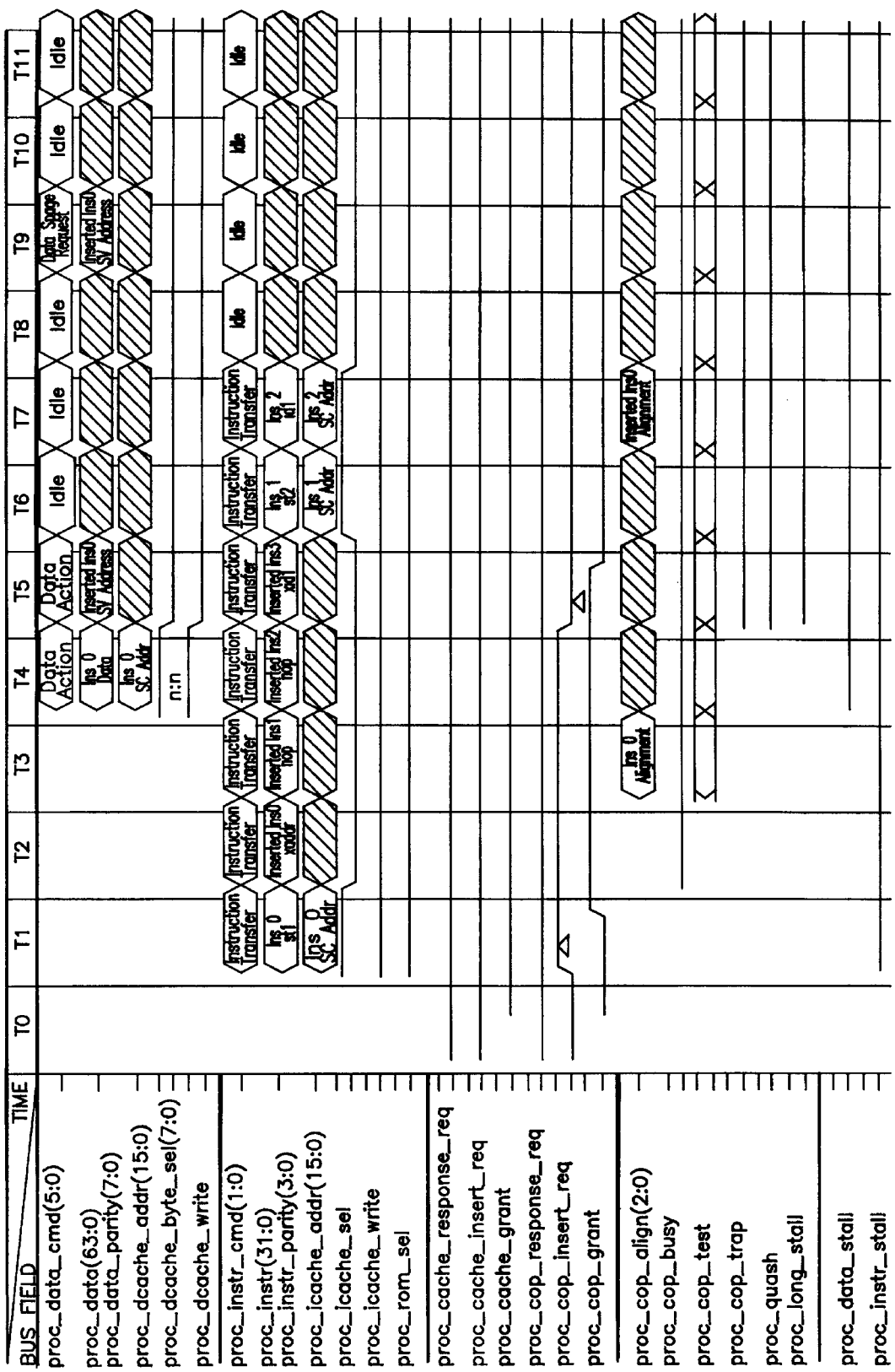
Figure 3H:
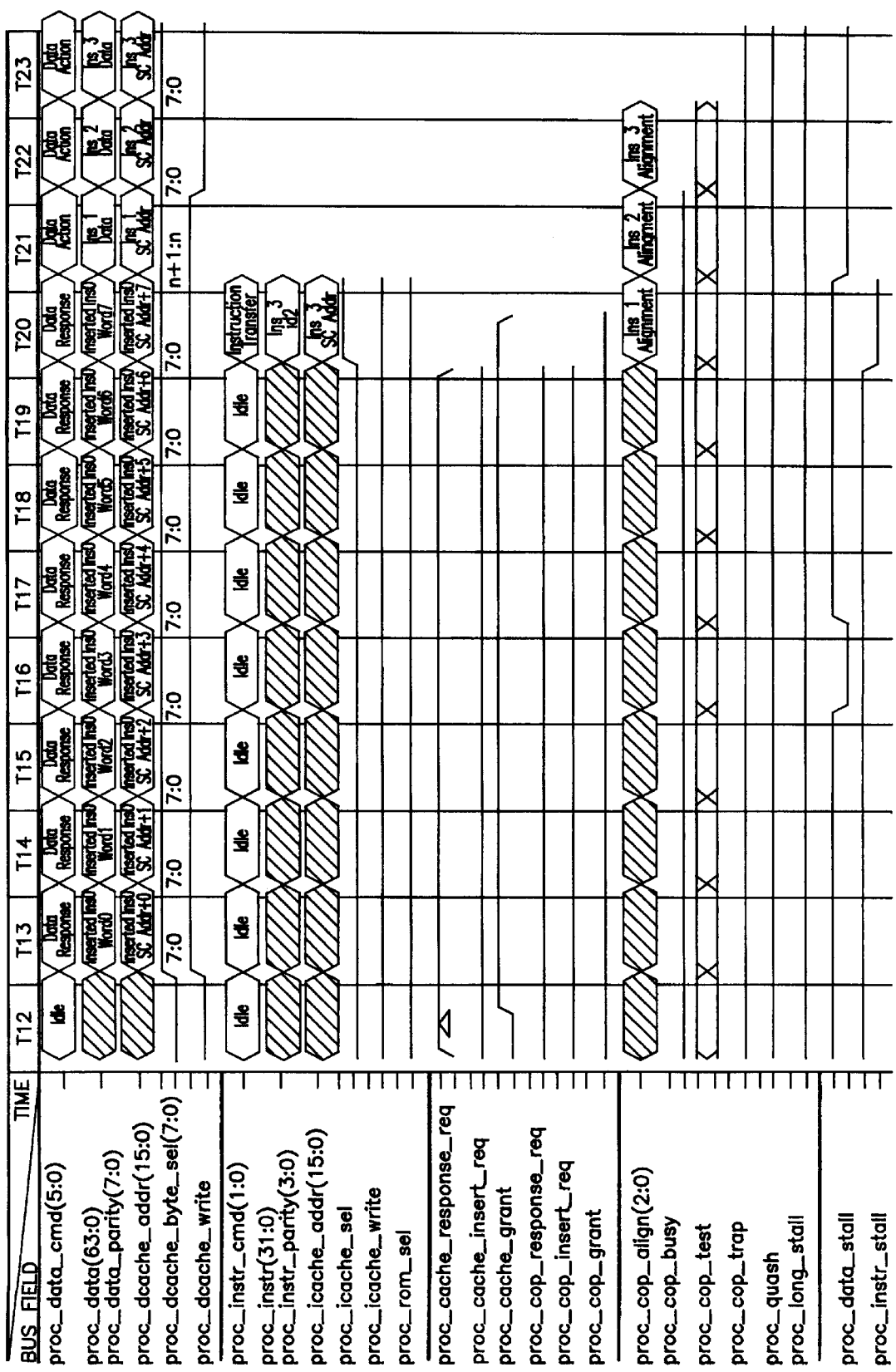
Figure 3I:
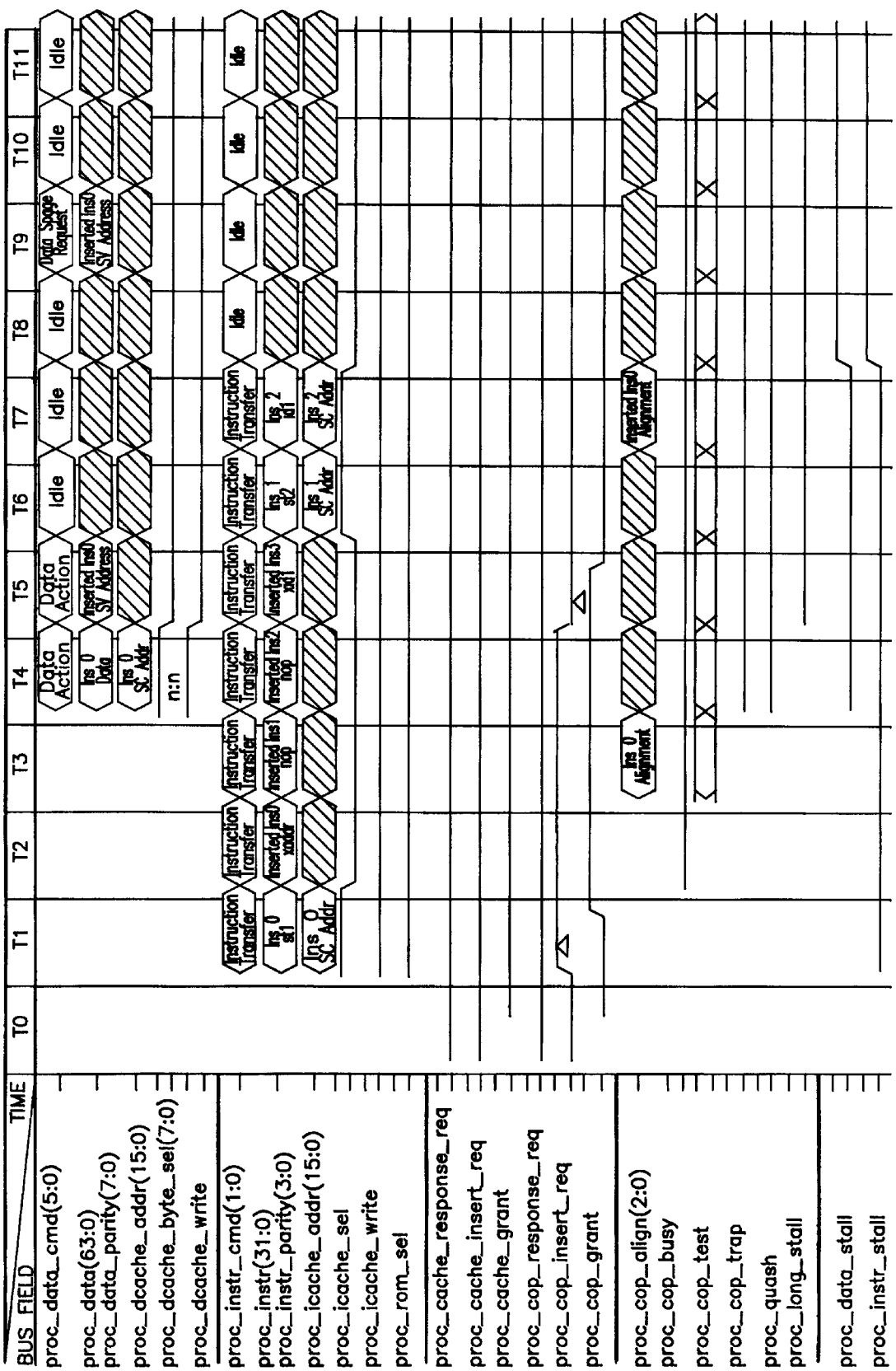
Figure 3I:
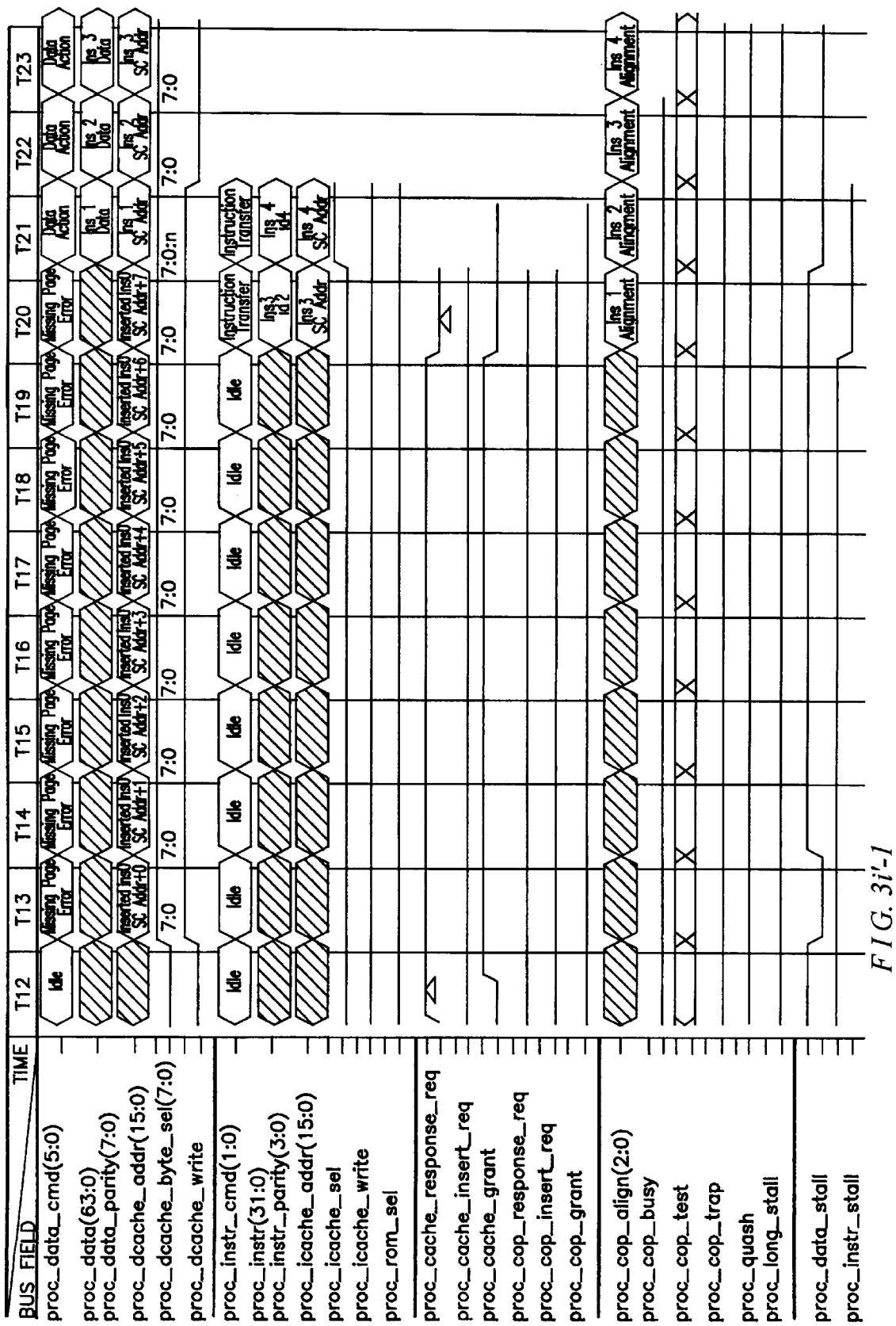
Figure 4A:
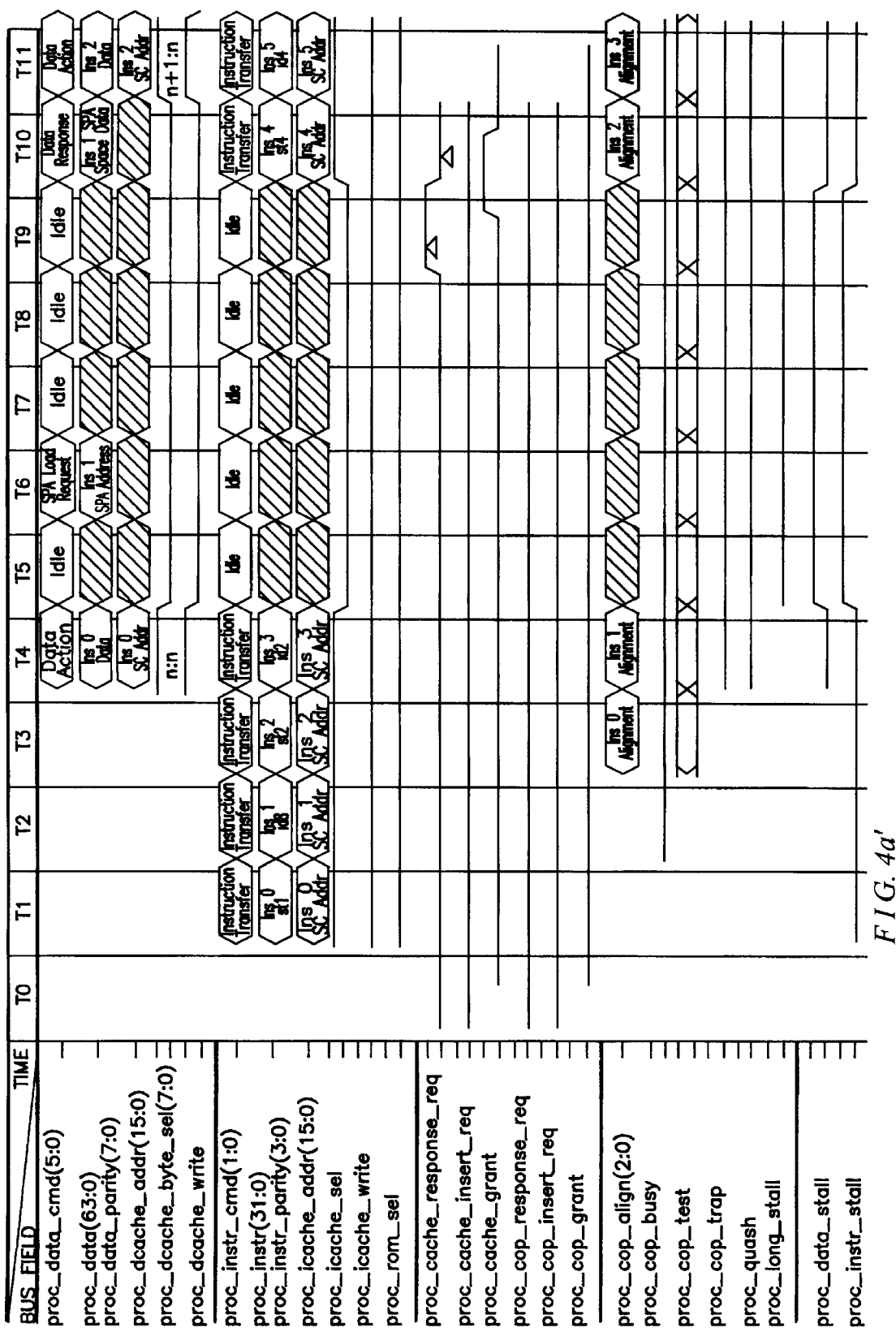
FIGS. 4a' and 4b' are timing diagrams depicting the timing of space load and store operations.
Figure 4B:
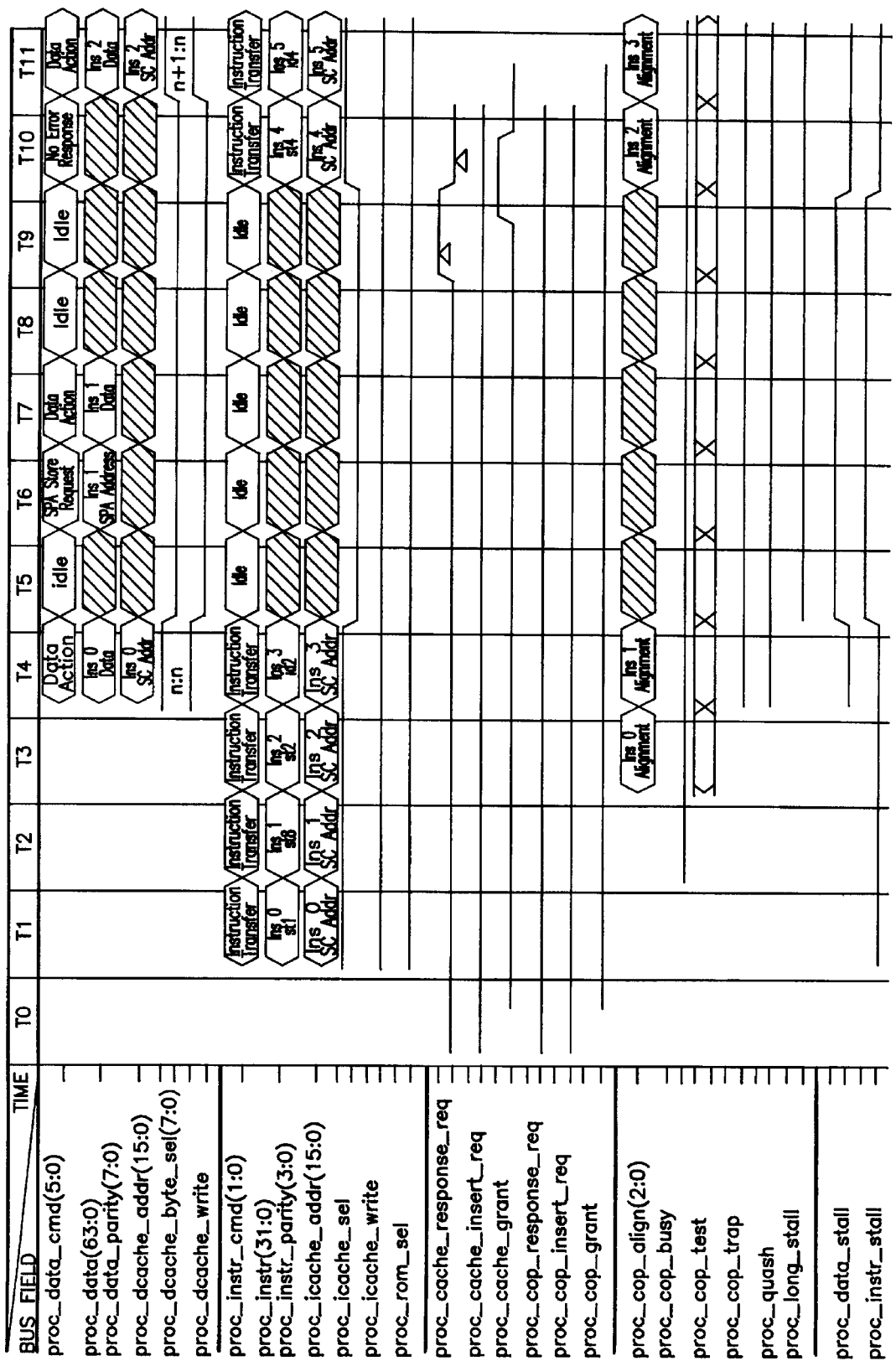
Figure 4B:
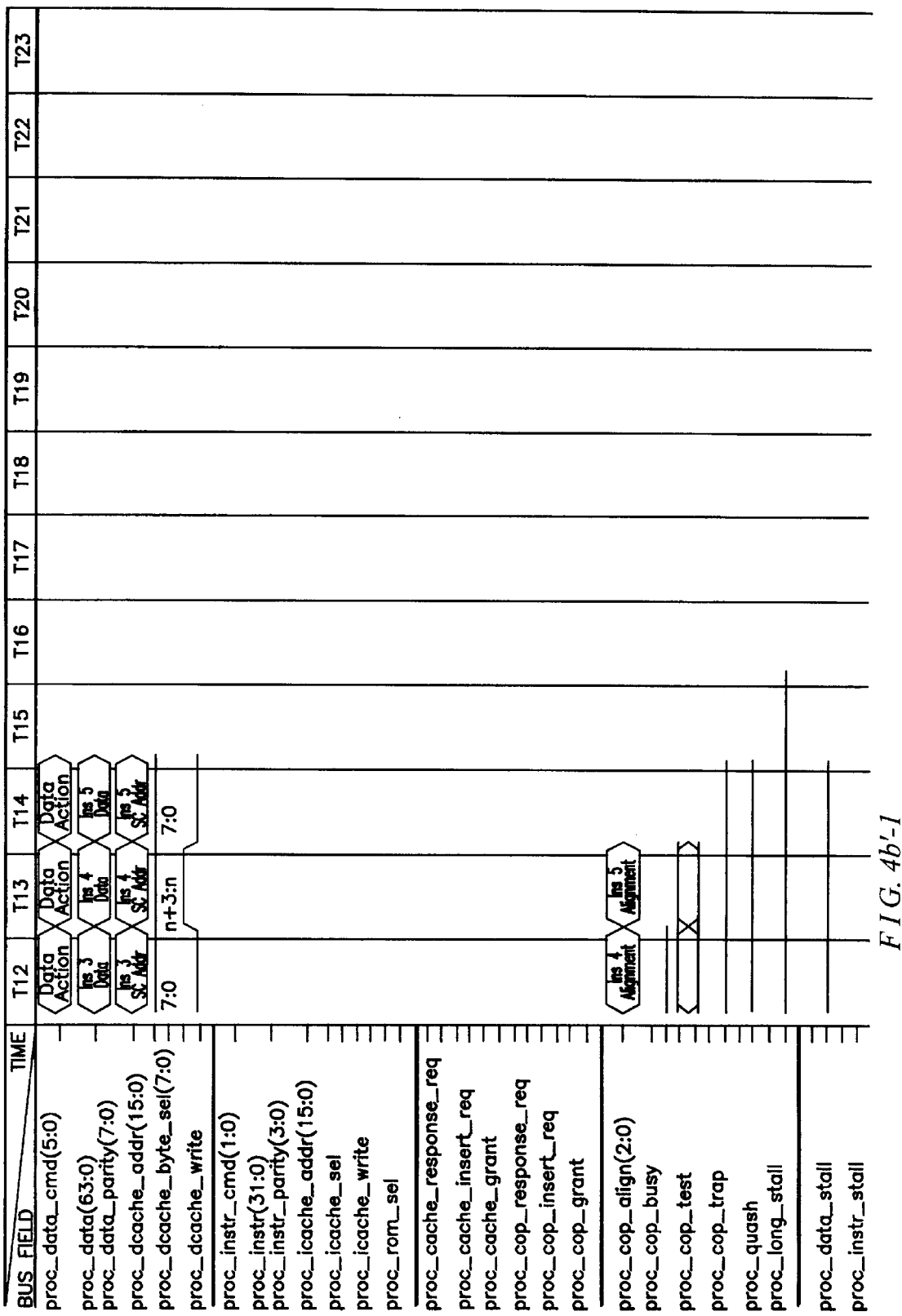
Figure 5A:
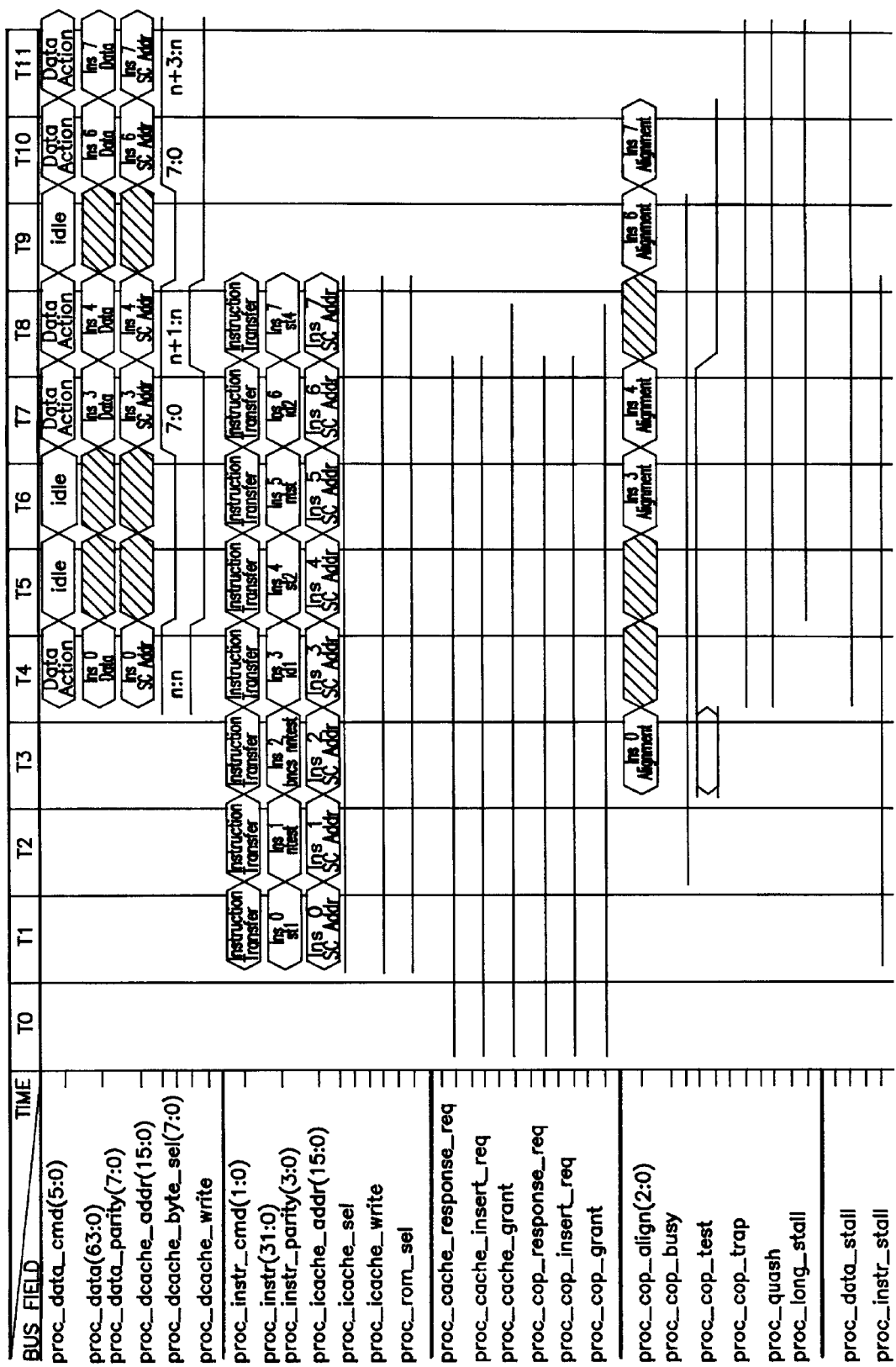
FIGS. 5a', 5b', 5c', and 5d' are timing diagrams depicting the timing of exception processing operations.
Figure 5B:
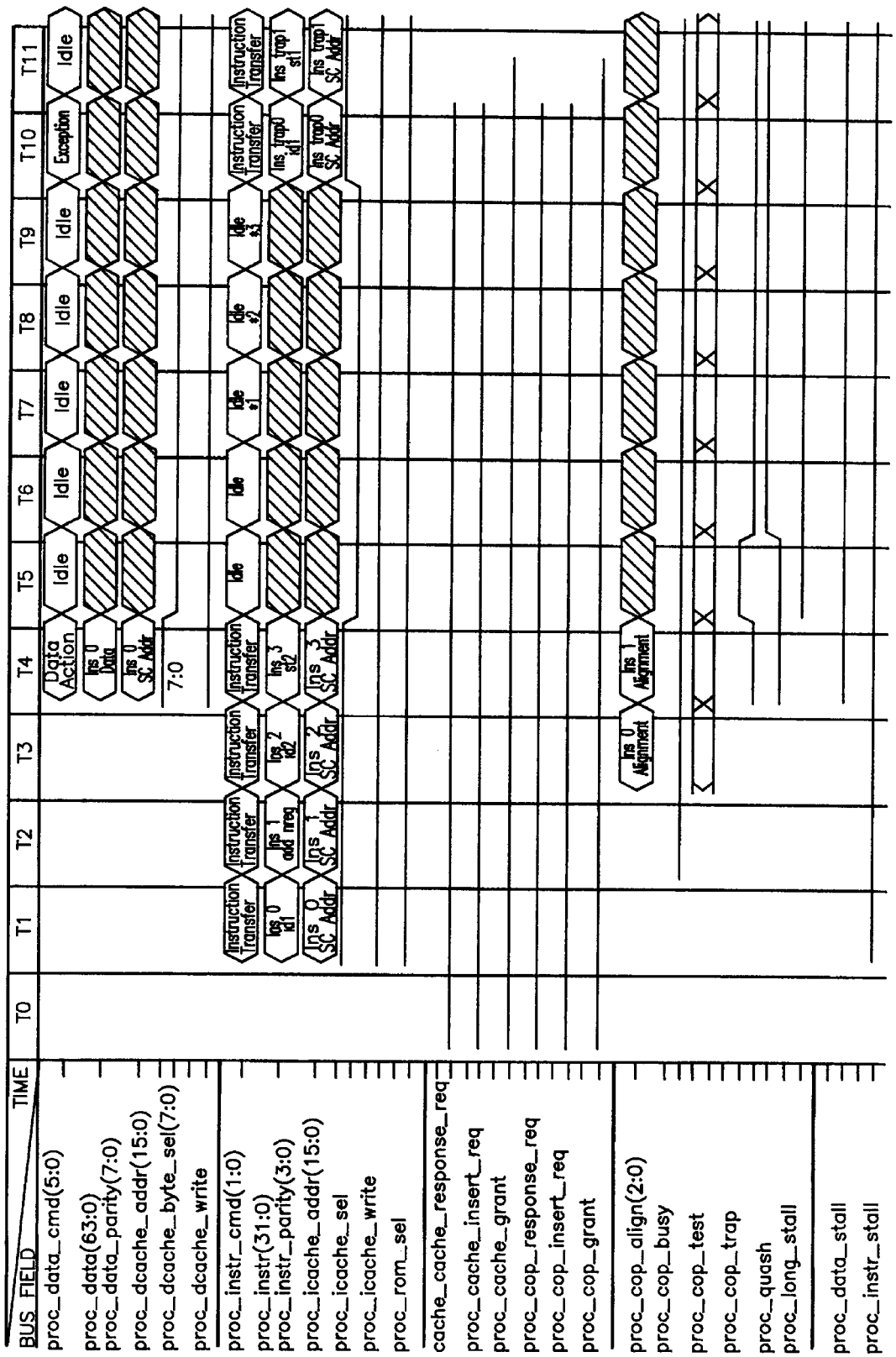
FIGS. 5 and 6 show examples of instruction sequences which violate source register restrictions.
Figure 5B:
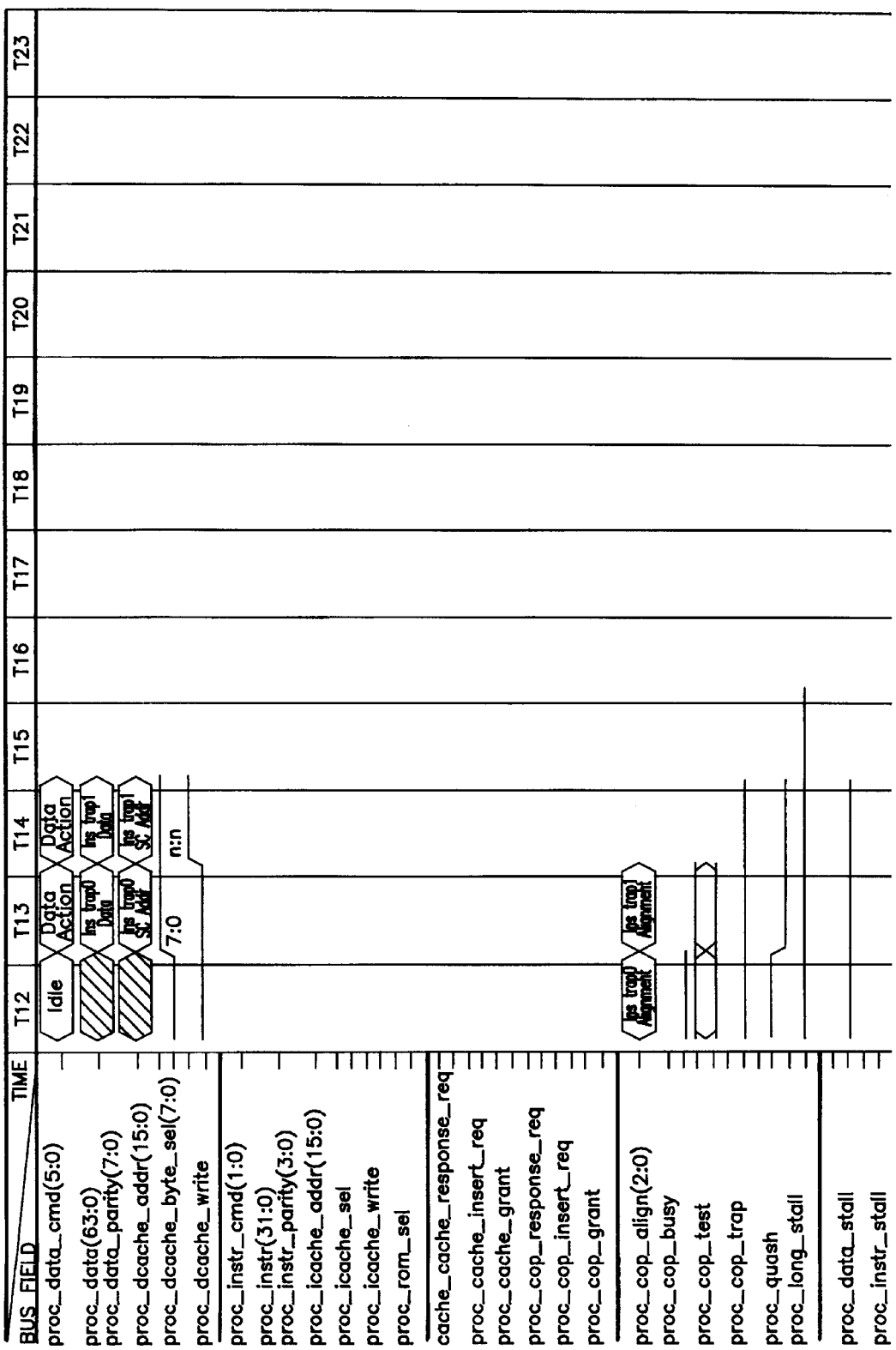
Figure 5C:
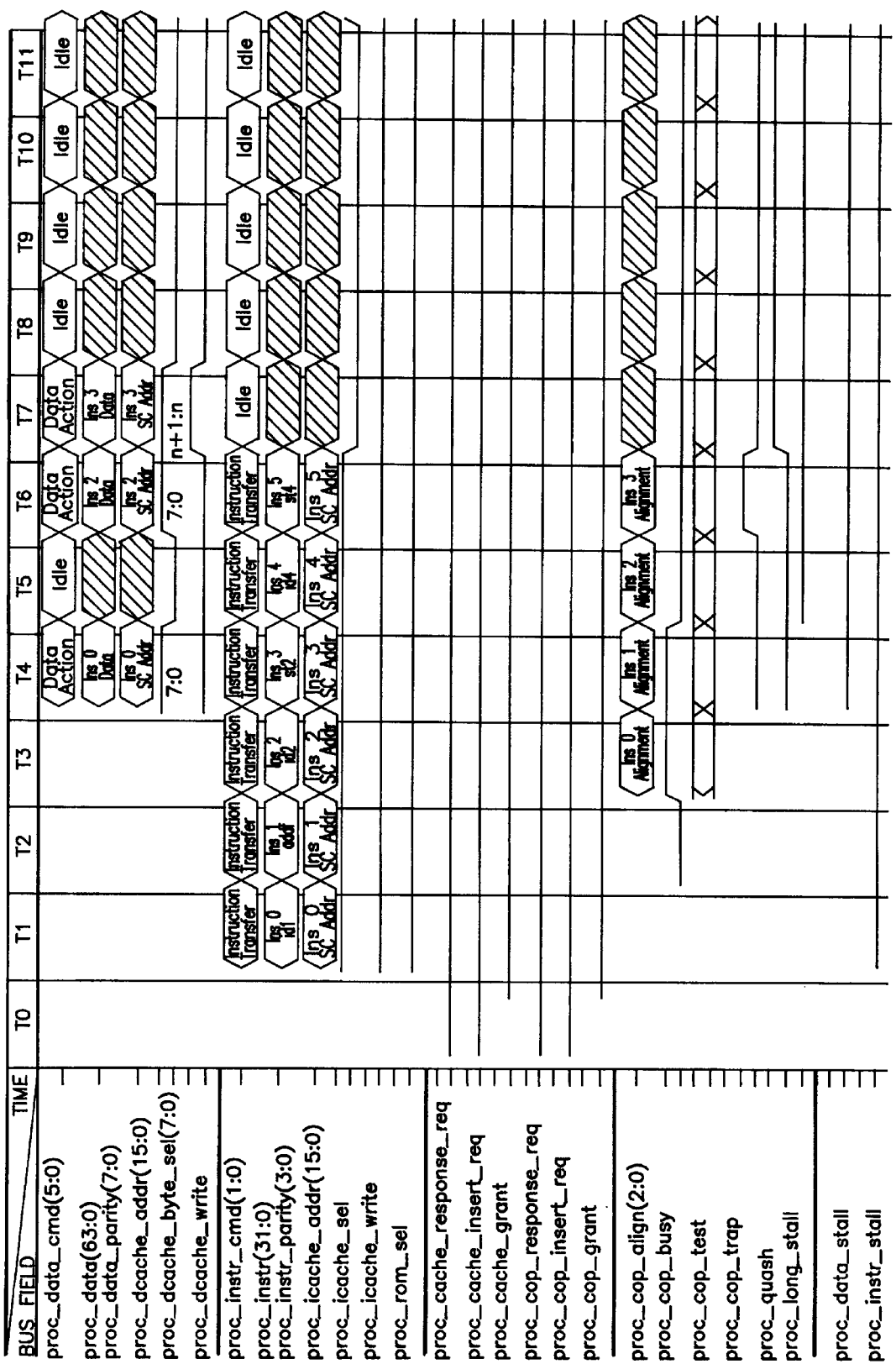
Figure 5C:
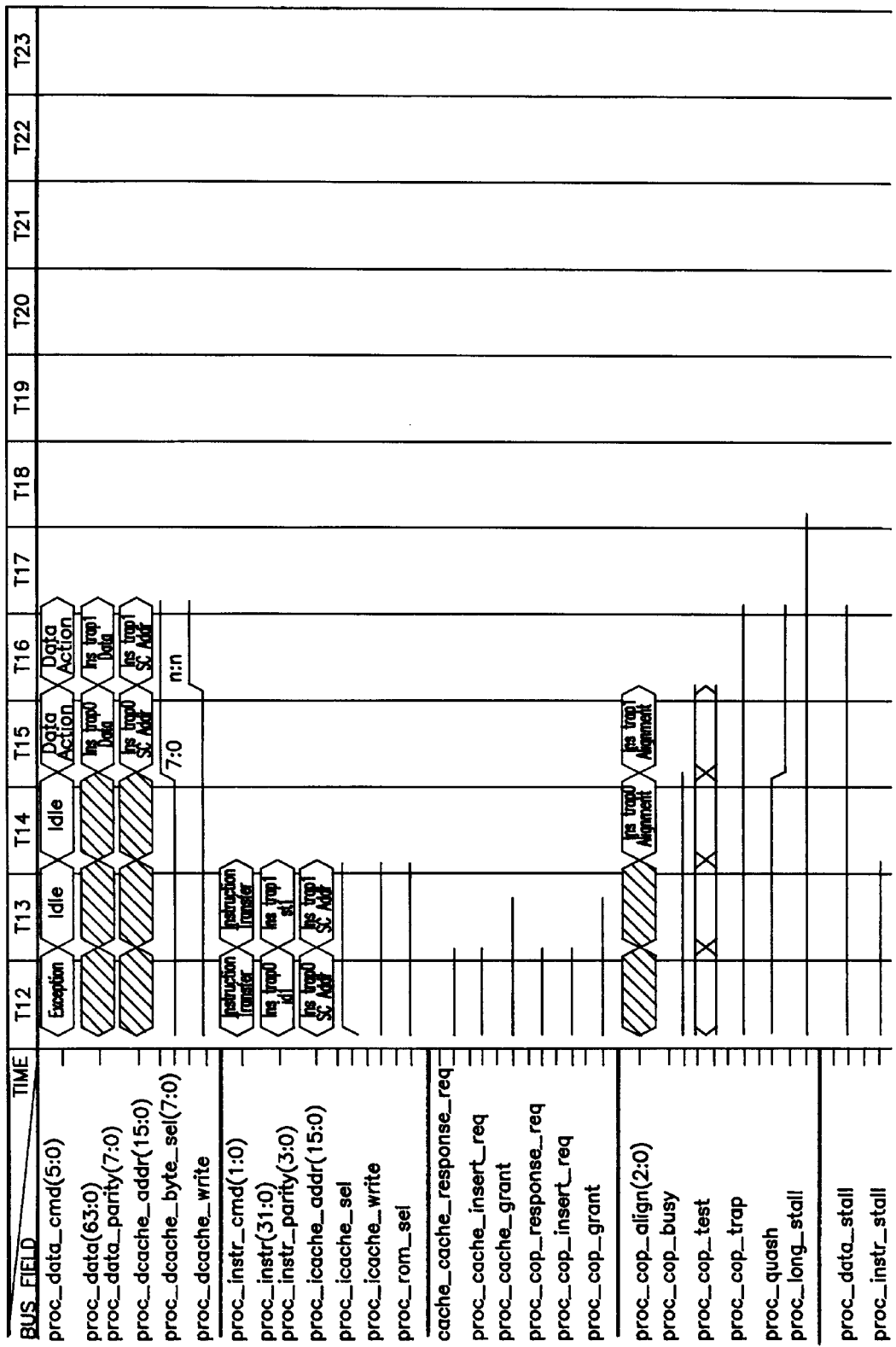
Figure 5D:
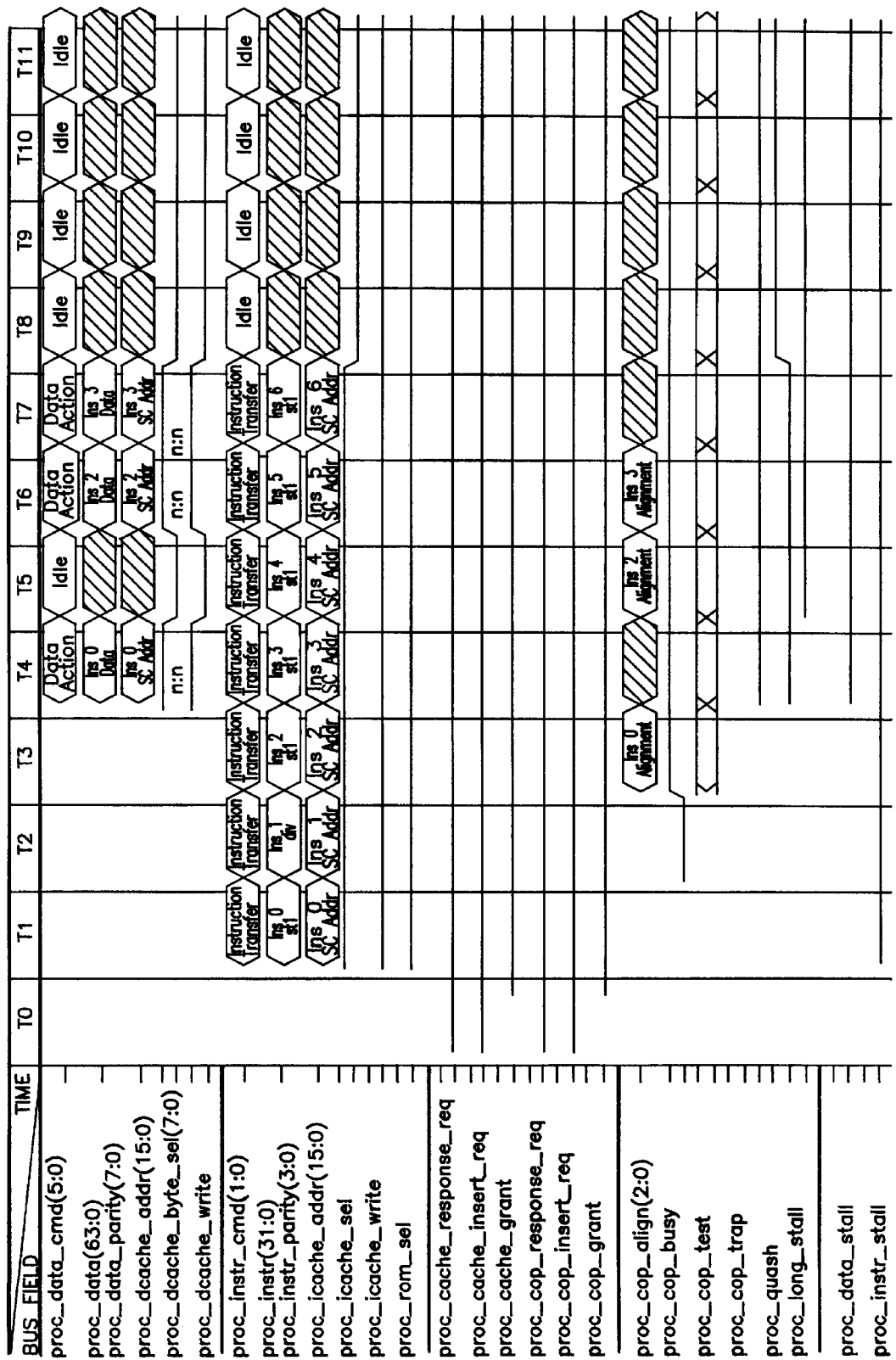
Figure 5D:
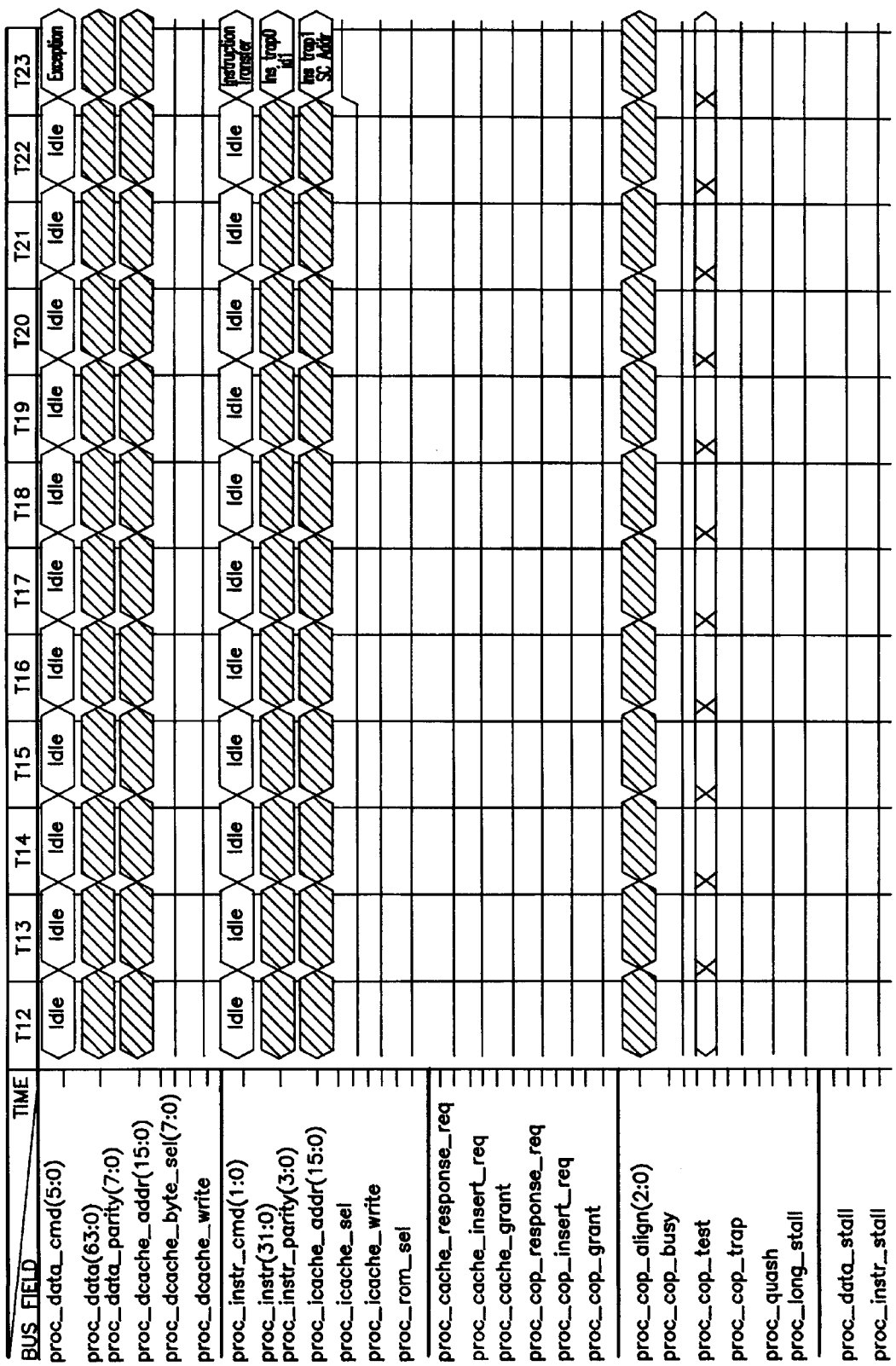
Figure 5D:
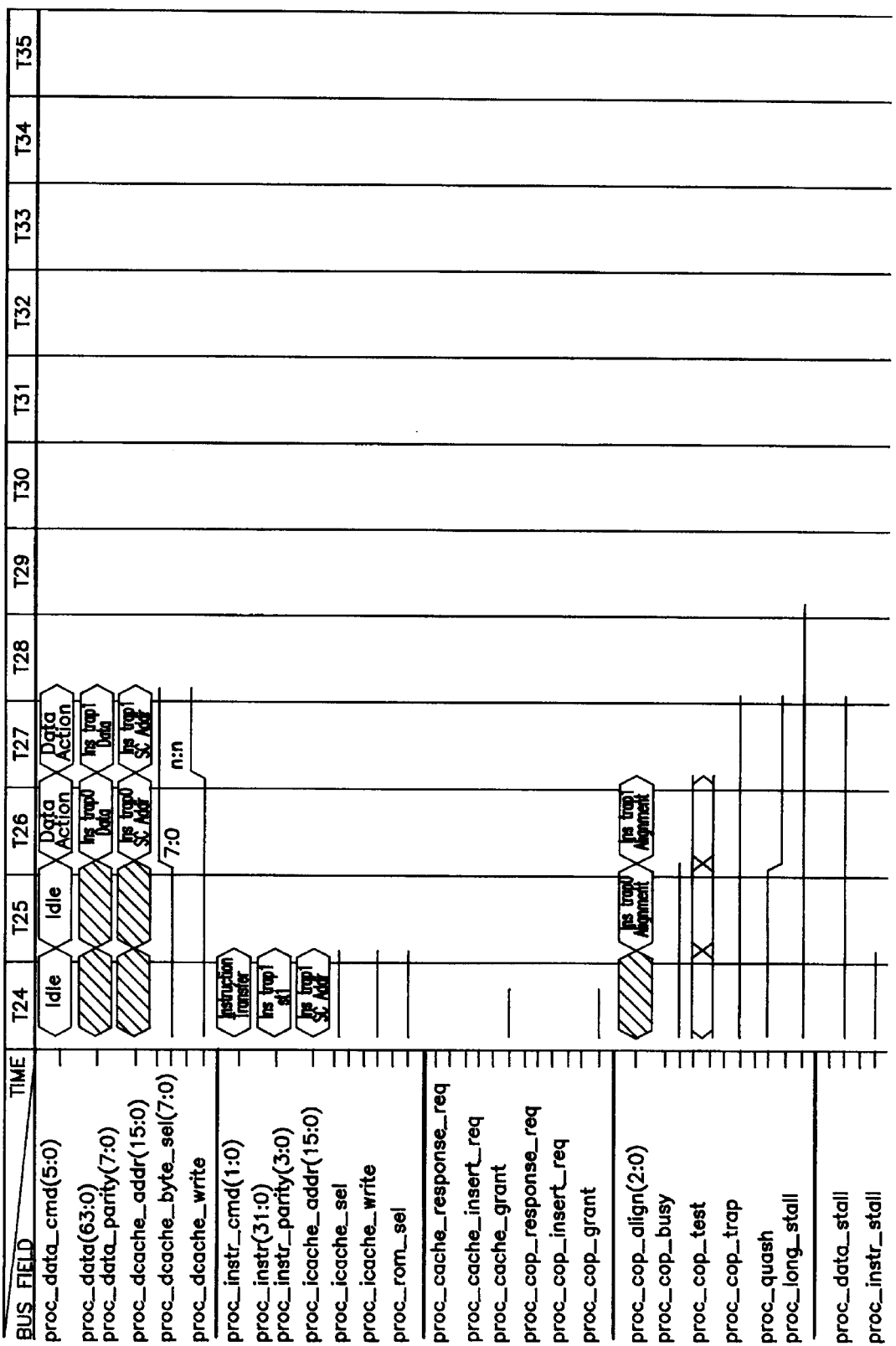
Figure 6A:
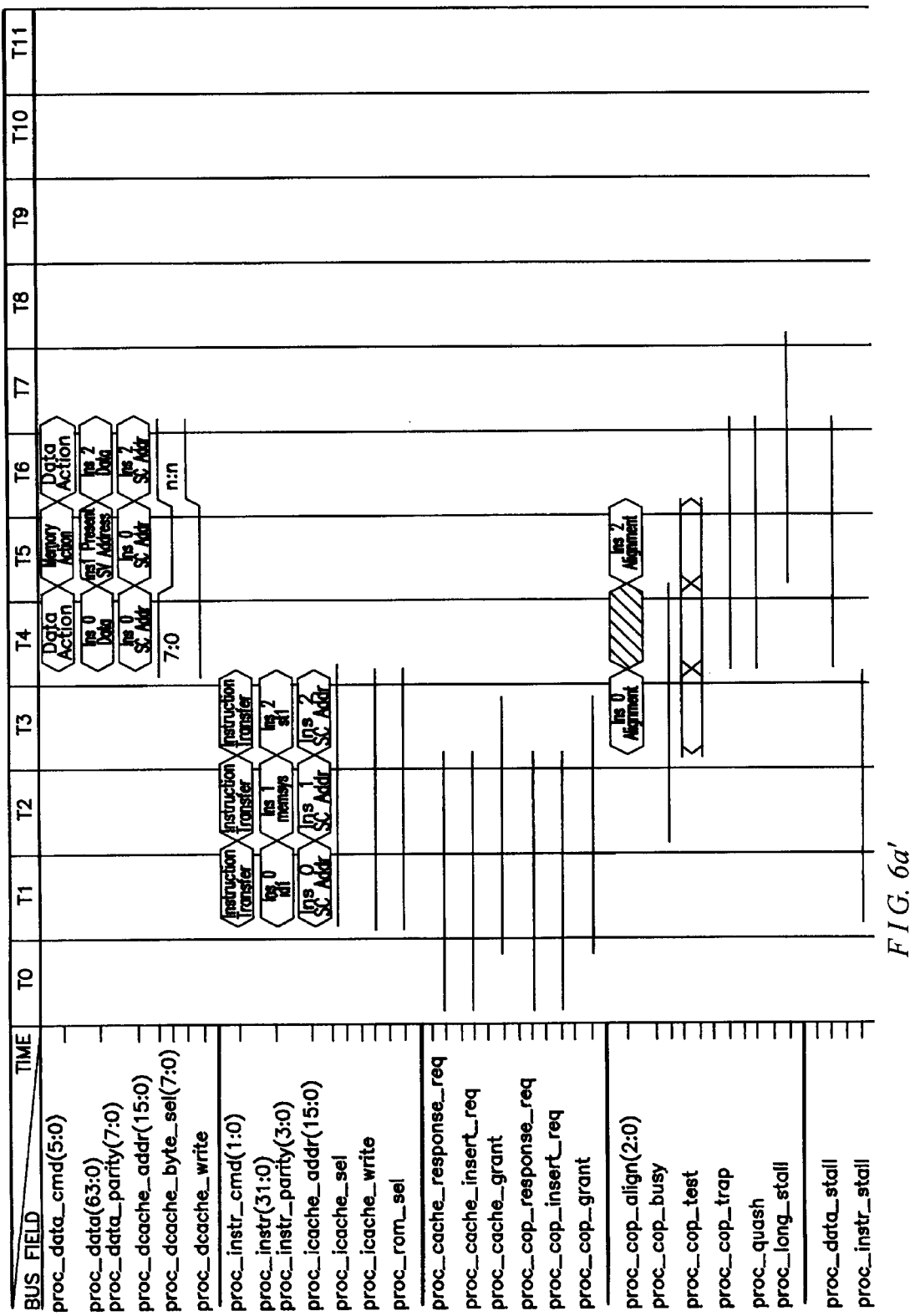
FIGS. 6a', 6b' and 6c' are timing diagrams depicting the timing of memory operations.
Figure 6B:
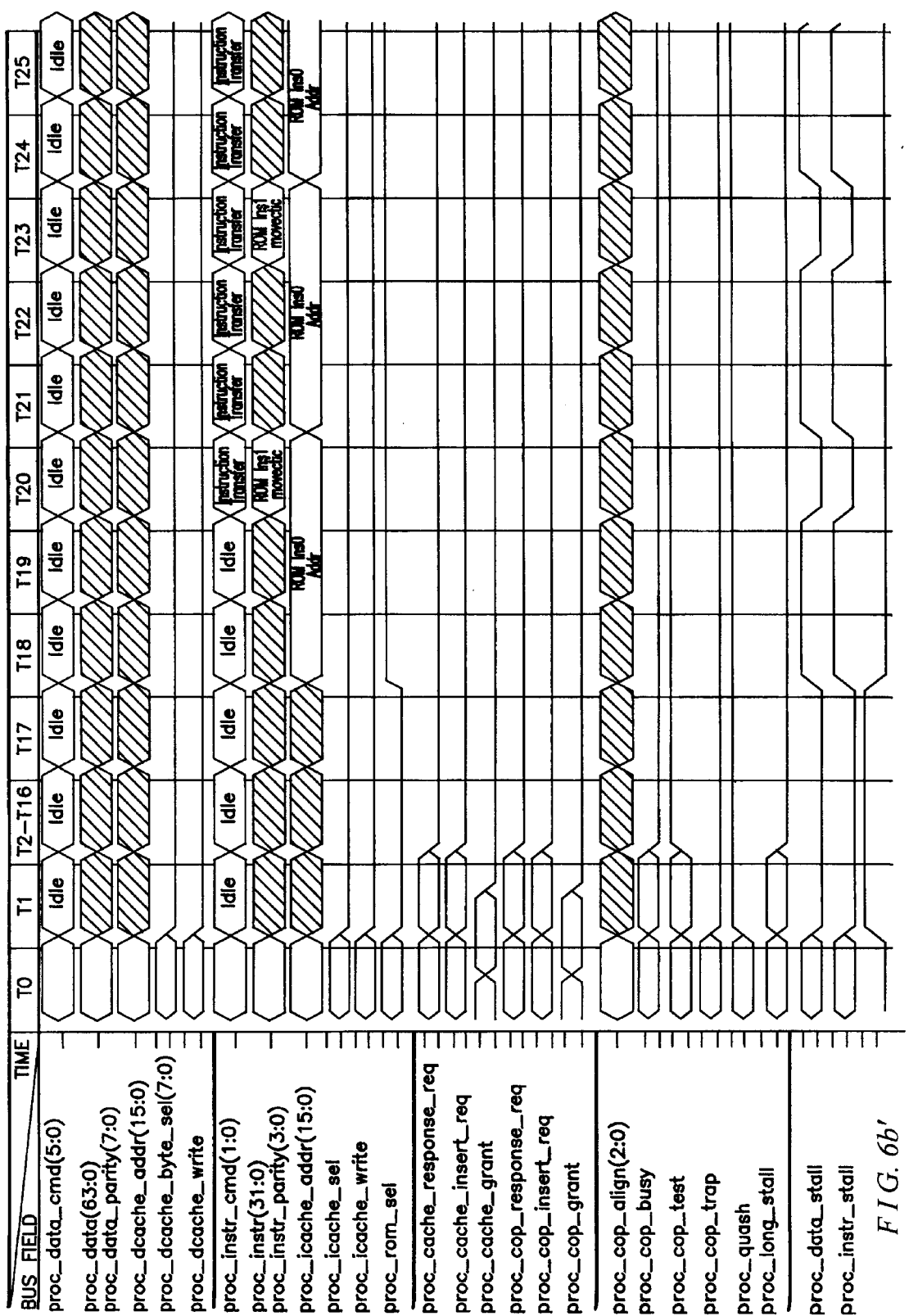
Figure 6B:
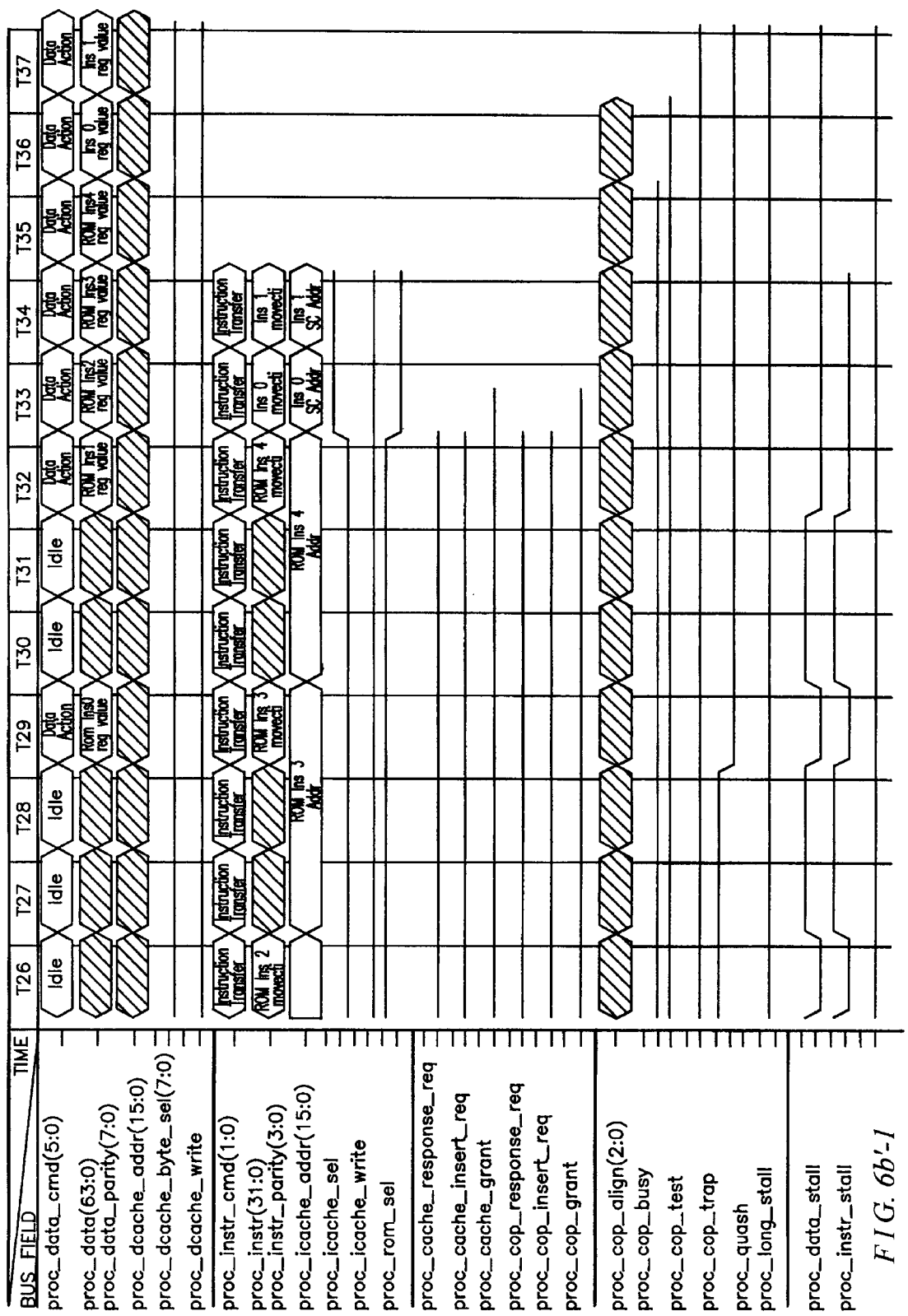
Figure 6C:
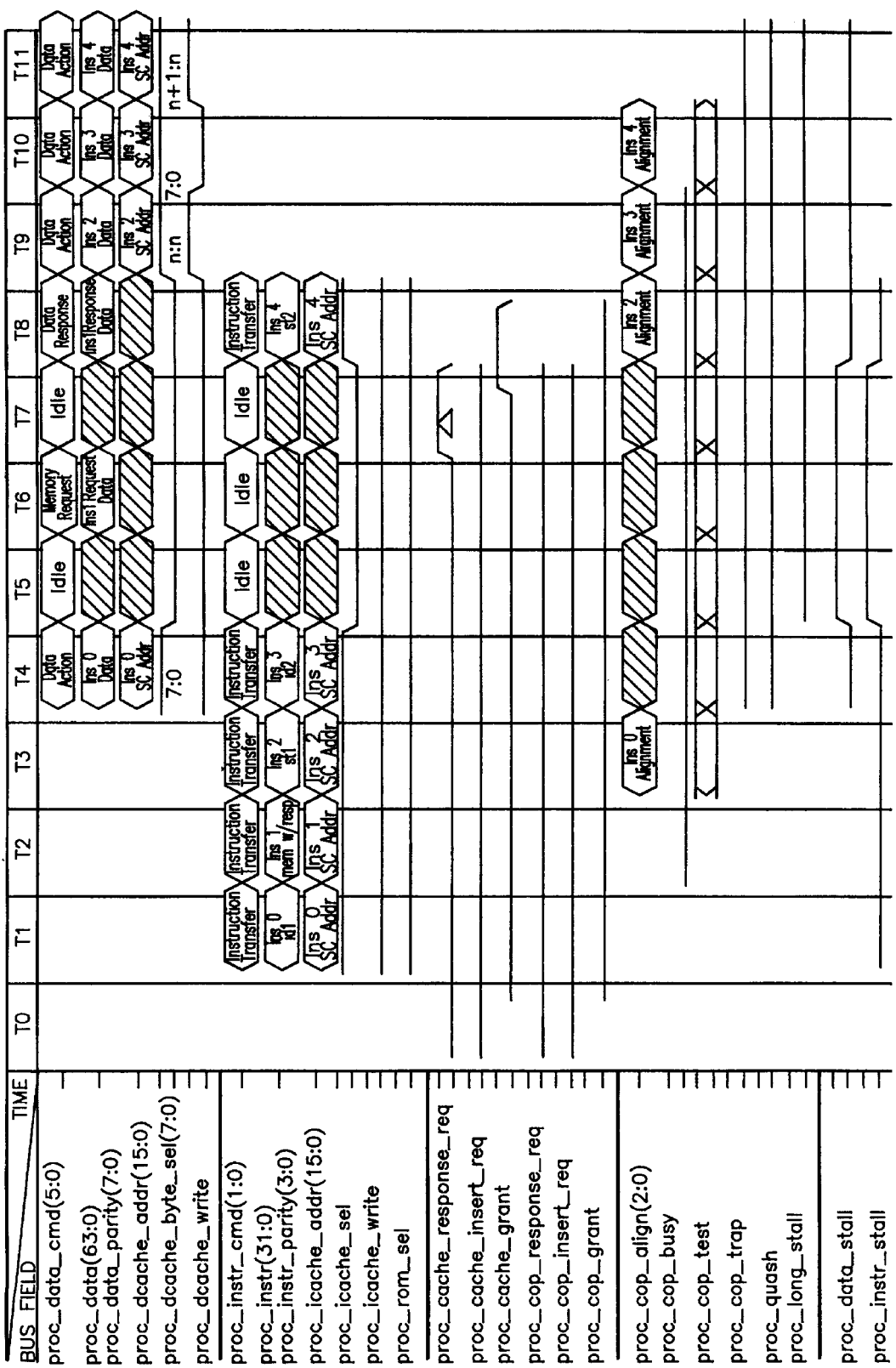

Citations to drawings 1a–6b in the text that follows are to be read as references to FIGS. 1a'–6b', respectively. Likewise, citation to FIG. 1 in the text that follows is to be read as a reference to FIG. 34.

-46-

Roadmap

This chapter defines the KSR processor Interface specification. The processor interface defines the communication between each KSR processor and the cache and the communication among the co-execution units within the processor. The description of the interface is naturally hierarchical. At the lowest level are signals. Signals are individually named wires between the elements of a cell. Signals are grouped together into fields. Each field performs a specific function and has a specific set of data values it can transmit. At the next level, logically related collections or fields perform specific operations. Operations are the smallest unit of communication. At the highest level of hierarchy, the operations on various collections of fields are combined to Create transactions. Transactions represent complete communications. including arbitration, a request, a response, and error reporting.

Peer Level Communication
Each level of the processor interface hierarchy defines a set of objects and a set of actions on these objects. The objects represent a view or the units of the processor. The actions represent communication between these units. Actions are logically communications between peer level units of the hierarchy.

Physical Communication
While peer level communication is a logical communication between units. the Physical implementation of Communication is performed at the lowest level, upon the signals. Thus, each peer level communication is transformed into a set of values on signals. See Figure 34.

Topology
The processor interface serves two functions. It provides communications of data operands and instructions among the elements that comprise the processor and it provides communication from the processor to it,. cache. The elements of a processor include a CPU, an NCEU, two co-processors called COPO and COPI, data RAMs for the data and instruction subcaches, and a ROM ror boot time instruction fetches. Processor interrace bandwidth is 200 mbytes/sec for data operands and 100 mbytes/sec for instructions at 25mhz (40ns cycle time). See wiring appendices and diagrams for details.

-47-

Processor Bus

The processor bus is organized into five groups of related fields. These are:

- Arbitration
- Data
- Instruction
- Control
- Clock

The arbitration fields provides point to point communication from each unit to the CPU which is the controller of arbitration. There are two types of arbitration. Response arbitration reserves cycles on the data or instruction fields to send data. Insertion arbitration reserves a cycle, in the pipeline timing, of each group of fields to insert instructions to the processor. The data and instruction fields provide a broadcast communication to all the units. The instruction fields move instructions and the data fields move system addresses and data. The control fields send information from the CPU to the co-execution units and from each co-execution unit to the CPU. The clock fields distribute timing signals to the units.

The fields of the processor bus have static timing relationships. These relationships are detailed in figure 2. The arbitration signals in cycle $n$ control use of the next cycle of the data and instruction fields and the instruction on the instruction fields in cycle $n$ will perform any data load or store on the data fields in cycle $n+3$.

To provide a better understanding of the implications of the processor bus timing relationships, the CPU pipeline schedule is presented here in figure 3.

-47A-

Arbitration Fields

The arbitration fields provide controlled sharing of the data and instruction fields. The CPU controls use of the data and instruction fields. The arbitration signals are divided into three sets of three signals. Each set is assigned to a specific *unit* where the units are the cache, cop0, and cop1. Each set consists of three signals: a response request, an insertion request, and a grant. The three sets are not distinguished in the discussion that follows, their signals are referred to as proc_*unit*_response_req, proc_*unit*_insert_req, and proc_*unit*_grant. In order to use a cycle on either the data or instruction fields, a co-execution unit must make a request to the CPU with its proc_*unit*_response_req or proc_*unit*_insert_req signal. When appropriate, the CPU will grant the request by asserting proc_*unit*_grant.

The following signals comprise the arbitration fields:

| field | CPU | NCEU | COP0 | COP1 | Cache |
|---|---|---|---|---|---|
| proc_cache_response_req | R | | | | D |
| proc_cache_insert_req | R | | | | D |
| proc_cache_grant | D | | | | R |
| proc_cop0_response_req | R | | D | | |
| proc_cop0_insert_req | R | | D | | |
| proc_cop0_grant | D | | R | | |
| proc_cop1_response_req | R | | | D | |
| proc_cop1_insert_req | R | | | D | |
| proc_cop1_grant | R | | | R | |

Response Arbitration

The proc_*unit*_response_req signal is used by a unit to request a data or instruction cycle in order to respond to an outstanding processor bus request operation. Only one request may be pending on the processor bus. While a request is pending, the processor is always stalled and both the data and instruction fields are idle. proc_*unit*_response_req must be asserted only when the response is ready for the next cycle and the request is still valid. When proc_*unit*_grant is asserted by the CPU, the next cycle is reserved for the specified unit.

Inserted Instruction Arbitration

The proc_*unit*_insert_req signal is used by a unit to request an instruction cycle $n$, the corresponding data cycle $n+3$, and the corresponding cycles on the control fields to insert an instruction. The cache may assert proc_cache_insert_req whenever it has an xtrap instruction to deliver. However, the co-processors must perform a distributed priority comparison before they may request an inserted instruction. The distributed priority comparison provides a mechanism for prioritizing use of the processor bus with a minimum of communication between the units. The basis of distributed priority comparison is three priority values: the cell priority, the transient priority, and the operation priority. Each priority is an eight bit value, with 0 the lowest priority and 255 the highest.

The cell priority is set by a movecU instruction which writes the lcontext register. Every movecU instruction uses its data cycle (the cycle during which it might have done a load or store) to make the value of the control register available to all the co-execution units. In this cycle, each co-execution unit must read the new cell priority and copy it to an internal register. The transient priority is set in each co-execution unit by the execution of one of the external class of instructions (not to be confused with inserted instructions). If the transient priority is not updated after four cycles, the transient priority drops to 0. Each unit must copy the transient priority from the instruction to an internal register.

-48-

Arbitration Fields

The arbitration fields provide controlled sharing of the data and instruction fields. The CPU controls use of the data and instruction fields. The arbitration signals are divided into three sets of three signals. Each set is assigned to a specific *unit* where the units are the cache, cop0, and cop1. Each set consists of three signals: a response request, an insertion request, and a grant. The three sets are not distinguished in the discussion that follows, their signals are referred to as proc_*unit*_response_req, proc_*unit*_insert_req, and proc_*unit*_grant. In order to use a cycle on either the data or instruction fields, a co-execution unit must make a request to the CPU with its proc_*unit*_response_req or proc_*unit*_insert_req signal. When appropriate, the CPU will grant the request by asserting proc_*unit*_grant.

The following signals comprise the arbitration fields:

| field | CPU | NCEU | COP0 | COP1 | Cache |
|---|---|---|---|---|---|
| proc_cache_response_req | R | | | | D |
| proc_cache_insert_req | R | | | | D |
| proc_cache_grant | D | | | | R |
| proc_cop0_response_req | R | | D | | |
| proc_cop0_insert_req | R | | D | | |
| proc_cop0_grant | D | | R | | |
| proc_cop1_response_req | R | | | D | |
| proc_cop1_insert_req | R | | | D | |
| proc_cop1_grant | R | | | R | |

Response Arbitration

The proc_*unit*_response_req signal is used by a unit to request a data or instruction cycle in order to respond to an outstanding processor bus request operation. Only one request may be pending on the processor bus. While a request is pending, the processor is always stalled and both the data and instruction fields are idle. proc_*unit*_response_req must be asserted only when the response is ready for the next cycle and the request is still valid. When proc_*unit*_grant is asserted by the CPU, the next cycle is reserved for the specified unit.

Inserted Instruction Arbitration

The proc_*unit*_insert_req signal is used by a unit to request an instruction cycle $n$, the corresponding data cycle $n+3$, and the corresponding cycles on the control fields to insert an instruction. The cache may assert proc_cache_insert_req whenever it has an xtrap instruction to deliver. However, the co-processors must perform a distributed priority comparison before they may request an inserted instruction. The distributed priority comparison provides a mechanism for prioritizing use of the processor bus with a minimum of communication between the units. The basis of distributed priority comparison is three priority values: the cell priority, the transient priority, and the operation priority. Each priority is an eight bit value, with 0 the lowest priority and 255 the highest.

The cell priority is set by a movecu instruction which writes the Icontext register. Every movecu instruction uses its data cycle (the cycle during which it might have done a load or store) to make the value of the control register available to all the co-execution units. In this cycle, each co-execution unit must read the new cell priority and copy it to an internal register. The transient priority is set in each co-execution unit by the execution of one of the external class of instructions (not to be confused with inserted instructions). If the transient priority is not updated after four cycles, the transient priority drops to 0. Each unit must copy the transient priority from the instruction to an internal register.

-49-

Each operation that requires inserted instructions will have an associated operation priority. The calculation of the operation priority is co-processor implementation specific. For the XIU, the operation priority comes from the lxiu_interrupt register and the XSTT entries. Each cycle that an operation requires an inserted instruction, the unit must compare the operation priority to both the cell and transient priorities. Only if the operation priority is higher than both the cell and transient priority, does the unit assert proc_*unit*_insert_req.

The CPU may not grant an inserted instruction while it is stalled. However, stalls may be interrupted in favor of inserted instructions. See the inserted instruction trap section below.

When proc_*unit*_grant is asserted by the CPU, and the unit has asserted proc_*unit*_response_req, the next cycle is reserved for a response operation. Otherwise, the grant reserves the next instruction cycle for the unit to insert an instruction.

An inserted instruction may be any instruction from the normal instruction set or one of the special inserted instructions. The CPU executes these instructions without changing the normal instruction stream. The instructions from the external instruction class never cause an exception. The CPU simply ignores error status returned to external instructions. However, inserted instructions from the normal classes may causes exceptions. These must be inserted by the co-processor only with the greatest of care.

-50-

Inserted Instruction Arbitration Request Algorithm

The following psuedocode describes the state transitions for the inserted instruction request algorithm executed by co-processors. The switch statement is assumed to execute once per cycle. The inputs to the function are:

cell_priority: the cell priority as maintained by the requestor.
    transient_priority: the transient priority as maintained by the requestor
    state: the current state of the operation
    initiate_request: a boolean value indicate a new operation must begin
    last_cycle_request: a boolean value indicating the unit used the last cycle for a different operation.
    operation_count: the number of instructions in the operation
    operation_priority: the priority of the operation derived in an implementation specific manner.

```
highest_priority = MAX( cell_priority , transient_priority );    /* get higher priority */
next_state = state;                                              /* default */ switch(state)
{
    idle:                                                        /* wait for need to do operation */
        if (initiate_request && (last_cycle_request == FALSE) )
        {
            count = operation_count;                             /* number of consecutive instructions
                                                                    in this operation */
            operation_ok = true;
            if (operation_priority > highest_priority)
                next_state = request_pending;
            else
                next_state = request_wait;
        }
        last_cycle_request = FALSE;
        break;
    request_wait:                                                /* wait for priority */
        if (operation_priority > highest_priority)
            next_state = request_pending;
        break;
    request_pending:                                             /* wait for proc_unit_grant */
        if (proc_unit_grant)
        {
            next_state = do_operation;
            status_begin_wait = status_end_wait = 3;             /* counters to acount for delay of data
                                                                    field behind instruction field */
        }
        else if (operation_priority < highest_priority)
            next_state = request_wait;
        break;
    do_operation:                                                /* work. check error status */
        count--; status_begin_wait--;
        last_cycle_request = TRUE;
        if (count <= 0)
```

-51-

```
            status_end_wait--;
        if (status_begin_wait <= 0)
            operation_ok = operation_status | operation_ok;
        if ( (count <= 0) && (status_end_wait <= 0) )
            next_state = idle;
        break;
    }
state = next_state;
if ( (state == request_pending) ||
    ( (state == do_operation) && (count > 0) ) )
    proc_unit_insert_req = TRUE;      /* request */
else
    proc_unit_insert_req = FALSE;     /* don't request */
```

Arbitration Grant Algorithm

The following table specifies the unit granted (cache, cop0, or cop1) by the CPU as a function of six request signals -- proc_unit_response_req, proc_unit_insert_req -- and the state last_insert_grant and last_cycle. Last_insert_grant specifies the last co-execution unit which was granted from proc_unit_insert_req request. Last_cycle specifies the unit which was granted during the previous cycle. Last_cycle takes on four values: none, cache, cop0, and cop1. Last_insert_grant takes on three values: cache, cop0 and cop1. Trap enable (ctl$context.te) and inserted instruction enable (ctl$context.ie) must be set and the processor not stalled for proc_unit_insert_req requests to be granted. An x indicates a don't care state.

| cache response | cache insert | cop0 response | cop0 insert | cop1 response | cop1 insert | last insert grant | last cycle | unit granted |
|---|---|---|---|---|---|---|---|---|
| 0 | 0 | 0 | 0 | 0 | 0 | x | x | none |
| 1 | x | 0 | x | 0 | x | x | none | cache |
| 0 | x | 1 | x | 0 | x | x | none | cop0 |
| 0 | x | 0 | x | 1 | x | x | none | cop1 |
| 0 | 1 | 0 | 0 | 0 | 0 | x | none | cache |
| 0 | 1 | 0 | 1 | 0 | 0 | cop0 | none | cache |
| 0 | 1 | 0 | x | 0 | x | cop1 | none | cache |
| 0 | 0 | 0 | 1 | 0 | 0 | x | none | cop0 |
| 0 | 0 | 0 | 1 | 0 | 1 | cop1 | none | cop0 |
| 0 | x | 0 | x | 0 | 1 | cache | none | cop0 |
| 0 | 0 | 0 | 0 | 0 | 1 | x | none | cop1 |
| 0 | 1 | 0 | 0 | 0 | 1 | cache | none | cop1 |
| 0 | x | 0 | x | 0 | 1 | cop0 | none | cop1 |
| 1 | x | x | x | x | x | x | cache | cache |
| x | 1 | x | x | x | x | x | cache | cache |
| x | x | 1 | x | x | x | x | cop0 | cop0 |
| x | x | x | 1 | x | x | x | cop0 | cop0 |
| x | x | x | x | 1 | x | x | cop1 | cop1 |
| x | x | x | x | x | 1 | x | cop1 | cop1 |

The first row indicates the trivial case where no request and so no grant is made. The next three rows indicate that if any response request is made, and no operation is in progress, that response is granted. Thus, responses are granted over inserts. Note that two response requests are never made at the same time. The next three sets of three rows each handle the beginning of an insertion. The first row of each set indicates that if one unit requests for insertion it is granted. The next indicates that if two are competing and one was granted last time, the other is granted now. The third indicates that insertions are granted in a round robin fashion from cop0 to cop1 to cache and back to cop0. The last six rows indicate that if the same unit is requesting a cycle as was granted it in the last cycle, it is granted this cycle. This assures that all grants are contiguous.

-53-

Note that the insertion request algorithm requires that a unit dis-assert proc_*unit*_insert_req for one cycle between operations. This prevents the rules of the last six rows from allowing the last unit granted to hold the bus forever.

-54-

Inserted Instruction Request Trap

The CPU may not grant an inserted instruction request while it is stalled awaiting a response. However, if an inserted instruction request is pending and the stall is long, the processor must allow the inserted instruction to proceed in order to limit interrupt latency. To accomplish this, the CPU may perform an inserted instruction request (iir) trap.

The inserted instruction request trap occurs when the following conditions are met:

- The processor is stalled awaiting a response
- a proc_*unit*_insert_req request is asserted by a co-processor or the cache
- proc_long_stall is asserted by the cache, or the CPU is between writebacks for a page flush The first two conditions assure that the iir trap is required. The third condition allows the CPU to stall for short operations but abandon the stall for the inserted instruction as soon as the operation is determined to be long. The proc_long_stall signal indicates that the subpage request will not be answered by the local cache. The page flush writeback is a long sequence which is easily broken between writebacks. Note that requests to SCnA space may not be interrupted. While these may be long in duration, their duration is not shortened by repeated requesting and so no advantage is gained by interrupting them.

The trap point for an inserted instruction trap is set before the instruction which caused the current stall. Thus, this trap looks very similar to an error status returned by the cache. The response operation that the stall was awaiting is quashed by the trap. However, the work done by the request to bring the required data to the local cache is preserved. Thus, when the request is re-issued, the response will arrive immediately.

If an inserted instruction caused the current stall, the CPU simply discards inserted instructions in the pipeline to complete the trap sequence. The co-processor that inserted the instructions must resubmit the instructions.

-55-

Cache Control Unit Arbitration Fields

These fields are used by the cache control unit for arbitration.

proc_cache_response_req
    size:      1 bit
    drivers:   Cache
    receivers: CPU
    description: logical A request from the cache controller to CPU for a processor bus cycle to respond to the pending request operation.

proc_cache_insert_req
    size:      1 bit
    drivers:   Cache
    receivers: CPU
    description: logical A request from the cache controller to CPU for a processor bus cycle to insert an instruction.

proc_cache_grant
    size:      1 bit
    drivers:   CPU
    receivers: Cache
    description: logical Grant from CPU to cache for the next cycle on the processor bus. proc_cache_grant is asserted in response to a request on proc_cache_response_req or proc_cache_insert_req.

-56-

Co-Execution Unit 0 Arbitration Fields

These fields are used by co-execution unit 0 for arbitration.

proc_cop0_response_req
    size:      1 bit
    drivers:   COP0
    receivers:  CPU
    description: logical A request from co-processor 0 to CPU for a processor bus cycle to respond to the pending request operation.

proc_cop0_insert_req
    size:      1 bit
    drivers:   COP0
    receivers:  CPU
    description: logical A request from co-processor 0 to CPU for a processor bus cycle to insert an instruction.

proc_cop0_grant
    size:      1 bit
    drivers:   CPU
    receivers:  COP0
    description: logical Grant from CPU to co-processor 0 for the next cycle on the processor bus. proc_cop0_grant is asserted in response to a request on proc_cop0_response_req or proc_cop0_insert_req.

-57-

Co-Execution Unit 1 Arbitration Fields

These fields are used by co-execution unit 1 for arbitration.

proc_cop1_response_req
    size:    1 bit
    drivers:    COP1
    receivers:    CPU
    description: logical A request from co-processor 1 to CPU for a processor bus cycle to respond to the pending request operation.

proc_cop1_insert_req
    size:    1 bit
    drivers:    COP1
    receivers:    CPU
    description: logical A request from co-processor 1 to CPU for a processor bus cycle to insert an instruction.

proc_cop1_grant
    size:    1 bit
    drivers:    CPU
    receivers:    COP1
    description: logical Grant from CPU to co-processor 1 for the next cycle on the processor bus. proc_cop1_grant is asserted in response to a request on proc_cop1_response_req or proc_cop1_insert_req.

-58-

Data Fields

The data fields provide the broadcast of address, data, and control information to all the units of the processor. Use of the data fields is governed by the arbitration mechanism described previously.

The following fields comprise the data fields:

| Field | CPU | NCEU | COP0 | COP1 | Data Cache | Subcache RAM |
|---|---|---|---|---|---|---|
| proc_data_cmd | DR | R | DR | DR | DR | |
| proc_data | DR | DR | DR | DR | DR | DR |
| proc_data_parity | DR | DR | DR | DR | DR | DR |
| proc_dcache_addr | D | | | | | R |
| proc_dcache_byte_sel | D | | | | | R |
| proc_dcache_write | D | | | | | R |

The proc_data_cmd, proc_data, and proc_data_parity fields are valid in the same cycle. The value on proc_data_cmd defines the operation in progress and the data format of proc_data.

The proc_dcache_addr, proc_dcache_byte_sel, and proc_dcache_write fields are used by the CPU to control the RAMs of the subcache.

The following pages define the data fields.

Data Broadcast Fields

These fields are used by all the units to broadcast data.

proc_data_cmd [7:0]
- size: 8 bits
- drivers: CPU, COP0, COP1, Cache
- receivers: CPU, NCEU, COP0, COP1, Cache
- description: encoded Proc_data_cmd transmits a command. The command identifies the unit which will act on the command and the action to take. In addition, the command implies a data format for proc_data. Refer to *KSR Architecture: Principles of Operation (Chapter 7 Instructions)* for description of memory system instruction and encodings.

| Bit Values | Command | proc_data Format |
|---|---|---|
| 00000000 | Data subpage request, read only | word address |
| 00000001 | Data subpage request, non-exclusive | word address |
| 00000010 | Data subpage request, exclusive | word address |
| 00000011 | Data subpage request, atomic | word address |
| 00000100 | Data subpage request, highest read only | word address |
| 00000101 | Data subpage request, highest non-exclusive | word address |
| 00000110 | Data subpage request, subpage load | word address |
| 00000111 | Upgrade any owner to atomic request | word address |
| 00001xxx | Instruction subpage request | word address |
| | | |
| 00010000 | SPA load request | word address |
| 00010001 | SPA store request | word address |
| 0001001x | reserved | word address |
| 00010100 | SC0A load request | word address |
| 00010101 | SC0A store request | word address |
| 00010110 | SC1A load request | word address |
| 00010111 | SC1A store request | word address |
| | | |
| 000110xx | writeback | word address |
| 00011100 | data store subpage request | word address |
| 00011101 | reserved | |
| 0001111x | reserved | |
| | | |
| 00100000 | response, acknowledge | invalid |
| 00100001 | response, missing page error | invalid |
| 00100010 | response, set full | invalid |
| 00100011 | response, cache error | invalid |
| 00100100 | response data, read only | word data |
| 00100101 | response data, non exclusive | word data |
| 00100110 | response data, exclusive | word data |
| 00100111 | response data, atomic | word data |

| | | |
|---|---|---|
| 00101000 | trap exception | invalid |
| 00101001 | interrupt cache | invalid |
| 00101010 | interrupt cop0 | invalid |
| 00101011 | interrupt cop1 | invalid |
| | | |
| 00101100 | data action | word data |
| 00101101 | deallocate block | word address |
| 0010111x | reserved | |
| 0011xxxx | resereved | |
| 01xxxxxx | reserved | |
| | | |
| 1xxxxxxx | memory system instructions | address and data/ word data |
| | bit[6:5]=instruction[1:0] , bit[4:0]=instruction[18:14] | |

Command Descriptions

Data subpage request

A data subpage request passes the Cache a System Virtual Address and requests that it return the subpage at that address in the state specified in the command. The subpage load type of data subpage request requests the data in read only state and specifies that the data will not be subcached. The data subpage request is always used in a single cycle request operation.

Upgrade any owner to atomic

An upgrade any owner to atomic request is given by the CPU when it would otherwise issue a data subpage request atomic to service a subcache miss but already has the data in an owner state. The upgrade request is answered only with one cycle of error status. In this way, the CPU subcache may keep its copy of the (possibly modified) data.

Instruction subpage request

An instruction subpage request passes the Cache a System Virtual Address and requests that it return the subpage at that address in read only state on the instruction fields. The instruction subpage request is always used in a single cycle request operation.

**S*A load request**

The SPA and SCnA load request passes an system physical or co-execution address to the specified unit and requests that it return the data word at that address. The S*A load request is always used in a single cycle request operation.

**S*A store request**

The SPA and SCnA store request passes a system physical or co-execution address to the specified unit and requests that it store the data word that follow in the next cycle at that address. The S*A store request is always used in a two cycle request operation that begins with the request and is followed by a data action to transmit the data.

Writeback

A writeback action indicates that the next eight data cycles will contain data from the subpage specified in the writeback data cycle. The writeback is always used in a nine cycle operation beginning with a writeback followed by eight data actions to transmit the data of the subpage. Writeback operations occur when the subcache voluntarily ejects data to make room or return a modification to a non-exclusively owned subpage and when it ejects data in response to a specific request by the Cache.

Data store subpage request

A data subpage store request passes the Cache a System Virtual Address and requests that it store the data that follows to the subpage at that address. The data subpage request is always used in a 9 cycle request operation which begins with the data store subpage request and is followed by eight data actions to transmit the data of the subpage.

Response

The response commands are used for response operations. The response acknowledge indicates correct execution of the request. The response missing page indicates that the page requested was not present in the memory system. The response cache error indicates that the request was not fulfilled for other reasons. The remaining response commands are used to return data and indicate the strength that the data is provided at. Data may be provided at a stronger strength than requested, but never at a weaker one.

The response commands are always used in one cycle or eight cycle operations depending on the requirements of the request they answer. Each request has a fixed length response. The CPU responds to subcache invalidation requests with response acknowledge if the data was present and removed without writeback. It responds with response cache error if the data was not present. When the Cache returns response cache error, the error status is described in a CADT entry in the Cache. Bad data errors (uncorrectible ECC) are reported in the cache error class in the cycle that the bad data is transmitted. Thus, on a subpage transfer, the receiver must read each response command to detect any bad data transfer.

Trap Exception, Interrupt

The trap exception and interrupt commands are used by the CPU to indicate the cause of the current trap. A co-execution unit that submits an interrupt request must monitor proc_data_cmd for the next cycle with one of these values to determine if its interrupt was accepted. When the Cache reads trap exception or interrupt on proc_data_cmd, it ends the current transaction by releasing all subpages held in atomic state.

Data action

The data action command accompanies the transmission of valid data whose purpose is understood by context. It is used by the CPU to perform subcache loads and stores and to transmit control register values. It is used in multi-cycle operations to transmit the data portion of the operation.

Deallocate block

The CPU transmits a deallocate block command and the address of the block it has deallocated whenever it deallocates a block from the instruction or data subcache. The instruction subcache block size is one half the data subcache block size. Deallocation is based on the data subcache block size, 1k bytes (*KSR Architecture: Principles of Operation (Chapter 5 Memory)*. Two events might cause a deallocation, a reallocation to make room for new data, or an invalidation request from the Cache. Software convention forbids the presence of a block in both the data and instruction subcache. The cache assumes that a deallocate block command entitles it to clear a subcached bit in its descriptor.

Idle

The idle command is used when the contents of the data fields contain no information.

Memory system instructions

The memory system instructions are used by the CPU to transmit directives to the Cache. The are accompanied by a data transmission whose contents is defined by the specific instruction. All of the memory systems instructions with the exception of the prefetches and memb instructions are requests in that they stall the processor awaiting a response from the cache. Certain of the memory system instructions use the value of the response as a destination register value. Others simply use the value for exception detection. The prefetches and memb instructions do not receive error status from the cache.

proc_data[63:0]

size:        64 bits
    drivers:    CPU, NCEU, COP0, COP1, Cache, Data subcache RAM
    receivers:  CPU, NCEU, COP0, COP1, Cache, Data subcache RAM
    description: encoded Transfers data and address information. The content of proc_data is defined by the contents of proc_data_cmd in the same cycle.

Formats

A word address transmits an System Virtual Address. The data formats for the memory instructions are not shown here. Refer to *KSR Architecture: Principles of Operation (Chapter 7 Instructions)* for description of memory system data formats.

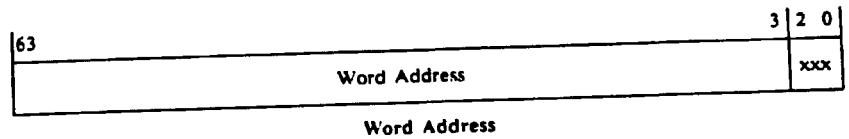

Word Address

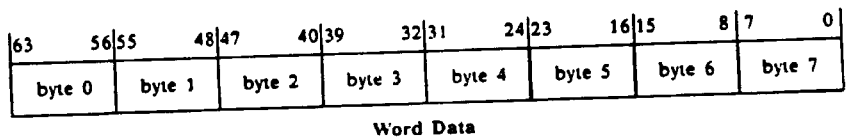

Word Data proc_data_parity[7:0]

size:        8 bits
    drivers:    CPU, NCEU, COP0, COP1, Cache, Data Subcache RAM
    receivers:  CPU, NCEU, COP0, COP1, Cache, Data Subcache RAM
    description: bytewise odd parity Provides byte parity protection for proc_data. The parity is generated so that the sum of eight data bits and one parity bit is odd. Parity is generated on a byte basis for each proc_data transfer. The least significant bit of proc_data_parity corresponds to least significant byte of proc_data. The CPU, NCEU, COP0, COP1, and Cache generate parity when they transmit data and check parity when the receive data. The Data RAMs store and retrieve parity.

| Bit Numbers | Description |
|---|---|
| bit 0 | Odd parity of proc_data[63:56] |
| bit 1 | Odd parity of proc_data[55:48] |
| bit 2 | Odd parity of proc_data[47:40] |
| bit 3 | Odd parity of proc_data[39:32] |
| bit 4 | Odd parity of proc_data[31:24] |
| bit 5 | Odd parity of proc_data[23:16] |
| bit 6 | Odd parity of proc_data[15:8] |
| bit 7 | Odd parity of proc_data[7:0] |

-63-

Data RAM Control Fields

These fields are used by the CPU to control the Data Subcache Rams.

proc_dcache_addr[15:0]
    size: 16 bits
    drivers: CPU
    receivers: Data Subcache RAMs
    description: encoded Word address lines for processor data subcache data RAMs. proc_dcache_addr[15:14] is taken from the group number of the descriptor which represents the data subpage. proc_dcache_addr[13:3] is taken from the system virtual address bits [16:6] of the reference. On a subcache hit, proc_dcache_addr[2:0] is taken from the system virtual address bits [5:3] of the reference. On a subcache maintenance operation proc_dcache_addr[2:0] is generated by the subcache control logic to the series of values 0, 1, 2, 3, 4, 5, 6, 7.

proc_dcache_byte_sel[7:0]
    size: 8 bits
    drivers: CPU
    receivers: Data Subcache RAMs
    description: bitwise logical Byte select lines for processor data subcache data and parity RAMs. Enables data subcache RAMs for data and parity read or write. least significant bit corresponds to RAM connected to least significant byte of proc_data and proc_data_parity.

| bit | |
|---|---|
| bit 0 | Select Data RAM byte on proc_data[7:0], Parity RAM in proc_data_parity[7] |
| bit 1 | Select Data RAM byte on proc_data[15:8], Parity RAM in proc_data_parity[6] |
| bit 2 | Select Data RAM byte on proc_data[23:16], Parity RAM in proc_data_parity[5] |
| bit 3 | Select Data RAM byte on proc_data[31:24], Parity RAM in proc_data_parity[4] |
| bit 4 | Select Data RAM byte on proc_data[39:32], Parity RAM in proc_data_parity[3] |
| bit 5 | Select Data RAM byte on proc_data[47:40], Parity RAM in proc_data_parity[2] |
| bit 6 | Select Data RAM byte on proc_data[55:48], Parity RAM in proc_data_parity[1] |
| bit 7 | Select Data RAM byte on proc_data[63:56], Parity RAM in proc_data_parity[0] | proc_dcache_write
    size: 1 bit
    drivers: CPU
    receivers: Data Subcache RAMs Write enable line for processor data subcache data and parity RAMs. Enables data subcache RAMs for data and parity write.

-64-

Instruction Fields

The instruction fields provide the broadcast of instruction information to all the units of the processor. There are two types of instruction transfer, an instruction fetch from the subcache and an instruction insertion by a co-execution element. Use of the instruction fields is governed by the arbitration mechanism described previously.

The following fields comprise the instruction fields:

| Field | CPU | NCEU | COP0 | COP1 | Cache | Instr Subcache RAM | ROM |
|---|---|---|---|---|---|---|---|
| proc_instr_cmd | DR | DR | DR | DR | DR | | |
| proc_instr | DR | DR | DR | DR | DR | DR | D |
| proc_instr_parity | DR | DR | DR | DR | DR | DR | D |
| proc_icache_addr | D | | | | | R | R |
| proc_icache_sel | D | | | | | R | |
| proc_icache_write | D | | | | | R | |
| proc_rom_sel | D | | | | | | R |

The proc_instr_cmd, proc_instr, and proc_instr_parity fields are valid in the same cycle. The value on proc_instr_cmd defines the operation in progress and the data format of proc_instr.

The proc_icache_addr, proc_icache_sel, proc_rom_sel, and proc_icache_write fields are used by the CPU to control the RAMs of the subcache and the instruction ROMs.

The following pages define the instruction fields.

-65-

Instruction Broadcast Fields

These fields are used by all the units to broadcast instructions.

proc_instr_cmd [1:0]
    size:      2 bits
    drivers:   CPU, COP0, COP1, Cache
    receivers: CPU, NCEU, COP0, COP1, Cache
    description: encoded Proc_instr_cmd transmits a command. The command identifies the unit which will act on the command and the action to take. In addition, the command implies a data format for proc_instr.

| Bit Values | Command | proc_data Format |
|---|---|---|
| 00 | Idle | Invalid |
| 01 | Instruction Transfer | Instruction |
| 10 | Missing Page Error | Invalid |
| 11 | Cache Error | Invalid |

The Instruction Transfer command is used both for subcache fetches and successful cache responses. Cache response errors are all reported with missing page error and cache error. Note that the Error data command used on the proc_data_cmd field to return data with uncorrectable ECC errors is not present here. If a cache error is reported, further information is stored in the cache CADT.

proc_instr[31:0]
    size:      32 bits
    drivers:   CPU, COP0, COP1, Cache, Subcache RAMs, ROMs
    receivers: CPU, NCEU, COP0, COP1, Cache, Subcache RAMs
    description: encoded Transfers instruction data. The contents of proc_instr is defined by proc_instr_cmd and the instruction encodings.

proc_instr_parity[3:0]
    size:      4 bits
    drivers:   COP0, COP1, Cache, Subcache RAMs, ROMs
    receivers: CPU, NCEU, COP0, COP1, Cache, Subcache RAMs
    description: bytewise odd parity Provides byte parity protection for proc_instr. The parity is generated so that the sum of eight instr bits and one parity bit is odd. Parity is generated on a byte basis for each proc_instr transfer. The least significant bit of proc_instr_parity corresponds to least significant byte of proc_instr. The CPU, COP0, COP1, and Cache generate parity when they transmit data and check parity when the receive data. The Instruction RAMs store and retrieve parity.

| Bit Numbers | Description |
|---|---|
| bit 0 | Odd parity of proc_instr[31:24] |
| bit 1 | Odd parity of proc_instr[23:16] |
| bit 2 | Odd parity of proc_instr[15:8] |
| bit 3 | Odd parity of proc_instr[7:0] |

-66-

Instruction RAM and ROM Control Fields

These fields are used by the CPU to control the Data Subcache RAMs and the instruction ROMs.

proc_icache_addr[15:0]
    size: 16 bits
    drivers: CPU
    receivers: Subcache RAMs, ROMs
    description: encoded Half word address lines for processor instruction subcache RAMs and ROMs. Proc_icache_addr[15:14] is taken from the group number of the descriptor which represents the instruction subpage. proc_icache_addr[13:3] is taken from the system virtual address bits [15:5] of the instruction reference. On a subcache hit, proc_icache_addr[2:0] is taken from the system virtual address bits [4:2] of the instruction reference. On a subcache maintenance operation proc_icache_addr[2:0] is generated by the subcache control logic to the series of values 0, 1, 2, 3, 4, 5, 6, 7.

proc_icache_sel
    size: 1 bit
    drivers: CPU
    receivers: Subcache RAMs
    description: logical Select line for processor instruction subcache data and parity RAMs. Enables instruction subcache RAMs for data and parity read or write.

proc_icache_write
    size: 1 bit
    drivers: CPU
    receivers: Subcache RAMs
    description: logical Write enable line for processor instruction subcache data and parity RAMs. Enables instruction subcache RAMs for data write.

proc_rom_sel
    size: 1 bit
    drivers: CPU
    receivers: ROMs
    description: logical Enables instruction ROMs for data and parity read.

Control Fields

The control fields provide information sharing between the CPU and the other elements of the processor. The pipeline timing of the control fields is different for each field and given with the field description. The control fields are all dedicated to a specific and simple function.

The following fields comprise the control fields:

| field | CPU | NCEU | COP0 | COP1 | Cache |
|---|---|---|---|---|---|
| proc_cell_reset | R | | | | D |
| proc_reset_out | D | R | R | R | R |
| proc_cop_align | D | R | R | R | |
| proc_quash | D | R | R | R | |
| proc_data_stall | D | R | R | R | |
| proc_instr_stall | D | R | R | R | |
| proc_cop_busy | R | D | D | D | |
| proc_nceu_trap | R | D | | | |
| proc_cop0_trap | R | | D | | |
| proc_cop1_trap | R | | | D | |
| proc_nceu_test | R | D | | | |
| proc_cop0_test | R | | D | | |
| proc_cop1_test | R | | | D | |
| proc_long_stall | R | | | | D |
| proc_cadt_full | R | | | | D |

The proc_cop_align, proc_quash, proc_reset_out, proc_data_stall, and proc_instr_stall fields pass information to control the pipelines from the CPU to the co-execution units.

The proc_cop_busy, proc_cop_trap, proc_cop0_test, proc_cop1_test, and proc_nceu_test fields send status information to the CPU.

The proc_long_stall, proc_cadt_full, and proc_cell_reset fields send information on cache and system status from the Cache to the CPU.

The following pages define the control fields.

-68-

Control Pipeline Information Fields

These fields are used by the CPU to control the pipelines of the co-execution units.

proc_cop_align[2:0]
    size:      1 bit
    drivers:   CPU
    receivers:  COP0, COP1, NCEU
    description: encoded Data alignment for next proc_data load/store. Taken from System VirtualA[2:0]. The proc_cop_align field in conjunction with the data size specified by the instruction allows the co-execution units to properly align data for loads and stores. See *KSR Architecture: Principles of Operation (Chapters 2 and 7)* for details.

proc_quash
    size:      1 bit
    drivers:   CPU
    receivers:  COP0, COP1, NCEU
    description: logical Proc_quash is asserted by the CPU in cycle n+3 to indicate that the instruction fetched in cycle n is to be quashed. See *KSR Architecture: Principles of Operation (Chapter 6)* for details of quashing.

proc_reset_out
    size:      1 bit
    drivers:   CPU
    receivers:  NCEU, COP0, COP1, Cache
    description: logical Signals a reset from CPU to remainder of cell. Asserted for at least sixteen clocks to signal reset.

proc_data_stall
    size:      1 bit
    drivers:   CPU
    receivers:  NCEU, COP0, COP1
    description: logical The CPU asserts proc_data_stall to indicate that the current clock period of the data fields does not advance the data side of the pipeline. During a clock period that proc_data_stall is dis-asserted, the data pipeline advances to the next cycle, using the data on proc_data for the current cycle. May be used to stall a data pipeline clock in the co-execution units or to trigger a loopback mechanism to properly handle stalled loads and stores.

proc_instr_stall
    size:      1 bit
    drivers:   CPU
    receivers:  NCEU, COP0, COP1
    description: logical The CPU asserts proc_instr_stall to indicate that the current clock period of the instruction fields does not advance the instruction side of the pipeline. During a clock period that proc_instruction_stall is dis-asserted, the instruction pipeline advances to the next cycle, using the data on proc_instr for the current cycle. May be used to stall an instruction pipeline clock in the co-execution units or to trigger a loopback mechanism to properly handle stalled instruction fetches.

Co-Processor Control Information Fields

These signals provide status information from the co-processors to the CPU.

proc_cop_busy

- size: 1 bit
- drivers: NCEU, COP0, COP1
- receivers: CPU
- description: logical Proc_cop_busy is asserted by a co-execution unit while it is executing a multi-cycle instruction. It is asserted for one cycle less than the resource time beginning in the cycle after the instruction is fetched. proc_cop_busy is used by the CPU only on traps to await the completion of all co-execution.

Proc_cop_busy must be implemented so that its value is the logical and of the values driven to it. If any unit asserts proc_cop_busy, the CPU will read it as asserted. Only if all units dis-assert proc_cop_busy does the CPU read it as dis-asserted.

proc_nceu_trap / proc_cop0_trap / proc_cop1_trap

- size: 1 bit
- drivers: NCEU / COP0 / COP1
- receivers: CPU
- description: logical In this description and those that follow proc_nceu_trap, proc_cop0_trap, and proc_cop1_trap are not distinguished, but refered to each as proc_unit_trap. proc_unit_trap requests an exception trap on behalf of the co-processor unit. The trap status of an instruction is transmitted one clock plus the result time of the instruction after it is fetched. Thus, if proc_cop_trap is asserted in cycle $n$ any store in cycle $n+1$ must be quashed by the CPU. The CPU may sample proc_cop_trap each cycle. However, the co-execution unit must assert it only at the specified time. In this way, exception trap timing remains precise without the CPU needing to know the specifics of co-execution unit instructions.

proc_nceu_test / proc_cop0_test / proc_cop1_test

- size: 3 signals, 1 bit each
- drivers: NCEU / COP0 / COP1
- receivers: CPU
- description: logical In this description and those that follow proc_nceu_test, proc_cop0_test, and proc_cop1_test are not distinguished, but refered to each as proc_testunit_test. Each proc_testunit_test indicates to the CPU the status of a co-execution unit's test bit. This bit is used to perform conditional branching based on co-execution unit tests. The test bits are modified by ntst instructions and subject to the result delay of the particular instruction. A one cycle ntst instruction fetched in cycle $n$ will change proc_testunit_test in cycle $n+2$, in time for the instruction fetched in cycle $n+1$ to test it.

When reset is asserted, each co-processor asserts its test bit and so its proc_testunit_test signal to indicate its presence. When reset is dis-asserted, the co-processors do not dis-assert their test bit or proc_testunit_test signal until an ntsts instruction causes them to.

-71-

Control Cache Information Fields

These fields are used by the Cache to pass status information to the CPU.

proc_long_stall
    size: 1 bit
    drivers: Cache
    receivers: CPU
    description: logical Proc_long_stall indicates to the CPU that the current stall will not be resolved by the cache quickly.

Proc_long_stall is dis-asserted on the cycle after a request is received by the cache. While it is dis-asserted, the CPU will not interrupt its stall with an iir trap. If the local cache can service the request, it should not assert proc_long_stall, and present its response. As soon as the local cache determines that a domain operation will be required to service the request, it should assert proc_long_stall allowing the CPU to interrupt its stall for inserted instructions.

proc_cadt_full
    size: 1 bit
    drivers: Cache
    receivers: CPU
    description: logical Proc_cadt_full indicates to the CPU that the cache's CADT table is full and new requests can not be serviced. If the CPU must make a request to the Cache and proc_lcadt_full is asserted, the CPU will stall until it is dis-asserted.

proc_cell_reset
    size: 1 bit
    drivers: Cache
    receivers: CPU
    description: logical Signals a reset from Domain. Asserted for at least sixteen cycles to signal reset.

Clock Fields

The clock fields provide timing and reset signals.

The following fields comprise the clock fields:

| field | CPU | NCEU | COP0 | COP1 | Cache |
|---|---|---|---|---|---|
| proc_2x_clock | R | R | R | R | R |
| proc_sync | D | R | R | R | R | proc_2x_clock
- size: 1 bit
- drivers: Clock
- receivers: CPU, NCEU, COP0, COP1, Cache
- description: clock 50-80 MHz clock used to generate internal chip clocks including phase1, phase2, and transmit clocks.

proc_sync
- size: 1 bit
- drivers: CPU
- receivers: NCEU, COP0, COP1, Cache
- description: logical Indicates that the current proc_2x_clock cycle is phase 1.

Instruction and Data Field Operations

Before a unit can perform an operation on the instruction or data fields, it must perform arbitration on the arbitration fields. There are three types of arbitration operation:

Types of Arbitration
Data Response Arbitration
Data response arbitration is used by a unit to respond to a request for data. It is illustrated in diagram 1c.

Instruction Response Arbitration
Instruction response arbitration is used by a unit to respond to a request for instructions. It is illustrated in diagram 1e.

Inserted Instruction Arbitration
Inserted instruction arbitration is used by a unit to request to insert an instruction. It is illustrated in diagram 3a.

An operation on the instruction or data fields consists of one or more consecutive cycles of the bus. There are three types of operation: actions, requests, and responses.

Actions
Instruction and data field actions are operations on the fields that do not request any corresponding response operation. These include instruction fetches and insertions, data loads and stores to subcache, and transmission of prefetch memory instructions to the cache.

Requests
The CPU may make a request to one of the other processing elements. Requests are data field operations that require a response operation on either the instruction or data fields. These include data subpage and instruction subpage fetches, SPA and SCnA space loads and stores, and subpage loads and stores. A request is valid only until it is answered or the CPU dis-asserts proc_data_stall to stop awaiting it. A unit should continue to service an invalidated request but must not send the final response.

Responses
Response operations are made to satisfy request operations. A response operation will transmit data or error status on either the data or instruction fields. All responses are of a fixed length determined by the request type. Thus, an error response to a subpage request will be repeated 8 times.

Table of Operations

All the operations on the instruction and data fields are presented here:

| Operations on the Data Fields | # of Cycles | Shown in diagram#/cycle# |
|---|---|---|
| *Actions* | | |
| Idle | 1 | 1c / t5 |
| Subcache load, store | 1 | 1a / t4, t5 |
| Subcache subpage load, store | 8 | 1b / t5 - t12 |
| Memory instruction, control register | 1 | 6a / t5 |
| Data writeback | 9 | 1h / t6 - t14 |
| *Requests* | | |
| Data subpage request | 1 | 1c / t6 |
| Instruction subpage request | 1 | 1e / t6 |
| Subpage Load Request | 1 | 1f / t6 |
| Subpage Store Request | 1 | 1g / t6 - t14 |
| SCnA/SPA space load request | 1 | 4a / t6 |
| SCnA/SPA space store request | 2 | 4b / t6 - t7 |
| Memory Instruction Request | 1 | 6c / t5 |
| *Responses* | | |
| Data subpage response* | 8 | 1c / t10 - t17 |
| SCnA/SPA space load response | 1 | 4a / t10 |
| SCnA/SPA space store response | 1 | 4b / t10 |
| Subpage store acknowledge | 1 | 1g / t15 |
| Memory Instruction Response | 1 | 6c / t8 |
| Error Response | 1/8 | (2b) |

\* The subcache store operation following a subpage response must come in the first cycle after the response.

| Operations on the Instruction Fields | # of Cycles | Shown in diagram # |
|---|---|---|
| *Actions* | | |
| Idle | 1 | 1c / t5 |
| Subcache instruction fetch | 1 | 1a / t1 |
| Rom instruction fetch | 3 | 6b / t1 - t3 |
| Instruction insertion | 1 | 3a / t2 |
| *Responses* | | |
| Instruction subpage response | 8 | 1e / t10 - t17 |
| Error Response | 1/8 | (2b) |

Processor Bus Transactions

The processor bus transactions are actions or combinations of requests and responses. The transactions are listed and described below and illustrated in the attached diagrams.

In the diagrams all signals are shown as active high. The values shown in proc_data_cmd and proc_instr_cmd are the names of the commands given above. The values in proc_data, proc_dcache_addr, proc_instr, proc_icache_addr, and proc_cop_align are illustrative. A binary value shown with both the high and low value is in a specific but unknown state. An encoded value shown filled with a diagonal cross hatching is in a don't care state. The numbers m:n shown when proc_dcache_addr is asserted indicate which lines of proc_dcache_addr are in fact asserted. While there are three sets of the proc_testunit_test signals, only one set is shown in the diagrams.

Each diagram is meant to illustrate a specific transaction. Before the transaction begins and after it ends a number of normal load and store subcache hits are shown to establish the context of the operation.

These diagrams are meant to be viewed in the order presented. Details described in an earlier diagram will not be repeated in the description of later ones.

Cache and Subcache Transactions

1a. Instruction/Data Subcache Hits

This diagram shows a sequence of eight instructions which perform loads and stores. In each cycle, the proc_data_cmd and proc_instr_cmd fields are driven by the CPU. The proc_instr and proc_instr_parity fields are driven by the instruction subcache RAMs as specified by proc_icache_sel. During the data loads -- t4, t6, t7, t8 -- the proc_data and proc_data_parity fields are driven by the data subcache RAMs. The entire word is read from the RAM and load aligned by the target co-execution unit. During the data stores -- t5, t9, t10, t11 -- the proc_data and proc_data_parity fields are driven by the unit -- CPU, NCEU, COP0, or COP1 -- specified by the instructions in t2, t6, t7, and t8 respectively and written into the bytes of the RAMs as specified by proc_dcache_byte_sel.

Since each of the eight operations here forms a complete transaction, any other operation can be placed between any two cycles of this example.

1b. Subpage Store Subcache Hit

The subpage store subcache hit operation is performed during cycles t5 through t12 on the data fields. In each of these cycles the CPU drives proc_data_cmd and generates the next value for proc_dcache_addr by incrementing the word address just as it would during a data subpage response from the Cache. The co-execution unit specified by the stsp instruction fetched in cycle t2 drives the appropriate data to be written to the subcache. The instructions ex0 through ex6 fetched in cycles t3 through t9 do not get any data bus cycle as their cycles are used by the stsp instruction. Unlike the normal load and store operations, the subpage store hit operation requires eight consecutive data bus cycles. No inserted instructions or data field stalls can occur between t5 and t12. The alignment information is not used by the stsp instruction or any of ex0 through ex6 so the value of cop_align is not significant.

A subpage load hit operation is exactly the same except that the CPU dis-asserts proc_dcache_write in order to make the data subcache RAMs drive proc_data. The co-execution unit specified by the ldsp instruction reads rather than writes the eight data transfers.

1c. Data Load Subcache Miss

The data load subcache miss transaction is performed during cycles t5 through t17. Cycles t0 through t4 and t18 through t21 are normal subcache load and store hits. In cycle t5, the CPU detects a miss for the subcache load instruction fetched in cycle t2. The CPU idles both the instruction and data fields and asserts proc_data_stall and proc_instr_stall to indicate to the co-processors that a miss has occurred. In cycle t6 the CPU performs a data subpage request operation on the data fields, sending the miss address for lookup to the cache on proc_data and the required subcache state on proc_data_cmd. In cycles t7 through t9 the CPU idles both instruction and data fields, while it awaits a response operation from the cache.

The response operation in this example begins in cycle t9 when the cache asserts proc_cache_response_req. In other cases, where the data is not staged in the Cache or not in the local cache, the response might come later. The CPU asserts proc_cache_grant in response to proc_cache_response_req and in cycle t10 the cache response data transfer begins. The cache asserts proc_cache_response_req for the eight cycles t9 through t16 to reserve eight consecutive data field cycles. During these eight data field cycles, t10 through t17, the cache sends data responses. At the same time, the CPU uses proc_dcache_byte_sel and proc_dcache_write to write the response data into the data subcache RAMs. In one of cycles t10 through t17 the CPU dis-asserts proc_data_stall to indicate that the data at that time on the data fields corresponds to the data word targeted by the load instruction. In this example the load instruction referenced the first data word of the subpage so the CPU dis-asserts proc_data_stall during t10. During the last data transfer, t17, the CPU dis-asserts the proc_instr_stall signal to allow the instruction side of the pipeline to process the cycle that the data side performed in t10. Finally, in cycle t18, the CPU dis-asserts both proc_instr_stall and proc_data_stall to allow the pipeline to resume normal execution.

Since this stall was serviced by the local cache, the proc_long_stall was never asserted. Had the required data not been found by the Cache it would have asserted proc_long_stall to allow the CPU to take inserted instructions while the Cache performs a system bus data lookup.

1d. Data Store Subcache Miss

The store subcache miss is handled like a load subcache miss except that the cycle after the last data transfer from cache to subcache does the store operation to subcache. Note that the load miss may be handled this way as well. It is crucial that the store be the very cycle after the last data response so the co-processors know when to drive their data onto proc_data for a co-execution unit store (cst).

1e. Instruction Subcache Miss

The instruction subcache miss is similar to a load subcache miss. Instead of toggling proc_data_stall, the CPU toggles proc_instr_stall when the appropriate instruction is on proc_instr. The CPU also drives the instruction subcache RAM control fields to write the data into the RAMs.

A data and instruction miss occur simultaneously if instruction n is not in subcache and the data for instruction n-3 is not in subcache. In this case handle the data miss first since the instruction which caused the data miss is ahead in the pipeline.

1f. Subpage Load Miss

The subpage load miss is very similar to the load miss. The command sent by the CPU in cycle t6 is different to specify that the data will not be subcached. The data is not read into the subcache RAMs. The proc_data_stall and proc_instr_stall lines are dis-asserted earlier to restart the pipelines. Instruction fetching resumes when the first data word is transferred in cycle t10.

If an instruction miss occurs in the result delay of the subcache load ( or store ) miss the instruction pipeline freezes while the load miss completes. Then, the instruction miss is serviced and both pipelines restarted. See 1i.

-77-

*1g. Subpage Store Miss*

The subpage store miss results in a subpage store request from the CPU to the Cache. In cycle t6, the CPU sends the System Virtual address of the subpage and a store request. In t7 through t14 it sends the data to store. After the data is sent, the CPU awaits an acknowledgment from the Cache. Here, the Cache has an acknowledgment ready by t12 as indicated by proc_cache_response_req asserted. Had the response not been ready, the CPU would have stalled between cycles t14 and t15 awaiting the acknowledgment. Instead, it asserts proc_cache_grant and the Cache sends an acknowledgment in cycle t15. Notice that both the instruction and data fields stall (proc_instr_stall and proc_data_stall) in t5, t6, and t15.

Had the response been an error, the store would not have occurred and the CPU would take an exception.

The Cache must not actually perform the store until it sends the acknowledgment. This allows the CPU to make the wait for acknowledgment stall interruptibly. If it is interrupted, the store and acknowledgment are quashed by the trap exception or interrupt command on proc_data_cmd and repeated later.

*1h. Set Full – Data Load Subcache Miss with Pre Writeback*

If no room is available for a required subpage, the CPU must clear a page by writing back all modified subpages of that page. These writebacks must come before the new subpage is requested. Here only one writeback is shown. Many may be placed in a row. While the CPU is clearing a page with successive writebacks, if any proc_*unit*_insert_req request is asserted, the CPU will perform an iir trap at the completion of the current writeback. Thus, long page flushes from subcache do not delay crucial inserted instructions.

Notice that in the load response from the Cache proc_data_stall is dis-asserted in cycle t21 to capture the second word of the subpage for the load.

This transaction may be followed by a deallocate block if the invalidation deallocated a block.

*1i. Data Load Subcache Miss with Post Writeback*

During any data miss, a dirty subpage may be written back after the request but before the response. Here in cycle t6 a data subpage request is made and in t7 a writeback started. Much of the bus work of the writeback is buried in the stall period waiting for the Cache to respond. In this example the Cache response is not ready when the writeback completes in cycle t15 so the CPU idles the bus and stalls awaiting the assertion of proc_cache_response_req by the Cache. If the Cache had asserted proc_cache_response_req in or before cycle t15, the CPU would have asserted proc_cache_grant in phase 2 of t15 and started the response with no idle data field cycles. Usually the response will be ready before the writeback ends if the data is in the local cache.

Note that this example is just like 1h except it involves rearranging the order of operations on the data fields.

*1j. Subpage Store Miss with Instruction Miss*

This diagram shows how the instruction fields are stalled if an instruction fetch miss occurs during a subpage store miss. The results would be very similar had it been a subpage load or had the subpage operation not missed the subcache. When the fetch miss is detected, the CPU idles the instruction fields until the subpage operation completes. When it completes, with a response on proc_data_cmd in t15, the CPU issues the instruction subpage request in t16 and resumes normal execution. Note that some of the ex# instructions get data field cycles they would not normally have. However, these cycles are idle since the instructions in the subpage operation's result delay must not use the data fields.

-78-

1k. Upgrade to Atomic

A load atomic instruction requires the CPU to fetch the data into the subcache in atomic state. If the data is already present in the subcache in an owner state, the CPU does not issue the normal data subpage request atomic, but instead issues an upgrade any owner to atomic. This action requires a single cycle response of either acknowledgment (response acknowledge) or error report (response cache error). An error report indicates that the CADT table in the Cache is full.

This diagram is exactly the same as diagram 1a except that the upgrade transaction is inserted in cycles t6 through t11 between the data cycles of instructions 1 and 2.

-79-

Traps

2a. Trap detected in CPU

This diagram shows the bus operations that occur when an exception is detected by the CPU. Cycles t1 through t4 represent normal execution of the program. Cycles t10 and t11 of the instruction fields and t13 and t14 of the data fields are normal execution of the trap handler. In cycle t5, the CPU detects the exception and so quashes the store of instruction 1 by idling the data fields. In cycles t6 through t9, the CPU idles the instruction and data fields while it performs the trap sequence. Cycle t7 represents the decision point to take the exception trap. Had a co-processor been busy, as indicated by proc_cop_busy, the CPU would have idled the bus longer between t6 and t7 to allow the co-processor to complete its activity (see diagram 5d). In the data field cycle corresponding to the instruction in t7 (data cycle t10), the CPU performs the exception action on proc_data_cmd to indicate that an exception is being processed. By cycle t10 the trap sequence is over and the CPU resumes fetching instructions and by cycle t13 the data bus is activated again for the instruction fetched in t10. During the entire trap sequence, cycle t5 through t12, the CPU asserts proc_quash to indicate that the instructions fetched in cycles t2 through t9 are not valid instructions. The *1, *2, and *3 idle cycles in t7, t8, and t9 are the cycles during which the CPU performs the trap sequence.

2b. Trap detected on Data Cache Request

This diagram shows an exception sequence generated because the cache returns a missing page fault to a data subcache request. Until cycle t10 this is exactly the data load miss sequence of diagram 1c. In cycles t10 through t17, the cache does not return data, but the missing page status on proc_data_cmd. In these cycle the CPU writes invalid data into its cache RAMs where it was to allocate the subpage. This subpage must be invalidated. The CPU begins a trap sequence by asserting proc_quash dis-asserting the proc_data_stall and proc_instr_stall signals, and idling the data and instruction fields. By cycle t16, the CPU has completed the trap sequence and begins to fetch instructions from the trap handler. In cycle t19 the data cycle of the first instruction of the trap handler begins and the CPU dis-asserts proc_quash. Since the CPU dis-asserts proc_data_stall for the cycle when the data word would have been present on proc_data (t15), the target unit sees the error status in the pipeline where the data was to have been delivered.

All errors reported on the data and instruction fields are handled in this manner. The specific timing of various situations will vary. The cases of multiple errors or of particular interest. All must be examined carefully in the implementation. They include:

ld/st, ld/st, ld/st, (missing instruction fetch)
ld/st, ld/st, ld/st (missing data fetch), (missing instruction fetch)
ld/st, ld/st (missing data fetch), ld/st, (missing instruction fetch)
ld/st (missing data fetch), ld/st, ld/st, (missing instruction fetch)
Data field parity error
Instruction field parity error
ldsp/stsp, (missing instruction fetch)

These are similarly treated. The two cycles when the pipeline is restarted (t12 and t13) allow the pipeline to flush instructions before the trap. As an example, in an instruction miss which receives a missing page, these cycles will perform the load and store operations of the two instructions before the one that caused the fault.

The error status for a missing page instruction request is sent up proc_instr_cmd.

-80-

Inserted Instructions

3a. Inserted Load ( hit )

This diagram shows an inserted sequence of four instructions for a co-processor initiated load or store. The instructions fetched in cycles t1 and t6 are part of the instruction stream and have normal data field phases in cycles t4 and t9 respectively. In cycle t1 the co-processor asserts proc_cop_insert_req to request an inserted instruction. The CPU answers by asserting proc_cop_grant. The co-processor continues to assert proc_cop_insert_req through cycle t4 to reserve instruction field cycles t2 through t5. The CPU grants all of these cycles (having granted the first it must grant the remaining). In cycles t2 through t5, the CPU disables the instruction cache to allow the co-processor to insert its instructions. The CPU continues to drive proc_instr_cmd, but the co-processor drives proc_instr. The first inserted instruction reserves data field cycle t5 to transmit an address. In t5, the co-processor drives an System Virtual address onto proc_data and the CPU reads this address. Again, the CPU drives proc_data_cmd as required by the instructions it processes. In cycle t8, the CPU fetches the data at the System Virtual address supplied in t5 from the subcache and the co-processor reads it from proc_data. Note that the address is not translated by the CPU STT, but simply looked up in its subcache descriptors. Cycles t6 and t7 have no data operation, so the CPU drives idle onto proc_data_cmd. Notice that the alignment for the xld instruction is supplied from the address transmitted in cycle t5.

3b. Triple Inserted Load/Store ( hit )

The triple inserted load/store looks just like a single load/store except that the two nop inserted instructions are replaced by xaddr instructions and two more load/store operations are placed at the end of the sequence. Double loads are also possible. The addresses and load/store types of the three instructions may be completely unrelated.

3c. Inserted Subpage Load ( hit )

The inserted subpage operation is a sequence of 11 consecutive inserted instructions. The co-processor must use proc_cop_insert_req to reserve the 11 necessary cycles. The first instruction transmits the System Virtual address of the subpage to the CPU. In cycle t5, the co-processor drives the address onto proc_data for the CPU to read. The CPU drives proc_data_cmd throughout the sequence. The two nops inserted in cycles t3 and t4 delay while the address propagates in the CPU. In cycle t5, the co-processor inserts an xldsp instruction and in the next seven cycles inserts seven instructions that do not use the data bus. Here the seven inserted instruction are nops (with a * after to signify that they may not use the data bus). In the eight data field cycles corresponding to the xldsp and seven nops, data field cycles t8 through t15, the CPU reads the required subpage of data from the RAMs onto the data field and the co-processor reads these values.

An inserted subpage store looks just the same except that the co-processor drives the eight values to store during data field cycles t8 through t15 and the CPU writes these values into the RAMs.

3d. Subcache Invalidation Request with Acknowledegement

The subcache invalidation request instruction is inserted as a four instruction sequence from the Cache. The first instruction passes the System Virtual address of the subpage to invalidate. The next two stall while the address enters the CPU, the fourth requests the invalidation. In this diagram, the invalidation requires simply an acknowledgment and that ackowledgement is passed in the data field cycle of the xcache instruction by the CPU to the CPU. Because the invalidation requires extra work in the CPU, it causes the CPU to create a stall cycle in t8 and delivers the acknowledgment in cycle t9.

There are three valid acknowledgment command, response acknowledge and response cache error and writeback. A response acknowledge indicates that the data was present and has been removed. Response cahce error indicates that the data was not present. A writeback operation results from a invalidation request if the data is modified in the subcache (see diagram 3e).

The maximum state that the subcache may keep the subpage in is indicated in the xcache instruction.

This transaction may be followed by a deallocate block if the invalidation deallocated a block.

3e. Subcache Invalidation Request with Writeback

The invalidation with writeback looks just like the invalidation with acknowledgment (3d) except that the acknowledgment command in t9 is replaced by the CPU with a writeback and that is followed by eight data actions to transfer the data from the subcache RAMs to the Cache. During these eight cycles, t10 through t17, the CPU stalls both the data and instruction pipelines by asserting proc_data_stall and proc_instr_stall.

This transaction may be followed by a deallocate block if the invalidation deallocated a block.

3f. Interrupt Request Accepted

This diagram shows an interrupt request sent by the co-processor and accepted by the CPU. In cycle t1 the co-processor asserts proc_cop_insert_req to request an inserted instruction. The CPU asserts proc_cop_grant to grant the cycle. In t2 the co-processor inserts an xtrap instruction. This causes the CPU to begin a begin a trap sequence. In instruction cycles t3, t4, and t5 the CPU fetches the three instructions which will be quashed for the trap sequence. In cycles t6 and t7 the CPU idles awaiting the beginning of the trap sequence in t8. The data cycle t11 acknowledges to the co-processor that the interrupt was accepted. Compare this to interrupt rejection in diagram 3g. See diagram 2a for the basic trap sequence.

3g. Interrupt Request Rejected

This diagram shows an interrupt rejected because an earlier instruction than the interrupt request caused an exception. In cycle t5 the co-processor delivers an xtrap instruction to the CPU. The CPU begins a trap sequence as in diagram 3f. However, because a divide instruction is in progress in the NCEU, proc_cop_busy is asserted. The CPU idles while proc_cop_busy is asserted. The co-processor dis-asserts busy in t18. After this, the CPU waits until t20 to begin the trap sequence to give the co-processor a chance to report trap status in t19. Here the co-processor reports a trap. So, the CPU elects to take the trap and reject the interrupt. The trap sequence proceeds in instruction cycles t20, t21, and t22 and data cycles t23, t24, and t25 with the exception command on proc_data_cmd in t23. The exception command on proc_data_cmd in t23 indicates to the co-processor that the interrupt was rejected. Had the NCEU dis-asserted its proc_cop_trap in cycle t19, the CPU would have accepted the interrupt and placed "Interrupt COPn" on proc_data_cmd in t23.

3h. Inserted Load (Subcache Miss)

The inserted instruction load which misses in the data subcache looks very much like an inserted load followed by a data subcache miss. Notice that the CPU toggles proc_data_stall during the response cycle that the requested word of data is transferred. Here that cycle is cycle t16, the fourth data word of the subpage.

Other types of miss look similarly like a combination of inserted instructions and miss handling transactions. These include the store miss, subpage load and store miss, instruction fetch miss, and multiple misses caused both by inserted and non inserted instructions.

3i. Inserted Load (Page Missing Response)

The error response is noted by the co-processor. The CPU does not begin an exception because errors on inserted instructions do not cause exceptions. However, the CPU must invalidate the subcache subpage which it had allocated for the request since invalid data is written to it.

Address Space Transactions

4a. SPA load request and response

This diagram shows a load instruction which references data in SPA space. In cycle t5 the CPU idles the data fields. In cycle t6 it drives on proc_data_cmd a request to load data from an SPA space location and drives the address of that location on proc_data. In cycles t5 through t9, the CPU asserts proc_data_stall and proc_instr_stall to stop the pipelines while it requests the data and awaits the response. In this period, no activity is performed on proc_instr or proc_data. In cycle t9, the cache asserts proc_cache_response_req, signaling that it has a response prepared. The CPU answers by asserting proc_cache_grant. Next, in t10, the cache drives proc_data_cmd and proc_data with the requested word and the unit targeted by instruction 1 reads the data value. In t10, the CPU dis-asserts both proc_data_stall and proc_instr_stall to resume execution.

The number of stall cycles after the request is not fixed. The CPU stalls until the cache asserts proc_cache_response_req.

An SCnA space load request and response looks exactly the same except that the command on proc_data_cmd in cycle t6 specifies an SCnA space load request and the co-processor performs the response with proc_cop_response_req in cycle t9 and proc_data and proc_data_cmd in cycle t10.

A memory operation which returns a value -- findpg, findpl or memck -- looks exactly the same except that the command in data field cycle t6 specifies the desired operation and arguments and the returned value reflects the result of the requested operation.

An error status return looks the same except that instead of data, the unit returns an error indication on proc_data_cmd. The CPU must initiate the trap sequence just as on a cache load which receives an error response.

4b. SPA store request and response

The SPA space store request and response looks very similar to the SPA space load request and response. The difference is that in cycle t7, the cycle after the store request, the CPU (or source unit as specified by instruction 2) drives the data to be stored onto proc_data. The Cache reads this data and stores it to the specified location. Rather than return a data value in cycle t10, the Cache returns only error status.

An SCnA space store request and response looks exactly the same except that the command on proc_data_cmd in cycle t6 specifies an SCnA space load request and the co-processor performs the response with proc_cop_response_req in cycle t9 and proc_data and proc_data_cmd in cycle t10.

-83-

Co-Execution

5a. One Cycle TST

This diagram shows an ntst instruction fetched in cycle t2. The result of the instruction, in this case true, is placed on the proc_testunit_test signal in cycle t4 and remains there until another ntst instruction, fetched in cycle t6, modifies it, in this case to dis-asserted. The instruction fetched in cycle t3 branches based on the nntst condition which corresponds to the proc_testunit_test signal. Thus, this instruction branches based on the test of the previous instruction.

The multi-cycle test is exactly like the one cycle test except that the value on proc_testunit_test appears later and the proc_cop_busy is asserted while the test is in progress. The proc_cop_busy is not used unless a trap is signaled (see diagrams 5b and 5c). Had this diagram shown a 3 cycle test, such as a floating point inequality comparison, the proc_testunit_test value would have changed in cycle t6 not t4 and proc_cop_busy would have been asserted in cycles t3 and t4. In order to use the proc_testunit_test value correctly, the bncs instruction would have to be placed in the instruction stream two instructions later than in this example.

5b. One Cycle Co-Processor Exception Report

This diagram shows a trap taken because a single cycle instruction executed by a co-processor reports an exception. In this example, the integer add instruction fetched in cycle t2 reports an exception because of overflow. The bus activity is exactly the same as for a trap detected in the CPU (diagram 2a) except that in cycle t4 the co-processor (NCEU) asserts proc_cop_trap to signal its exception. As in diagram 2a, the *1, *2, and *3 idle cycles in t7, t8, and t9 are the cycles during which the CPU performs the trap sequence.

This diagram illustrates the timing of proc_cop_trap for single cycle instructions. The trap signal is asserted 2 cycles after the instruction is fetched.

5c. Multi-Cycle Co-Execution with Exception Report

This diagram shows the execution of a multi cycle instruction which reports an exception. The co-processor asserts its proc_cop_busy signal for cycles t3 and t4 while it performs the addition. In t6 it reports the exception from the addition. This causes the CPU to begin a trap sequence just like in diagram 2a. Notice that the two proc_quash does not rise until t7 so that the instructions fetched in t3 and t4 are not quashed.

This diagram illustrates the timing of proc_cop_trap for multi cycle instructions. The trap signal is asserted 1 cycle after proc_cop_busy is dis-asserted.

5d. Exception Detected by CPU while Co-Execution Unit busy

This diagram shows the CPU waiting until a co-processor completes its instructions before beginning a trap sequence. The co-processor dis-asserts proc_cop_busy in t18. After this, the CPU waits until t20 to begin the trap sequence to give the co-processor a chance to report trap status in t19. Here the co-processor does not report any trap. The trap sequence proceeds in instruction cycles t20, t21, and t22 and data cycles t23, t24, and t25 with the exception command on proc_data_cmd in t23. The sequence is very similar to diagram 3g.

-84-

Misc

6a. Memory System Instructions

This diagram shows a memory system instruction that does not require a response, such as a prefetch or memb. In cycle t5 the CPU drives the subpage address information on proc_data and the prefetch subpage command on proc_data command. The Cache reads these values and takes the specified action. All memory operations that do not return a value work this way. These include endt, memb, and pfp. In addition, the change priority instruction has a data cycle like this that is read by all the co-processors.

The data broadcast when a control register is modified looks exactly like a memory system instruction without a response. The command for a control register broadcast is data action.

6b. Reset and Instruction Cache Enable

This diagram shows the processor entering and leaving reset and then going through the cache enable sequence. The first instruction fetch from cache is a subcache hit. The miss timing is similar and illustrated in diagram 1e. Each of the data field operations is a movectl on the assumption that the data subcache is disable and normal loads and stores are not possible. This need not be the case.

In cycle t0, the processor is in an unknown state. In cycle t1, the CPU resets by asserting proc_reset_out idling the data and instruction fields, asserting proc_quash, and dis-asserting the proc_data_stall and proc_instr_stall signals. The next frame shows cycles t2 through t16. These are all the same. The processor holds the reset state and the co-processors enter and hold the reset state.

In t17, the processor leaves reset by beginning to fetch instructions from ROM. Each instruction fetch here takes three cycles. The precise timing depends on the ROM access time. Each instruction fetch causes two stalls during which the CPU asserts both proc_data_stall and proc_instr_stall.

In cycle t29, the data field cycle of ROM instruction 0, the CPU lowers proc_quash to allow that first instruction to execute. Notice that each instruction has a data field cycle three non stalled cycles after it is fetched.

In cycle t33, the CPU begins to fetch instructions from the subcache. This begins normal execution.

The data subcache enable is not critical since no data operations need be in progress when the subcache is enabled.

6c. Memory System Instructions with Response

This diagram shows a memory system instruction which requires a response from the Cache, such as an LRU lookup or cpy. In cycle t5 the CPU drives the subpage address information on proc_data and the command request command on proc_data command. The Cache reads these values and takes the specified action. The CPU then stalls awaiting a response which comes in t8.

The bus activity of the memory instruction with a response is exactly that of the SPA/SCnA space load except that the request command differs.

-85-

Cross References

Response Operation for Each Request

| Request Type | Possible Responses |
|---|---|
| Data subpage request | 8 of ( response data, response missing_page, response cache error ) |
| Instruction subpage request | 8 of ( instruction transfer, response missing page, response cache error ) |
| Subpage load request | 8 of ( response data, response missing_page, response cache error ) |
| Subpage store request | response acknowledge, response missing page, response cache error |
| SPA load request | response data, response cache error |
| SPA store request | response acknowledge, response cache error |
| SC0A load request | response data, response cache error |
| SC0A store request | response acknowledge, response cache error |
| SC1A load request | response data, response cache error |
| SC1A store request | response acknowledge, response cache error |
| LRU lookup request | response data, response cache error |
| System lookup request | response data, response cache error |
| memory instruction | response data, response missing page, response cache error, response acknowledge |

Action or Request Operation for Each Instruction

| Instruction Type | Action or Request |
|---|---|
| ld, cld | data action, data subpage request, upgrade any owner to atomic |
| ldsp, cldsp | 8 data action, data subpage request subpage load |
| st, cst | data action, data subpage request |
| stsp, cstsp | 8 data action, data store subpage request |
| movectlc | data action |
| movectln | data action |
| movectlcop | data action |
| endt | memory instruction (endt) |
| moveb | data action |
| KSR | exception |
| memb | memory instruction, action |
| pfs | memory instruction, action |
| pfp | memory instruction, action |
| findpg | memory instruction, request |
| findpl | memory instruction, request |
| memck | memory instruction, request |
| chng | memory instruction, request |
| cpy | memory instruction, request |
| crt | memory instruction, request |
| dst | memory instruction, request |
| udl | memory instruction, request |
| udg | memory instruction, request |

Implementation Notes

These are a series of miscellaneous notes about the processor interface.

Subcache Descriptor Lookup
data lookup in subcache descriptor and access in subcache must be atomic. If an inserted instruction occurs between a lookup and a data fetch or store, the lookup must be repeated in case an invalidation occurred in the gap.

Writebacks
Writebacks may be inserted just before or just after a data/instruction subpage request. A writeback does not have an aknowledgement, so the writeback simply invisibly fills the stall. A sensible implementation will do one writeback if any is available in the stalls after the request and as many writebacks before the request as are necessary to clear a descriptor.

Interrupted Stall Recovery
Any inserted instruction activity will prevent a long request from receiving its response. Thus, to insure forward progress, the results of a long request should be cached in the CADT for a time so that when the request is reissued, the result will be available immediately. Long requests include data requests that return missing_page, physical accesses, and find page operations. Successful data requests will be cached in the local cache. Note that this has some implications for coherency. The only place that should be important is the missing page information which must be managed by a software control anyway.

Subcache Miss Note
On a load miss, the CPU controls the co-processor data input latches with proc_data_stall and proc_instr_stall. It uses these to latch the correct data into the co-processor during the response to a miss. On store miss the store cycle always comes the cycle after the seventh transfer to subcache. blockstore miss transfer is performed directly after the address and store request. On a block load, data is seen as on a load but each transfer must be read by the target co-execution unit. An instruction miss looks like a data load miss.

Stores to data held Non-Exclusive
Every storew to a data element held in the subcache in non-exclusive mode must be followed by a writeback of that data elements subpage.

Parity Errors
On parity errors, the trap point must be placed before the instruction that caused the parity error, but any store instruction immediately following that instruction may be allowed to complete without quashing.

It will thus be seen that the invention efficiently attains the objects set forth above, among those made apparent from the preceding description. In particular, the invention provides multiprocessor methods and apparatus in which each processor can selectively assert instructions to other processing elements, thereby enhancing parallelism of execution and increasing processing speed.

It will be understood that changes may be made in the above construction and in the foregoing sequences of operation without departing from the scope of the invention. The invention can be practiced, for example, in connection with multiprocessor structures other than those depicted in FIG. 1. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

We claim:

1. Digital processing apparatus comprising
   A. a first instruction source for
      storing a plurality of instructions, each associated with a logical program count (PC), and for
      responding to a sequence of instruction fetch signals, each designating a PC associated with a requested instruction, for generating an instruction stream including a corresponding sequence of requested instructions,
   B. a set of interconnected processing elements, said set of processing elements including a first processing element coupled to said first instruction source for normally processing an instruction stream received therefrom,
      said first processing element including pipeline processing means for processing plural instructions substantially concurrently with one another, said pipeline processing means including
         fetch means for generating and applying to said first instruction source an instruction fetch signal designating a logical program count (PC) associated with a requested instruction,
         execution means for executing, substantially concurrently with generation and application of such instruction fetch signal, a previously received instruction,
   C. at least one other of said processing elements including insert means for generating one or more inserted-instructions and for applying those inserted-instructions to said first processing element to be processed thereby,
   D. said execution means including means for processing said inserted-instructions in the same manner as instructions received by the first processing element from the first instruction source, and without affecting the generation and application of a sequence of instruction fetch signals by said fetch means
   E. said first processing element further including launch quash means, coupled with said execution means, for selectively preventing processing of an instruction received from said first instruction source in response to a prior instruction fetch signal,
      result quash means for selectively limiting a result of processing by said execution means of any of (i) an inserted-instruction received by said first processing element from said at least one other processing element and (ii) an instruction received from said first instruction source in response to a prior instruction fetch signal.

2. Apparatus according to claim 1, further comprising
   instruction pipeline means for interconnecting said processing elements and said first instructions source for carrying said instructions, and
   wherein said insert means includes means for applying one or more of said inserted-instructions to said instruction pipeline means.

3. Apparatus according to claim 1, wherein said inserted-instructions have the same format as the instructions from the first instruction source.

4. Apparatus according to claim 3, wherein said format includes a selected number of digital instruction bits, wherein at least a first set of said instruction bits form a first instruction field.

5. Apparatus according to claim 3, wherein said format includes a first set of digital instruction bits for specifying selected address signals, and a second set of digital instruction bits, for specifying selected command signals.

6. Apparatus according to claim 1, wherein said first instruction source includes a memory element.

7. Apparatus according to claim 6, wherein said memory element includes an instruction cache element for storing digital values representative of instructions.

8. Apparatus according to claim 7, wherein
   said first processing element includes an execution unit (CEU), said CEU including
   means for asserting signals to said instruction cache element to cause instructions to be transmitted from said instruction cache element to said CEU.

9. Apparatus according to claim 7, wherein said instructions include cache management instructions inserted by said instruction cache element.

10. Apparatus according to claim 7, wherein said instruction cache element includes means for storing instructions representative of program steps.

11. Digital processing apparatus comprising
    A. a first instruction source for responding to a sequence of instruction fetch signals, each designating a logical program count (PC) associated with a requested instruction, for generating an instruction stream including a corresponding sequence of requested instructions,
    B. a set of interconnected processing elements, said set of processing elements including a first processing element coupled to said first instruction source for normally processing an instruction stream received therefrom,
       said first processing element including pipeline processing means for processing plural instructions substantially concurrently with one another, said pipeline processing means including
          fetch means for signal generating and applying to said first instruction source an instruction fetch signal designating a logical program count (PC) associated with a requested instruction,
          execution means for executing, substantially concurrently with generation and application of such instruction fetch signal, a previously received instruction,
    C. at least one other of said processing elements including input/output processing means for processing signals received from, and transmitted to, a peripheral device, said input/output processing means including insert means for responding to selected signals from said peripheral device to generate direct memory access (DMA) control instructions and for applying those DMA control instructions to said first processing element to be processed thereby to at least initiate DMA transfers with said peripheral device, D. said execution means including means for processing said DMA control instructions in the same manner as instructions received by the first processing element from the first instruction source, and without affecting the generation and application of a sequence of instruction fetch signals by said fetch means, E. said first processing element further including launch quash means, coupled with said execution means, for selectively preventing processing of an instruction received from said first instruction resource in response to a prior instruction fetch signal, result quash means for selectively limiting a result of processing by said execution means of any of (i) a DMA control instruction received by said first processing element from said input/output processing means and (ii) an instruction received from said first instruction resource in response to a prior instruction fetch signal.

12. Apparatus according to claim 11, wherein said input/output processing means includes a peripheral interface unit (XIU) for controlling signals received from, and transmitted by, a peripheral device.

13. Apparatus according to claim 11, wherein said input/output processing means includes graphics controller means for controlling signals transmitted to a display device.

14. Apparatus according to claim 11, wherein said input/output processing means includes text searching means for searching data structures representative of text.

15. Apparatus according to claim 1 or 11, wherein at least a selected one of said processing elements includes at least a first register element associated with that processing element for storing digital values representative of data, and said insert means includes means for generating and applying to that selected processing element instructions to control movement of data into and out of at least said first register element.

16. Apparatus according to claim 1 or 11, wherein at least a selected one of said processing elements includes at least a first register element associated with that processing element for storing digital values representative of data, and said insert means includes means for generating and applying to that selected processing element instructions to cause execution of selected logical operations on selected digital values stored in at least said first register element.

17. Apparatus according to claim 1 or 11, wherein at least one of said processing elements includes trap means, responsive to a trap signal, for initiating a trap sequence, said trap sequence including selected program steps to be executed in response to a trap signal, and said insert means includes means for generating and applying to that processing element instructions for generating a trap signal.

18. Apparatus according to claim 1 or 11, wherein at least one of said processing elements includes interrupt means, responsive to an interrupt signal, for initiating an interrupt sequence, said interrupt sequence including selected program steps to be executed in response to an interrupt signal, and said insert means includes means for generating and applying to that processing element instructions for initiating an interrupt sequence.

19. Apparatus according to claim 18, wherein said interrupt means includes means for generating a trap signal in response to an interrupt signal.

20. A method of operating a digital data processor of the type having a first processing element coupled, along an instruction pipeline, to a first instruction source, wherein said first instruction source stores a plurality of instructions, each associated with a logical program count (PC), and responds to a sequence of instruction fetch signals, each designating a PC associated with a requested instruction, for generating and applying to said instruction pipeline an instruction stream including a corresponding sequence of said requested instructions, said method comprising the steps of processing, with said first processing element, plural instructions substantially concurrently with one another said processing step including generating and applying to said first instruction source, with said first processing element, an instruction fetch signal designating a logical program count (PC) associated with a requested instruction, executing, substantially concurrently with generation and application of such instruction fetch signal, a previously received instruction, generating, with a second processing element one or more inserted-instructions to be processed by the first processing element, and applying those inserted-instructions to said instruction pipeline, processing, with said first processing element and without affecting the sequence of instruction fetch signals generated thereby, said inserted-instructions in the same manner as the instruction stream transferred to said first processing element by said first instruction source along said instruction pipeline, selectively preventing processing of an instruction received from said first instruction resource in response to a prior instruction fetch signal, selectively limiting a result of processing by said execution means of any of (i) an inserted-instruction received by said first processing element from said at least one other processing element and (ii) an instruction received from said first instruction resource in response to a prior instruction fetch signal.

21. A method of operating a digital data processor of the type having a first processing element coupled, along an instruction pipeline, to a first instruction source, wherein said first instruction source stores a plurality of instructions, each associated with a logical program count (PC), and responds to a sequence of instruction fetch signals, each designating a PC associated with a requested instruction, for generating and applying to said instruction pipeline an instruction stream including a corresponding sequence of said requested instructions, said method comprising the steps of processing, with said first processing element, plural instructions substantially concurrently with one another, said processing step including generating and applying to said first instruction source, with said first processing element, an instruction fetch signal designating a logical program count (PC) associated with a requested instruction, executing, substantially concurrently with generation and application of such instruction fetch signal, a previously received instruction, generating, with input/output controller, one or more DMA control instructions for at least initiating DMA transfers with said peripheral device, and applying those DMA control instructions to said instruction pipeline, processing, with said first processing element and without affecting the sequence of instruction fetch signals generated thereby, said DMA control instructions in the same manner as the instruction stream transferred to said first processing element by said first instruction source along said instruction pipeline selectively preventing processing of an instruction received from said first instruction resource in response to a prior instruction fetch signal, selectively limiting a result of processing by said execution means of any of (i) a DMA control instruction received by said first processing element from said input/output controller and (ii) an instruction received from said first instruction resource in response to a prior instruction fetch signal.

* * * * *